(12) United States Patent
Kondo

(10) Patent No.: US 7,595,819 B2
(45) Date of Patent: Sep. 29, 2009

(54) SIGNAL PROCESSING DEVICE AND SIGNAL PROCESSING METHOD, PROGRAM, AND RECORDING MEDIUM

(75) Inventor: Tetsujiro Kondo, Tokyo (JP)

(73) Assignee: Sony Corporation, Tokyo (JP)

(*) Notice: Subject to any disclaimer, the term of this patent is extended or adjusted under 35 U.S.C. 154(b) by 818 days.

(21) Appl. No.: 10/898,376

(22) Filed: Jul. 26, 2004

(65) Prior Publication Data

US 2005/0052541 A1 Mar. 10, 2005

(30) Foreign Application Priority Data

| Jul. 31, 2003 | (JP) | ............................... 2003-283271 |
| Jul. 31, 2003 | (JP) | ............................... 2003-283272 |
| Jul. 31, 2003 | (JP) | ............................... 2003-283273 |
| Jul. 31, 2003 | (JP) | ............................... 2003-283274 |

(51) Int. Cl.
*H04N 5/228* (2006.01)

(52) U.S. Cl. ..................... 348/222.1; 348/273; 348/280; 348/281

(58) Field of Classification Search .................. None
See application file for complete search history.

(56) References Cited

U.S. PATENT DOCUMENTS

| 5,552,825 | A   | * | 9/1996  | Talluri et al. .............. 348/222.1 |
| 6,198,770 | B1  | * | 3/2001  | Kondo .................... 375/240.14 |
| 6,233,019 | B1  | * | 5/2001  | Kondo et al. ................. 348/458 |
| 6,522,339 | B1  | * | 2/2003  | Orimo ........................ 345/606 |
| 6,639,201 | B2  |   | 10/2003 | Almogy et al. |
| 7,339,617 | B1  | * | 3/2008  | Kondo et al. ............. 348/222.1 |

FOREIGN PATENT DOCUMENTS

| JP | 03-106186   | 5/1991  |
| JP | 06-339082   | 12/1994 |
| JP | 08-331465   | 12/1996 |
| JP | 9-51510     | 2/1997  |
| JP | 10-112844   | 4/1998  |
| JP | 11-220753   | 8/1999  |
| JP | 2000-138944 | 5/2000  |
| JP | 2001-358989 | 12/2001 |
| JP | 2002-182095 | 6/2002  |
| JP | 2003-075252 | 3/2003  |
| JP | 2003-110947 | 4/2003  |
| JP | 2003-197889 | 7/2003  |
| JP | 2005-533996 | 11/2005 |

* cited by examiner

*Primary Examiner*—Ngoc-Yen T Vu
*Assistant Examiner*—Temitope Adeyiga
(74) *Attorney, Agent, or Firm*—Oblon, Spivak, McClelland, Maier & Neustadt, P.C.

(57) ABSTRACT

A signal processing unit subjects to signal processing first image signals, obtained as the output from a three-sensor-system sensor unit which uses CMOS sensors or the like, thereby obtaining high-image-quality second image signals. The three sensors are positioned at placement positions which are suitable for signal processing at the signal processing unit. The suitable placement positions have been obtained by learning performed beforehand. In one arrangement, the signal processing unit evaluates the second image signals, and controls the placement positions of the three sensors according to the evaluation results. In another arrangement, the first signals are evaluated in a predetermined region, and the capabilities of the sensors at the predetermined region are changed according to the evaluation results. In another arrangement, the sensor unit is controlled according to the level distribution of the first image signals. The present invention can be applied to still or video digital cameras.

27 Claims, 70 Drawing Sheets

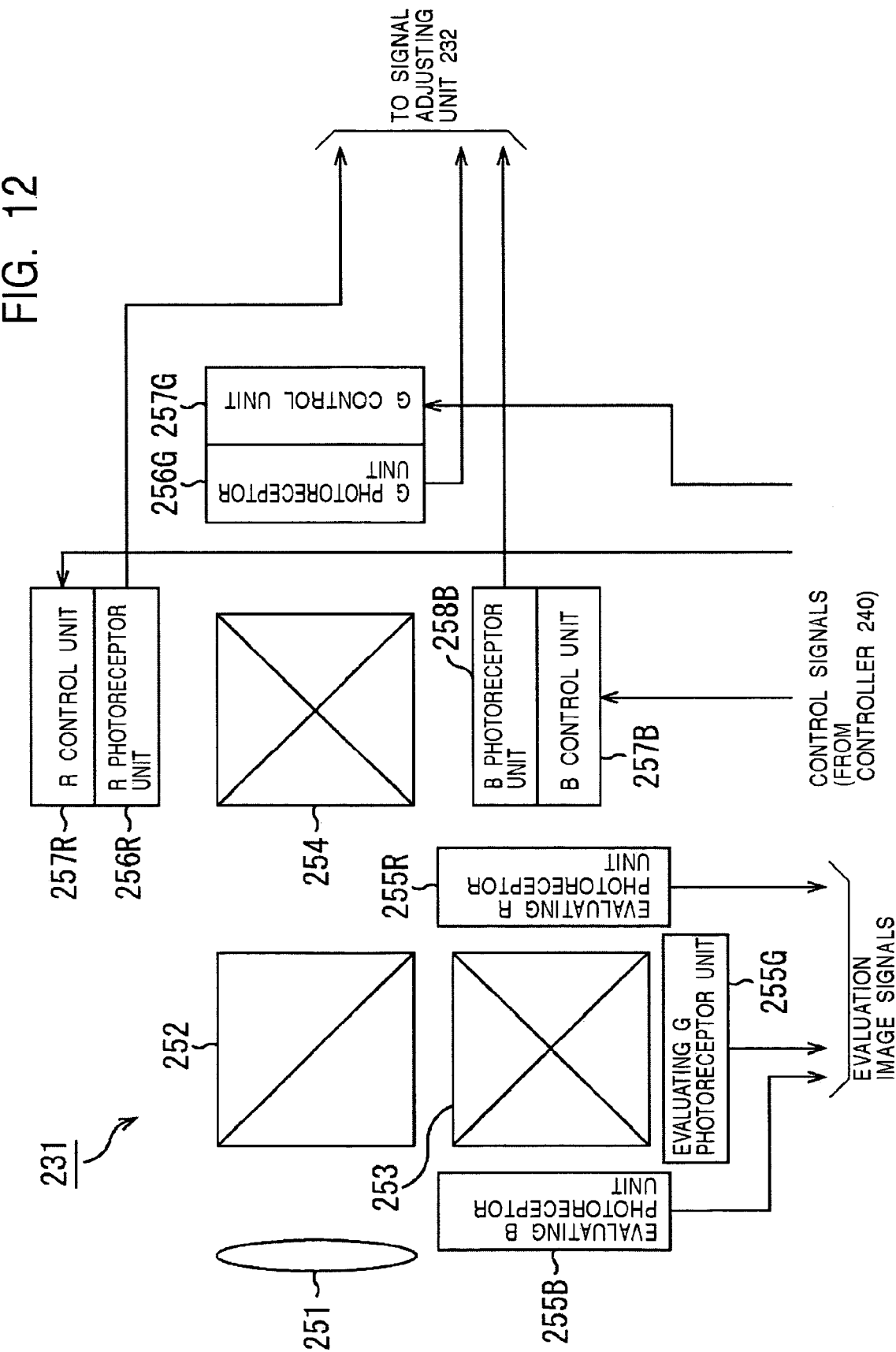

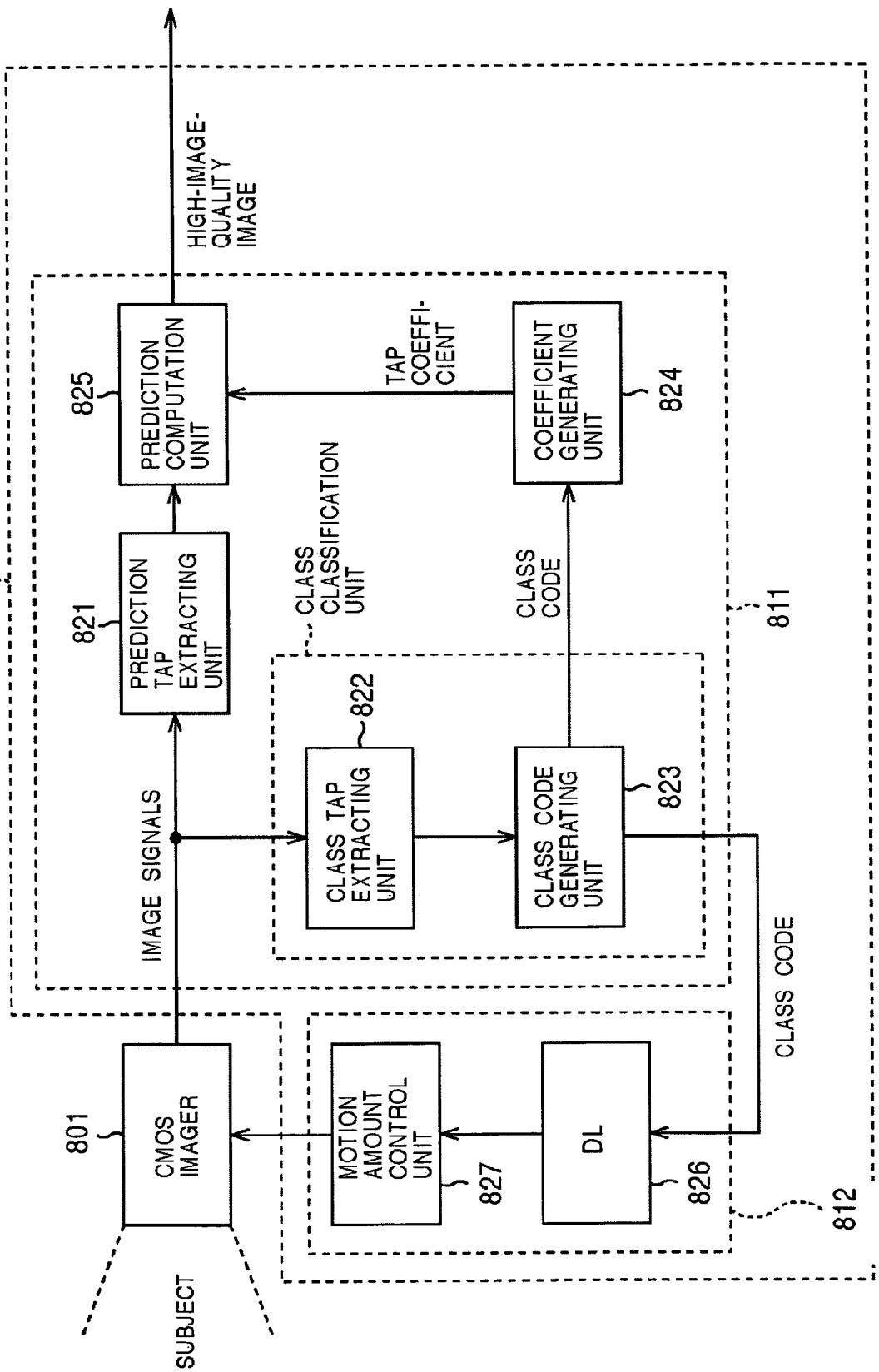

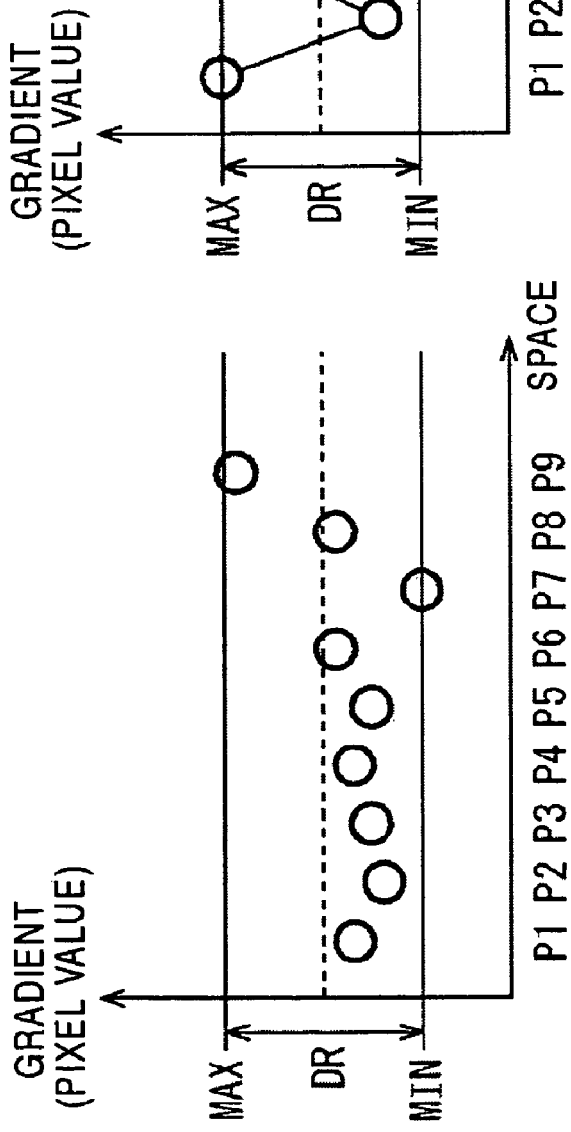

SIGNAL PROCESSING DEVICE AND SIGNAL PROCESSING METHOD, PROGRAM, AND RECORDING MEDIUM

BACKGROUND OF THE INVENTION

1. Field of the Invention

The present invention relates to a signal processing device and a signal processing method, and a program and recording medium thereof, and particularly relates to an image-taking device, a signal processing device and a signal processing method, and a program and recording medium thereof whereby, for example, suitable image signals are obtained for signal processing of images signals, and the image signals are subjected to signal processing, thereby yielding high-quality image signals.

2. Description of the Related Art

Image-taking devices, an example of which is a digital camera (either still or video), have sensor means (or imaging means) such as a CCD (Charge Coupled Device) or CMOS (Complementary Metal Oxide Semiconductor) imager (also known as a "CMOS sensor"), for example, which receive subject light (light from a subject) and output image signals corresponding to the amount of light received. The sensor means act as a sensor for outputting image signals corresponding to the subject light in the form of electric signals by sensing the light from the subject and performing photoelectric conversion thereof.

There are several ways of using the sensor means (imaging means), such as the single-sensor system and the three-sensor system, for example. With the single-sensor system, color filters transmitting R (Red), G (Green), and B (Blue) light, e.g., optical filters arrayed in a pattern called a Bayer array, and one of the R. G, or B light is cast into the sensor pixels. Accordingly, each pixel of the sensor receives light of one of R, G, or B, and an image signal having the signal component of one of R, G, or B is output for one pixel. Thus, with the single-sensor system, each pixel making up the image obtained from the sensor have only one signal component of R, G, or B, so interpolation is performed later for signal components which each pixel do not have. For example, taking notice of a pixel containing only an R signal (component), the G signal and B signal of the pixel of interest are predicted by a nearby pixel having only a G signal and a nearby pixel having only a B signal (see Japanese Unexamined Patent Application Publication No. 2002-135797, for example).

Also, there is signal processing called demosaic wherein pixels having only one of the R, G, or B signals obtained from a single CCD are converted into pixels having all of the R, G, and B signals (see International Publication No. 00/49812, for example).

On the other hand, with a three-sensor system, the sensor means are configured of three sensors, one each for R, G, and B, so that the R sensor receives the R light, the G sensor receives the G light, and the B sensor receives the B light, such that image signals having the three components of the R signal, G signal, and B signal for each pixel are output.

Now, with image-taking devices with a three-sensor system, taking notice of a certain light ray, the light ray of interest is split into the R, G, and B light, by a prism, so that the R sensor receives the R light, the G sensor receives the G light, and the B sensor receives the B light. Accordingly, each of the sensors for R, G, and B are placed at optically equivalent (same) positions so that the R, G, and B light of the ray of interest is received at the same position on each sensor for each of R, G, and B. Note that an image-taking device has also been proposed wherein the G sensor is positioned so as to be offset by ½ pixel as to the R sensor and B sensor in order to obtain image signals with improved resolution in the vertical direction (see Japanese Unexamined Patent Application Publication No. 08-256345, for example).

Also, with conventional devices, the output of the sensing means such as the Charge Coupled Device (hereafter also referred to simply as "CCD") or Complementary Metal Oxide Semiconductor (CMOS) imager (hereafter also referred to simply as "CMOS sensor", or "CMOS") is amplified to obtain image signals of a suitable level.

Amplification of the output of sensor means is carried out by an amplifier such as an AGC (Auto Gain Controller). However, in the event that the contrast of the subject is great, there may be cases wherein obtaining suitable image signals level with a single amplifier is difficult. Accordingly, Japanese Unexamined Patent Application Publication No. 06-086155 discloses a method for easily amplifying a wide dynamic range by amplifying the output of the sensor means with two amplifiers each having different gain.

Now, downstream of the sensor means, signal processing is often performed in order to improve the image quality of the image signals output by the sensor means. That is to say, the CCD or CMOS sensor of the sensor means (imaging means) receive incident light (subject light within a range corresponding to the pixels over a predetermined exposure time, and output image signals corresponding to the amount of light received. Accordingly, it may be said that the sensor performs sampling, as if it were, of the time-wise and space-wise continuous light within a range corresponding to the pixels over a predetermined exposure time, and outputs the sampling results as image signals (pixel values).

In this way, the image signals output by the sensor means are the sampling results of the time-wise and space-wise continuous light, meaning that a part of the information contained in the original light is missing. Accordingly, the image signals output by the sensor means are deteriorated with regard to image quality (i.e., the amount of information) as compared with the original light. This is why signal processing is performed downstream from the sensor means, to raise the image quality of the image signals of which the image quality has deteriorated as compared with the original light.

Now, with conventional arrangements, the sensor means are manufactured giving no regard whatsoever to the signal processing performed downstream therefrom, and operate to output image signals giving no regard whatsoever to the signal processing performed downstream therefrom. Accordingly, the sensor means have properties which are unrelated to the signal processing performed downstream, i.e., the sensor means take into consideration none of the signal processing performed downstream. Thus, not only do the sensor means have properties which are unrelated to the signal processing performed downstream, but also operate in a uniform manner to output image signals, meaning that there is a limit to how far the image quality can be improved by the signal processing performed downstream from the sensor means.

Conversely, if image signals suitable for signal processing performed downstream were to be output at the sensor means, image signals with further-improved image quality could be obtained by that signal processing.

SUMMARY OF THE INVENTION

The present invention has been made in light of the above, and accordingly, it is an object of the present invention to obtain image signals suitable for signal processing and to perform signal processing of the image signals, thereby enabling obtaining of high-quality image signals.

According to a first aspect of the present invention, a signal processing device comprises: sensor means for sensing information and outputting signals corresponding to the information; and signal processing means for subjecting signals output from the sensor means to signal processing; wherein the sensor means are set to properties corresponding to the signal processing.

A signal processing method corresponding to the first aspect of the present invention comprises: an acquisition step for sensing information, and acquiring signals output by sensor means outputting signals corresponding to the information; and a signal processing step for subjecting signals output from the sensor means to signal processing; wherein the sensor means are set to properties corresponding to the signal processing.

A computer-readable program corresponding to the first aspect of the present invention comprises: code for an acquisition step for sensing information, and acquiring signals output by sensor means outputting signals corresponding to the information; and code for a signal processing step for subjecting signals output from the sensor means to signal processing; wherein the sensor means are set to properties corresponding to the signal processing.

A recording medium corresponding to the first aspect of the present invention stores a computer-readable program, wherein the program comprises: code for an acquisition step for sensing information, and acquiring signals output by sensor means outputting signals corresponding to the information; and code for a signal processing step for subjecting signals output from the sensor means to signal processing; wherein the sensor means are set to properties corresponding to the signal processing.

With the signal processing device according to the first aspect of the present invention, and the signal processing method, program, and recording medium corresponding thereto, signal processing is performed on signals output by sensor means which sense information and output signals corresponding to the information. In this case, the sensor means are set to properties corresponding to signal processing.

According to a second aspect of the present invention, a signal processing device comprises: sensor means having at least a first sensor for sensing light and outputting a first component of image signals corresponding to the light, and a second sensor for outputting a second component of the image signals; and signal processing means for subjecting first digital image signals obtained from the output from the sensor means to signal processing, and outputting second digital image signals; wherein the first and second sensors are set in a placement state corresponding to the signal processing, by learning performed beforehand.

A signal processing method corresponding to the second aspect of the present invention comprises: an acquisition step for acquiring the image signals output by sensor means having at least a first sensor for sensing light and outputting a first component of image signals corresponding to the light, and a second sensor for outputting a second component of the image signals; and a signal processing step for subjecting first digital image signals obtained from the output from the sensor means to signal processing, and outputting second digital image signals; wherein the first and second sensors are set in a placement state corresponding to the signal processing, by learning performed beforehand.

A computer-readable program corresponding to the second aspect of the present invention comprises: code for an acquisition step for acquiring the image signals output by sensor means having at least a first sensor for sensing light and outputting a first component of image signals corresponding to the light, and a second sensor for outputting a second component of the image signals; and code for a signal processing step for subjecting first digital image signals obtained from the output from the sensor means to signal processing, and outputting second digital image signals; wherein the first and second sensors are set in a placement state corresponding to the signal processing, by learning performed beforehand.

A recording medium corresponding to the second aspect of the present invention stores a computer-readable program, wherein the program comprises: code for an acquisition step for acquiring the image signals output by sensor means having at least a first sensor for sensing light and outputting a first component of image signals corresponding to the light, and a second sensor for outputting a second component of the image signals; and code for a signal processing step for subjecting first digital image signals obtained from the output from the sensor means to signal processing, and outputting second digital image signals; wherein the first and second sensors are set in a placement state corresponding to the signal processing, by learning performed beforehand.

With the signal processing device according to the second aspect of the present invention, and the signal processing method, program, and recording medium corresponding thereto, signal processing is performed on first digital image signals obtained from the output of sensor means having at least a first sensor for sensing light and outputting a first component of image signals corresponding to the light, and a second sensor for outputting a second component of the image signals, thereby outputting second digital image signals. In this case, the first and second sensors are put in placement states corresponding to the signal processing by learning performed beforehand.

According to a third aspect of the present invention, a signal processing device comprises: signal processing means for subjecting to signal processing signals output from sensor means, which sense information and output signals corresponding to the information; control means for controlling the properties of the sensor means; evaluating means for evaluating the results of the signal processing as to the output of the sensor means with properties controlled by the control means; and determining means for determining the properties of the sensor means corresponding to the signal processing, according to the evaluation results at the evaluating means, and outputting information of the properties.

A signal processing method corresponding to the third aspect of the present invention comprises: a signal processing step for subjecting to signal processing signals output from sensor means, which sense information and output signals corresponding to the information; a control step for controlling the properties of the sensor means; an evaluating step for evaluating the results of the signal processing as to the output of the sensor means with properties controlled in the control step; and a determining step for determining the properties of the sensor means corresponding to the signal processing, according to the evaluation results in the evaluating step, and outputting information of the properties.

A computer-readable program corresponding to the third aspect of the present invention comprises: code for a signal processing step for subjecting to signal processing signals output from sensor means, which sense information and output signals corresponding to the information; code for a control step for controlling the properties of the sensor means; code for an evaluating step for evaluating the results of the signal processing as to the output of the sensor means with properties controlled in the control step; and code for a determining step for determining the properties of the sensor means corresponding to the signal processing, according to the evaluation results in the evaluating step, and outputting information of the properties.

A recording medium corresponding to the third aspect of the present invention stores a computer-readable program, wherein the program comprises: code for a signal processing step for subjecting to signal processing signals output from sensor means, which sense information and output signals corresponding to the information; code for a control step for controlling the properties of the sensor means; code for an evaluating step for evaluating the results of the signal processing as to the output of the sensor means with properties controlled in the control step; and code for a determining step for determining the properties of the sensor means corresponding to the signal processing, according to the evaluation results in the evaluating step, and outputting information of the properties.

With the signal processing device according to the third aspect of the present invention, and the signal processing method, program, and recording medium corresponding thereto, signal processing is performed on signals output from sensor means, which sense information and output signals corresponding to the information, while on the other hand, the properties of the sensor means are controlled, and the results of the signal processing on the output of the sensor means with the properties thereof controlled are evaluated. Properties of the sensor means corresponding to the signal processing are determined according to the evaluation results, and information of the properties is output.

According to a fourth aspect of the present invention, a signal processing device comprises: signal processing means for subjecting to signal processing first digital image signals obtained from the output from sensor means having at least a first sensor for sensing light and outputting a first component of image signals corresponding to the light, and a second sensor for outputting a second component of the image signals and outputting second digital image signals; control means for controlling the placement state of the first and second sensors; evaluating means for evaluating the second digital image signals obtained by the signal processing of the output of the sensor means wherein the placement state of the first and second sensors is controlled by the control means; and determining means for determining the placement state of the first and second sensors corresponding to the signal processing, according to the evaluation results at the evaluating means, and outputting information of the placement state.

A signal processing method corresponding to the fourth aspect of the present invention comprises: a signal processing step for subjecting to signal processing first digital image signals obtained from the output from sensor means having at least a first sensor for sensing light and outputting a first component of image signals corresponding to the light, and a second sensor for outputting a second component of the image signals and outputting second digital image signals; a control step for controlling the placement state of the first and second sensors; an evaluating step for evaluating the second digital image signals obtained by the signal processing of the output of the sensor means wherein the placement state of the first and second sensors is controlled in the control step; and a determining step for determining the placement state of the first and second sensors corresponding to the signal processing, according to the evaluation results in the evaluating step, and outputting information of the placement state.

A computer-readable program corresponding to the fourth aspect of the present invention comprises: code for a signal processing step for subjecting to signal processing first digital image signals obtained from the output from sensor means having at least a first sensor for sensing light and outputting a first component of image signals corresponding to the light, and a second sensor for outputting a second component of the image signals and outputting second digital image signals; code for a control step for controlling the placement state of the first and second sensors; code for an evaluating step for evaluating the second digital image signals obtained by the signal processing of the output of the sensor means wherein the placement state of the first and second sensors is controlled in the control step; and code for a determining step for determining the placement state of the first and second sensors corresponding to the signal processing, according to the evaluation results in the evaluating step, and outputting information of the placement state.

A recording medium corresponding to the fourth aspect of the present invention stores a computer-readable program, wherein the program comprises: code for a signal processing step for subjecting to signal processing first digital image signals obtained from the output from sensor means having at least a first sensor for sensing light and outputting a first component of image signals corresponding to the light, and a second sensor for outputting a second component of the image signals and outputting second digital image signals; code for a control step for controlling the placement state of the sensor means; code for an evaluating step for evaluating the second digital image signals obtained by the signal processing of the output of the sensor means wherein the placement state of the first and second sensors is controlled in the control step; and code for a determining step for determining the placement state of the first and second sensors corresponding to the signal processing, according to the evaluation results in the evaluating step, and outputting information of the placement state.

With the signal processing device according to the fourth aspect of the present invention, and the signal processing method, program, and recording medium corresponding thereto, signal processing is performed on first digital image signals obtained from the output from sensor means having at least a first sensor for sensing light and outputting a first component of image signals corresponding to the light, and a second sensor for outputting a second component of the image signals and outputting second digital image signals, thereby outputting second digital image signals, while on the other hand, the placement state of the first and second sensors is controlled, and the second digital image signals obtained by performing signals processing on the output of the sensor means with the placement state thereof controlled are evaluated. The placement state of the first or second sensor corresponding to the signal processing is determined according to the evaluation results, and information of the placement state thereof is output.

According to a fifth aspect of the present invention, a signal processing device comprises: image converting means for subjecting to image converting processing first digital image signals obtained from the output from imaging means having at least a first sensor for obtaining a first component of image signals, and a second sensor for obtaining a second component of the image signals and outputting second digital image signals; evaluating means for evaluating the second digital image signals; and control means for controlling the placement state of at least one of the first and second sensors according to evaluation at the evaluating means.

A signal processing method corresponding to the fifth aspect of the present invention comprises: an image converting step for subjecting to image converting processing first digital image signals obtained from the output from imaging means having at least a first sensor for obtaining a first component of image signals, and a second sensor for obtaining a second component of the image signals and outputting second digital image signals; an evaluating step for evaluating the second digital image signals; and a control step for controlling the placement state of at least one of the first and second sensors according to evaluation in the evaluating step.

A computer-readable program corresponding to the fifth aspect of the present invention comprises: code for an image converting step for subjecting to image converting processing first digital image signals obtained from the output from imaging means having at least a first sensor for obtaining a first component of image signals, and a second sensor for obtaining a second component of the image signals and outputting second digital image signals; code for an evaluating step for evaluating the second digital image signals; and code for a control step for controlling the placement state of at least one of the first and second sensors according to evaluation in the evaluating step.

A recording medium corresponding to the fifth aspect of the present invention stores a computer-readable program, wherein the program comprises: code for an image converting step for subjecting to image converting processing first digital image signals obtained from the output from imaging means having at least a first sensor for obtaining a first component of image signals, and a second sensor for obtaining a second component of the image signals and outputting second digital image signals; code for an evaluating step for evaluating the second digital image signals; and code for a control step for controlling the placement state of at least one of the first and second sensors according to evaluation in the evaluating step.

With the signal processing device according to the fifth aspect of the present invention, and the signal processing method, program, and recording medium corresponding thereto, image conversion processing is performed on first digital image signals obtained from the output from imaging means having at least a first sensor for obtaining a first component of image signals, and a second sensor for obtaining a second component of the image signals and outputting second digital image signals. Further, the second digital image signals are evaluated, and the placement state of at least one of the first and second sensors is controlled according to the evaluation.

According to a sixth aspect of the present invention, a signal processing device comprises: parameter acquisition means for acquiring predetermined parameters; control means for controlling the placement state of at least one of a first sensor or a second sensor of imaging means having at least a first sensor for acquiring a first component of image signals, and a second sensor for acquiring a second component of the image signals according to the predetermined parameters; and image converting means for subjecting first digital image signals obtained from the output from the imaging means to image conversion processing corresponding to the predetermined parameters, and outputting second digital image signals.

A signal processing method corresponding to the sixth aspect of the present invention comprises: an acquisition step for acquiring predetermined parameters; a control step for controlling the placement state of at least one of a first sensor or a second sensor of imaging means having at least a first sensor for acquiring a first component of image signals, and a second sensor for acquiring a second component of the image signals according to the predetermined parameters; and an image conversion step for subjecting first digital image signals obtained from the output from the imaging means to image conversion processing corresponding to the predetermined parameters, and outputting second digital image signals.

A computer-readable program corresponding to the sixth aspect of the present invention comprises: code for an acquisition step for acquiring predetermined parameters; code for a control step for controlling the placement state of at least one of a first sensor or a second sensor of imaging means having at least a first sensor for acquiring a first component of image signals, and a second sensor for acquiring a second component of the image signals according to the predetermined parameters; and code for an image conversion step for subjecting first digital image signals obtained from the output from the imaging means to image conversion processing corresponding to the predetermined parameters, and outputting second digital image signals.

A recording medium corresponding to the sixth aspect of the present invention stores a computer-readable program, wherein the program comprises: code for an acquisition step for acquiring predetermined parameters; code for a control step for controlling the placement state of at least one of a first sensor or a second sensor of imaging means having at least a first sensor for acquiring a first component of image signals, and a second sensor for acquiring a second component of the image signals according to the predetermined parameters; and code for an image conversion step for subjecting first digital image signals obtained from the output from the imaging means to image conversion processing corresponding to the predetermined parameters, and outputting second digital image signals.

With the signal processing device according to the sixth aspect of the present invention, and the signal processing method, program, and recording medium corresponding thereto, the placement state of at least one of a first sensor or a second sensor of imaging means having at least a first sensor for acquiring a first component of image signals, and a second sensor for acquiring a second component of the image signals, is controlled according to predetermined parameters, and image conversion processing corresponding to the predetermined parameters is performed on first digital image signals obtained from the output of the imaging means, thereby outputting second digital image signals.

According to a seventh aspect of the present invention, a signal processing device comprises: acquisition means for acquiring predetermined parameters; image converting means for subjecting to image processing first digital image signals obtained from the output of imaging means having at least a first sensor for acquiring a first component of image signals, and a second sensor for acquiring a second component of the image signals and outputting second digital image signals; control means for controlling the placement state of at least one of the first or second sensors; evaluating means for evaluating the second digital image signals; and storage means for storing the predetermined parameters and the placement state of the first or second sensors in a correlated manner, corresponding to the evaluation of the evaluating means.

A signal processing method corresponding to the seventh aspect of the present invention comprises: an acquisition step for acquiring predetermined parameters; an image conversion step for subjecting to image processing first digital image signals obtained from the output of imaging means having at least a first sensor for acquiring a first component of image signals, and a second sensor for acquiring a second component of the image signals and outputting second digital image signals; a control step for controlling the placement state of at least one of the first or second sensors; an evaluating step for evaluating the second digital image signals; and a storage step for storing the predetermined parameters and the placement state of the first or second sensors in a correlated manner, corresponding to the evaluation of the evaluating means.

A computer-readable program corresponding to the seventh aspect of the present invention comprises: code for an acquisition step for acquiring predetermined parameters; code for an image conversion step for subjecting to image processing first digital image signals obtained from the output of imaging means having at least a first sensor for acquiring a first component of image signals, and a second sensor for acquiring a second component of the image signals and outputting second digital image signals; code for a control step for controlling the placement state of at least one of the first or second sensors; code for an evaluating step for evaluating the second digital image signals; and code for a storage step for storing the predetermined parameters and the placement state of the first or second sensors in a correlated manner, corresponding to the evaluation of the evaluating means.

A storage medium corresponding to the seventh aspect of the present invention stores a computer-readable program, wherein the program comprises: code for an acquisition step for acquiring predetermined parameters; code for an image conversion step for subjecting to image processing first digital image signals obtained from the output of imaging means having at least a first sensor for acquiring a first component of image signals, and a second sensor for acquiring a second component of the image signals and outputting second digital image signals; code for a control step for controlling the placement state of at least one of the first or second sensors; code for an evaluating step for evaluating the second digital image signals; and code for a storage step for storing the predetermined parameters and the placement state of the first or second sensors in a correlated manner, corresponding to the evaluation of the evaluating means.

With the signal processing device according to the seventh aspect of the present invention, and the signal processing method, program, and recording medium corresponding thereto, image processing is performed on first digital image signals obtained from the output of imaging means having at least a first sensor for acquiring a first component of image signals, and a second sensor for acquiring a second component of the image signals and outputting second digital image signals. Further, the placement state of at least one of the first and second sensors is controlled, the second digital image signals are evaluated, and the predetermined parameters and the placement state of the first or second sensors are stored in a correlated manner, corresponding to the evaluation.

According to an eighth aspect of the present invention, a signal processing device comprises: image converting means for subjecting to image conversion processing first digital image signals obtained from the output from sensor means having a plurality of photoelectric converting devices, and outputting second digital image signals; and evaluating means for evaluating the first digital image signals of a predetermined region; wherein a portion of the sensor means corresponding to the first digital image signals of the predetermined region are changed to capabilities corresponding to the evaluation made at the evaluating means.

A signal processing method corresponding to the eighth aspect of the present invention comprises: an image converting step for subjecting to image conversion processing first digital image signals obtained from the output from sensor means having a plurality of photoelectric converting devices, and outputting second digital image signals; and an evaluating step for evaluating the first digital image signals of a predetermined region; wherein a portion of the sensor means corresponding to the first digital image signals of the predetermined region are changed to capabilities corresponding to the evaluation made in the evaluating step.

A computer-readable program corresponding to the eighth aspect of the present invention comprises: code for an image converting step for subjecting to image conversion processing first digital image signals obtained from the output from sensor means having a plurality of photoelectric converting devices, and outputting second digital image signals; and code for an evaluating step for evaluating the first digital image signals of a predetermined region; wherein a portion of the sensor means corresponding to the first digital image signals of the predetermined region are changed to capabilities corresponding to the evaluation made in the evaluating step.

A storage medium corresponding to the eighth aspect of the present invention stores a computer-readable program, wherein the program comprises: code for an image converting step for subjecting to image conversion processing first digital image signals obtained from the output from sensor means having a plurality of photoelectric converting devices, and outputting second digital image signals; and code for an evaluating step for evaluating the first digital image signals of a predetermined region; wherein a portion of the sensor means corresponding to the first digital image signals of the predetermined region are changed to capabilities corresponding to the evaluation made in the evaluating step.

With the signal processing device according to the eighth aspect of the present invention, and the signal processing method, program, and recording medium corresponding thereto, image conversion processing is performed on first digital image signals obtained from the output of sensor means, and second digital image signals are output. On the other hand, first digital image signals of a predetermined region are evaluated, and capabilities of a portion of the sensor means corresponding to the first digital image signals of the predetermined region change to capabilities corresponding to the evaluation of the first digital image signals of the predetermined region.

According to a ninth aspect of the present invention, a signal processing device which performs signal processing for converting first image signals into second image signals, comprises: class classification means for classifying the second image signals into one of a plurality of classes, according to level distribution of the first image signals output from imaging means for converting subject light, which is light from a subject, into image signals; control means for controlling the imaging means according to the level distribution of the first image signals; tap coefficient output means for outputting tap coefficients for each of the classes gained by learning; and computing means for obtaining the second image signals by performing computation using the first image signals output by the imaging means controlled by the control means, and tap coefficients of the class obtained by the class classification means.

A signal processing method corresponding to the ninth aspect of the present invention, for performing signal processing for converting first image signals into second image signals, comprises: a class classification step for classifying the second image signals into one of a plurality of classes, according to level distribution of the first image signals output from imaging means for converting subject light, which is light from a subject, into image signals; a control step for controlling the imaging means according to the level distribution of the first image signals; a tap coefficient output step for outputting tap coefficients for each of the classes gained by learning; and a computing step for obtaining the second image signals by performing computation using the first image signals output by the imaging means controlled in the control step, and tap coefficients of the class obtained in the class classification step.

A computer-readable program corresponding to the ninth aspect of the present invention, for performing signal processing for converting first image signals into second image signals, comprises: code for a class classification step for classifying the second image signals into one of a plurality of classes, according to level distribution of the first image signals output from imaging means for converting subject light, which is light from a subject, into image signals; code for a control step for controlling the imaging means according to the level distribution of the first image signals; code for a tap coefficient output step for outputting tap coefficients for each of the classes gained by learning; and code for a computing step for obtaining the second image signals by performing computation using the first image signals output by the imaging means controlled in the control step, and tap coefficients of the class obtained in the class classification step.

A storage medium corresponding to the ninth aspect of the present invention stores a computer-readable program for performing signal processing for converting first image signals into second image signals, wherein the program comprises: code for a class classification step for classifying the second image signals into one of a plurality of classes, according to level distribution of the first image signals output from imaging means for converting subject light, which is light from a subject, into image signals; code for a control step for controlling the imaging means according to the level distribution of the first image signals; code for a tap coefficient output step for outputting tap coefficients for each of the classes gained by learning; and code for a computing step for obtaining the second image signals by performing computation using the first image signals output by the imaging means controlled in the control step, and tap coefficients of the class obtained in the class classification step.

With the signal processing device according to the ninth aspect of the present invention, and the signal processing method, program, and recording medium corresponding thereto, class classification is performed for classifying second image signals into one of a plurality of classes, according to level distribution of the first image signals output from imaging means for converting subject light, which is light from a subject, into image signals, and the imaging means are controlled according to the level distribution of the first image signals. Further, tap coefficients are output for each of the classes gained by learning, and computation is performed using the first image signals output by the imaging means controlled by the control means, and tap coefficients of the class obtained by the class classification means, thereby obtaining second image signals.

According to a tenth aspect of the present invention, a signal processing device which performs signal processing for converting first image signals into second image signals, comprises: class classification means for classifying the second image signals into one of a plurality of classes, according to level distribution of the first image signals output from imaging means for converting subject light, which is light from a subject, into image signals; activity detecting means for detecting the activity of the first image signals; control means for controlling the imaging means according to the activity of the first image signals; tap coefficient output means for outputting tap coefficients for each of the classes gained by learning; and computing means for obtaining the second image signals by performing computation using the first image signals output by the imaging means controlled by the control means, and tap coefficients of the class obtained by the class classification means.

A signal processing method corresponding to the tenth aspect of the present invention, for performing signal processing for converting first image signals into second image signals, comprises: a class classification step for classifying the second image signals into one of a plurality of classes, according to level distribution of the first image signals output from imaging means for converting subject light, which is light from a subject, into image signals; an activity detecting step for detecting the activity of the first image signals; a control step for controlling the imaging means according to the activity of the first image signals; a tap coefficient output step for outputting tap coefficients for each of the classes gained by learning; and a computing step for obtaining the second image signals by performing computation using the first image signals output by the imaging means controlled in the control step, and tap coefficients of the class obtained in the class classification step.

A computer-readable program corresponding to the tenth aspect of the present invention, for performing signal processing for converting first image signals into second image signals, comprises: code for a class classification step for classifying the second image signals into one of a plurality of classes, according to level distribution of the first image signals output from imaging means for converting subject light, which is light from a subject, into image signals; code for an activity detecting step for detecting the activity of the first image signals; code for a control step for controlling the imaging means according to the activity of the first image signals; code for a tap coefficient output step for outputting tap coefficients for each of the classes gained by learning; and code for a computing step for obtaining the second image signals by performing computation using the first image signals output by the imaging means controlled in the control step, and tap coefficients of the class obtained in the class classification step.

A storage medium corresponding to the tenth aspect of the present invention stores a computer-readable program for performing signal processing for converting first image signals into second image signals, wherein the program comprises: code for a class classification step for classifying the second image signals into one of a plurality of classes, according to level distribution of the first image signals output from imaging means for converting subject light, which is light from a subject, into image signals; code for an activity detecting step for detecting the activity of the first image signals; code for a control step for controlling the imaging means according to the activity of the first image signals; code for a tap coefficient output step for outputting tap coefficients for each of the classes gained by learning; and code for a computing step for obtaining the second image signals by performing computation using the first image signals output by the imaging means controlled in the control step, and tap coefficients of the class obtained in the class classification step.

With the signal processing device according to the tenth aspect of the present invention, and the signal processing method, program, and recording medium corresponding thereto, class classification is performed for classifying the second image signals into one of a plurality of classes, according to level distribution of the first image signals output from imaging means for converting subject light, which is light from a subject, into image signals. Further, the activity of the first image signals is detected, and the imaging means are controlled according to the activity of the first image signals. Tap coefficients for each of the classes gained by learning are output, and computation is performed using the first image signals output by the imaging means controlled by the control means, and tap coefficients of the class obtained by the class classification means, thereby obtaining the second image signals.

According to an eleventh aspect of the present invention, a signal processing device which performs signal processing for converting first image signals into second image signals, comprises: class classification means for classifying the second image signals into one of a plurality of classes, according to level distribution of the first image signals output from imaging means for converting subject light, which is light from a subject, into image signals; parameter output means for outputting parameters representing the resolution of the second image signals; control means for controlling the imaging means according to the parameters; tap coefficient generating means for generating tap coefficients for each of the classes, from coefficient seed data gained by learning and from the parameters; and computing means for obtaining the second image signals by performing computation using the first image signals output by the imaging means controlled by the control means, and tap coefficients of the class obtained by the class classification means.

A signal processing method corresponding to the eleventh aspect of the present invention, for performing signal processing for converting first image signals into second image signals, comprises: a class classification step for classifying the second image signals into one of a plurality of classes, according to level distribution of the first image signals output from imaging means for converting subject light, which is light from a subject, into image signals; a parameter output step for outputting parameters representing the resolution of the second image signals; a control step for controlling the imaging means according to the parameters; a tap coefficient generating step for generating tap coefficients for each of the classes, from coefficient seed data gained by learning and from the parameters; and a computing step for obtaining the second image signals by performing computation using the first image signals output by the imaging means controlled in the control step, and tap coefficients of the class obtained in the class classification step.

A computer-readable program corresponding to the eleventh aspect of the present invention, for performing signal processing for converting first image signals into second image signals, comprises: code for a class classification step for classifying the second image signals into one of a plurality of classes, according to level distribution of the first image signals output from imaging means for converting subject light, which is light from a subject, into image signals; code for a parameter output step for outputting parameters representing the resolution of the second image signals; code for a control step for controlling the imaging means according to the parameters; code for a tap coefficient generating step for generating tap coefficients for each of the classes, from coefficient seed data gained by learning and from the parameters; and code for a computing step for obtaining the second image signals by performing computation using the first image signals output by the imaging means controlled in the control step, and tap coefficients of the class obtained in the class classification step.

A storage medium corresponding to the eleventh aspect of the present invention stores a computer-readable program for performing signal processing for converting first image signals into second image signals, wherein the program comprises: code for a class classification step for classifying the second image signals into one of a plurality of classes, according to level distribution of the first image signals output from imaging means for converting subject light, which is light from a subject, into image signals; code for a parameter output step for outputting parameters representing the resolution of the second image signals; code for a control step for controlling the imaging means according to the parameters; code for a tap coefficient generating step for generating tap coefficients for each of the classes, from coefficient seed data gained by learning and from the parameters; and code for a computing step for obtaining the second image signals by performing computation using the first image signals output by the imaging means controlled in the control step, and tap coefficients of the class obtained in the class classification step.

With the signal processing device according to the eleventh aspect of the present invention, and the signal processing method, program, and recording medium corresponding thereto, class classification is performed for classifying the second image signals into one of a plurality of classes, according to level distribution of the first image signals output from imaging means for converting subject light, which is light from a subject, into image signals. Further, parameters representing the resolution of the second image signals are output, and the imaging means are controlled according to the parameters. Also, tap coefficients are generated for each of the classes, from coefficient seed data gained by learning and from the parameters, and computation is performed using the first image signals output by the imaging means controlled by the control means, and tap coefficients of the class obtained by the class classification means, thereby obtaining the second image signals.

BRIEF DESCRIPTION OF THE DRAWINGS

FIG. 12 is a block diagram illustrating a configuration example of a sensor unit 231;

FIG. 56 is a block diagram illustrating a first configuration example of a DRC circuit 802;

FIGS. 60A and 60B are diagrams describing class code;

DESCRIPTION OF THE PREFERRED EMBODIMENTS

Embodiments of the present invention will now be described.

First Embodiment

Figure 1:
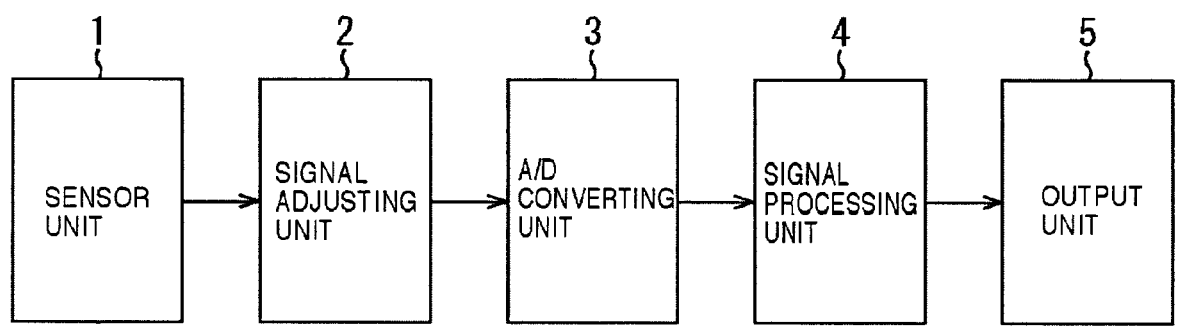
FIG. 1 is a block diagram illustrating a configuration example of an embodiment of an image-taking device to which the present invention has been applied.

FIG. 1 illustrates a configuration example of a first embodiment of an image-taking device to which the present invention has been applied. Note that this image-taking device shown in FIG. 1 can be applied to such as a digital still camera or digital video camera, for example. Let us say here that the image-taking device is a digital video camera.

A sensor unit 1 comprises multiple photoelectric conversion elements corresponding to pixels, for sensing subject light cast therein and outputting image signals corresponding to the subject light. That is to say, the sensor unit 1 receives subject light and supplies image signals which are electric signals corresponding to the amount of received light to a signal adjusting unit 2.

The signal adjusting unit 2 performs Correlated Double Sampling (CDS) for removing the so-called reset noise contained in the image signals output from the sensor unit 1, and supplies image signals obtained as the result of the processing to an A/D converting unit 3. The A/D converting unit 3 performs Analog-Digital conversion of the image signals supplied from the signal adjusting unit 2, i.e., quantizes the image signals, and supplies the digital image signals obtained as a result thereof to a signal processing unit 4.

The signal processing unit 4 takes the digital image signals (hereafter simply referred to as "image signals") supplied from the A/D converting unit 3 as first image signals, subjects the first image signals to predetermined image conversion processing and outputs digital image signals obtained as a result thereof as second image signals to an output unit 5.

The output unit 5 receives the second image signals output from the image processing unit 4, and outputs these. That is to say, the output unit 5 outputs the second image signals from the signal processing unit 4 from an unshown output terminal, or displays on an unshown monitor. Also, the output unit 5 stores the second image signals in an unshown recording medium such as an optical disk, magnetic disk, magneto-optical disk, magnetic tape, semiconductor memory, or the like, or transmits these via such as a telephone line, the Internet, a LAN, or other like cable or wireless transmission medium.

With the image-taking device configured as described above, subject light is received at the sensor unit 1, and image signals which are electric signals corresponding to the amount of light received are supplied to the signal processing unit 4 via the signal adjusting unit 2 and A/D conversion unit 3. The signal processing unit 4 subjects the image signals supplied from the sensor unit 1 via the signal adjusting unit 2 and A/D conversion unit 3 to signal processing as first image signals, such as image conversion processing for improving image quality by improving resolution for example, and outputs second image signals wherein the image quality has been improved thereby to the output unit 5. At the output unit 5, the second image signals supplied from the signal processing unit 4 are output.

Now, the sensor unit 1 is set to properties corresponding to the signal processing performed at the signal processing unit 4, i.e., set to properties such that image signals suitable for the signal processing performed at the signal processing unit 4 are output from the sensor unit 1.

More specifically, the sensor unit 1 is a three-sensor system sensor means for example, comprising three sensors for obtaining the R, G, and B components of the image signals (the later-described R photoreceptor unit 23R, G photoreceptor unit 23G, and B photoreceptor unit 23B). Accordingly, the sensor unit 1 outputs image signals having the three components of R signals, G signals, and B signals, for each pixel. Further, information regarding the properties of the sensor unit 1 for outputting image signals from the sensor unit 1 which are suitable for the signal processing performed at the signal processing unit 4 are obtained beforehand by later-described learning, and the sensor unit 1 is set to such properties. Specifically, the placement state of one or more of the three sensors of the sensor unit 1 is set to a state whereby the sensor unit 1 outputs image signals suitable for the signal processing performed at the signal processing unit 4, i.e., set to a placement state corresponding to the signal processing performed at the signal processing unit 4. Now, the sensor placement state includes the placement position of the sensors, and the attitude (rotational state) of the sensors. Note however that with the present embodiment, in order to facilitate description, the placement position of the sensors of the sensor unit 1 will be employed as the properties of the sensor unit 1. Of course, this does not mean that the attitude of the sensors could not be employed as properties of the sensor unit 1 as well.

As described above, the sensor unit 1 is set to properties corresponding to the signal processing performed at the signal processing unit 4, whereby the sensor unit 1 outputs image signals suitable for the signal processing performed at the signal processing unit 4. Accordingly, subjecting the image signals to signal processing at the signal processing unit 4 allows high-quality image signals to be obtained.

Figure 2:
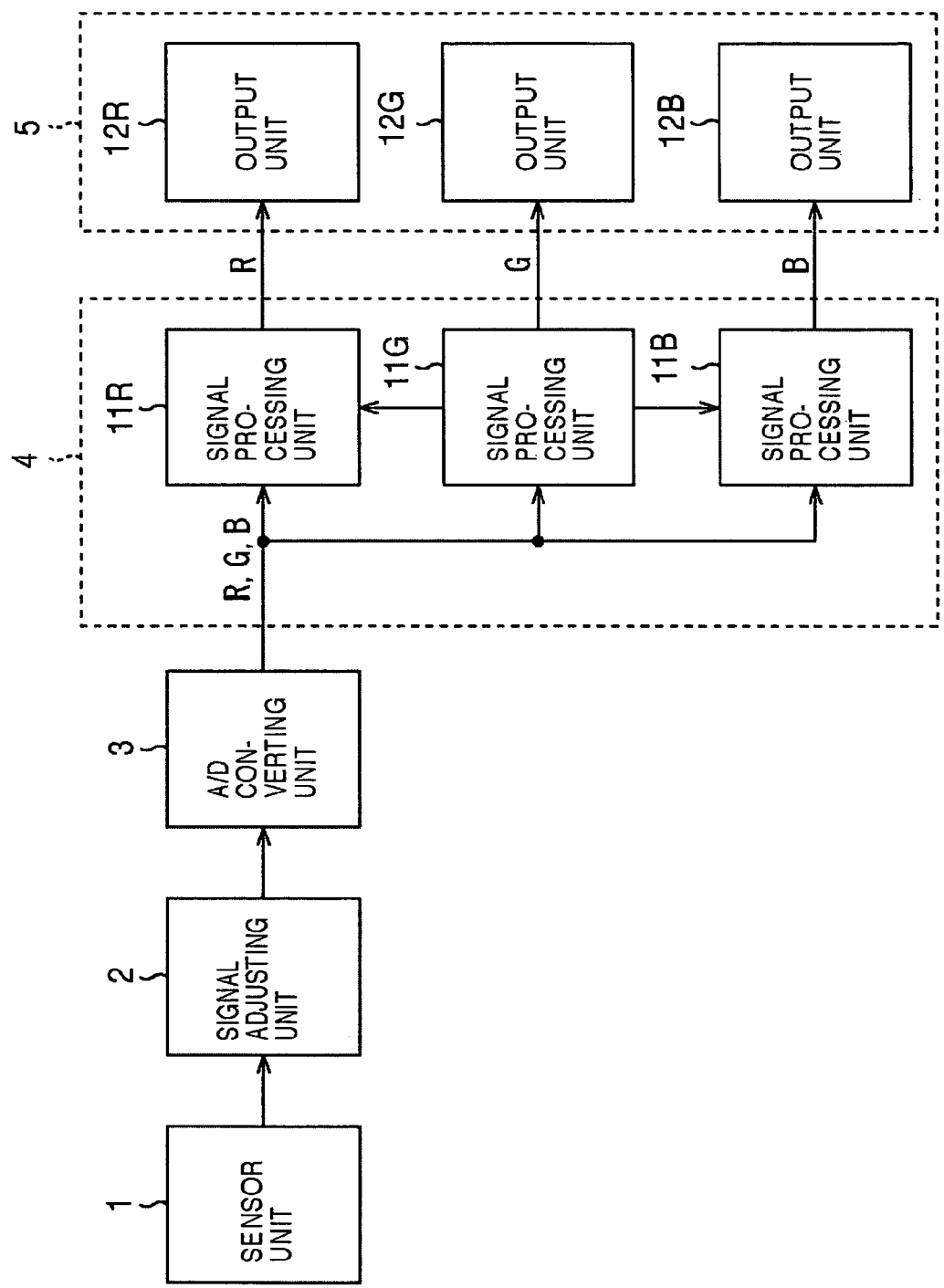
FIG. 2 is a block diagram illustrating a configuration example of a signal processing unit 4 and an output unit 5.

FIG. 2 illustrates a configuration example of the signal processing unit 4 and the output unit 5 shown in FIG. 1.

The signal processing unit 4 comprises three signal processing units, 11R, 11G, and 11B. The signal processing unit 11R receives the first image signals having the R, G, and B signals which are supplied from the A/D conversion unit 3, and subjects the first image signals to signal processing, thereby obtaining the R signals (component) of the second image signals, which is then output to the output unit 5. The signal processing unit 11G receives the first image signals having the R, G, and B signals which are supplied from the A/D conversion unit 3, and subjects the first image signals to signal processing, thereby obtaining the G signals (component) of the second image signals, which is then output to the output unit 5. The signal processing unit 11B receives the first image signals having the R, G, and B signals which are supplied from the A/D conversion unit 3, and subjects the first image signals to signal processing, thereby obtaining the B signals (component) of the second image signals, which is then output to the output unit 5.

The output unit 5 comprises output units 12R, 12G, and 12B. The output units 12R, 12G, and 12B receive and output the R signals, G, signals, and B signals, of the second image signal output by the signal processing units 11R, 11G, and 11B, respectively. Note that hereafter, the signal processing units 11R, 11G, and/or 11B may also be collectively or individually referred to simply as "signal processing unit 11" whenever appropriate.

Figure 3:
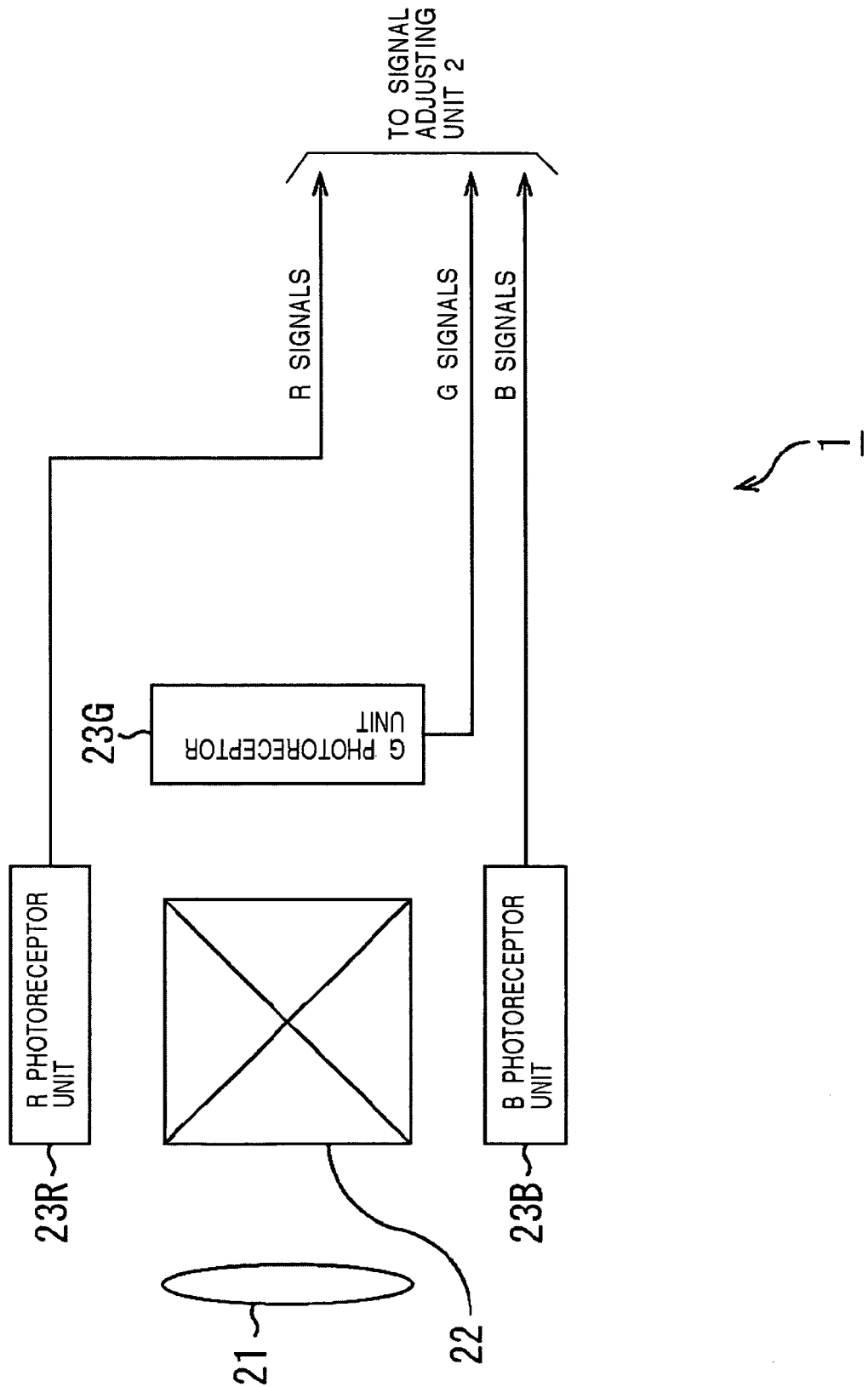
FIG. 3 is a block diagram illustrating a configuration example of a sensor unit 1.

Next, FIG. 3 illustrates a configuration example of the sensor unit 1 shown in FIGS. 1 and 2. Subject light is cast into a lens 21, the and the lens 21 condenses the subject light onto each of the R photoreceptor unit 23R, G photoreceptor unit 23G, and B photoreceptor unit 23B, via a prism 22. That is to say, subject light cast into the lens 21 is emitted into the prism 22. The prism 22 splits the subject light from the lens 21 into R, G, and B light, and emits the R, G, and B light in the respective directions where the R photoreceptor unit 23R, G photoreceptor unit 23G, and B photoreceptor unit 23B are positioned.

The R photoreceptor unit 23R, G photoreceptor unit 23G, and B photoreceptor unit 23B are configured of photoelectric converting devices such as photo-diodes for example, which received the R, G, and B light from the prism 22, and thereby yield R signals, G signals, and B signals, as electric signals corresponding to the amount of received light, which are output to the signal adjusting unit 2.

An example of a device which can be used for the R photoreceptor unit 23R, G photoreceptor unit 23G, and B photoreceptor unit 23B, is a CCD. Note however, that the R photoreceptor unit 23R, G photoreceptor unit 23G, and B photoreceptor unit 23B are by no means restricted to CCDs, and CMOS sensors, or HARPs (High-Gain Avalanche Rushing Amorphous Photoconductor) which are imaging tubes employing the electron avalanche phenomena occurring within a photoconductive target of an a-Se (amorphous selenium) semiconductor, may be used instead.

With the sensor unit 1 configured such as described above, the placement positions of the R photoreceptor unit 23R, G photoreceptor unit 23G, and B photoreceptor unit 23B, are set to positions where RGB signals of image signals, suitable for signals processing at the signal processing units 11R, 11G, and 11B of the signal processing unit 4, are output. That is to say, the R photoreceptor unit 23R, G photoreceptor unit 23G, and B photoreceptor unit 23B are placed at positions corresponding to the signal processing performed at the signal processing unit 4. Now, the placement positions of the R photoreceptor unit 23R, G photoreceptor unit 23G, and B photoreceptor unit 23B which correspond to the signal processing performed at the signal processing unit 4 are obtained beforehand by performing later-described learning, for example.

To facilitate description here, let us say that the placement position of the entire R photoreceptor unit 23R has been set to a position obtained by learning. Further, let us say that the placement positions of the entire G photoreceptor unit 23G and B photoreceptor unit 23B have been set to positions obtained by learning. However, it should be noted that an arrangement may be made using MEMS (Micro-Electro-Mechanical System) technology, whereby the R photoreceptor unit 23R employed is one wherein the placement position of a pixel can be essentially changed (moved), with the placement position of each of the pixels of the R photoreceptor unit 23R being obtained beforehand by learning, corresponding to the signal processing at the signal processing unit 4, so as to place each of the pixels of the R photoreceptor unit 23R at positions obtained by learning. This is true for the G photoreceptor unit 23G and the B photoreceptor unit 23B as well.

Figure 4:
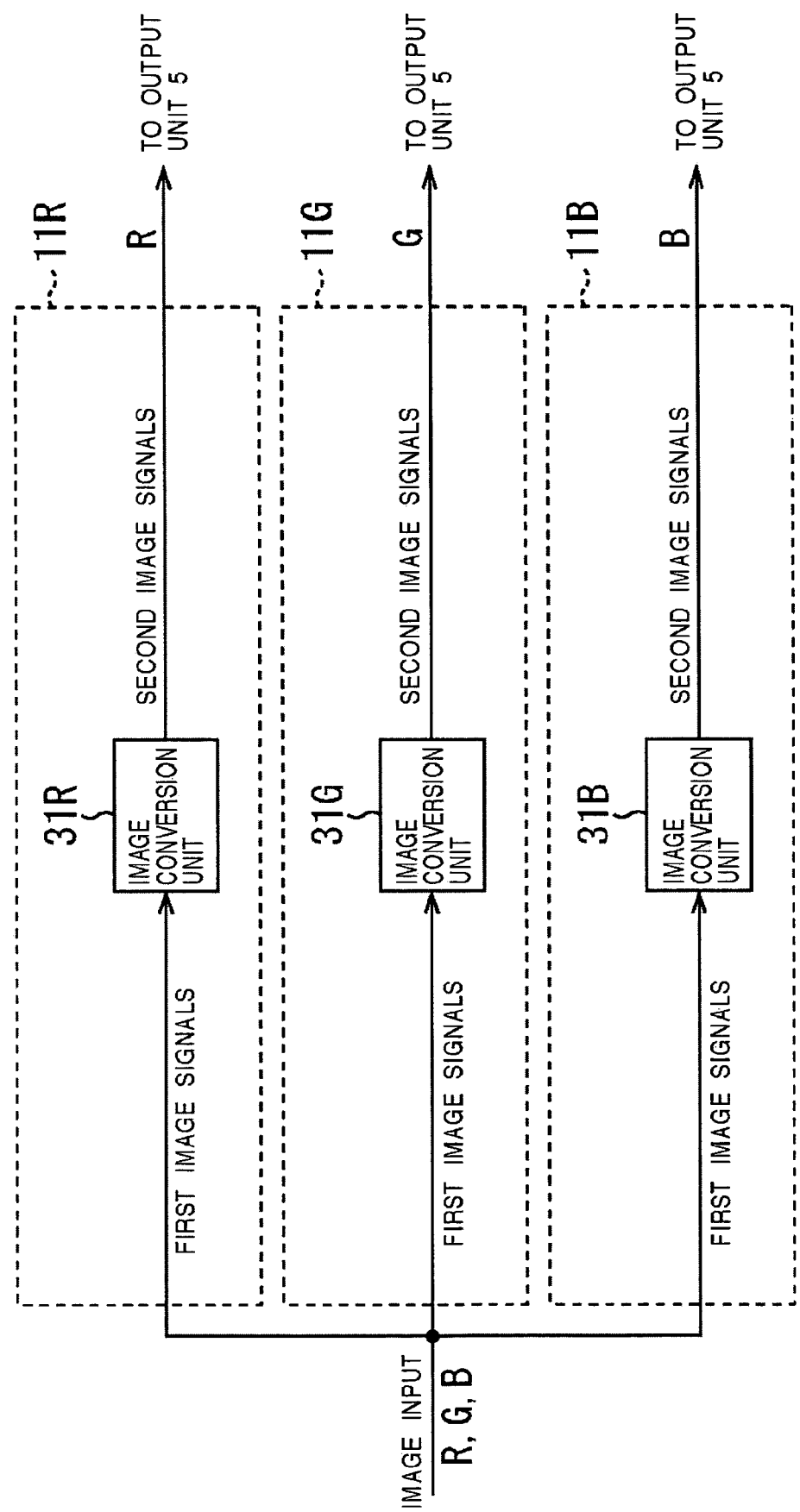
FIG. 4 is a block diagram illustrating a configuration example of a signal processing unit 11.

Next, FIG. 4 illustrates a configuration example of the signal processing unit 11 shown in FIG. 2. The signal processing units 11R, 11G, and 11B have supplied thereto the image signals output from the sensor unit 1, as first image signals, via the signal adjusting unit 2 and A/D converting unit 3.

The signal processing unit 11R comprises an image converting unit 31R. The first image signals supplied to the signal processing unit 11R are supplied to the image converting unit 31R. The image converting unit 31R subjects the first image signals to image conversion processing for improving image quality by improving resolution for example, and supplies the R digital image signals with improved image quality that are obtained as a result thereof to the output unit 5 as R signals of the second image signals.

The signal processing unit 11G comprises an image converting unit 31G. The image signals supplied to the signal processing unit 11G are supplied to the image converting unit 31G. The image converting unit 31G subjects the first image signals to image conversion processing for improving image quality by improving resolution for example, and supplies the G digital image signals with improved image quality that are obtained as a result thereof to the output unit 5 as G signals of the second image signals.

The signal processing unit 11B comprises an image converting unit 31B and an image storing unit 32B. The first image signals supplied to the signal processing unit 11B are supplied to the image converting unit 31B. The image converting unit 31B subjects the first image signals to image conversion processing for improving image quality by improving resolution for example, and supplies the B digital image signals with improved image quality that are obtained as a result thereof to the output unit 5 as B signals of the second image signals.

It should be noted that the image converting units 31R, 31G, and 31B are of the same configuration, and accordingly, may be referred to simply as "image converting unit 31", collectively or individually, as appropriate.

Figure 5:
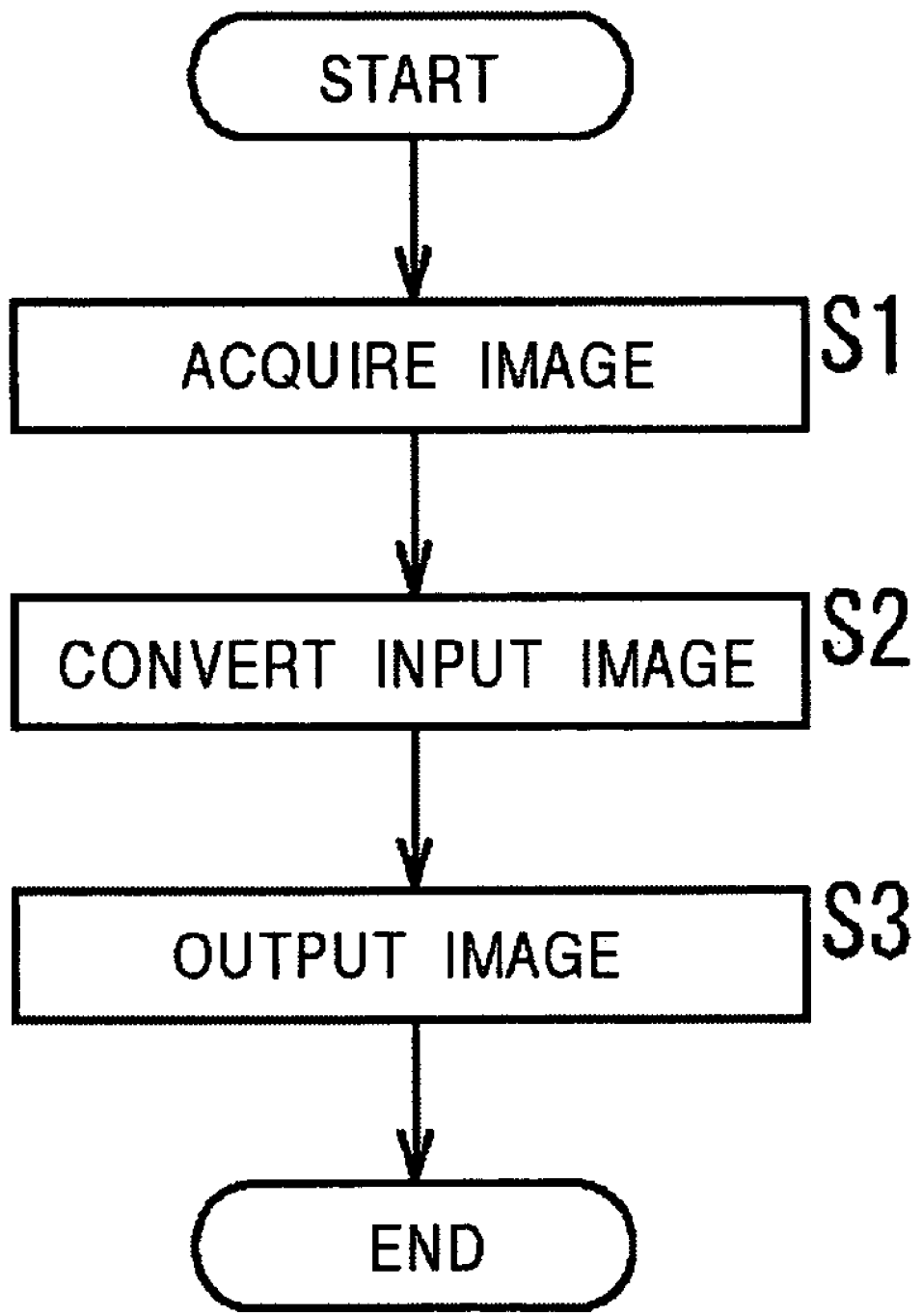
FIG. 5 is a flowchart describing the operation of the image-taking device.

Next, the operations of the image-taking device shown in FIGS. 1 and 2 will be described with reference to the flowchart in FIG. 5.

With the image-taking device, first, in step S1, the signal processing unit 4 obtains first image signals which are to be subjected to signal processing, from the sensor unit 1. That is to say, in step S1, the sensor unit 1 receives the subject light, and performs photoelectric conversion, thereby obtaining image signals as electric signal (i.e., images the subject), and supplies the image signals to the signal adjusting unit 2. The signal adjusting unit 2 subjects the image signals supplied from the sensor unit 1 to CDS processing and then supplies these to the A/D converting unit 3. The A/D converting unit 3 performs A/D conversion of the image signals supplied from the signal adjusting unit 2, which are then supplied to the signal processing unit 4 as first image signals, and accordingly, the signal processing unit 4 obtains the first image signals and the flow proceeds from step S1 to step S2.

In step S2, at the signal processing unit 4, the image converting unit 31 of the signal processing unit 11 (FIG. 4) subjects the first image signals supplied from the A/D converting unit 3 to image conversion processing as signal processing, thereby yielding the second image signals with image quality improved over that of the first image signals, and the flow proceeds to step S3.

In step S3, the signal processing unit 11 outputs the second image signals obtained in step S2 to the output unit 5, thereby completing processing for one frame (or one field). With the image-taking device, the processing according to the flowchart in FIG. 5 is repeated until the user gives a command to stop image-taking, for example.

As described above, the placement positions of the R photoreceptor unit 23R, G photoreceptor unit 23G, and B photoreceptor unit 23B of the sensor unit 1 (FIG. 3) have been set to positions wherein suitable RGB image signals for signal processing at the signal processing unit 4 (signal processing units 11R, 11G, and 11B) are output. That is to say, the R photoreceptor unit 23R, G photoreceptor unit 23G, and B photoreceptor unit 23B are placed at positions corresponding to signal processing of the signal processing unit 4. Accordingly, image signals which are suitable for r the signal processing of the signal processing unit 4 are output from the sensor unit 1, so high-quality image signals can be obtained by subjecting the image signals to signal processing.

Figure 6:
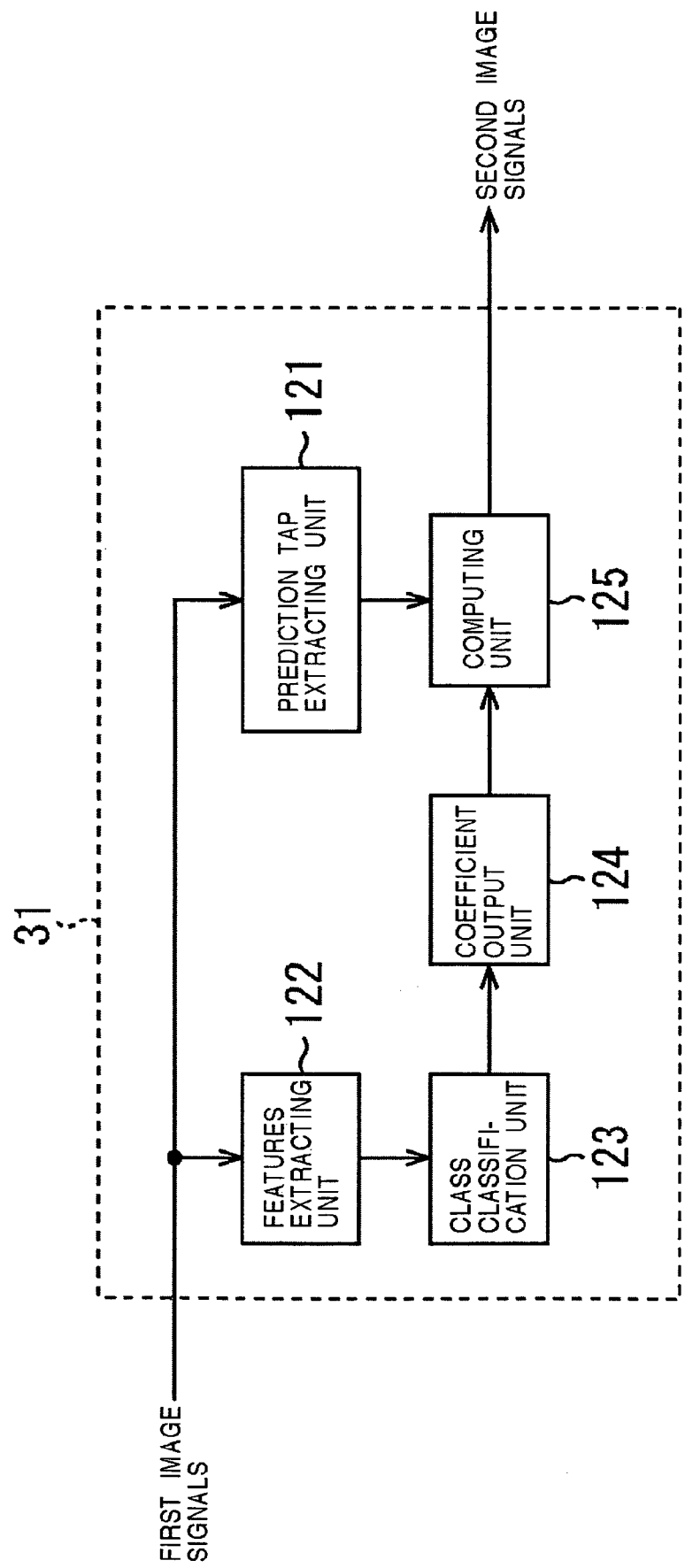
FIG. 6 is a block diagram illustrating a configuration example of an image converting unit 31.

Next, FIG. 6 is a block diagram illustrating a configuration example of the image converting unit 31 shown in FIG. 4. The image converting unit 31 subjects the first image signals supplied thereto to image conversion processing, and outputs the second image signals obtained by the image conversion processing.

Now, if we say that for example, the first image signals are low-resolution image signals and the second image signals are high-resolution image signals, the image conversion processing can be said to be resolution improving processing. Also, if we say that for example, the first image signals are low-S/N (Signal/Noise) image signals and the second image signals are high-S/N image signals, the image conversion processing can be said to be noise removal processing. Further, if we say that for example, the first image signals are image signals of a predetermined size and the second image signals are image signals greater or smaller than the size of the first image signals, the image conversion processing can be said to be image resizing (enlarging or reducing) processing.

At the image converting unit 31, first image signals which are to be subjected to image conversion processing are supplied to a prediction tap extracting unit 121 and features extracting unit 122.

The prediction tap extracting unit 121 sequentially takes pixels making up the second image signals as pixels of interest, and further extracts several pixels (the pixel values thereof) making up the first image signals as a prediction tap. Specifically, the prediction tap extracting unit 121 extracts multiple pixels, which are close space-wise or time-wise to a pixel in the first image signals which corresponds to the pixel of interest (e.g., a pixel in the first image signals closest to the pixel of interest space-wise and time-wise), from the first image signals, as a prediction tap. The prediction tap extracting unit 121 then supplies the prediction tap regarding the pixel of interest to a computing unit 125.

The features extracting unit 122 extracts the features of the pixel of interest using the first image signals, and supplies the features to a class classification unit 123. Examples of the pixel of interest which can be used include the level distribution of the pixel values of multiple pixels in the first image signals close space-wise or time-wise to a pixel in the first image signals which corresponds to the pixel of interest, and so forth.

The class classification unit 123 performs class classification for classifying the pixel of interest into one of multiple classes based on the features of the pixel of interest from the features extracting unit 122, and supplies a class code corresponding to the class obtained as a result thereof, to a coefficients output unit 124. That is to say, the class classification unit 123 outputs as class code the scholar amount itself in the event that the features of the pixel of interest are represented by scholar amount, or a quantization value obtained by quantizing the scholar amount. Also, in the event that the features of the pixel of interest are represented by a vector amount made up of multiple components, the class classification unit 123 outputs as the class code a value obtained by quantizing the vector amount, or a value obtained by ADRC (Adaptive Dynamic Range Coding).

Now, with K-bit ADRC, for example, the maximum value MAX and minimum value MIN of components making up the vector amount representing the features of the pixel of interest are detected, and with DR=MAX−MIN as a local dynamic range of a group, the components making up the features of the pixel of interest are re-quantized into K bits based on this dynamic range DR. That is to say, the minimum value MIN is subtracted from the components making up the features of the pixel of interest, and the subtracted value is divided (quantized) by $DR/2^K$. A bit string wherein the K-bit components making up the features of the pixel of interest are arrayed according to a predetermined order is output as ADRC code. Accordingly, in the event that the vector amount representing the features of the pixel of interest is subjected to 1-bit ADRC processing, each of the components making up the features of the pixel of interest are divided by the average of the maximum value MAX and minimum value MIN (rounded off at the decimal), whereby each component becomes one bit (i.e., binarized). The bit string wherein the 1-bit components are arrayed in a predetermined order is output as the ADRC code.

The class classification unit 123 outputs the ADRC code obtained by ADRC processing of the features of the pixel of interest for example, as the class code.

The coefficients output unit 124 stores a tap coefficient for each class, and further, of the stored tap coefficients, outputs a tap coefficient of the class of the class code supplied from the class classification unit 123 to the computing unit 125. It should be noted here that a tap coefficient is equivalent to a coefficient by which input data is multiplied in a so-called tap, in a digital filter.

The computing unit 125 obtains the prediction tap output from the prediction tap extracting unit 121 and the tap coefficient output by the coefficient output unit 124, and performs predetermined prediction computation to obtain the prediction value of the true value of the pixel of interest, using the prediction tap and the tap coefficient. Accordingly, the computing unit 125 obtains and outputs the pixel value of the pixel of interest (or the prediction value thereof, rather), i.e., the pixel value of the pixel making up the second image signals.

Figure 7:
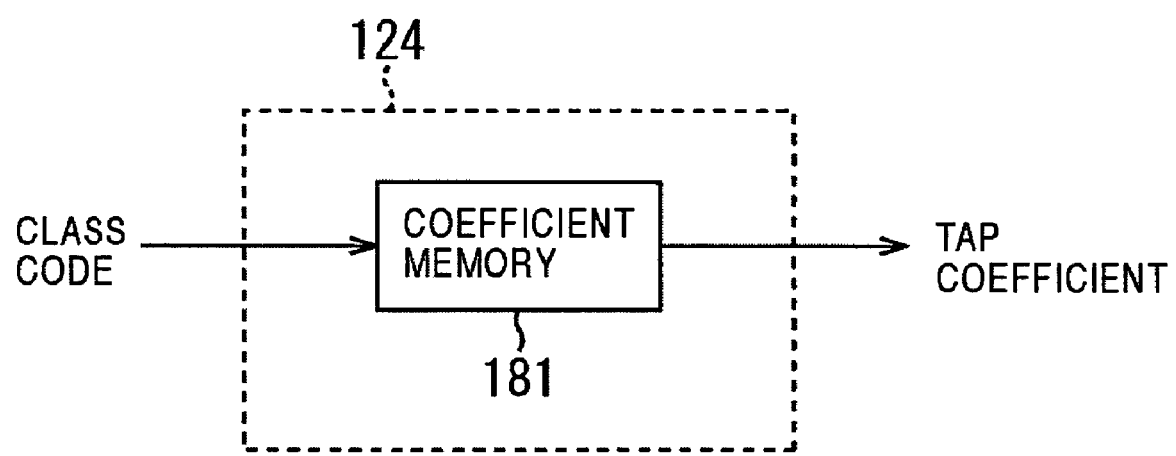
FIG. 7 is a block diagram illustrating a configuration example of a coefficient output unit 124.

Next, FIG. 7 illustrates a configuration example of the coefficient output unit 124 shown in FIG. 6. In FIG. 7, the coefficient output unit 124 comprises coefficient memory 181. The coefficient memory 181 stores tap coefficients for each class obtained beforehand by later-described learning. Upon having class code supplied thereto from the class classification unit 123, the coefficient memory 181 reads out the tap coefficient of the class code and supplies this to the computing unit 125.

Next, prediction computation carried out at the computing unit 125 shown in FIG. 6, and the learning of the tap coefficient stored in the coefficient memory 181 shown in FIG. 7 used for the prediction computation, will be described.

Let us say that we have high-image-quality image signals as second image signals, and low-quality signals, which have been obtained by filtering the high-image-quality image signals with an LPF (low-pass filter) to lower the resolution thereof, as first image signals. We will now consider a case of extracting prediction taps from the low-image-quality image signals, and using prediction taps and tap coefficients to obtain pixel values for high-image-quality pixels according to predetermined prediction computation.

Using linear primary prediction computation for example as the predetermined prediction computation, the pixel value y of a high-image-quality pixel can be obtained by the following linear primary expression.

$$y = \sum_{n=1}^{N} w_n x_n \tag{1}$$

wherein $x_n$ represents the pixel value of the n'th low-image-quality image signal pixel (hereafter referred to as "low-image-quality pixel" as appropriate) making up a prediction tap regarding the high-image-quality pixel y, and $w_n$ represents the n'th tap coefficient to be multiplied with the pixel value of the n'th low-image-quality pixel. Note that in Expression (1), the prediction tap comprises an N number of low-image-quality pixels $x_1$, $x_2$, and so on through $x_N$.

Now, the pixel value y of the high-image-quality pixel can be obtained by a quadratic expression or higher, rather than the linear primary expression of Expression (1).

With the true value of the pixel value of the high-image-quality pixel of a k'th sample represented by $y_k$ and the prediction value of the true value $y_k$ obtained from Expression (1) as $y_k'$, the prediction error $e_k$ thereof is as shown by the following Expression.

$$e_k = y_k - y_k' \quad (2)$$

Here, the prediction value $y_k'$ in Expression (2) is obtained according to Expression (1), so substituting the $y_k'$ in Expression (2) according to Expression (1) yields the following Expression.

$$e_k = y_k - \left(\sum_{n=1}^{N} w_n x_{n,k}\right) \quad (3)$$

Note that in Expression (3), $x_{n,k}$ represents the n'th low-image-quality pixel making up the prediction tap regarding the high-image-quality pixel of the k'th sample.

Now, while a tap coefficient $w_n$ with a prediction error $e_k$ of 0 in Expression (3) (or in Expression (2)) is optimal for predicting the high-image-quality pixel, but obtaining such as tap coefficient $w_n$ for all high-image-quality pixels is generally difficult. Accordingly, using the least-square method as a standard representing an optimal tap coefficient $w_n$, the optimal tap coefficient $w_n$ can be obtained by minimizing the squared error sum E represented by the following Expression.

$$E = \sum_{k=1}^{K} e_k^2 \quad (4)$$

wherein K represents the number of samples of sets of the high-image-quality pixels $y_k$ and the low-image-quality pixels $x_{1,k}, x_{2,k},$ and so on through $x_{N,k}$ making up the prediction tap regarding the high-image-quality pixels $y_k$ (i.e., the number of learning samples).

The minimum value (minimal value) of the squared error sum E in Expression (4) is obtained with a $w_n$ wherein partial differentiation of the sum E with the tap coefficient $w_n$ yields 0, as shown in Expression (5).

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \; (n = 1, 2, \ldots, N) \quad (5)$$

Accordingly, partial differentiation of the above Expression (3) with the tap coefficient $w_n$ gives the following Expression.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (6)$$

$$(k = 1, 2, \ldots, K)$$

The following Expression is obtained from Expressions (5) and (6).

$$\sum_{k=1}^{K} e_k x_{1,k} = 0, \sum_{k=1}^{K} e_k x_{2,k} = 0, \ldots, \sum_{k=1}^{K} e_k x_{N,k} = 0 \quad (7)$$

Substituting Expression (3) into the $e_k$ in Expression (7) allows Expression (7) to be expressed as the normal equation of Expression (8).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \cdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,y} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

The normal equation of Expression (8) can solve the tap coefficient $w_n$ using discharge calculation (Gauss-Jordan elimination), for example. Solving the normal equation of Expression (8) for each of the classes allows the optimal tap coefficient (in this case, the tap coefficient minimizing the squared error sum E) $w_n$ to be obtained for each class.

Figure 8:
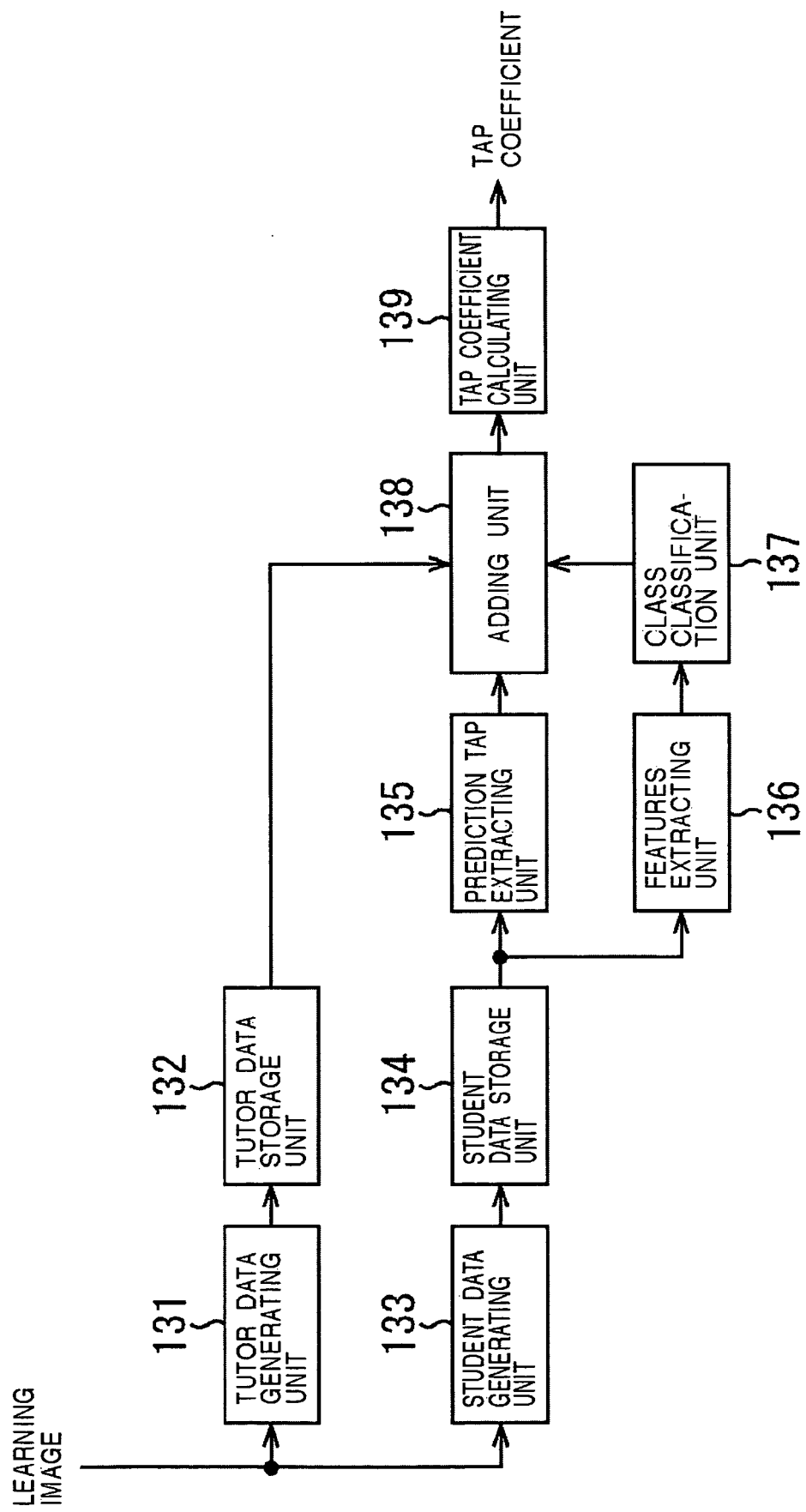
FIG. 8 is a block diagram illustrating a configuration example of a learning device which learns tap coefficients.

Next, FIG. 8 illustrates a configuration example of a learning device for performing learning for obtaining the tap coefficient $w_n$ for each class by solving the normal equation of Expression (8) for each class.

Learning image signals used for learning the tap coefficient $w_n$ are input to the learning device. An example of learning image signals here is high-image-quality image signals with high resolution. The learning image signals are supplied to a tutor data generating unit 131 and student data generating unit 133 of the learning device.

The tutor data generating unit 131 generates tutor data from the learning image signals supplied thereto, and supplies these to a tutor data storage unit 132. That is to say, here, the tutor data generating unit 132 supplies high-image-quality image signals serving as learning image signals to the tutor data storage unit 132 as tutor data without change. The tutor data storage unit 131 stores the high-image-quality image signals serving as tutor data supplied from the tutor data generating unit 131.

The student data generating unit 133 generates student data from the learning image signals, and supplies this student data to a student data storage unit 134. That is to say, the student data generating unit 133 performs filtering of the high-image-quality image signals serving as the learning image signals so as to lower the resolution thereof, thereby generating low-image-quality image signals, and supplies the low-image-quality image signals as student data to the student data storage unit 134. The student data storage unit 134 stores the student data supplied from the student data generating unit 133.

A prediction tap extracting unit 135 sequentially takes as tutor pixels of interest the pixels making up the high-image-quality image signals serving as the tutor data stored in the tutor data storage unit 132, and extracts predetermined ones from the low-image-quality pixels making up the low-image-quality image signals serving as the student data stored in the student data storage unit 134, thereby configuring a prediction tap with the same tap configuration as that configured by the prediction tap extracting unit 121 shown in FIG. 6, which is supplied to an adding unit 38.

A features extracting unit 136 uses the low-image-quality pixels making up the low-image-quality image signal serving as the student data stored in the student data storage unit 134 with regard to the tutor pixel of interest to extract the features of the tutor pixel of interest in the same way as with the case at the features extracting unit 122 shown in FIG. 6, and supplies these to a class classification unit 137.

The class classification unit 137 performs the same class classification as with the class classification unit 123 shown in FIG. 6, based on the features of the tutor pixel of interest output from the features extracting unit 136, and outputs the class code corresponding to the class obtained as the result thereof to the adding unit 138.

Class code regarding the tutor pixel of interest output from the class classification unit 137 is supplied to the adding unit 138. The adding unit 138 reads out the tutor pixel of interest from the tutor data storage unit 132, and performs adding regarding the tutor pixel of interest and the student data making up the prediction tap configured with regard to the tutor pixel of interest supplied from the prediction tap extracting unit 135, for each class code supplied from the class classification unit 137.

That is to say, the adding unit 138 is supplied with the tutor data $y_k$ stored in the tutor data storage unit 132, the prediction tap $x_{0,k}$ output from the prediction tap extracting unit 135, and the class code output from the class classification unit 137.

For each class corresponding to the class code supplied from the class classification unit 137, the adding unit 138 performs computation equivalent to the multiplication ($x_{n,k}$ $x_{n',k}$) of the student data one with another in the matrix to the left side in Expression (8), and summation ($\Sigma$) thereof, using the prediction tap (student data) $x_{n,k}$.

Also, for each class corresponding to the class code supplied from the class classification unit 137, the adding unit 138 performs computation equivalent to the multiplication ($x_{n,k}$ $y_k$) of the student data $x_{n,k}$ and the tutor data $y_k$ in the vector to the right side in Expression (8), and summation ($\Sigma$) thereof, using the prediction tap (student data) $x_{n,k}$, using prediction tap (student data) $x_{n,k}$ and the tutor data $y_k$.

That is to say, the adding unit 138 stores in the memory thereof (not shown) the left-side matrix component ($\Sigma x_{n,k}$ $x_{n',k}$) and the right-side vector component ($\Sigma n_{,k}$ $y_k$) of the Expression (8) obtained regarding the tutor data taken as the tutor pixel of interest at the previous time, and adds to the matrix component ($\Sigma x_{n,k} x_{n',k}$) or vector component ($\Sigma x_{n,k} y_k$) the corresponding component $x_{n,k-1}$ $x_{n',k-1}$ or $x_{n,k-1}$ $y_{k-1}$ regarding new tutor data taken as the tutor pixel of interest, the corresponding component $x_{n,k-1}$ $x_{n',k-1}$ or $x_{n,k-1}$ $y_{k-1}$ being calculated using the tutor data $y_{k-1}$ and the student data $x_{n,k-1}$, (i.e., performs the addition expressed by the summation in Expression (8)).

The adding unit 138 performs this addition with all of the tutor data stored in the tutor data storage unit 132 as tutor pixel of interest so as to form the normal equation given in Expression (8) for each class, and then outputs the normal equations to a tap coefficient calculating unit 139. The tap coefficient calculating unit 139 solves the normal equation for each class, supplied from the adding unit 138, and thus obtains and outputs an optimal tap coefficient $w_n$ for each tap.

The coefficient memory 181 shown in FIG. 7 stores the tap coefficient $w_n$ for each class that is obtained by the learning device shown in FIG. 8.

Note that with the arrangement described above, learning image signals are taken as tutor data corresponding to the second image signals with no change, and also, low-image-quality image signals wherein the resolution of the learning image signals has been lowered are taken as student data corresponding to the first image signals, upon which learning of tap coefficients is performed, so tap coefficients can be obtained enabling image conversion processing, wherein resolution improvement processing of the first image signals into the second image signals with improved resolution can be realized.

Now, depending on how the image signals for the student data corresponding to the first image signals and the tutor data corresponding to the second image signals are selected, tap coefficients for various types of image conversion processing can be obtained.

That is to say, for example, with an arrangement wherein high-image-quality image signals are taken as tutor data, and noise is superimposed on the tutor data high-image-quality image signals to yield image signals with noise which are taken as student data, learning processing is carried out, whereby tap coefficients can be obtained which perform image conversion processing which is noise removal processing for converting the first image signals into the second image signals with the noise contained therein removed (or reduced).

Also, for example, with an arrangement wherein given image signals are taken as tutor data and image signals with the number of pixels of the image signals serving as the tutor data is thinned out yielding image signals taken as student data, or wherein given image signals are taken as student data and image signals with the number of pixels of the image signals serving as the student data is thinned out according to a predetermined thinning ratio so as to yield image signals taken as tutor data, learning processing is carried out, whereby tap coefficients can be obtained which perform image conversion processing which is resizing processing for converting the first image signals into second image signals which are enlarged or reduced. Further, setting the image signals to be taken as tutor data and student data in certain ways allows tap coefficients to be obtained which perform various sorts of image conversion processing such as conversion of number of pixels, conversion of aspect ratio, and so forth.

Next, the processing performed by the learning device shown in FIG. 8, i.e., the learning processing, will be described with reference to the flowchart in FIG. 9.

First, in step S51, the tutor data generating unit 131 and the student data generating unit 133 respectively generate tutor data and student data from learning image signals which is then output. That is to say, the tutor data generating unit 131 outputs the learning image signals without change as tutor data. Also, the student data generating unit 133 filters the learning image signals with LPF at a predetermined cutoff frequency, thereby generating and outputting student data regarding the tutor data (learning image signals) for each frame.

The tutor data output from the tutor data generating unit 131 is supplied to and stored in the tutor data storage unit 132, and the student data output from the student data generating unit 133 is supplied to and stored in the student data storage unit 134.

Subsequently, the flow proceeds to step S52, where, from the tutor data stored in the tutor data storage unit 132, the prediction tap extracting unit 135 takes as a tutor pixel of interest one which has not yet been taken as a tutor pixel of interest. Further, in step S52, the prediction tap extracting unit 135 configures a prediction tap from the student data stored in the student data storage unit 134 with regard to the tutor pixel of interest, which is then supplied to the adding unit 138, and the flow proceeds to step S53.

In step S53, the features extracting unit 136 extracts the features of the tutor pixel of interest using the student data stored in the student data storage unit 134, which is then supplied to the class classification unit 137, and the flow proceeds to step S54.

In step S54, the class classification unit 137 performs class classification of the tutor pixel of interest based on the pixel of interest features regarding the tutor pixel of interest from the features extracting unit 136, and outputs a class code corresponding to the class obtained thereby to the adding unit 138, and the flow proceeds to step S55.

In step S55, the adding unit 138 reads the tutor pixel of interest out from the tutor data storage unit 132, performs adding of the Expression (8) regarding the tutor pixel of interest and the student data making up the prediction tap configured regarding the tutor pixel of interest supplied from the prediction tap extracting unit 135, for each class code supplied from the class classification unit 137, and the flow proceeds to step S56.

In step S56, whether or not the prediction tap extracting unit 135 has stored tutor data not yet taken as a tutor pixel of interest in the tutor data storage unit 132 is determined. In the event that determination is made in step S56 that the prediction tap extracting unit 135 still has stored tutor data not yet taken as a tutor pixel of interest in the tutor data storage unit 132, the prediction tap extracting unit 135 returns to step S52 with the tutor data not yet taken as a tutor pixel of interest, and the same processing is repeated. On the other hand, in the event that determination is made in step S56 that the prediction tap extracting unit 135 has no more tutor data not yet taken as a tutor pixel of interest in the tutor data storage unit 132, the adding unit 138 supplies to the tap coefficient calculating unit 139 the left-side matrix and right-side vector of the Expression (8) for each class that has been obtained by the processing so far, and the flow proceeds to step S57.

In step S57, the tap coefficient calculating unit 139 solves the normal equation for each class made up of the left-side matrix and right-side vector of the Expression (8) for each class supplied from the adding unit 138, thereby obtains and outputs a tap coefficient $w_n$ for each class, and the processing ends.

While there may be cases wherein the number of normal equations necessary for obtaining the tap coefficient cannot be obtained due to insufficient number of learning image signals or the like, the tap coefficient calculating unit 139 is arranged to output a default tap coefficient for example, for such classes.

The coefficient memory 181 shown in FIG. 7 stores the tap coefficients for each class obtained as described above. However, it should be noted that the coefficient memory 181 of the image conversion unit 31R shown in FIG. 4 stores tap coefficients obtained by performing learning using only the R signals of the image signals for the tutor data and all of the R, G, and B signals of the image signals as student data. Also, the coefficient memory 181 of the image conversion unit 31G shown in FIG. 4 stores tap coefficients obtained by performing learning using only the G signals of the image signals for the tutor data and all of the R, G, and B signals of the image signals as student data. Further, the coefficient memory 181 of the image conversion unit 31B shown in FIG. 4 stores tap coefficients obtained by performing learning using only the B signals of the image signals for the tutor data and all of the R, G, and B signals of the image signals as student data.

Figure 10:
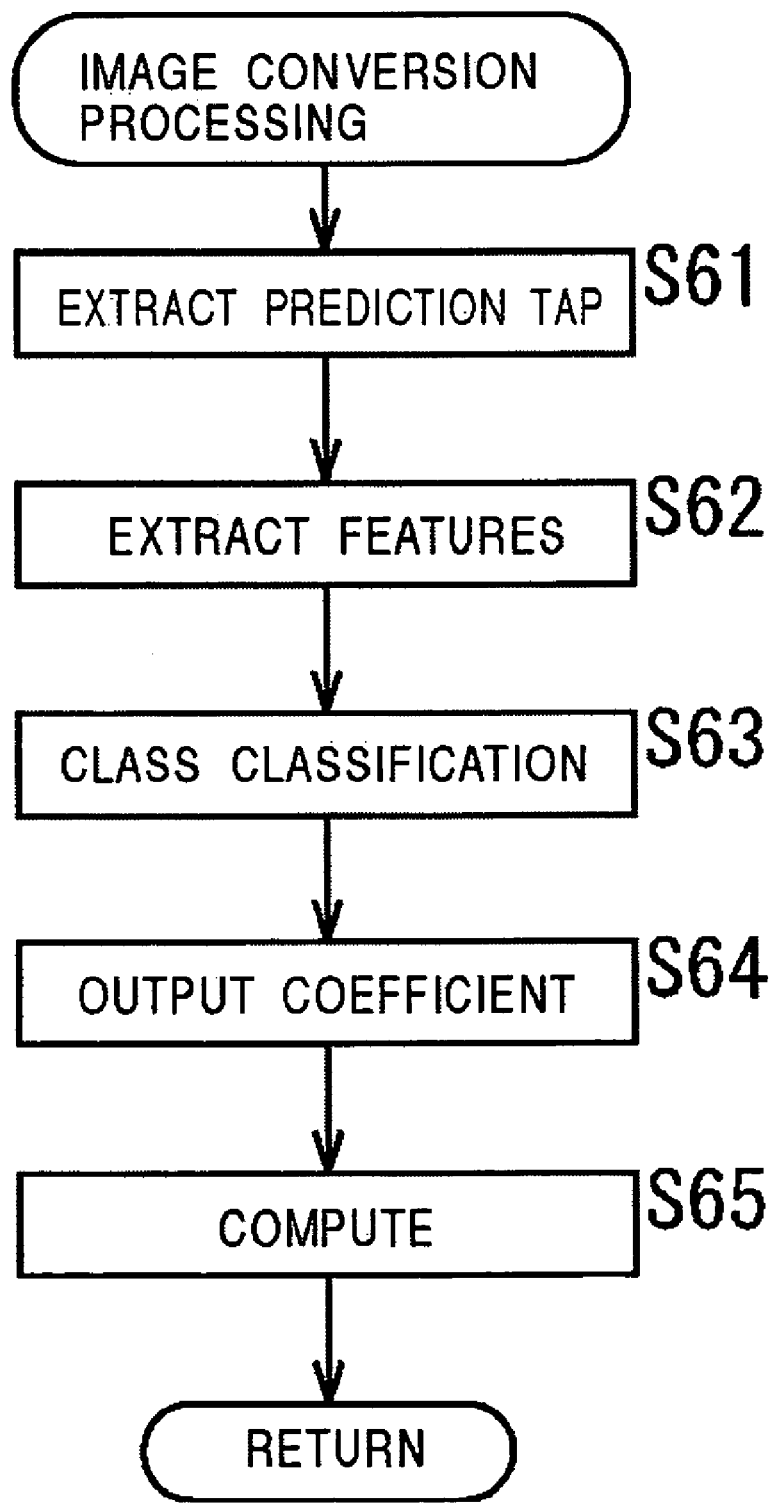
FIG. 10 is a flowchart describing the processing of the image conversion unit 31.

Next, the image conversion processing performed by the image conversion unit 31 shown in FIG. 6 will be described with reference to the flowchart in FIG. 10. Note that the image conversion processing described with reference to FIG. 10 is the processing performed in step S2 in FIG. 5.

In step S61, the prediction tap extracting unit 121 takes one of the pixels making up the second image signals that has not yet been made a pixel of interest as the pixel of interest, and also extracts, as a prediction tap, several of the pixels making up the first image signals (actually, the pixel values of the pixels) used for predicting the pixel value of the pixel of interest of the second image signals, and the flow proceeds to step S62.

In step S62, the features extracting unit 122 extracts the features of the pixel of interest using the first image signals, supplies the features to the class classification unit 123, and the flow proceeds to step S63. In step S63, the class classification unit 123 performs class classification processing for classifying the pixel of interest in one of multiple classes based on the features of the pixel of interest supplied from the features extracting unit 122, supplies the class code corresponding to the class obtained as a result thereof to the coefficient output unit 124, and the flow proceeds to step S64. In step S64, the coefficient output unit 124 reads out the tap coefficient of the class of the class code supplied from the class classification unit 123, which is then output to the computing unit 125, and the flow proceeds to step S65.

At step S65, the computing unit 125 performs the computation of Expression (1) using the prediction tap supplied from the prediction tap extracting unit 121 and the tap coefficient of the class of the pixel of interest output from the coefficient output unit 124, thereby obtaining the pixel value of the pixel of interest.

The image conversion unit 31 performs the processing of steps S61 through S65 for all of the pixels of the second image signals as the pixel of interest for one screen (i.e., one frame or one field), and thereafter the flow returns.

Figure 11:
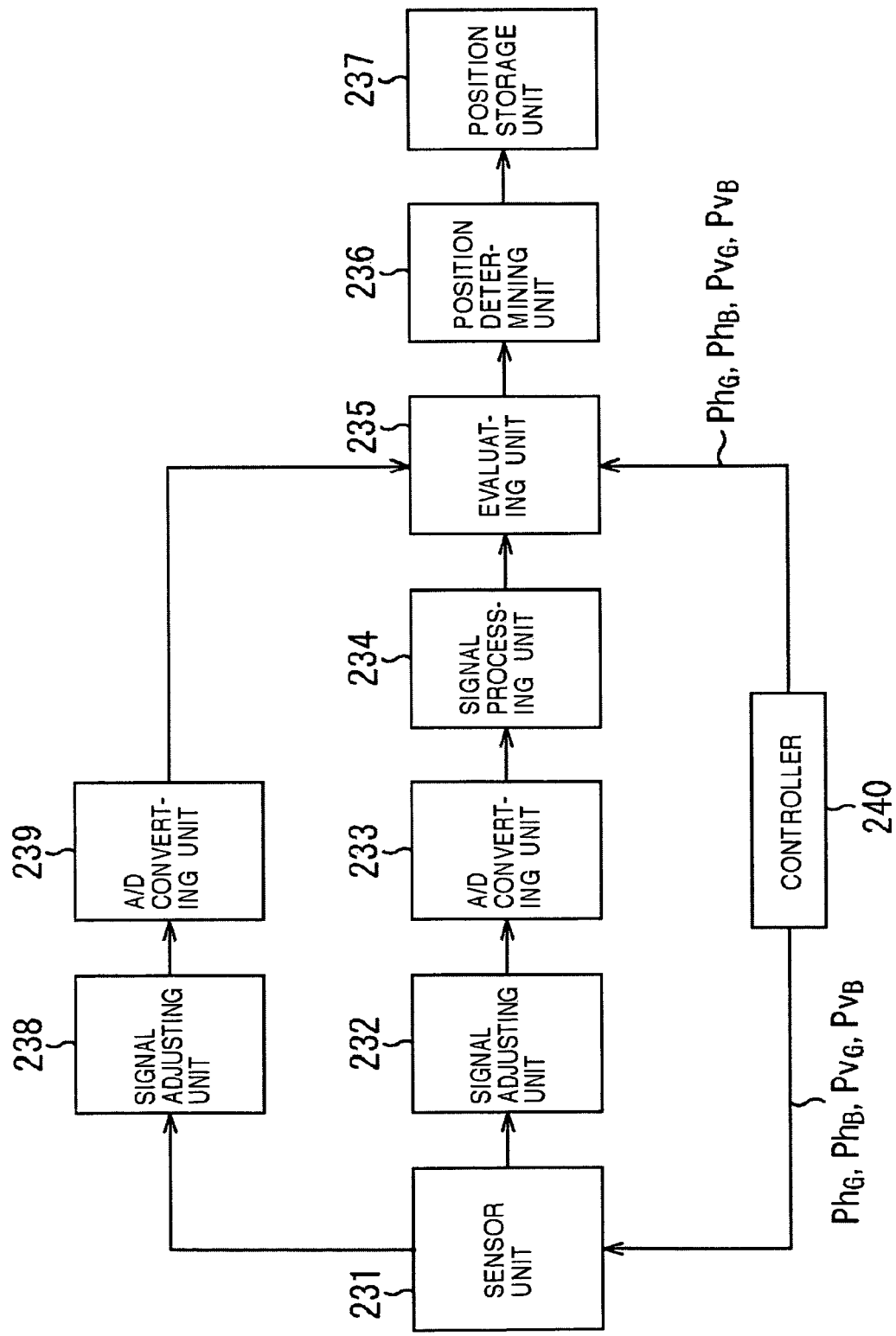
FIG. 11 is a block diagram illustrating a configuration example of the first embodiment of the image-taking device as a learning device for learning placement position.

Next, FIG. 11 illustrates a configuration example of an arrangement of the image-taking device as a learning device for performing learning of properties information of the sensor unit 1 for outputting image signals suitable for the signal processing performed by the signal processing unit 4 shown in FIG. 1, i.e., information regarding the placement state of the R photoreceptor unit 23R, G photoreceptor unit 23G, and B photoreceptor unit 23B, corresponding to the signal processing performed by the signal processing unit 4. A sensor unit 231 has multiple photoelectric converting devices corresponding to the pixels, for detecting subject light cast thereinto, and outputting image signals corresponding to the subject light. That is to say, the sensor unit 231 receives the subject light and obtains image signals as electric signals corresponding to the amount of received light, which are supplied to signal adjusting units 232 and 238.

Note that as described later, the sensor unit 231 is arranged so as to obtain image signals equivalent to the image signals obtained by the sensor unit 1 shown in FIG. 1 (hereafter also referred to as "normal image signals" as appropriate) and high-quality image signals used at a later-described evaluating unit 235 (hereafter also referred to as "evaluation image signals" as appropriate) equivalent to the second image signals output by the signal processing unit shown in FIG. 1. The sensor unit 231 supplies the normal image signals to the signal adjusting unit 232 and supplies the evaluation image signals to the signal adjusting unit 238.

Also, control signals from a controller 240 are supplied to the sensor unit 231. The properties of the sensor unit 231 change according to the control signals supplied from the controller 240, and normal image signals corresponding to the subject light are obtained according to the changed properties.

As with the signal adjusting unit 2 in FIG. 1, the signal adjusting unit 232 subject the normal image signals output from the sensor unit 231 to CDS processing, and supplies the image signals obtained as a result of the processing to an A/D converting unit 233.

As with the A/D converting unit 3 in FIG. 1, the A/D converting unit 233 subjects the normal image signals supplied from the signal adjusting unit 232 to A/D conversion, i.e., samples and quantizes the normal image signals, and supplies the digital image signals obtained as a result thereof to the signal processing unit 234 as first image signals.

The signal processing unit 234 is configured in the same way as the signal processing unit 4 shown in FIG. 2, and subjects the first image signals from the A/D converting unit 233 to the image conversion processing as the signal processing described with FIGS. 6 through 10, thereby obtaining the second image signals (the R, G, and B signals thereof) and supplying these to an evaluating unit 235.

The evaluating unit 235 is supplied with the second image signals from the signal processing unit 234, as well as control signals for controlling the properties of the sensor unit 231 supplied from the controller 240 and evaluation image signals from the A/D converting unit 239. The evaluating unit 235 evaluates the second image signals supplied from the signal processing unit 234 using the evaluation image signals supplied from the A/D converting unit 239, and correlates the evaluation with the properties of the sensor unit 231 which the control signals represents at the time of the evaluation being obtained, that is to say, correlates the evaluation with properties information representing the properties of the sensor unit 231 at the time of obtaining the first image signals which are the object of signal processing at the signal processing unit 234 for obtaining the evaluated second image signals. Further, the evaluating unit 235 supplies the set of the evaluation of the first image signals and the properties information to a position determining unit 236.

The position determining unit 236 determines the properties of the sensor unit 231 at the time of first image signals suitable for signal processing at the signal processing unit 234 being obtained, i.e., the properties of the sensor unit 231 corresponding to the signal processing at the signal processing unit 234 (and thus the properties of the sensor unit 1 corresponding to the signals processing of the signal processing unit 4 shown in FIG. 1), according to the set of the evaluation of the second signals and the properties information supplied from the evaluating unit 235, and supplies properties information indicating the properties to a position storage unit 237. The position storage unit 237 stores the properties information supplied from the position determining unit 236.

As with the signal adjusting unit 232, the signal adjusting unit 238 subjects the evaluating image signals output from the sensor unit 231 to CDS processing, and supplies the evaluation image signals obtained as a result of the processing to the A/D converting unit 239. Note however that while the signal adjusting unit 232 processes normal image signals, the signal adjusting unit 238 processes evaluation image signals which are of higher quality than the normal image signals, so the signal adjusting unit 238 has greater capabilities than the signal adjusting unit 232, in order to maintain the image quality of the evaluation image signals.

As with the A/D conversion unit 233, the A/D conversion unit 239 subjects the evaluation image signals supplied from the signal adjusting unit 238 to A/D conversion, i.e., samples and quantizes the evaluation image signals, and supplies the digital evaluation image signals obtained as a result thereof to the evaluating unit 235. Note however that while the A/D conversion unit 233 processes normal image signals, the A/D conversion unit 239 processes evaluation image signals which are of higher image quality than the normal image signals, so the A/D conversion unit 239 has greater capabilities than the A/D conversion unit 233 (e.g., more quantization bits or sampling frequencies than the A/D conversion unit 233), in order to maintain the image quality of the evaluation image signals.

The controller 240 supplies control signals for controlling the properties of the sensor unit 241 to the sensor unit 231 and evaluating unit 235.

Next, a configuration example of the sensor unit 231 shown in FIG. 11 is shown in FIG. 12. The subject light is cast into the lens 251, and the lens 251 condenses the subject light on an evaluating R photoreceptor unit 255R, an evaluating G photoreceptor unit 255G, and an evaluating B photoreceptor unit 255B via a half mirror 252 and prism 253, and also condenses the subject light on the R photoreceptor unit 256R, G photoreceptor unit 256G, and B photoreceptor unit 256B via the half mirror 252 and a prism 254.

That is to say, the subject light cast into the lens 251 is emitted to the half mirror 252. The half mirror 252 reflects some of the subject light from the lens 251 to the prism 253, and transmits the remainder to the prism 254.

The prism 253 splits the subject light from the half mirror 252 into the R, G, and B light, and emits the R, G, and B light to the respective directions where the evaluating R photoreceptor unit 255R, evaluating G photoreceptor unit 255G, and evaluating B photoreceptor unit 255B are situated. The evaluating R photoreceptor unit 255R, evaluating G photoreceptor unit 255G, and evaluating B photoreceptor unit 255B are configured of photoelectric conversion elements such as photodiodes or the like, so as to receive the R, G, and B light from the prism 253 and obtain R signals, G signals, and B signals, as electric signals corresponding to the amount of light received. The image signals made up of the R signals, G signals, and B signals are then output to the signal adjusting unit 238 (FIG. 11) as evaluating image signals. Examples of the evaluating R photoreceptor unit 255R, evaluating G photoreceptor unit 255G, and evaluating B photoreceptor unit 255B include CCDs, CMOS sensors, HARPs, and so forth.

The prism 254 splits the subject light from the lens 251 into the RGB light, and emits the R, G, and B light in the respective directions where the R photoreceptor unit 256R, G photoreceptor unit 256G, and B photoreceptor unit 256B are situated. The R photoreceptor unit 256R, G photoreceptor unit 256G, and B photoreceptor unit 256B are configured of photoelectric conversion elements such as photodiodes or the like, so as to receive the R, G, and B light from the prism 254 and obtain R signals, G signals, and B signals, as electric signals corresponding to the amount of light received. The image signals made up of the R signals, G signals, and B signals are then output to the signal adjusting unit 232 (FIG. 11) as normal image signals. Examples of the R photoreceptor unit 256R, G photoreceptor unit 256G, and B photoreceptor unit 256B include CCDs, CMOS sensors, HARPs, and so forth. However, the R photoreceptor unit 256R, G photoreceptor unit 256G, and B photoreceptor unit 256B should preferably have the same performance as the R photoreceptor unit 23R, G photoreceptor unit 23G, and B photoreceptor unit 23B, shown in FIG. 3.

An R control unit 257R, G control unit 257G, and B control unit 257B each perform control for moving the placement positions of the R photoreceptor unit 256R, G photoreceptor unit 256G, and B photoreceptor unit 256B, according to control signals supplied from a controller 240 (FIG. 11), thereby changing the properties of the sensor unit 251.

Now, in order to facilitate description, we will say here that the R control unit 257R controls the placement position of the entire R photoreceptor unit 256R, the G control unit 257G controls the placement position of the entire G photoreceptor unit 256G, and the B control unit 257B controls the placement position of the entire B photoreceptor unit 256B. However, it should be noted that using MEMS technology for example, allows the placement position of pixels of the R photoreceptor unit 256R so as to be essentially changed (moved), whereby the placement position of the individual pixels of the R photoreceptor unit 256R can be independently controlled. This is also true for the G photoreceptor unit 256G and G control unit 257G, and the B photoreceptor unit 256B and B control unit 257B.

Also, the evaluating R photoreceptor unit 255R, evaluating G photoreceptor unit 255G, and evaluating B photoreceptor unit 255B have higher performance than the R photoreceptor unit 256R, G photoreceptor unit 256G, and B photoreceptor unit 256B which obtain normal image signals, since high-quality evaluation image signals are to be obtained thereby. That is to say, the evaluating R photoreceptor unit 255R, evaluating G photoreceptor unit 255G, and evaluating B photoreceptor unit 255B have, for example, a greater dynamic range than the R photoreceptor unit 256R, G photoreceptor unit 256G, and B photoreceptor unit 256B, a greater number or pixels, or the like.

Next, control of each of the R photoreceptor unit 256R, G photoreceptor unit 256G, and B photoreceptor unit 256B, with the R control unit 257R, G control unit 257G, and B control unit 257B, shown in FIG. 12, will be described with reference to FIGS. 13A through 13D.

Figure 13A:
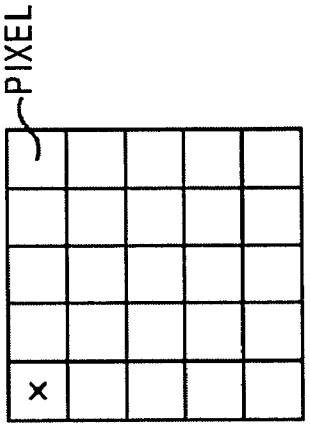
FIGS. 13A through 13D are diagrams describing the control of the placement position of an R photoreceptor unit 256, a G photoreceptor unit 256G, and a B photoreceptor unit 256B.
Figure 13B:
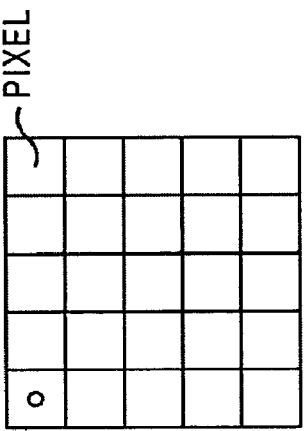
Figure 13C:
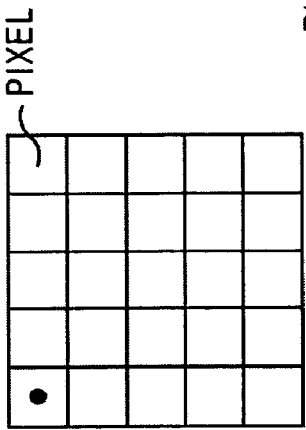

The R photoreceptor unit 256R shown in FIG. 13A, the G photoreceptor unit 256G shown in FIG. 13B, and the B photoreceptor unit 256B shown in FIG. 13C, each have pixels with finite area (corresponding to one photodiode or the like) and output image signals corresponding to the amount of light received at each pixel. Note that in FIGS. 13A through 13D, the pixels are squares with each side having a finite length.

Here, positions of pixels of the R photoreceptor unit 256R, the G photoreceptor unit 256G, and the B photoreceptor unit 256B are each represented by the center of gravity of the squares which are the pixels, and the pixels of the R photoreceptor unit 256R, the G photoreceptor unit 256G, and the B photoreceptor unit 256B are respectively represented by dots, circles, and Xs. At the point of manufacturing the image-taking device, such as a video camera or a still camera, the positions of the corresponding pixels for example of R photoreceptor unit 256R, the G photoreceptor unit 256G, and the B photoreceptor unit 256B are all optically matching. That is to say, the R photoreceptor unit 256R, the G photoreceptor unit 256G, and the B photoreceptor unit 256B are all disposed at optically equivalent positions such that the R, G, and B rays of a light ray are received by corresponding pixels.

The R control unit 257R, the G control unit 257G, and the B control unit 257B respectively move the placement positions of the R photoreceptor unit 256R, the G photoreceptor unit 256G, and the B photoreceptor unit 256B which are the properties of the sensor unit 241, according to control signals supplied from the controller 240 (FIG. 11). That is to say, the placement positions of the R photoreceptor unit 256R, the G photoreceptor unit 256G, and the B photoreceptor unit 256B are not fixed but rather movable, and accordingly, the corresponding pixels of the R photoreceptor unit 256R, the G photoreceptor unit 256G, and the B photoreceptor unit 256B in the sensor unit 241 are not necessarily at optically identical positions.

Figure 13D:
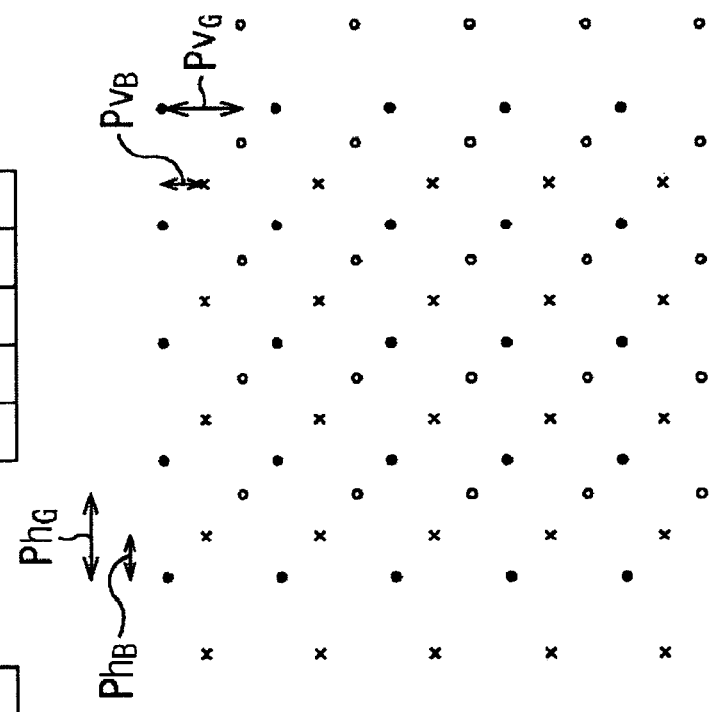

As shown in FIG. 13D, with the position of the pixels of the R photoreceptor unit 256R (shown as dots in FIGS. 13A and 13D) as a reference, the amounts of offset in the horizontal direction and the vertical direction of the position of the pixels of the G photoreceptor unit 256G (shown as circles in FIGS. 13B and 13D) are represented as $Ph_G$ and $Pv_G$, and the amounts of offset in the horizontal direction and the vertical direction of the position of the pixels of the B photoreceptor unit 256B (shown as Xs in FIGS. 13C and 13D) are represented as $Ph_B$ and $Pv_B$.

The R control unit 257R, the G control unit 257G, and the B control unit 257B move the placement positions of the R photoreceptor unit 256R, G photoreceptor unit 256G, and B photoreceptor unit 256B, so as to realize the offset amounts $Ph_G$, $Pv_G$, $Ph_B$, $Pv_B$, according to the control signals supplied from the controller 240.

Now, in this case, an arrangement may be made wherein, for example, the position of the R photoreceptor unit 256R is fixed, and only the G photoreceptor unit 256G, and B photoreceptor unit 256B are moved. Or, an arrangement may be made wherein another of the R control unit 257R, the G control unit 257G, and the B control unit 257B, other than the R control unit 257R is fixed, and the remaining two are moved, and further, an arrangement may be made wherein all of the R photoreceptor unit 256R, the G photoreceptor unit 256G, and the B photoreceptor unit 256B can be moved.

Also, in the sensor unit 241 shown in FIG. 12, the placement positions of the R photoreceptor unit 256R, the G photoreceptor unit 256G, and the B photoreceptor unit 256B can be moved, while the evaluating R photoreceptor unit 255R, evaluating G photoreceptor unit 255G, and evaluating B photoreceptor unit 255B have the pixel positions at optically same positions. That is to say, with the evaluating R photoreceptor unit 255R, evaluating G photoreceptor unit 255G, and evaluating B photoreceptor unit 255B are all disposed at optically equivalent positions such that the R, G, and B rays of a light ray are received by corresponding pixels.

Figure 14:
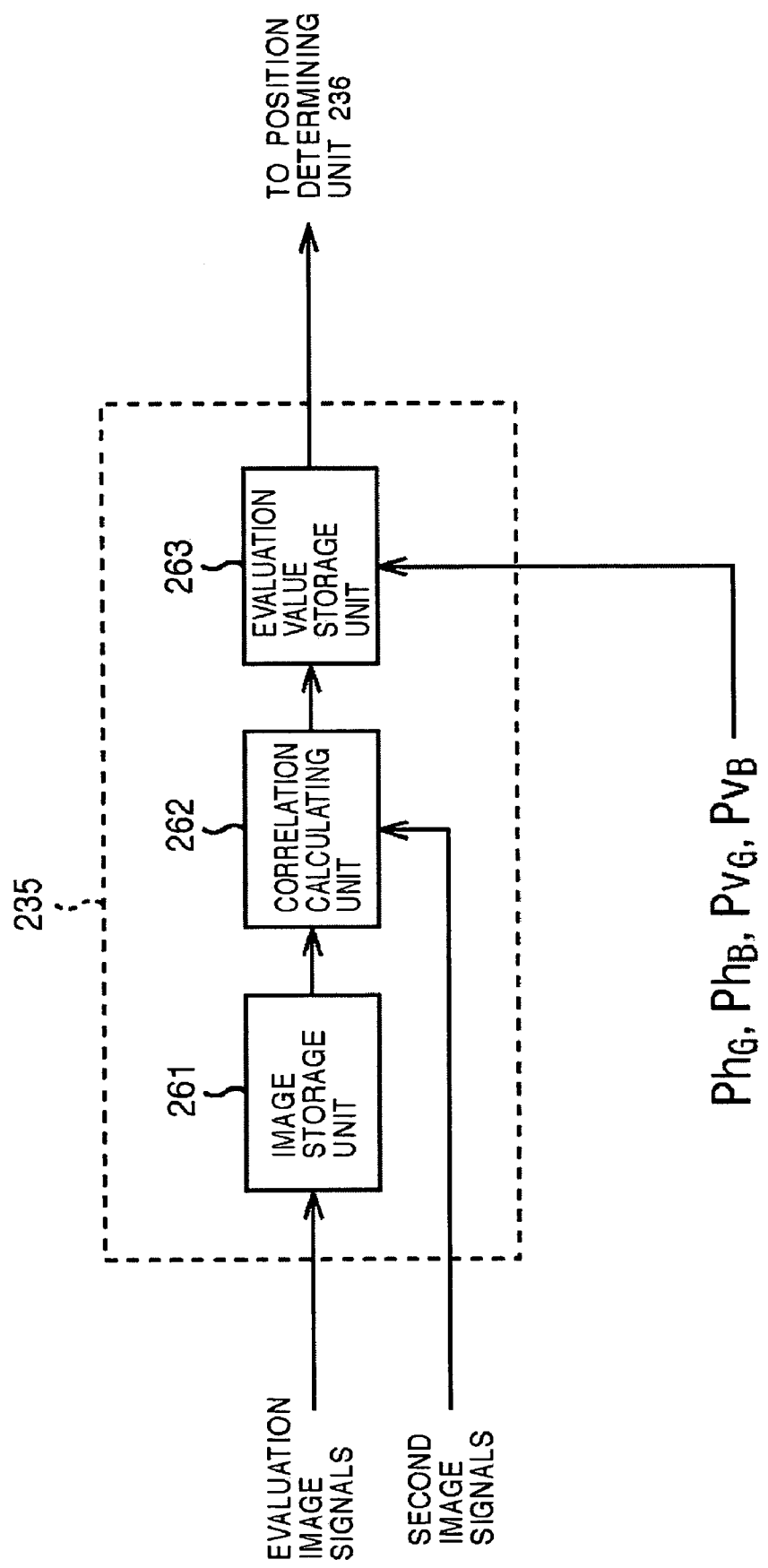
FIG. 14 is a block diagram illustrating a configuration example of a evaluating unit 235.

FIG. 14 illustrates a configuration example of the evaluating unit 235 shown in FIG. 11. The evaluating unit 235 comprises an image storage unit 261, correlation calculating unit 262, and evaluation value storage unit 263. The image storage unit 261 stores evaluation image signals for a certain subject light supplied from the sensor 231 via the signal adjusting unit 238 and A/D converting unit 239.

The correlation calculating unit 262 evaluates the second image signals obtained from the normal image signals corresponding to the evaluation image signals stored in the image storage unit 261 which are supplied from the signal processing unit 234 using evaluation image signals sorted in the image storage unit 261, i.e., the correlation calculating unit 262 obtains the correlation value between the second image signals supplied from the signal processing unit 234 and the evaluation image signals stored in the image storage unit 261, and supplies the correlation value thereof to the evaluation value storage unit 263 as evaluation results or as evaluation values of the second image signals supplied from the signal processing unit 234.

Now, an example of correlation values between one frame (field) of second image signals and evaluation image signals is the reciprocal of the sum of absolutes of differences of part or all of pixels at the same position between the second image signals and the evaluation image signals.

The evaluation value storage unit 263 is supplied with control signals output from the controller 240, in addition to the evaluation values of the second image signals from the correlation calculating unit 262. The control signals output by the controller 240 represent the properties of the sensor unit 231 at the point of the first image signals used for obtaining the evaluation values of the second image signals output from the correlation calculating unit 262 having been obtained by the sensor unit 231, i.e., the placement position of the R control unit 257R, the G control unit 257G, and the B control unit 257B shown in FIG. 12. The evaluation value storage unit 263 stores this placement position and the evaluation values of the second image signals from the correlation calculating unit 262 in a correlated manner. The evaluation value storage unit 263 stores evaluation values for each second image signals of multiple images regarding each of multiple position set beforehand (hereafter referred to simply as "set position") regarding the R photoreceptor unit 256R, the G photoreceptor unit 256G, and the B photoreceptor unit 256B, and then supplies the evaluation values to the position determining unit 236 (FIG. 11).

Note that here, the controller 240 shown in FIG. 11 outputs as the control signals for controlling the placement position of the R photoreceptor unit 256R, the G photoreceptor unit 256G, and the B photoreceptor unit 256B, of the sensor unit 241 (FIG. 12), signals representing the amounts of offset in the horizontal direction and the vertical direction of the position of the pixels of the G photoreceptor unit 256G represented as $Ph_G$ and $Pv_G$, and the amounts of offset in the horizontal direction and the vertical direction of the position of the pixels of the B photoreceptor unit 256B as $Ph_B$ and $Pv_B$ (these offset amounts $Ph_G$, $Pv_G$, $Ph_B$, and $Pv_B$, may hereafter be simply referred to as "offset amount P").

Figure 15:
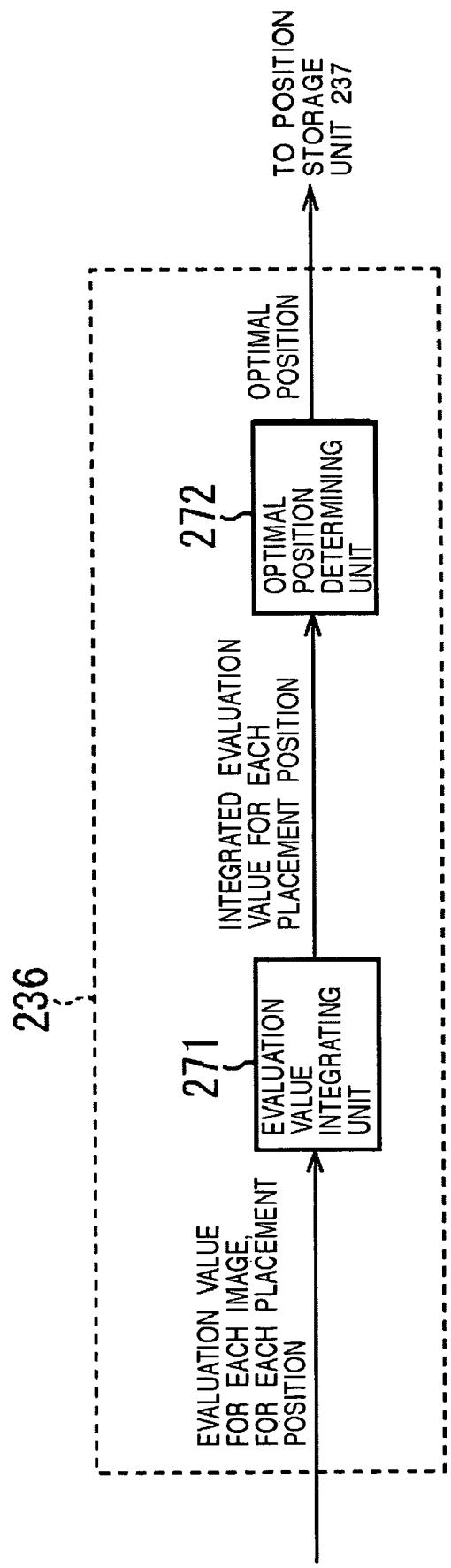
FIG. 15 is a block diagram illustrating a configuration example of a position determining unit 236.

Next, FIG. 15 illustrates a configuration example of the position determining unit 236 shown in FIG. 11.

An evaluation value integrating unit 271 is supplied with evaluation values for each of the multiple second image signals regarding the multiple set position which the evaluation value storage unit 263 of the evaluating unit 235 outputs. The evaluation value integrating unit 271 integrates the evaluation values for each of the multiple second image signals with regard to the set position thereof for each of the multiple set positions, and supplies the evaluation values obtained by this integration (hereafter also referred to as "integrated evaluation value" as appropriate) to an optimal position determining unit 272.

The optimal position determining unit 272 determines the set position corresponding to the signal processing to be performed at the signal processing unit 234 based on the integrated evaluation values for each of the multiple set positions supplied from the evaluation value integrating unit 271, i.e., determines the placement position of the R photoreceptor unit 256R, G photoreceptor unit 256G, and B photoreceptor unit 256B, of the sensor unit 241 shown in FIG. 12, and supplies the placement position to a position storage unit 237 (FIG. 11) as the optimal position for the signal processing at the signal processing unit 234 (and the signal processing unit 4 as well).

Figure 16:
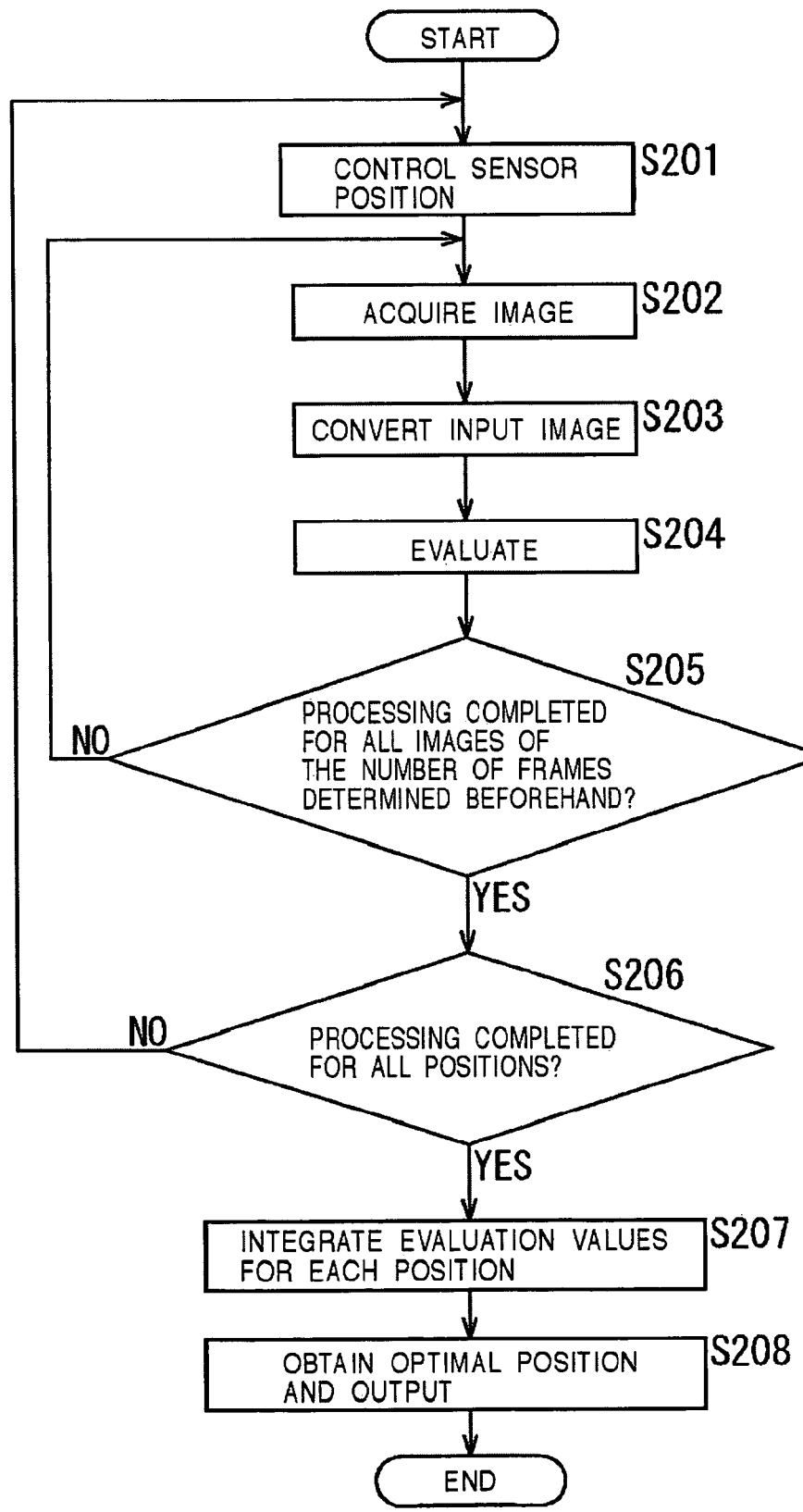
FIG. 16 is a flowchart describing the learning processing of the image-taking device as a learning device.

Next, the process of learning the optimal position with the image-taking device shown in FIG. 11 (learning processing) will be described with reference to the flowchart shown in FIG. 16.

First, in step S201, the controller 240 takes as the placement position of interest one of the multiple placement positions of interest set as the placement position of the R photoreceptor unit 256R, G photoreceptor unit 256G, and B photoreceptor unit 256B, of the sensor unit 241 shown in FIG. 12, and supplies control signals representing the placement position of interest to the evaluation value storage unit 263 of the evaluating unit 235 shown in FIG. 14. Further, in step S201, the controller 240 supplies controls signals representing the placement position of interest to the R control unit 257R, the G control unit 257G, and the B control unit 257B, of the sensor unit 241, and thus moves the placement positions of the R photoreceptor unit 256R, G photoreceptor unit 256G, and B photoreceptor unit 256B to the placement position of interest, and the flow proceeds to step S202.

In step S202, the signal processing unit 234 obtains the image signals output from the sensor unit 231. That is to say, in step S202, the sensor unit 231 receives subject image light and performs photoelectric conversion, thereby obtaining image signals as electric signals (i.e., images the subject), and supplies the image signals to the signal adjusting units 232 and 238. The signal adjusting unit 232 subjects the image signals supplied from the sensor unit 231 to CDS processing, and supplies these to the A/D converting unit 233. The A/D converting unit 233 performs A/D conversion of the image signals supplied from the signal adjusting unit 232, and supplies these to the signal processing unit 234 as first image signals. On the other hand, the signal adjusting unit 238 subjects the image signals supplied from the sensor unit 231 to CDS processing and supplies these to the A/D converting unit 239. The A/D converting unit 239 performs A/D conversion of the image signals supplied from the signal adjusting unit 238, and supplies these to the evaluating unit 235, as evaluation image signals.

That is to say, at the sensor unit 231, the R photoreceptor unit 256R, G photoreceptor unit 256G, and B photoreceptor unit 256B placed at the placement position of interest obtain normal image signals corresponding to the incident subject light. The normal image signals are supplied to the signal processing unit 234 via the signal adjusting unit 232 and the A/D converting unit 233.

Further, at the sensor unit 231, the evaluation R photoreceptor unit 255R, evaluation G photoreceptor unit 255G, and evaluation B photoreceptor unit 255B obtain evaluation image signals corresponding to the same incident subject light. The evaluation image signals are supplied to the evaluating unit 235 via the signal adjusting unit 238 and the A/D converting unit 239. At the evaluating unit 235 shown in FIG. 14, the evaluation image signals are stored in the image storage unit 261.

The flow then proceeds to step S203 from step S202, the signal processing unit 234 subjects the first image signals supplied via the A/D converting unit 232 to the same image conversion processing as performed by the signal processing unit 4 shown in FIG. 1 as signal processing, thereby obtaining second image signals with image quality that is improved over that of the first image signals, supplies the second image signals to the evaluating unit 235, and the flow proceeds to step S204.

In step S204, the evaluating unit 235 performs evaluation processing for evaluating the second image signals supplied from the signal processing unit 234, and the flow proceeds to step S205. That is to say, at the evaluating unit 235 shown in FIG. 14, the correlation calculating unit 262 reads out from the evaluation image signals stored in the image storage unit 261 the evaluation image signals obtained from the same subject light as the subject light of the normal image signals used for obtaining the second image signals supplied from the signal processing unit 234, as evaluation image signals of interest. Further, the correlation calculating unit 262 obtains the correlation value between the second image signals supplied from the signal processing unit 234 and the evaluation image signals of interest, and supplies the correlation value as the evaluation value of the second image signals supplied from the signals processing unit 234 to the evaluation value storage unit 263.

The evaluation value storage unit 263 correlates the evaluation value of the second image signals from the correlation calculating unit 262 with the set positions of interest which the control signals supplied from the controller 240 in the immediately preceding step S201 represent, and stores the evaluation value correlated with the set positions of interest.

In step S205, the controller 240 determines whether or not the evaluation value regarding the set position of interest has been obtained for each of a predetermined number of frames. In the event that determination is made in step S205 that the evaluation value regarding the set position of interest has not yet been obtained for each of the predetermined number of frames, the flow returns to step S202, the sensor unit 231 receives the incident subject light at that timing, and performs photoelectric conversion, so as to obtain the image signals as electric signals, and the same processing is subsequently repeated.

Also, in the event that determination is made in step S205 that the evaluation value regarding the set position of interest has been obtained for each of the predetermined number of frames, the flow proceeds to step S206, and the controller 240 determines whether or not all of the multiple set positions have been taken as the set position of interest.

In the event that determination is made in step S206 that not all of the multiple set positions have been taken as the set position of interest, the flow returns to step S201, the controller 240 takes of the multiple set positions one which has not yet been taken as the set position of interest, and the same processing is subsequently repeated.

Also, in the event that determination is made in step S206 that all of the multiple set positions have been taken as the set position of interest, i.e., in the event that evaluation values corresponding to each of the multiple set positions have been obtained for each of the predetermined number of frames, and stored in the evaluation value storage unit 263 of the evaluating unit 235 shown in FIG. 14, the evaluation value storage unit 263 supplies the evaluation values corresponding to each of the multiple set positions which have been obtained for each image of the predetermined number of frames to the position determining unit 236, and the flow proceeds to step S207.

At step S207, the evaluation value integrating unit 271 of the position determining unit 236 shown in FIG. 15 integrates for each of the multiple set positions the evaluation values corresponding to each of the multiple set positions which have been obtained for each image of the predetermined number of frames, and accordingly obtains the integrated evaluation values for each of the multiple set positions which are supplied to the optimal position determining unit 272. That is to say, the evaluation value integrating unit 271 takes a certain set position, obtains for example, the average value, maximum value, minimum value, or the like, of the evaluation values obtained for each of the predetermined number of image frames, as an integrated evaluation value for the set position of interest, and supplies this to the optimal position determining unit 272.

The flow proceeds from step S207 to step S208, where the optimal position determining unit 272 determines the set position corresponding to the signal processing of the signal processing unit 234, i.e., the placement position of the R photoreceptor unit 256R, G photoreceptor unit 256G, and B photoreceptor unit 256B, of the sensor unit 241 shown in FIG. 12, based on the integrated evaluation values of each of the multiple set positions supplied from the evaluation value integrating unit 271.

That is to say, in step S208, the optimal position determining unit 272 obtains, for example, the maximum value from the integrated evaluation values for each of the multiple set positions supplied from the evaluation value integrating unit 271, and determines the set positions corresponding to the maximum integrated evaluation value as the set position corresponding to the signal processing of the signal processing unit 234, i.e., as the optimal placement position of the R photoreceptor unit 23R, G photoreceptor unit 23G, and B photoreceptor unit 23B, shown in FIG. 3, for the signal processing of the signal processing unit 4 shown in FIG. 1.

Further, in step S208, the optimal position determining unit 272 stores information representing the optimal position (equivalent to the above-described properties information) in the position storage unit 237, and the flow ends.

In the sensor unit 1 shown in FIG. 1, the R photoreceptor unit 23R, G photoreceptor unit 23G, and B photoreceptor unit 23B (FIG. 3) are placed in the optimal position which the information stored in the position storage unit 237 by the above learning processing represents. Accordingly, with the sensor unit 1 shown in FIG. 1, image signals which are suitable for the signal processing at the signal processing unit 4 can be obtained, and further, performing signals processing of the image signals obtained from this sensor unit 1 allows image signals with higher image equality to be obtained.

In the above-described case, the second image signals are described as being evaluated by obtaining the correlation between the second image signals and evaluation image signals, but it should be noted that this may be carried out based on the S/N of the second image signals, for example. Further, evaluation of the second image signals may be externally input. That is to say, an arrangement may be made wherein the second image signals are displayed, and evaluation of the second image signals is input by a user viewing the displayed image, for example.

Next, the above-described series of processing by the signal processing unit 4 and 234, evaluating unit 235, position determining unit 236, controller 240, and so forth, can be carried out by dedicated hardware, or with software. In the event of performing the series of processing with software, a program making up the software is installed in a microcomputer, a general-purpose computer, or the like.

Figure 17:
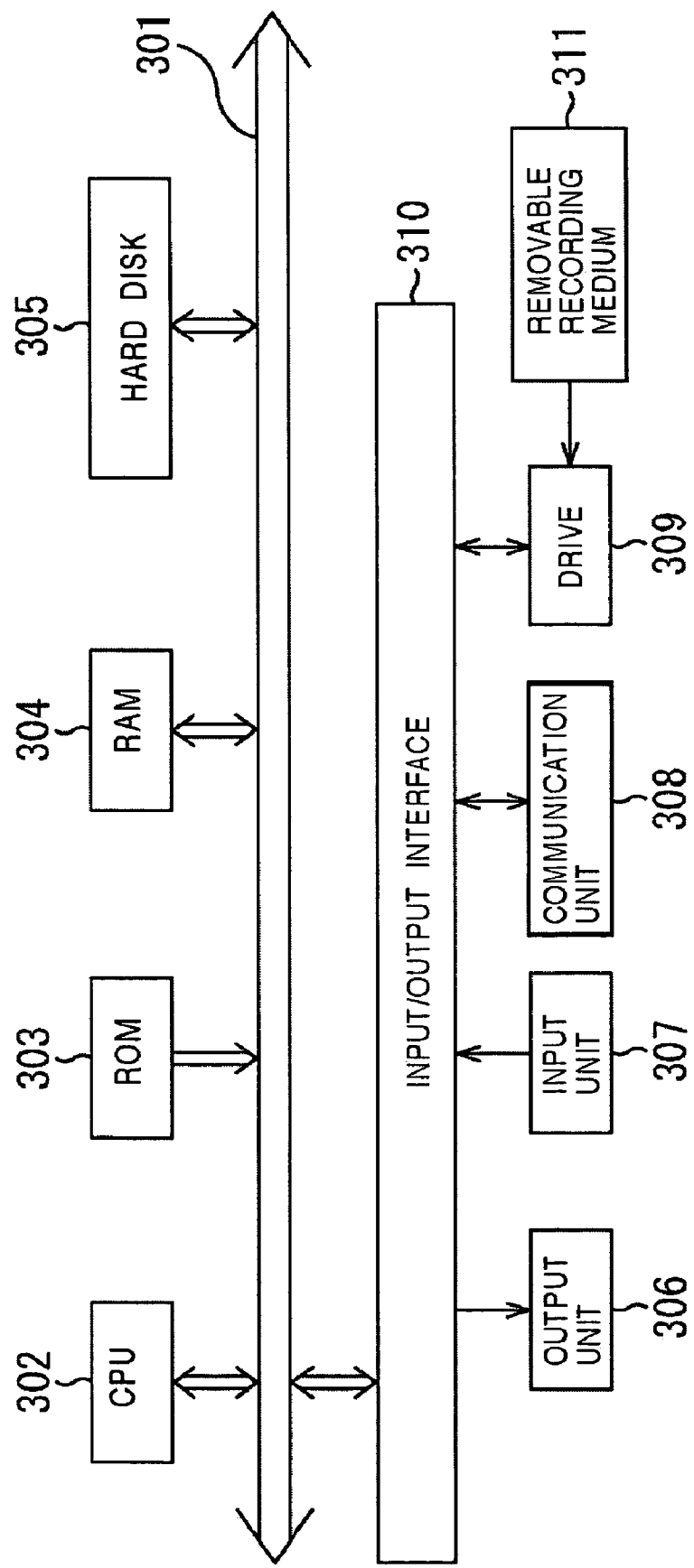
FIG. 17 is a block diagram illustrating a configuration example of a computer to which the present invention has been applied.

Now, FIG. 17 illustrates a configuration example of a computer in which a program for executing the above-described series of processing is to be installed.

The program can be stored in a hard disk 305 or in ROM 303, which are recording media built into the computer. Or, the program may be temporarily or permanently stored on removable storage media 311 such as a flexible disk, a CD-ROM (Compact Disc Read Only Memory), a MO (Magneto-Optical) disk, a DVD (Digital Versatile Disc), a magnetic disk, semiconductor memory, or the like. Such a removable recording medium 311 may be provided as so-called packaged software.

Besides installing the program to the computer from such a removable recording medium 311, the program may be transferred to the computer from a download site wirelessly via a satellite such as a digital broadcast satellite, or transferred over cable via a network such as a LAN (Local Area Network) or the Internet, with the program transferred thus being received at the computer with a communication unit 308 and installed in the built-in hard disk 305.

The computer has a built-in CPU (Central Processing Unit) 302. An input/output interface 310 is connected to the CPU 302 via a bus 301, and upon a user inputting commands by operating an input unit 307 made up of such as a keyboard, mouse, microphone, etc., via the input/output interface 310, the program stored in the ROM (Read Only Memory) 303 is executed accordingly. Or, the CPU 302 may load the program, stored in the hard disk 305, or transferred by satellite or network and received with the communication unit 308 and installed in the hard disk 305, or read out from the removable recording medium 311 mounted to a drive 309 and installed in the hard disk 305, to RAM (Random Access Memory) 304 so as to execute. Accordingly, the CPU 302 carries out processing following the above-described flowcharts, or the configuration of the block diagrams described above. The CPU 302 then as necessary uses the input/output interface 310 to output the processing results from an output unit 306 made up of an LCD (Liquid Crystal Display) or speaker, or transmit from the communication unit 308, or store in the hard disk 305, or the like.

Now, in the present specification, the processing steps described in the code of the program for causing a computer to carry out the various processes do not need to be processed in time-sequence in the order given in the flowchart, and may be executed in parallel or individually (e.g., parallel processing or object-based processing). Further, the program may be processed by a single computer, or multiple computers. Moreover, the program may be transferred to a remote computer to be executed.

Also note that the signal processing unit 4 and 234 may perform processing for obtaining second image signals besides the above-described image conversion processing, such as subjecting the first image signals to digital clamping processing, white balance adjusting processing, gamma correction processing, linear interpolation processing, and so forth.

Also, while the present embodiment has been described as using so-called three-sensor means for the sensor unit 1 and 231, single-sensor, two-sensor, or four or more sensor systems may be used for the sensor unit 1 and 231.

Moreover, with the present embodiment, description has been made with regard to a sensor unit 1 and 231 which senses light and outputs image signals corresponding to the light, however, arrangements may be made wherein the sensor unit 1 and 231 are microphones which sense sound and output audio signals corresponding to the sound, or sensors which sense other types of information such as temperature or acceleration for example, and output signals corresponding to the information. Note though, that the signal processing performed downstream of the sensor unit 1 and 231 differs according to the type of information sensed.

Also, besides the placement state of the R photoreceptor unit 23R, G photoreceptor unit 23G, and B photoreceptor unit 23B, examples of properties of the sensor unit 1 (and the sensor unit 231 as well) include the placement position of on-chip lenses for condensing light on the pixels, amplification of voltage (electric current) corresponding to the charge which each of the pixels has stored, and so forth.

Second Embodiment

Next, a second embodiment of the present invention will be described.

Figure 18:
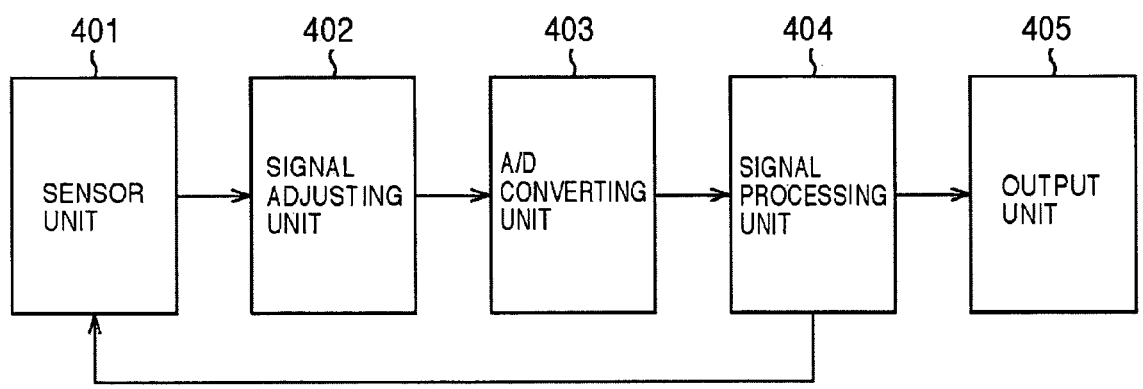
FIG. 18 is a block diagram illustrating a configuration example of a second embodiment of an image-taking device to which the present invention has been applied.

FIG. 18 illustrates a configuration example of the second embodiment of an image-taking device to which the present invention has been applied. The image-taking device shown in FIG. 18 may be a digital still camera or digital video camera, for example.

The sensor unit 401 comprises multiple photoelectric conversion elements corresponding to pixels as with the sensor unit 1 shown in FIG. 1, for sensing subject light cast therein and outputting image signals as electric signals corresponding to the amount of light received, to a signal adjusting unit 402. Also, unlike the sensor unit 1 shown in FIG. 1, the sensor unit 401 changes its state according to control signals supplied from a signal processing unit 404.

The signal adjusting unit 402 performs CDS processing for removing the reset noise contained in the image signals output from the sensor unit 401, and supplies image signals obtained as the result of the processing to an A/D converting unit 403. The A/D converting unit 403 performs A/D conversion of the image signals supplied from the signal adjusting unit 402, i.e., quantizes the image signals by sampling, and supplies the digital image signals obtained as a result thereof to the signal processing unit 404.

The signal processing unit 404 takes the digital image signals (hereafter simply referred to as "image signals") supplied from the A/D converting unit 403 as first image signals, subjects the first image signals to predetermined image conversion processing and outputs digital image signals obtained as a result thereof as second image signals to an output unit 405. Also, the signal processing unit 404 evaluates the second image signals obtained as a result thereof, and supplies control signals to the sensor unit 401 corresponding to the evaluation, for controlling the state of the sensor unit 401.

The output unit 405 receives the second image signals output from the image processing unit 404, and outputs these. That is to say, the output unit 405 outputs the second image signals from the signal processing unit 404 from an unshown output terminal, or displays on an unshown monitor. Also, the output unit 405 stores the second image signals in an unshown recording medium such as an optical disk, magnetic disk, magneto-optical disk, magnetic tape, semiconductor memory, or the like, or transmits these via such as a telephone line, the Internet, a LAN, or other like cable or wireless transmission medium.

With the image-taking device configured as described above, subject light is received at the sensor unit 401, and image signals which are electric signals corresponding to the amount of light received are supplied to the signal processing unit 404 via the signal adjusting unit 402 and A/D conversion unit 403. The signal processing unit 404 subjects the image signals supplied from the sensor unit 401 via the signal adjusting unit 402 and A/D conversion unit 403 to signal processing as first image signals, such as image conversion processing for improving image quality by improving resolution for example, and outputs second image signals wherein the image quality has been improved thereby to the output unit 405. At the output unit 405, the second image signals supplied from the signal processing unit 404 are output.

Also, the signal processing unit 404 evaluates the obtained second image signals by subjecting the first image signals from the sensor unit 401 to image conversion processing. Further, the signal processing unit 404 supplies controls signals to the sensor unit 401 for controlling the state of the sensor unit 401, corresponding to the evaluation thereof.

The sensor unit 401 changes the state thereof according to the control signals supplied from the signal processing unit 404, and outputs image signals obtained in the state following the change.

The sensor unit 401 is a three-sensor imaging sensor means for example, comprising three sensors for obtaining the R, G, and B components of the image signals (the later-described R photoreceptor unit 23R, G photoreceptor unit 23G, and B photoreceptor unit 23B). Accordingly, the sensor unit 1 outputs image signals having the three components of R signals, G signals, and B signals, for each pixel. The sensor unit 401 changes the placement state of one or more of the three sensors, according to the control signals supplied from the signal processing unit 404. Accordingly, the sensor placement state of the sensor unit 401 is controlled by the control signals from the signal processing unit 404. Now, the sensor placement state includes the placement position of the sensors, and the attitude (rotational state) of the sensors. Note however that with the present embodiment, description will be made regarding controlling the placement position of the sensors or the sensor unit 401 with control signals from the signal processing unit 404, to facilitate description. It should also be noted that the attitude of the sensors can be controlled, as well.

Figure 19:
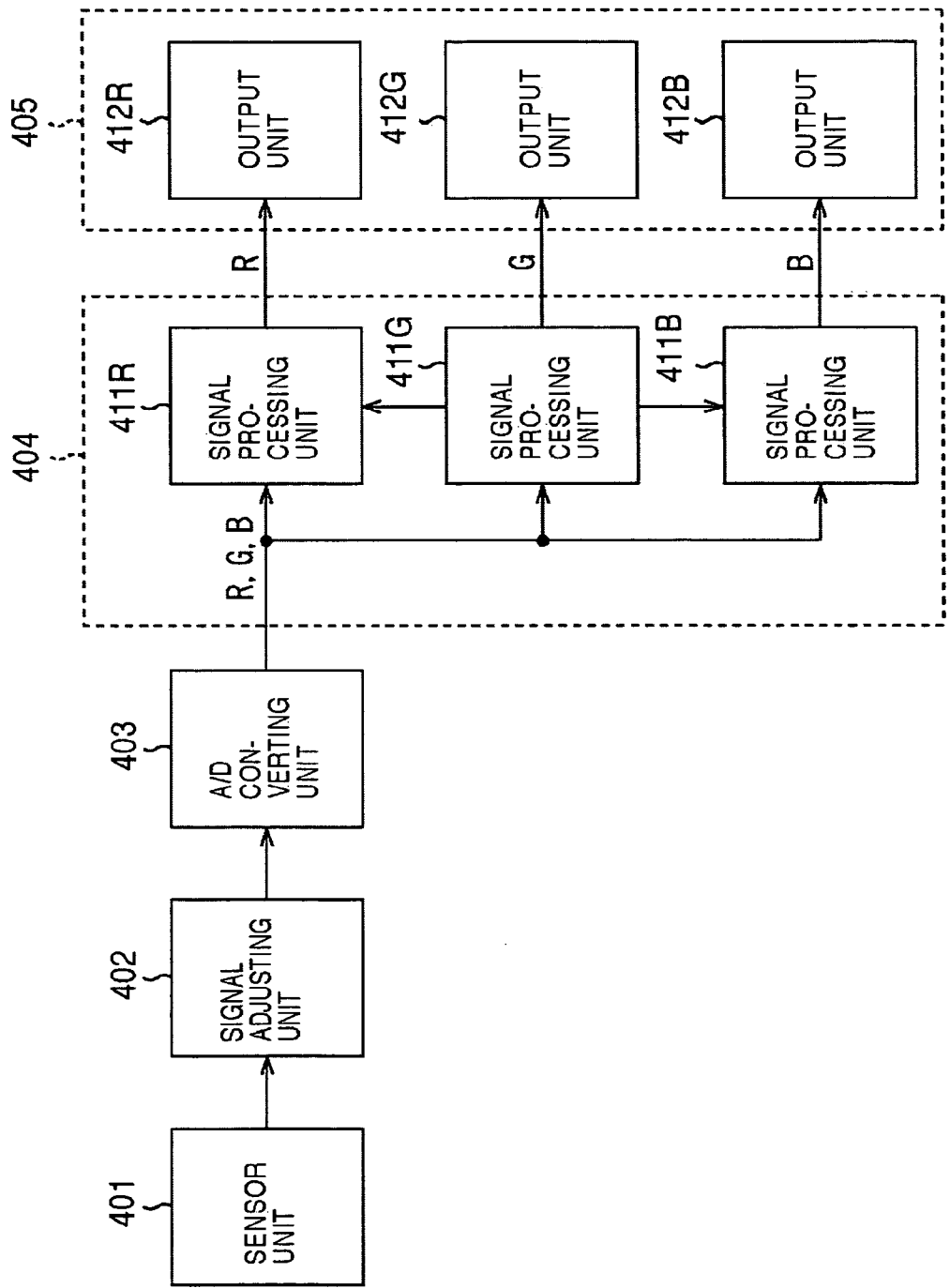
FIG. 19 is a block diagram illustrating a configuration example of a signal processing unit 404 and output unit 405.

FIG. 19 illustrates a configuration example of the signal processing unit 404 and the output unit 405 shown in FIG. 18. The signal processing unit 404 comprises three signal processing units, 411R, 411G, and 411B. The signal processing unit 411R receives the first image signals having the R, G, and B signals which are supplied from the A/D conversion unit 403, and subjects the first image signals to image conversion processing, thereby obtaining the R signals (component) of the second image signals, which is then output to the output unit 405. The signal processing unit 411G receives the first image signals having the R, G, and B signals which are supplied from the A/D conversion unit 403, and subjects the first image signals to image conversion processing, thereby obtaining the G signals (component) of the second image signals, which is then output to the output unit 405. The signal processing unit 411G also evaluates the G signals of the second image signals, and controls the placement state of the sensors of the sensor unit 401 according this evaluation. The signal processing unit 411B receives the first image signals having the R, G, and B signals which are supplied from the A/D conversion unit 403, and subjects the first image signals to image conversion processing, thereby obtaining the B signals (component) of the second image signals, which is then output to the output unit 405.

Note that here, the signal processing unit 411G evaluates the G signals of the second image signals, obtaining B signals (component) of the second image signals, which are supplied to the output unit 405. However, while the signal processing unit 411G is arranged to evaluate the G signals of the second image signals and control the placement state of the sensors or the sensor unit 401 according to the evaluation, control of the sensor unit 401 may also be made by evaluating either of the R signals or B signals of the second image signals rather than the G signals, or, two or more of the R, G, and B signals of the second image signals may be evaluated.

The output unit 405 comprises output units 412R, 412G, and 412B. The output units 412R, 412G, and 412B receive and output the R signals, G signals, and B signals, of the second image signal output by the signal processing units 411R, 411G, and 411B, respectively. Note that hereafter, the signal processing units 411R, 411G, and/or 411B may also be collectively or individually referred to simply as "signal processing unit 411" whenever appropriate.

Figure 20:
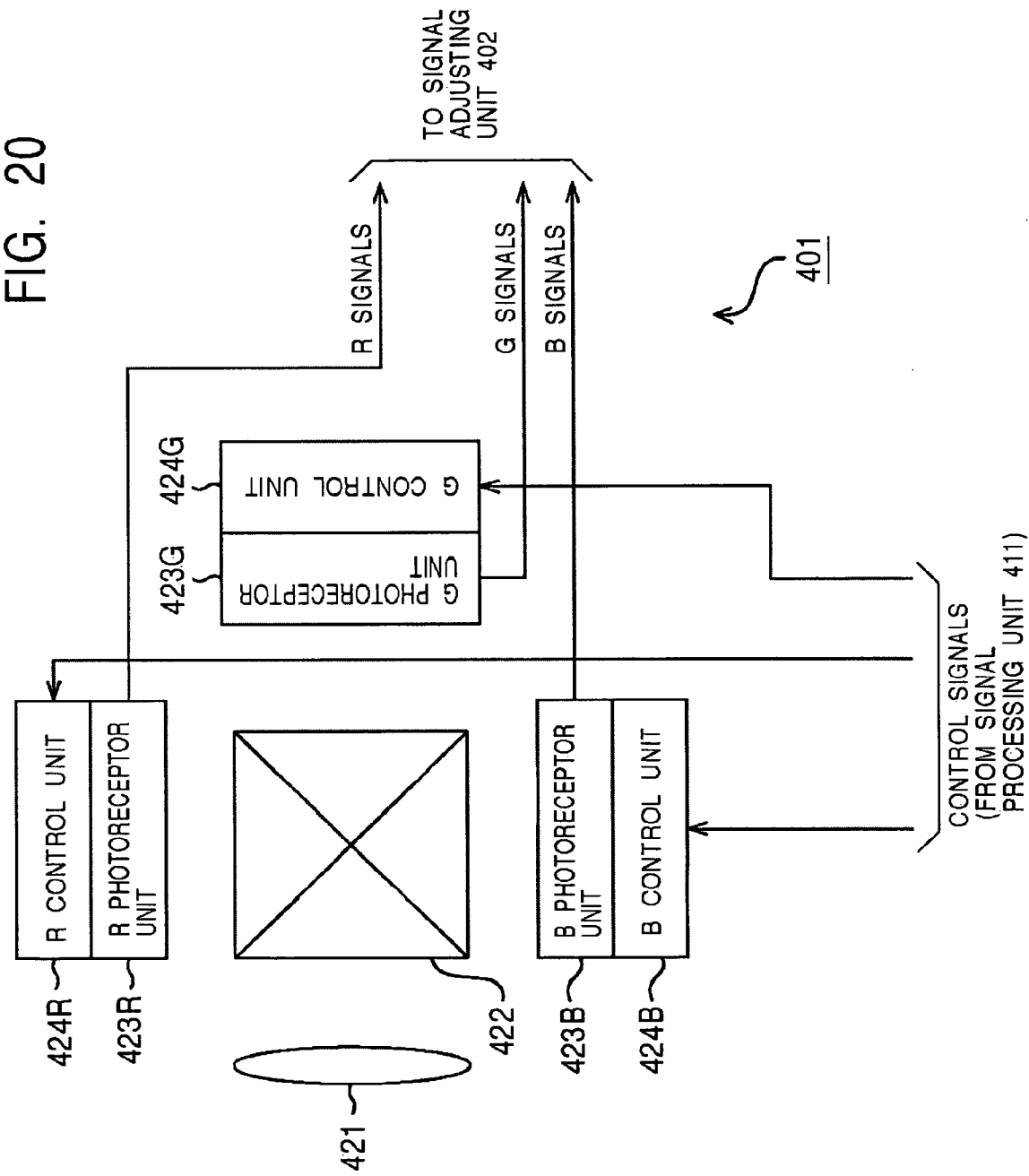
FIG. 20 is a block diagram illustrating a configuration example of a sensor unit 401.

Next, FIG. 20 illustrates a configuration example of the sensor unit 401 shown in FIGS. 18 and 19. Subject light is cast into a lens 421, and the lens 421 condenses the subject light onto each of the R photoreceptor unit 423R, G photoreceptor unit 423G, and B photoreceptor unit 423B, via a prism 422. That is to say, light cast into the lens 421 is emitted into the prism 422. The prism 422 splits the subject light from the lens 421 into R, G, and B light, and emits the R, G, and B light in the respective directions where the R photoreceptor unit 423R, G photoreceptor unit 423G, and B photoreceptor unit 423B are positioned.

The R photoreceptor unit 423R, G photoreceptor unit 423G, and B photoreceptor unit 423B are configured of photoelectric converting devices such as photo-diodes for example, which received the R, G, and B light from the prism 422, and thereby yield R signals, G signals, and B signals, as electric signals corresponding to the amount of received light, which are output to the signal adjusting unit 402.

An example of a device which can be used for the R photoreceptor unit 423R, G photoreceptor unit 423G, and B photoreceptor unit 423B, is a CCD. Note however, that the R photoreceptor unit 423R, G photoreceptor unit 423G, and B photoreceptor unit 423B are by no means restricted to CCDs, and CMOS sensors or HARPs may be used instead.

An R control unit 424R, G control unit 424G, and B control unit 424B each perform control to move the placement position of the R photoreceptor unit 423R, G photoreceptor unit 423G, and B photoreceptor unit 423B, according to the control signals supplied from the signal processing unit 411G.

To facilitate description here, let us say that the placement position of the entire R photoreceptor unit 423R has been set to a position obtained by the R control unit 424R. Further, let us say that the placement positions of the entire G photoreceptor unit 423G and B photoreceptor unit 423B have been set to positions obtained by the G control unit 424G and B control unit 424B. However, it should be noted that an arrangement may be made using MEMS technology, whereby the R photoreceptor unit 423R employed is one wherein the placement position of a pixel can be essentially changed (moved), so the R control unit 424R can individually control the placement position of each of the pixels of the R photoreceptor unit 423R. This is true for the G photoreceptor unit 423G and G control unit 424G, and the B photoreceptor unit 423B and B control unit 424B as well.

Next, control of each of the R photoreceptor unit 423R, G photoreceptor unit 423G, and B photoreceptor unit 423B, with the R control unit 424R, G control unit 424G, and B control unit 424B, shown in FIG. 21, will be made with reference to FIGS. 21A through 21D.

Figure 21C:
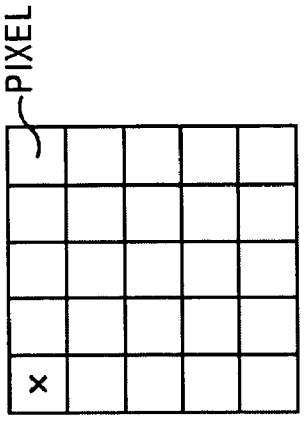
FIGS. 21A through 21D are diagram describing control of the placement position of an R photoreceptor unit 423R, a G photoreceptor unit 423G, and a B photoreceptor unit 423B.
Figure 21B:
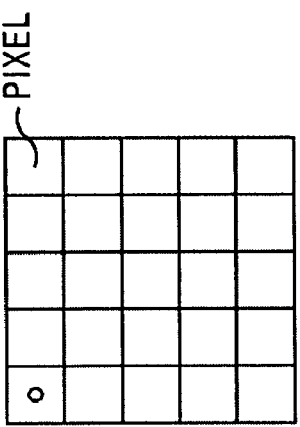
Figure 21A:
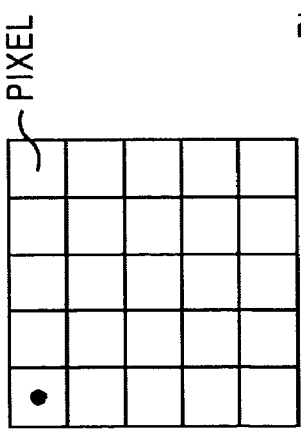

The R photoreceptor unit 423R shown in FIG. 21A, the G photoreceptor unit 423G shown in FIG. 21B, and the B photoreceptor unit 423B shown in FIG. 21C, each have pixels with finite area (corresponding to one photodiode or the like) and output image signals (pixel value) corresponding to the amount of light received at each pixel. Note that in FIGS. 21A through 21D, the pixels are squares with each side having a finite length.

Here, positions of pixels of the R photoreceptor unit 423R, the G photoreceptor unit 423G, and the B photoreceptor unit 423B are each represented by the center of gravity of the squares which are the pixels, and the pixels of the R photoreceptor unit 423R, the G photoreceptor unit 423G, and the B photoreceptor unit 423B are respectively represented by dots, circles, and Xs. At the point of manifesting the image-taking device, such as a video camera or a still camera, the positions of the corresponding pixels for example of R photoreceptor unit 423R, the G photoreceptor unit 423G, and the B photoreceptor unit 423B are all optically matching. That is to say, the R photoreceptor unit 423R, the G photoreceptor unit 423G, and the B photoreceptor unit 423B are all disposed at optically equivalent positions such that the R, G, and B rays of a light ray are received by corresponding pixels.

The R control unit 424R, the G control unit 424G, and the B control unit 424B respectively move the placement positions of the R photoreceptor unit 423R, the G photoreceptor unit 423G, and the B photoreceptor unit 423B, according to control signals supplied from the signal processing unit 411G (FIG. 11). That is to say, the placement positions of the R photoreceptor unit 423R, the G photoreceptor unit 423G, and the B photoreceptor unit 423B are not fixed but rather movable, and accordingly, the corresponding pixels of the R photoreceptor unit 423R, the G photoreceptor unit 423G, and the B photoreceptor unit 423B in the sensor unit 401 are not necessarily at optically identical positions.

Figure 21D:
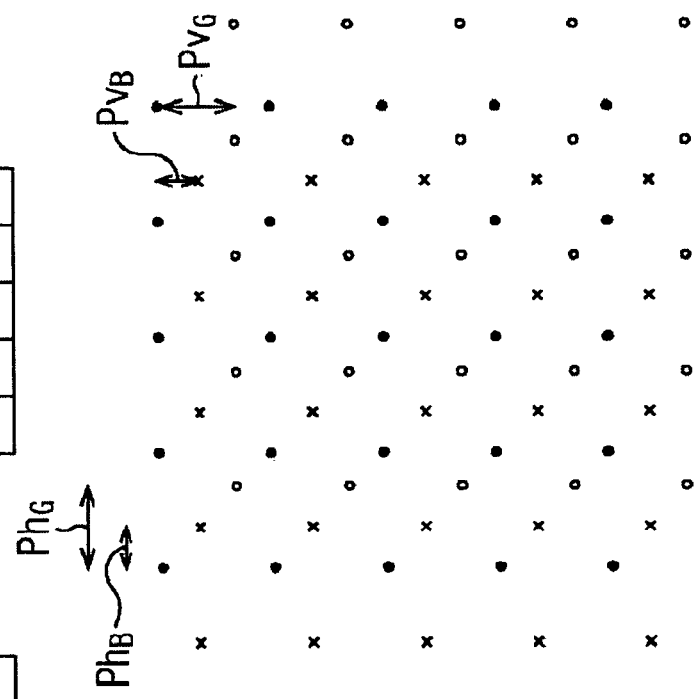

As shown in FIG. 21D, with the position of the pixels of the R photoreceptor unit 423R (shown as dots in FIGS. 13A and 13D) as a reference, the amounts of offset in the horizontal direction and the vertical direction of the position of the pixels of the G photoreceptor unit 423G (shown as circles in FIG. 21) are represented as $Ph_G$ and $Pv_G$, and the amounts of offset in the horizontal direction and the vertical direction of the position of the pixels of the B photoreceptor unit 423B (shown as Xs in FIG. 21) are represented as $Ph_B$ and $Pv_B$.

The R control unit 424R, the G control unit 424G, and the B control unit 424B move the placement positions of the R photoreceptor unit 423R, G photoreceptor unit 423G, and B photoreceptor unit 423B, so as to realize the offset amounts $Ph_G$, $Pv_G$, $Ph_B$, $Pv_B$, according to the control signals supplied from the signal processing unit 411G.

Now, in this case, an arrangement may be made wherein, for example, the position of the R photoreceptor unit 423R is fixed, and only the G photoreceptor unit 423G, and B photoreceptor unit 423B are moved. Or, an arrangement may be made wherein another of the R photoreceptor unit 423R, the G photoreceptor unit 423G, and the B photoreceptor unit 423B, other than the R photoreceptor unit 423R is fixed, and the remaining two or moved, and further, an arrangement may be made wherein all of the R photoreceptor unit 423R, the G photoreceptor unit 423G, and the B photoreceptor unit 423B can be moved.

Figure 22:
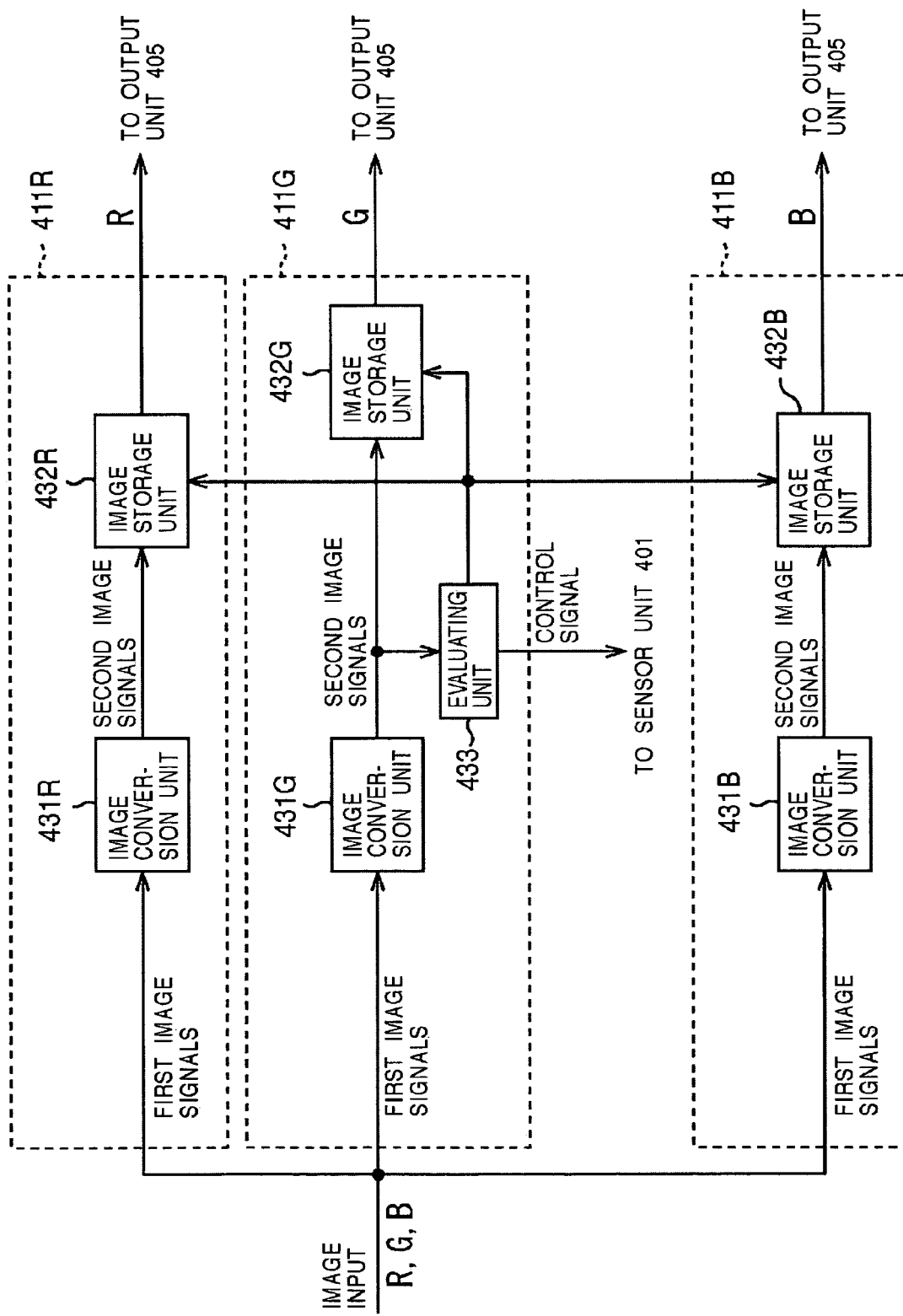
FIG. 22 is a block diagram illustrating a configuration example of a signal processing unit 411.

Next, FIG. 22 illustrates a configuration example of the signal processing unit 411 shown in FIG. 19. The signal processing units 411R, 411G, and 411B have supplied thereto the image signals output from the sensor unit 401, as first image signals, via the signal adjusting unit 402 and A/D converting unit 403.

The signal processing unit 411R comprises an image converting unit 431R and image storage unit 432R. The first image signals supplied to the signal processing unit 411R are supplied to the image converting unit 431R. The image converting unit 431R subjects the first image signals to image conversion processing for improving image quality by improving resolution for example, and supplies the R digital image signals with improved image quality that are obtained as a result thereof to the image storage unit 432R as R signals of the second image signals.

The image storage unit 432R temporarily stores the second image signals supplied from the image converting unit 431R. Further, from the stored second image signals, the image storage unit 432R reads out the second image signals following selection information for selecting images that is supplied from an evaluating unit 433 of a signal processing unit 411G, and supplies the second image signals read out to the output unit 405.

The signal processing unit 411G comprises an image converting unit 431G, an image storage unit 432G, and the evaluating unit 433. The first image signals supplied to the signal processing unit 411G are supplied to the image converting unit 431G. The image converting unit 431G subjects the first image signals to image conversion processing for improving image quality by improving resolution for example, and supplies the G digital image signals with improved image quality that are obtained as a result thereof to the image storage unit 432G and the evaluating unit 433, as G signals of the second image signals.

The image storage unit 432G temporarily stores the second image signals supplied from the image converting unit 431G. Further, from the stored second image signals, the image storage unit 432G reads out the second image signals following selection information for selecting images that is supplied from an evaluating unit 433 of a signal processing unit 411G, and supplies the second image signals read out to the output unit 405.

The evaluating unit 433 evaluates the G signals of the second image signals supplied from the image converting unit 431G, and supplies control signals to the sensor unit 401 corresponding to the evaluation, thereby controlling the placement position of the R photoreceptor unit 423R, G photoreceptor unit 423G, and B photoreceptor unit 423B of the sensor unit 401 (FIG. 20). Further, the evaluating unit 433 supplies selection information to the image storage unit 432G corresponding to the evaluation of the second image signals, and further supplies the same to the image storage unit 432R of the signal processing unit 411R and the image storage unit 432B of the signal processing unit 411B.

The signal processing unit 411B comprises an image converting unit 431B and image storage unit 432B. The first image signals supplied to the signal processing unit 411B are supplied to the image converting unit 431B. The image converting unit 431B subjects the first image signals to image conversion processing for improving image quality by improving resolution for example, and supplies the B digital image signals with improved image quality that are obtained as a result thereof to the image storage unit 432B as B signals of the second image signals.

The image storage unit 432B temporarily stores the second image signals supplied from the image converting unit 431B. Further, from the stored second image signals, the image storage unit 432B reads out the second image signals following selection information for selecting images that is supplied from an evaluating unit 433 of a signal processing unit 411G, and supplies the second image signals read out to the output unit 405.

It should be noted that the image converting units 431R, 431G, and 431B are of the same configuration, and accordingly, may be referred to simply as "image converting unit 431", collectively or individually, as appropriate. Further, it should be noted that the image storage units 432R, 432G, and 432B are of the same configuration, and accordingly, may be referred to simply as "image storage unit 432", collectively or individually, as appropriate.

Figure 23:
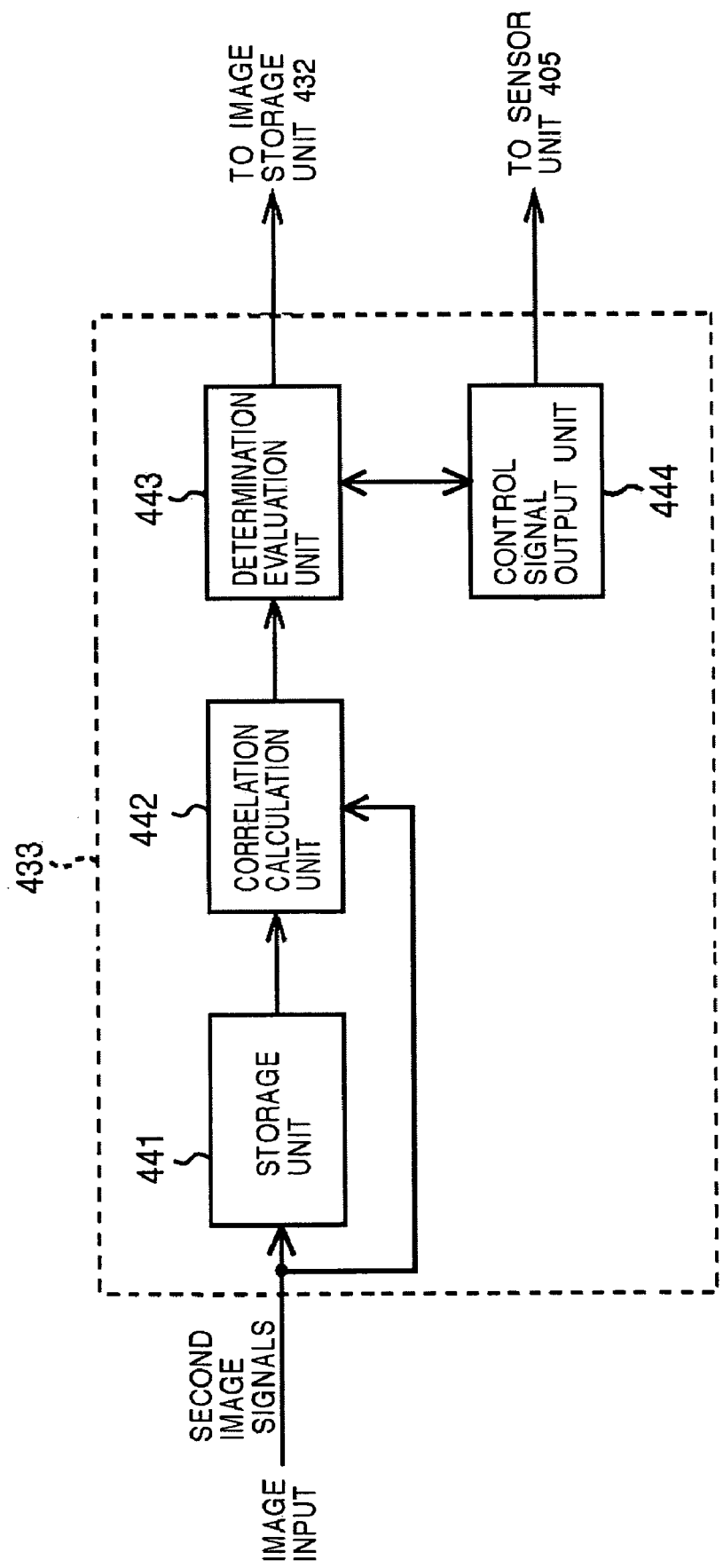
FIG. 23 is a block diagram illustrating a first configuration example of an evaluating unit 433.

Next, FIG. 23 illustrates a configuration example of the evaluating unit 433 shown in FIG. 22. The evaluating unit 433 comprises a storage unit 441, a correlation calculation unit 442, a determination evaluation unit 443, and a control signal output unit 444, and evaluates the image quality of the G signals of the second image signals supplied from the image converting unit 431G.

More specifically, the storage unit 441 temporarily stores the second image signals supplied from the image converting unit 431G. The correlation calculation unit 442 computes the correlation between the second image signals supplied from the image converting unit 431G the last time and the second image signals supplied from the image converting unit 431G this time, and supplies the correlation value obtained as a result of the computation to the determination evaluation unit 443.

The determination evaluation unit 443 evaluates the second image signals output from the image converting unit 431G based on the correlation value supplied from the correlation calculation unit 442, and obtains evaluation results to the effect that the image quality of the second image signals is high, or low. Further, the determination evaluation unit 443 supplies the evaluation results of the second image signals to the control signal output unit 444 and moreover outputs selection information to the image storage units 432R, 432G, and 432B, shown in FIG. 22, according to the evaluation results.

The control signal output unit 444 supplies control signals for controlling the placement positions of the R photoreceptor unit 423R, G photoreceptor unit 423G, and B photoreceptor unit 423B of the sensor unit 401 (FIG. 20), corresponding to the evaluation results of the second image signals from the determination evaluation unit 443, to the R control unit 424R, the G control unit 424G, and the B control unit 424B of the sensor 401. Thus, the placement position of the R photoreceptor unit 423R, G photoreceptor unit 423G, and B photoreceptor unit 423B is controlled.

With the evaluating unit 433 configured as described above, the storage unit 441 sequentially stores the second image signals supplied from the image converting unit 431G. The correlation calculation unit 442, upon receiving supply of new second image signals from the image converting unit 431G, computes the correlation value between these second image signals and the second image signals supplied from the image converting unit 431G the last time and stored in the storage unit 441.

Now, an example of the correlation value between two frames (or fields) of the second image signals is the reciprocal of the sum of absolutes of differences of part or all of pixels at the same position between the two image signals.

The correlation calculation unit 442 supplies the obtained correlation values to the determination evaluation unit 443. The determination evaluation unit 443 evaluates the second image signals output from the image converting unit 431G based on the correlation value supplied from the correlation calculation unit 442, and obtains evaluation results to the effect that the image quality of the second image signals is high, or low. In the event that the determination evaluation unit 443 obtains evaluation results to the effect that the image quality of the second image signals is low, the determination evaluation unit 443 supplies the evaluation results to the control signal output unit 444.

Upon receiving evaluation results to the effect that the image quality of the second image signals is low, the control signal output unit 444 supplies to the sensor unit 401 control signals for controlling the placement position of the R photoreceptor unit 423R, G photoreceptor unit 423G, and B photoreceptor unit 423B of the sensor unit 401 (FIG. 20), corresponding to the evaluation results, i.e., control signals for changing the value of the amounts of offset $Ph_G$ and $Pv_G$ of the position of the pixels of the G photoreceptor unit 423G, and the amounts of offset $Ph_B$ and $Pv_B$ of the position of the pixels of the B photoreceptor unit 423B, with the position of the pixels of the R photoreceptor unit 423R as a reference, as described in FIG. 21. Now, with a four-dimensional vector having the current offset amounts $Ph_G$, $Pv_G$, $Ph_B$, and $Pv_B$, as the components thereof represented as vector P ($Ph_G$, $Pv_G$, $Ph_B$, $Pv_B$,), and a four-dimensional infinitesimal vector as $\Delta P$, at the time of imaging a certain frame the control signal output unit 444 newly sets a vector $P+\Delta P$ which has not been set yet, and outputs control signals for controlling the R photoreceptor unit 423R, G photoreceptor unit 423G, and B photoreceptor unit 423B to offset positions matching the component values of the vector $P+\Delta P$. Now, the components of the infinitesimal vector $\Delta P$ may be random numbers, for example.

In this case, the placement positions of the R photoreceptor unit 423R, G photoreceptor unit 423G, or B photoreceptor unit 423B of the sensor unit 401 (FIG. 20) are moved, according to the control signals supplied from the control signal output unit 444. Further, the R photoreceptor unit 423R, G photoreceptor unit 423G, and B photoreceptor unit 423B of the sensor unit 401 receive the subject light following the movement thereof, and output image signals corresponding to the amount of light received. The image signals output by the sensor unit 401 are supplied to the signal processing unit 411 as new first image signals via the signal adjusting unit 402 and A/D converting unit 403. The image converting unit 431 of the signals processing unit 411 shown in FIG. 22 subjects the new first image signals to image conversion processing, and supplies to and stores in the image storage unit 432 the new second image signals obtained as a result of the image conversion processing. Further, the image conversion unit 431R supplies the new second image signals to the evaluating unit 433.

The correlation calculating unit 442 of the evaluating unit 433 receives the new second image signals from the image converting unit 431R, and computes the correlation value between the second image signals and the second image signals supplied from the image converting unit 431G and stored in the storage unit 411 last time, which is supplied to the determination evaluation unit 443.

By repeating the above processing, the determination evaluation unit 443 obtains the correlation values for the second image signals obtained from the first image signals imaged at the offset amounts $Ph_G$, $Pv_G$, $Ph_B$, and $Pv_B$.

Figure 24:
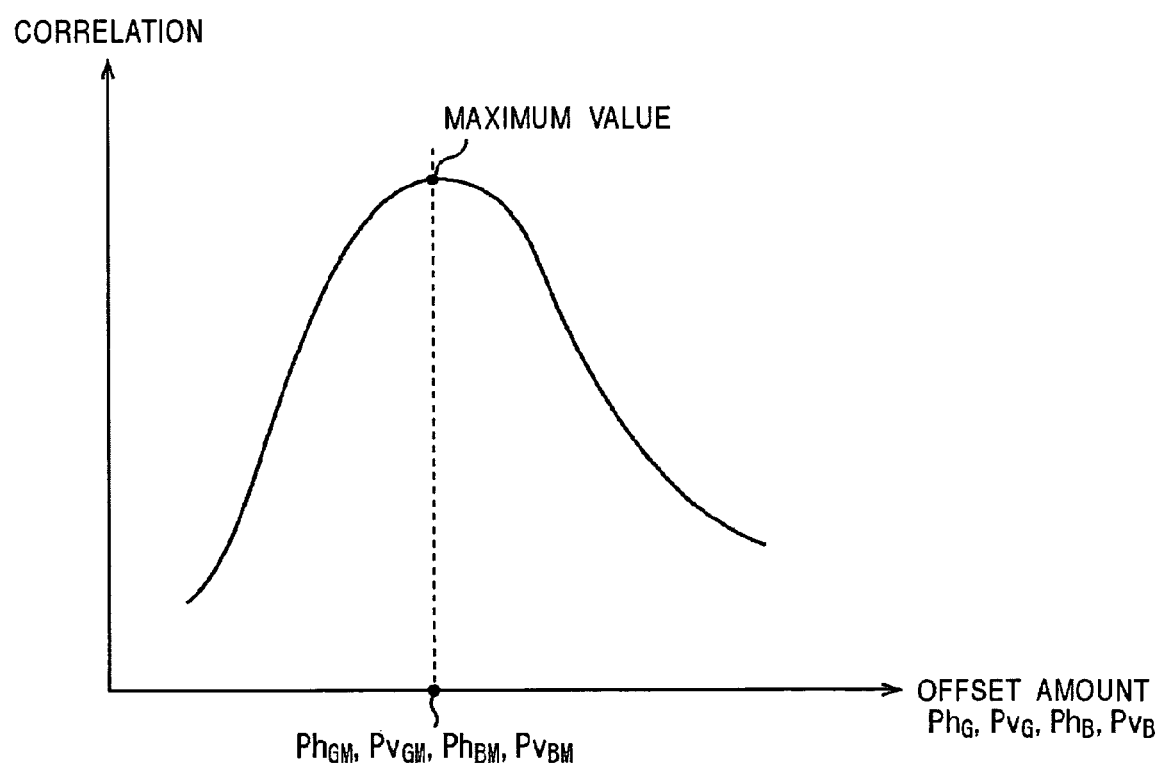
FIG. 24 is a diagram illustrating the relation between offset amount and correlation value.

Now, FIG. 24 illustrates the relation between the offset amounts $Ph_G$, $Pv_G$, $Ph_B$, and $Pv_B$, for each value, and the correlation value obtained using the second image signals obtained from the first image signals imaged at the offset amount $Ph_G$, $Pv_G$, $Ph_B$, and $Pv_B$. The correlation value indicates the correlation between the second image signals obtained with a certain offset amount $Ph_G$, $Pv_G$, $Ph_B$, $Pv_B$, and second image signals obtained with an offset amount $Ph_G'$, $Pv_G'$, $Ph_B'$, and $Pv_B'$, offset by an infinitesimal amount corresponding to the above-described infinitesimal vector $\Delta P$.

Accordingly, a low correlation value for the certain offset amount $Ph_G$, $Pv_G$, $Ph_B$, $Pv_B$, means that the second image signals obtained with the offset amount $Ph_G$, $Pv_G$, $Ph_B$, $Pv_B$, have low image quality with blurred edges that are not sharp. On the other hand, a high correlation value for the certain offset amount $Ph_G$, $Pv_G$, $Ph_B$, $Pv_B$, means that the second image signals obtained with the offset amount $Ph_G$, $Pv_G$, $Ph_B$, $Pv_B$, have high image quality with sharp edges.

Accordingly, in the event that the correlation value supplied from the correlation calculating unit 442 is low, the determination evaluation unit 443 shown in FIG. 23 evaluates the image quality of the second image signals to be low, and in the event that the correlation value is high, e.g., in the event that a maximal value (or greatest value) is obtained as shown in FIG. 24, evaluates the image quality of the second image signals to be high. In the event that evaluation results to the effect that the image quality of the second image signals is high, the determination evaluation unit 443 outputs selection information to the effect that one of the two second image signals used for computing the correlation value at the time that these evaluation results were obtained is to be selected, to the image storage unit 432 (FIG. 22).

At the image storage units 432R, 432G, and 432B, second image signals according to the selection information, i.e., second image signals regarding which evaluation results have been obtained to the effect that the image quality is high, are read out from the second image signals stored therein as described above, and supplied to the output unit 405.

Next, the operations of the image-taking device shown in FIGS. 18 and 19 will be described with reference to the flowchart in FIG. 25.

With the image-taking device, first, in step S101, the sensor unit 401 receives the subject light and performs photoelectric conversion, thereby obtaining image signals as electric signal (i.e., images the subject), and supplies the image signals to the signal adjusting unit 402. The signal adjusting unit 402 subjects the image signals supplied from the sensor unit 401 to CDS processing and then supplies these to the A/D converting unit 403. The A/D converting unit 403 performs A/D conversion of the image signals supplied from the signal adjusting unit 462, which are then supplied to the signal processing unit 404 as first image signals, and accordingly, the signal processing unit 404 obtains the first image signals and the flow proceeds from step S101 to step S102.

In step S102, at the signal processing unit 404, the image converting unit 431 of the signal processing unit 411 (FIG. 22) subjects the first image signals supplied from the A/D converting unit 403 to image conversion processing as signal processing, thereby yielding the second image signals with image quality improved over that of the first image signals, which are supplied to and stored in the image storage unit 432. Further, in step S102, the image conversion unit 431G supplies second image signals obtained as the result of image conversion processing to the evaluating unit 433, and the flow proceeds to step S103.

In step S103, the evaluating unit 433 performs evaluation processing for evaluating the second image signals supplied from the image conversion unit 431G, and the flow proceeds to step S104. In step S104, the evaluating unit 433 determines whether or not second image signals, regarding which evaluation results have been obtained to the effect that the image quality is high, have been obtained.

In step S104, in the event that determination is made that second image signals, regarding which evaluation results have been obtained to the effect that the image quality is low, have been obtained, the flow proceeds to step S105, and the evaluating unit 433 supplies control signals for specifying the offset amounts $Ph_G$, $Pv_G$, $Ph_B$, and $Pv_B$, to the sensor unit 401, thereby moving the placement positions of the R photoreceptor unit 423R, G photoreceptor unit 423G, or B photoreceptor unit 423B of the sensor unit 401 (FIG. 20), and the flow returns to step S101.

In step 101, image signals are obtained for each of the R photoreceptor unit 423R, G photoreceptor unit 423G, or B photoreceptor unit 423B of the sensor unit 401 (FIG. 20) at the placements positions to which movement has been made in step S105 immediately before, and the same processing is repeated.

In step S104, in the event that determination is made that second image signals, regarding which evaluation results have been obtained to the effect that the image quality is high, have been obtained, the evaluating unit 433 supplies the selection information to the effect that the second image signals yielding the evaluation results are to be selected to the image storage unit 432, and the flow proceeds to step S106.

In step S106, the image storage units 432R, 432G, and 432B select and read out from the second image signals left stored in the state in step S102, the second signals according to the selection information from the evaluating unit 433, i.e., the second image signals with the high image quality, output to the output unit 405, and processing for one frame (or one field) of image data ends. The image-taking device repeats the processing according to the flowchart in FIG. 25 until, for example, the user gives a image-taking stop command.

Next, the evaluation processing which the evaluating unit 433 shown in FIG. 23 performs in step S103 in FIG. 25 will be described with reference to the flowchart in FIG. 26.

In the evaluating processing, first, in step S311, the storage unit 411 stores the second image signals supplied from the image conversion unit 431G in the immediately-preceding step S102 (FIG. 25), and the correlation calculating unit 442 receives these second image signals. Further, in step S311, the correlation calculating unit 442 computes the correlation value between the second image signals supplied from the image conversion unit 431G and the second image signals stored in the previous step S311 by the storage unit 441, supplies the correlation value to the determination evaluation unit 443, and the flow proceeds to step S312.

In step S312, the determination evaluation unit 443 temporarily stores the correlation value supplied from the correlation calculating unit 442 in a manner correlated with the offset amounts $Ph_G$, $Pv_G$, $Ph_B$, and $Pv_B$ at the time of taking one of the two second image signals used for obtaining the correlation value, and the flow proceeds to step S313. Now, the determination evaluation unit 443 obtains the offset amounts $Ph_G$, $Pv_G$, $Ph_B$, and $Pv_B$ at the time of taking one of the two second image signals used for obtaining the correlation value supplied from the correlation calculating unit 422, from the control signal output unit 444.

In step S313, the determination evaluation unit 443 determines, regarding the relation between the correlation value stored in step S312 so far and the offset amount, whether a maximal value has been obtained for the correlation value. In the event that determination is made in step S313 that a maximal value has not been obtained for the correlation value, the flow proceeds to step S314, the determination evaluation unit 443 makes an evaluation to the effect that the second image signals are of low image quality, and the flow returns to step S104 in FIG. 25.

Figure 25:
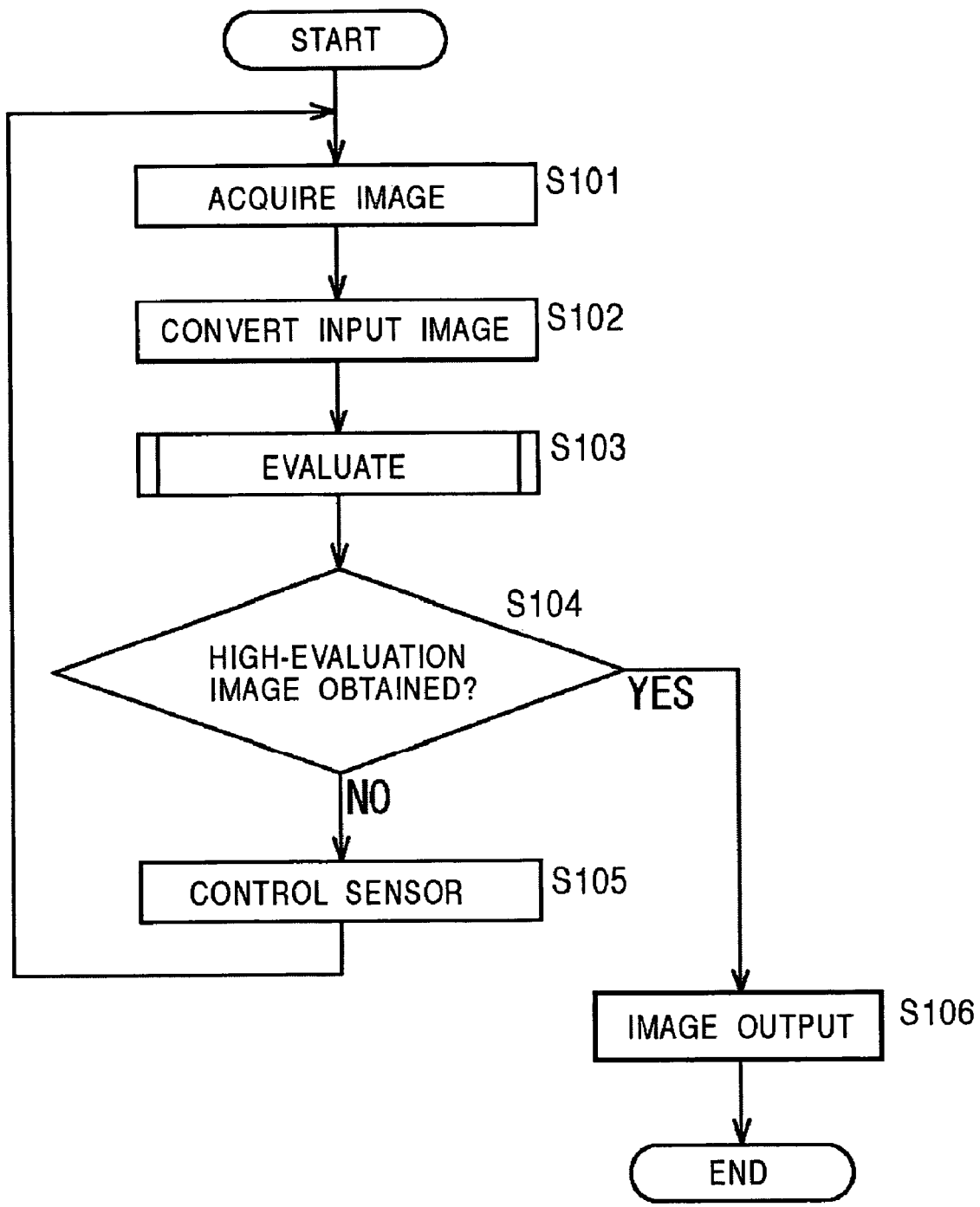
FIG. 25 is a flowchart describing the operations of the image-taking device.
Figure 26:
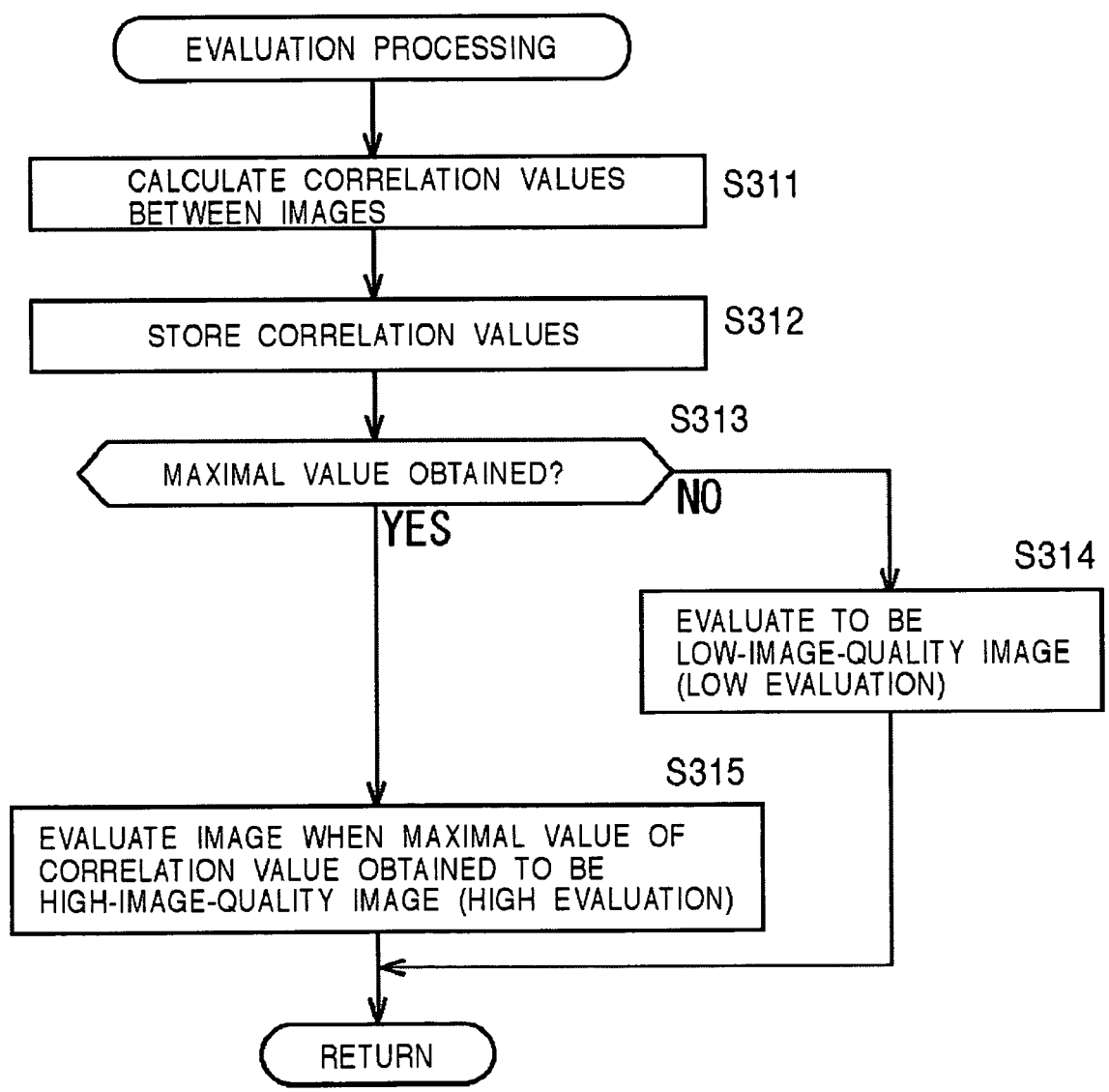
FIG. 26 is a flowchart describing evaluation processing by the evaluating unit 433.

In this case, in step S104 in FIG. 25, the determination evaluation unit 443 determines that evaluation results have not been obtained to the effect that the image quality is high, and accordingly supplies the evaluation results, i.e., evaluation results to the effect that the second image signals are of low image quality, to the control signal output unit 444, and the flow proceeds to step S105. In step S105, the control signal output unit 444 receives the evaluation results to the effect that the second image signals are of low image quality, and supplies the sensor unit 401 with control signals specifying new offset amounts $Ph_G$, $Pv_G$, $Ph_B$, and $Pv_B$ corresponding to the evaluation results.

Returning to step S26, in the event that determination is made in step S313 that a maximal value has been obtained for the correlation value, the flow proceeds to step S315, the determination evaluation unit 443 makes an evaluation to the effect that the second image signals are of high image quality, and the flow returns to step S104 in FIG. 25.

In this case, in step S104 of FIG. 25, in the event that determination is made that second image signals, regarding which evaluation results have been obtained to the effect that the image quality is high, have been obtained, the evaluating unit 433 supplies the selection information to the effect that the second image signals yielding the evaluation results are to be selected to the image storage unit 432, and the flow proceeds to step S106.

In step S106, the image storage units 432R, 432G, and 432B select and read out from the second image signals left stored in the state in step S102, the second signals according to the selection information from the evaluating unit 433, i.e., the second image signals with the high image quality.

As described above, the second digital image signals are evaluated, and the offset amounts $Ph_G$, $Pv_G$, $Ph_B$, and $Pv_B$ are controlled according to the evaluation results, such that the placement positions of the R photoreceptor unit 423R, G photoreceptor unit 423G, and B photoreceptor unit 423B of the sensor unit 401 (FIG. 20) are controlled, and accordingly, with the sensor unit 401 having the R photoreceptor unit 423R, G photoreceptor unit 423G, and B photoreceptor unit 423B, placed at positions corresponding to the offset amounts $Ph_G$, $Pv_G$, $Ph_B$, and $Pv_B$, suitable image signals for the image conversion processing at the image converting unit 431 are output, and consequently, high-image-quality second image signals can be obtained at the image converting unit 431.

While in the above description, evaluation is made to the effect that the second image signals are high-image-quality in the event that a maximal value is obtained for the correlation value in step S313, but an arrangement may be made instead wherein evaluation is made to the effect that the second image signals are high-image-quality in the event that a maximal value exceeding a predetermined threshold value is obtained for the correlation value in step S313.

Also, in the case above, the second image signals are described as being evaluated based on correlation values, but an arrangement may be made instead wherein evaluation of the second image signals are made based on the S/N of the second image signals obtained with regard to the offset amounts $Ph_G$, $Pv_G$, $Ph_B$, and $Pv_B$ for each value. Further, evaluation of the second image signals may be input externally. That is, for example, an arrangement may be made wherein the second image signals are displayed, and evaluation of the second image signals is input by a user viewing the displayed image, for example.

Further, an arrangement may be made regarding the amount of offset wherein several values are prepared beforehand, correlation values are obtained regarding all of the several offset amount values, and the one of the two second image signals when the highest correlation value is obtained is output in step S106 of FIG. 25.

Also, an arrangement may be made wherein the loop of steps S101 through S105 in FIG. 25 is executed as many times as possible within one frame (field) period, and the one of the two second image signals when the highest correlation value is obtained of the correlation values obtained during the loop processing is output in step S106 of FIG. 25.

The image converting unit 431 shown in FIG. 22 is configured in the same way as the image converting unit 31 shown in FIG. 4, and accordingly, the description thereof will be omitted here (see FIGS. 6 through 10 and the description thereof).

Third Embodiment

Figure 27:
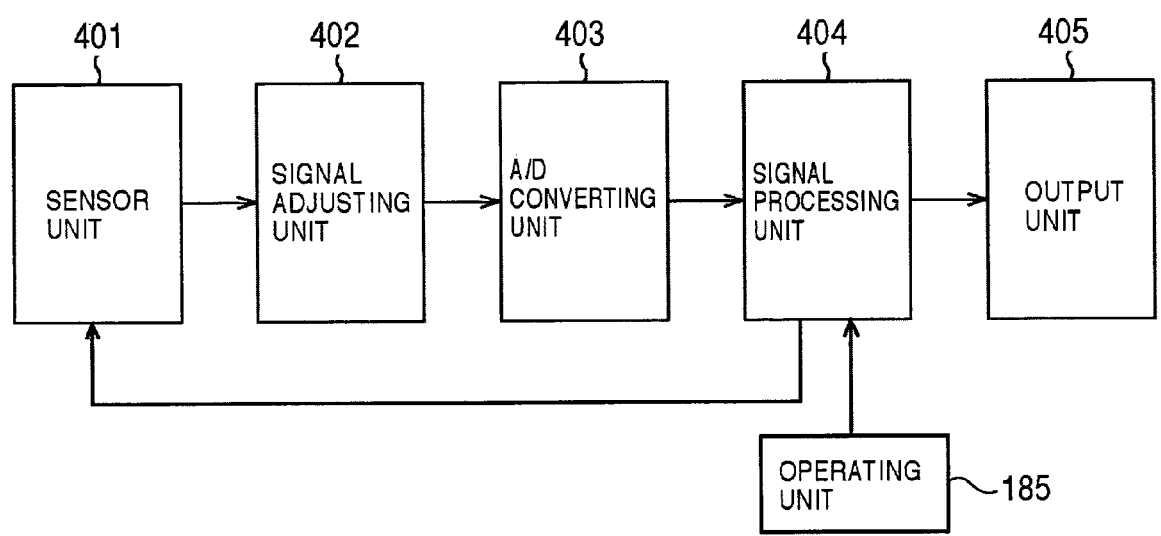
FIG. 27 is a block diagram illustrating a configuration example of a third embodiment of an image-taking device to which the present invention has been applied.

Next, FIG. 27 illustrates a configuration example of a third embodiment of an image-taking device to which the present invention has been applied. Note that the components which correspond to those in FIGS. 18 or 19 are denoted with the same reference numerals, and description thereof will be omitted as appropriate. Put simply, the image-taking device according to the third embodiment which is illustrated in FIG. 27 is basically the same as that according to the second embodiment illustrated in FIGS. 18 and 19, other than an operating unit 185 having been further provided.

The operating unit 185 is a knob or the like to be operated by a user for example, and outputs parameters corresponding to the operations thereof to the signal processing unit 404. The signal processing unit 404 in FIG. 27 is configured of the signal processing units 411R, 411G, and 411B, as illustrated in FIG. 19.

Figure 28:
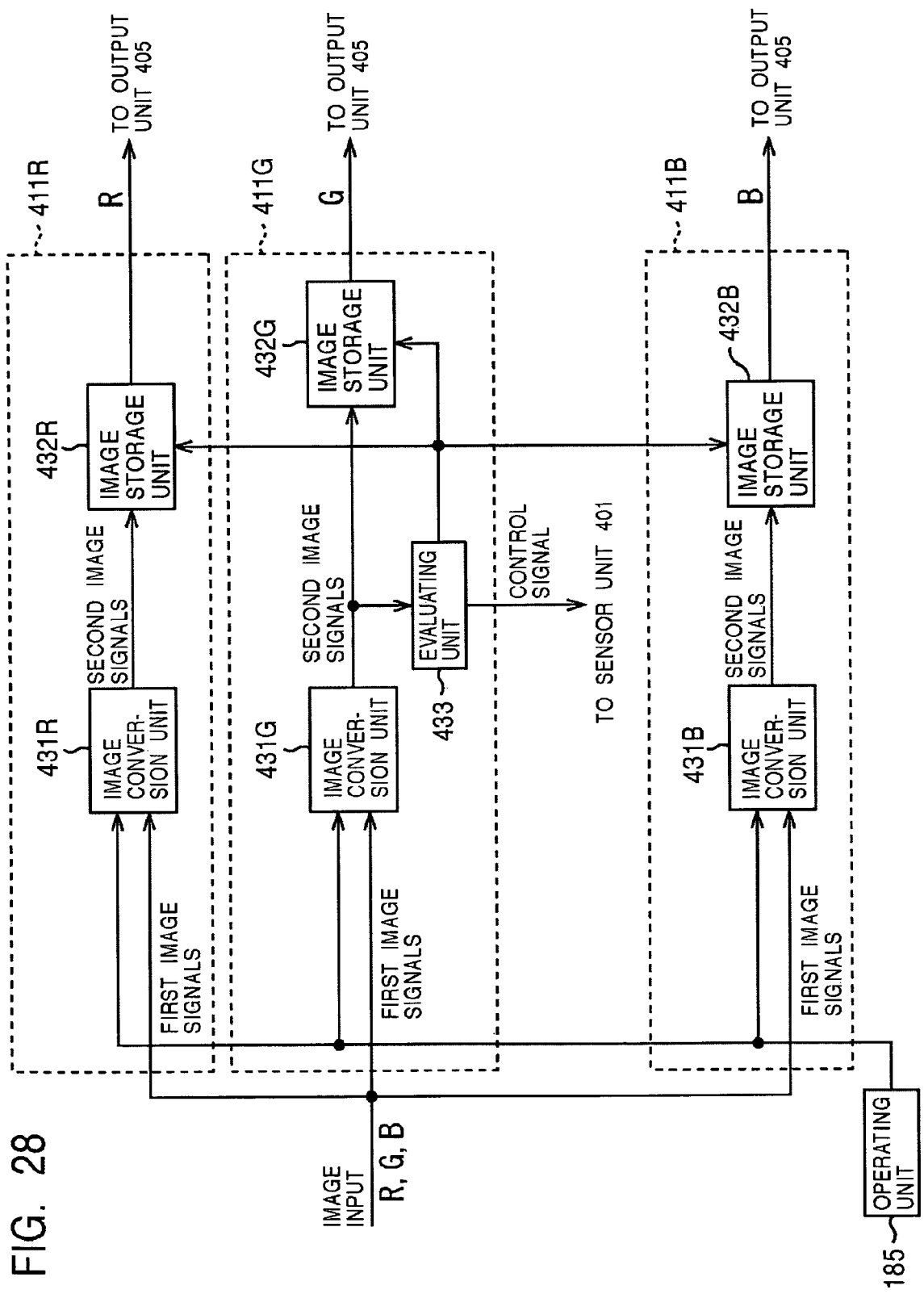
FIG. 28 is a block diagram illustrating a configuration example of a signal processing unit 411.

FIG. 28 illustrates a configuration example of the signal processing units 411R, 411G, and 411B, making up the signals processing unit 404 shown in FIG. 27. Note that the components here which correspond to those in FIG. 22 are denoted with the same reference numerals, and description thereof will be omitted as appropriate. As far as the signal processing units 411R, 411G, and 411B are concerned, these are configured in the same way as that shown in FIG. 22, however, the arrangement here differs in that parameters output from the operating unit 185 are supplied to the image converting unit 431 (made up of 431R, 431G, and 431B), with the image converting unit 431 performing image conversion processing corresponding to the parameters.

Figure 29:
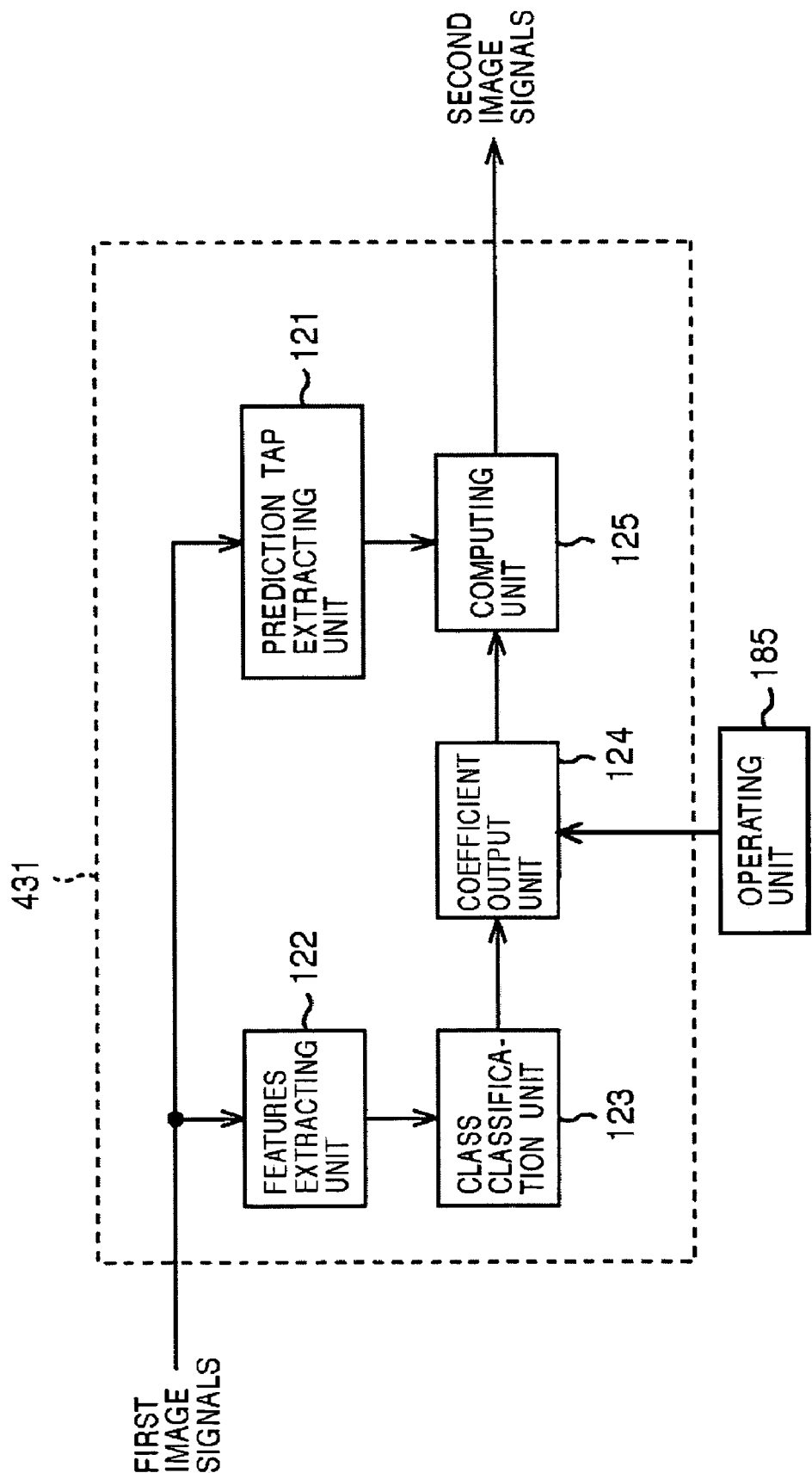
FIG. 29 is a block diagram illustrating a configuration example of an image converting unit 431.

FIG. 29 illustrates a configuration example of the image converting unit 431 shown in FIG. 28. Note that the components here which correspond to those in FIG. 6 are denoted with the same reference numerals, and description thereof will be omitted as appropriate. Here, the image converting unit 431 shown in FIG. 22 is of the same configuration of the image converting unit 31 shown in FIG. 4, and the image converting unit 31 shown in FIG. 4 has been described by way of FIGS. 6 through 10. However, parameters output from the operating unit 185 are supplied to the coefficient output unit 124.

Figure 30:
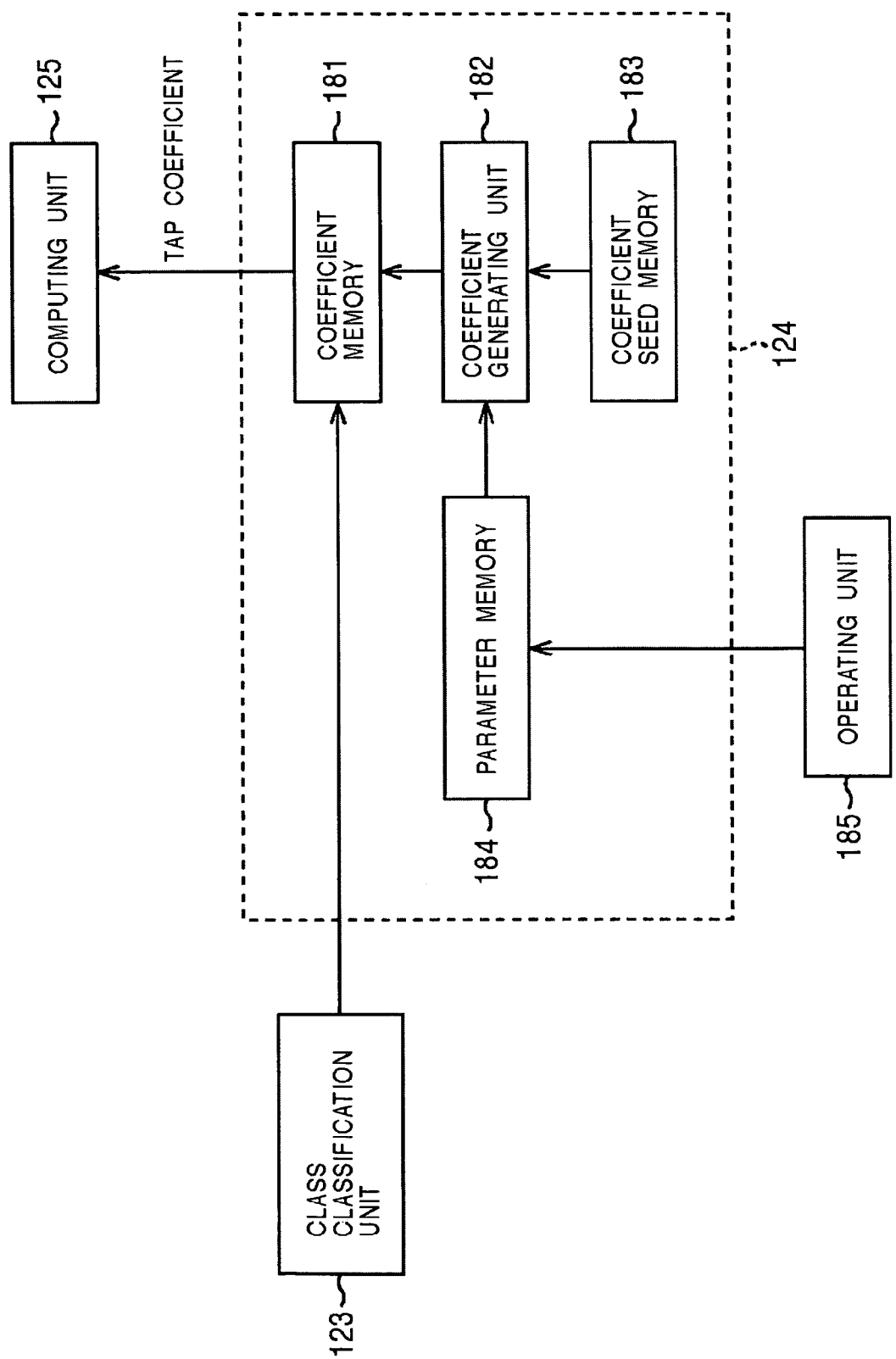
FIG. 30 is a block diagram illustrating another configuration example of the coefficient output unit 124.

FIG. 30 illustrates another configuration example of the coefficient output unit 124 shown in FIG. 29. Here also, components here which correspond to those in FIG. 7 are denoted with the same reference numerals.

While the arrangement shown in FIG. 7 involved the coefficient output unit 124 storing tap coefficients for each class obtained by learning beforehand, but with the arrangement in FIG. 30, tap coefficients are generated at the coefficient output unit 124 for each class capable of yielding the desired quality images, from coefficient seed data serving as seeds, as if it were, and predetermined parameters.

The coefficient memory 181 stores tap coefficients for each class supplied from a coefficient generating unit 182. Upon being supplied with class code from the class classification unit 123, the coefficient memory 181 reads out the tap coefficient of the class which the class code represents from the tap coefficients for each class stored, and outputs to the computing unit 125.

The coefficient generating unit 182 generates tap coefficients for each class based on the coefficient seed data stored in coefficient seed memory 183 and the parameters stored in the parameter memory 184, which are supplied to the coefficient memory 181 and stored by overwriting.

The coefficient seed memory 183 stores coefficient seed data for each class obtained by learning later-described coefficient seed data. Coefficient seed data is data which serves as seeds for generating tap coefficients.

In the event that the user operates the operating unit 185, the parameter memory 184 stores the parameters output from the operating unit 185 by overwriting according to the operations.

With the coefficient output unit 124 shown in FIG. 30, the tap coefficients for each tap stored (set) in the coefficient memory 181, i.e., the tap coefficients for each class used at the computing unit 125, are updated according to operations of the operating unit 185 by the user.

Now, the process for updating the tap coefficients for each class which is carried out at the coefficient output unit 124 shown in FIG. 30, i.e., the tap coefficient updating processing, will be described with reference to the flowchart in FIG. 31.

First, in step S171, the parameter memory 184 determines whether or a parameter has been provided from the operating unit 185, and in the event that determination is made in step S171 that a parameter has been provided from the operating unit 185, the flow proceeds to step S172, where the parameter memory 1884 stores the supplied parameter by overwriting, and the flow proceeds to step S173.

Also, in the event that determination is made in step S171 that a parameter has not been provided from the operating unit 185, step S172 is skipped, and the flow proceeds to step S173.

Accordingly, with the parameter memory 184, in the event that the operating unit 185 is operated by the user and parameters corresponding to the user operations are supplied from the operating unit 185, the stored contents are updated by the supplied parameters.

In step S173, the coefficient generating unit 182 reads out coefficient seed data for each class from the coefficient seed memory 183, and also reads out parameters from the parameter memory 184, thereby obtaining coefficient seed data and parameters, and obtains tap coefficients for each class based on the coefficient seed data and parameters. The flow then proceeds to step S174, where the coefficient generating unit 182 supplies the tap coefficients for each class to the coefficient memory 181, and stores by overwriting. The flow returns from step S174 to S171, and the same processing is repeated hereafter.

Thus, at the image converting unit 431 in FIG. 29, image conversion processing for converting the first image signals into second image signals with the earlier Expression (1) using the tap coefficient updated with the parameters, i.e., image conversion processing corresponding to the parameters, is performed.

Figure 31:
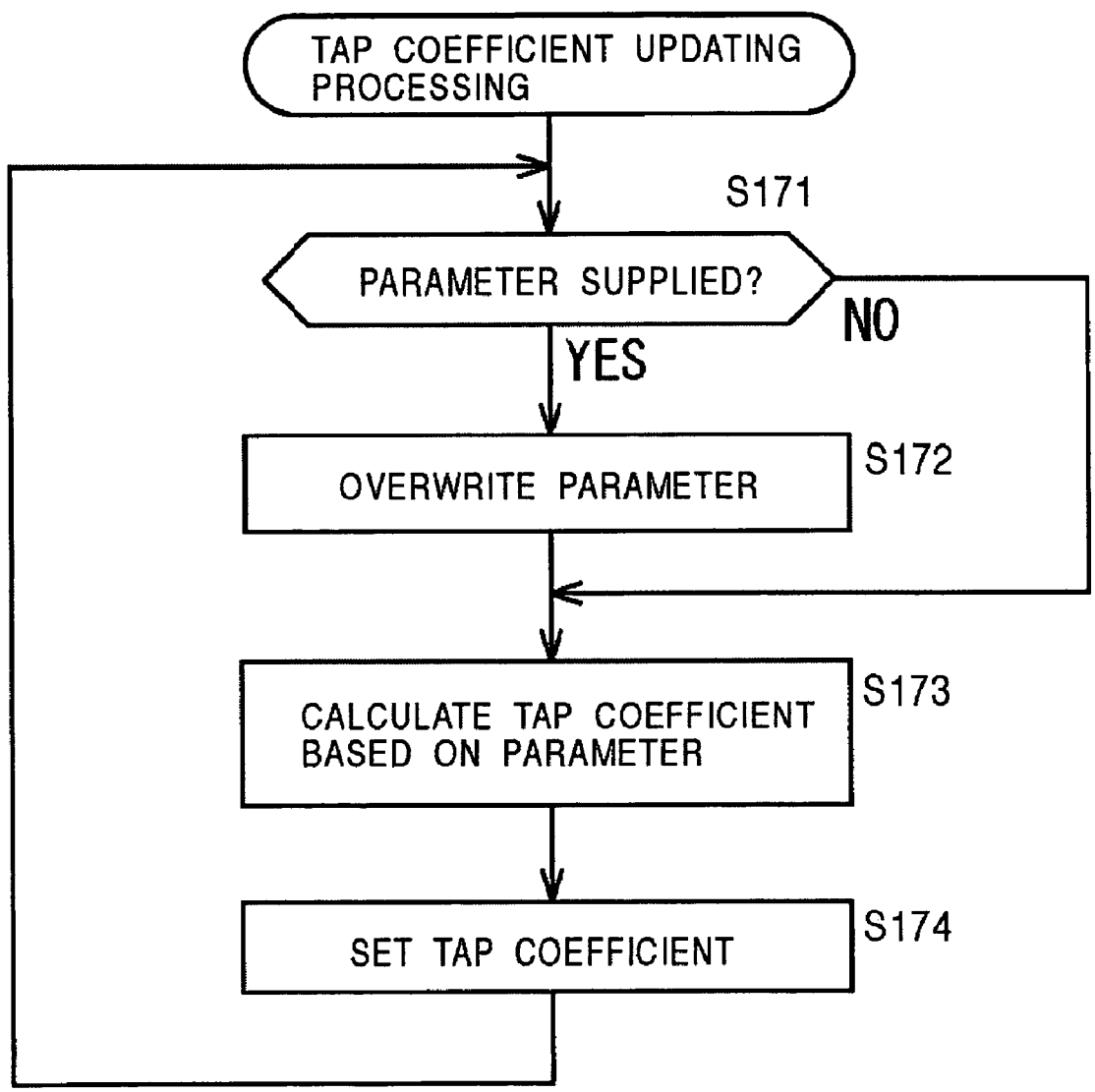
FIG. 31 is a flowchart describing tap coefficient updating processing.

Note that in FIG. 31, the processing in steps S173 and S174 is to be performed in the event that new parameters are overwritten in the parameter memory 184, and otherwise skipped.

Next, description will be made regarding generating tap coefficients at the coefficient generating unit 182, and learning coefficient seed data to be stored in the coefficient seed memory 183.

Let us say that we have high-image-quality image signals as second image signals, and low-quality signals, which have been obtained by filtering the high-image-quality image signals with an LPF (low-pass filter) to lower the resolution thereof, as first image signals. We will now consider a case of extracting prediction taps from the low-image-quality image signals, and using prediction taps and tap coefficients to obtain pixel values for high-image-quality pixels according to predetermined prediction computation, with the linear primary prediction computation of Expression (1), for example.

Now, the pixel value y of the high-image-quality pixel can be obtained by a quadratic expression or higher, rather than the linear primary expression of Expression (1).

On the other hand, at the coefficient generating unit 182, the tap coefficient $w_n$ is generated from the coefficient seed data stored in the coefficient seed memory 183 and the parameters stored in the parameter memory 184, here, let us say that the generating of the tap coefficient $w_n$ at the coefficient generating unit 182 is performed with the following expression, for example, using the coefficient seed data and parameters.

$$w_n = \sum_{m=1}^{M} \beta_{m,n} z^{m-1} \qquad (9)$$

wherein $\beta_{m,n}$ represents the m'th coefficient seed data used for obtaining the n'th tap coefficient $w_n$, and z represents the parameter. Note that in the Expression (9), the tap coefficient $w_n$ is obtained using M pieces of coefficient seed data $\beta_{n,1}$, $\beta_{n,2}$, and so on through $\beta_{n,M}$.

Now, it should be understood that expressions for obtaining the tap coefficient $w_n$ from the coefficient seed data $\beta_{m,n}$ and parameter z are not restricted to Expression (9).

The value $z^{m-1}$ determined by the parameter z in Expression (9) is defined with the following Expression by introducing a new variable $t_m$.

$$t_m = z^{m-1} \quad (m=1, 2, \ldots, M) \qquad (10)$$

Substituting Expression (10) into Expression (9) yields the following Expression.

$$w_n = \sum_{m=1}^{M} \beta_{m,n} t_m \qquad (11)$$

According to Expression (11), the tap coefficient $w_n$ is obtained by a linear primary expression of the coefficient seed data $\beta_{m,n}$ and variable $t_m$.

Now, with the true value of the k'th sample of the pixel value of high-image-quality pixels as $y_k$, and the prediction value of the true value $y_k$ as $y_k'$, the prediction error $e_k$ is expressed with the following Expression.

$$e_k = y_k - y_k' \qquad (12)$$

Now, the prediction value $y_k'$ in Expression (12) is obtained according to Expression (1), so substituting $y_k'$ in Expression (12) according to Expression (1) yields the following Expression.

$$e_k = y_k - \left( \sum_{n=1}^{N} w_n x_{n,k} \right) \qquad (13)$$

wherein $x_{n,k}$ represents the n'th low-image-quality pixel making up the prediction tap with regard to the k'th sample of high-image-quality pixels.

Substituting Expression (11) into $W_n$ in Expression (13) yields the following Expression.

$$e_k = y_k - \left( \sum_{n=1}^{N} \left( \sum_{m=1}^{M} \beta_{m,n} t_m \right) x_{n,k} \right) \qquad (14)$$

Now, the coefficient seed data $\beta_{m,n}$ wherein the prediction error $e_k$ in Expression (14) is 0 is optimal for predicting high-image-quality pixels, but obtaining such coefficient seed data $\beta_{m,n}$ for all high-image-quality pixels is generally difficult.

Accordingly, a range wherein the coefficient seed data $\beta_{m,n}$ is optimal can be obtained by, for example, employing the least-square method, and minimizing the squared error sum E.

$$E = \sum_{k=1}^{K} e_k^2 \qquad (15)$$

wherein K represents the number of samples of sets of the high-image-quality pixels $y_k$ and the low-image-quality pixels $x_{1,k}$, $x_{2,k}$, and so on through $x_{N,k}$ making up the prediction tap regarding the high-image-quality pixels $y_k$ (i.e., the number of learning samples).

The minimum value (minimal value) of the squared error sum E in Expression (15) is obtained with a $\beta_{m,n}$ wherein partial differentiation of the sum E with the coefficient seed data $\beta_{m,n}$ yields 0, as shown in Expression (16).

$$\frac{\partial E}{\partial \beta_{m,n}} = \sum_{k=1}^{K} 2 \cdot \frac{\partial e_k}{\partial \beta_{m,n}} \cdot e_k = 0 \quad (16)$$

Substituting Expression (13) into Expression (16) yields the following Expression.

$$\sum_{k=1}^{K} t_m x_{n,k} e_k = \sum_{k=1}^{K} t_m x_{n,k} \left( y_k - \left( \sum_{n=1}^{N} \left( \sum_{m=1}^{M} \beta_{m,n} t_m \right) x_{n,k} \right) \right) = 0 \quad (17)$$

We also define $X_{i,p,j,q}$ and $Y_{i,p}$ as in Expressions (18) and (19).

$$X_{i,p,j,q} = \sum_{k=1}^{K} x_{i,k} t_p x_{j,k} t_q \quad (18)$$

$(i = 1, 2, \ldots, N: j = 1, 2, \ldots, N: p = 1, 2, \ldots, M: q = 1, 2, \ldots, M)$ $$Y_{i,p} = \sum_{k=1}^{K} x_{i,k} t_p y_k \quad (19)$$

In this case, Expression (17) can be expressed as the normal equation shown in Expression (20) using $X_{i,p,j,q}$ and $Y_{i,p}$.

$$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,2,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,M,1,M} & X_{2,M,2,1} & \cdots & X_{2,M,N,M} \\ \vdots & \vdots & & \vdots & \vdots & \ddots & \vdots \\ X_{N,M,1,1} & X_{N,M,1,2} & \cdots & X_{N,M,1,M} & X_{N,M,2,M} & \cdots & X_{N,M,N,M} \end{bmatrix} \begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix} \quad (20)$$

The normal equation of Expression (20) can solve the coefficient seed data $\beta_{m,n}$ by using discharge calculation (Gauss-Jordan elimination), for example.

The coefficient seed memory 183 shown in FIG. 29 stores coefficient seed data $\beta_{m,n}$ obtained by performing learning wherein the Expression (20) is solved, with a great number of high-image-quality pixels $y_1$, $y_2$, and so on through $y_K$ as tutor data serving as a tutor for learning, and low-image-quality pixels $x_{1,k}$, $x_{2,k}$, and so on through $x_{N,k}$, making up prediction taps for each of the high-image-quality pixels $y_k$, as student data serving as a student for learning. The coefficient generating unit 182 generates tap coefficients $w_n$ according to Expression (9), from the coefficient seed data $\beta_{m,n}$ and the parameter z stored in the parameter memory 184. The computing unit 125 then calculates Expression (1) using the tap coefficient $w_n$ and the low-image-quality pixel (pixel of the first image signals) $x_n$ making up the prediction tap regarding the pixel of interest which is a high-image-quiality pixel, thereby obtaining a prediction value in the proximity of the pixel of interest which is a high-image-quiality pixel.

Figure 32:
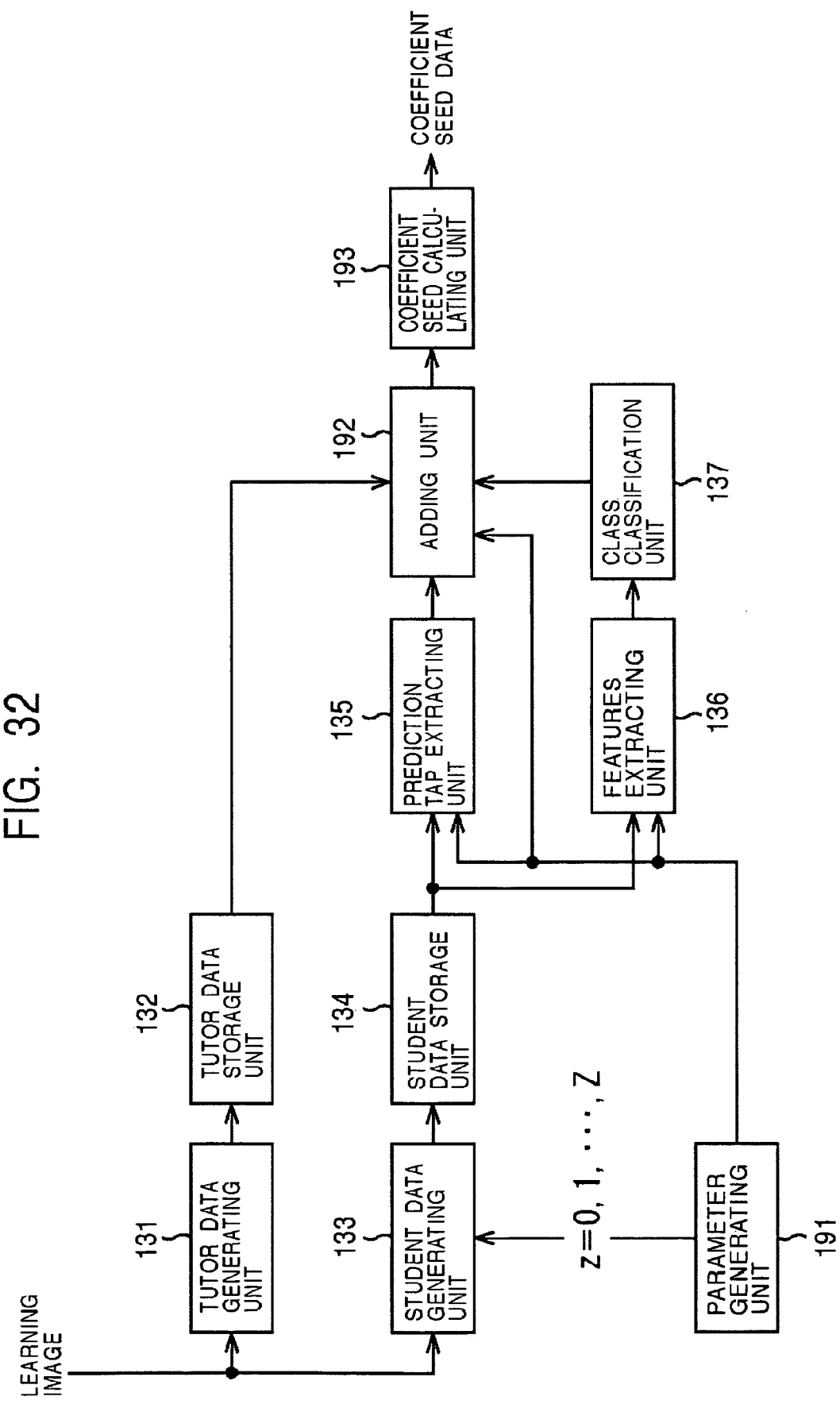
FIG. 32 is a block diagram illustrating a first configuration example of a learning device for learning coefficient seed data.

Next, FIG. 32 illustrates a configuration example of a learning device for obtaining coefficient seed data $\beta_{m,n}$ by setting and solving the normal equation of Expression (20). Note that the components here which correspond to those in FIG. 8 are denoted with the same reference numerals, and description thereof will be omitted as appropriate.

Learning image signals used for learning the coefficient seed data $\beta_{m,n}$ are input to the learning device. High-image-quality image signals can be used for the learning image signals, for example.

In the learning device, the learning image signals are supplied to the tutor data generating unit 131 and student data generating unit 133. The tutor data generating unit 131 generates tutor data from the learning image signals supplied thereto, which is then supplied to the tutor data storage unit 132. That is to say, here, the tutor data generating unit 131 supplies high-image-quality image signals serving as learning image signals to the tutor data storage unit 132 as tutor data without change. The tutor data storage unit 132 stores the high-image-quality image signals serving as tutor data supplied from the tutor data generating unit 131.

The student data generating unit 133 generates student data from the learning image signals, and supplies this student data to the student data storage unit 134. That is to say, the student data generating unit 133 performs filtering of the high-image-quality image signals serving as the learning image signals so as to lower the resolution thereof, thereby generating low-image-quality image signals, and supplies the low-image-quality image signals as student data to the student data storage unit 134.

Now, supplied to the student data generating unit 133 besides the learning image signals, are several values of a range which the parameter z supplied to the parameter memory 184 in FIG. 30, these being supplied from the parameter generating unit 191. That is to say, if we say that the range which the parameter z can assume is real numbers within the range of 0 through Z, the student data generating unit 133 is supplied with, e.g., z=0, 1, 2, and so on through Z, from the parameter generating unit 191.

Also, the student data generating unit 133 filters the high-image-quality image signals as the learning image signals with LPF at a predetermined cutoff frequency, corresponding to the parameter z supplied thereto, thereby generating low-image-quality image signals as student data.

Figure 33:
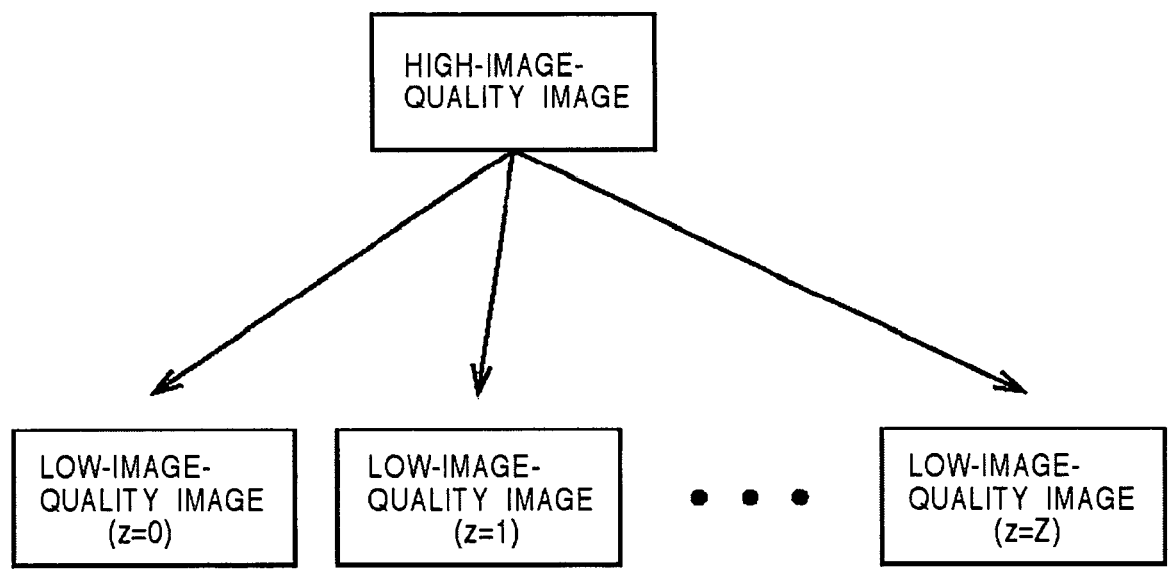
FIG. 33 is a diagram describing a learning method for learning coefficient seed data.

Accordingly, in this case, at the student data generating unit 133, Z+1 types of low-image-quality image signals as student data with differing resolution, are generated regarding the high-image-quality image signals serving as the learning image signals, as shown in FIG. 33. Note that the higher that parameter z value is for example, a higher frequency cutoff LPF is used to filter the high-image-quality image signals, thereby generating low-image-quality image signals serving as student data. Accordingly, the greater the value of the parameter z is, the higher the resolution of the low-image-quality image signals corresponding thereto.

Also, with the present embodiment, in order to facilitate description, low-image-quality image signals wherein the resolution is both the horizontal direction and vertical direction of the high-image-quality image signals has been deteriorated by an amount corresponding to the parameter z are generated at the student data generating unit 133.

Returning to FIG. 32, the student data storage unit 134 stores the student data supplied from the student data generating unit 133.

The prediction tap extracting unit 135 sequentially takes as tutor pixels of interest the pixels making up the high-image-quality image signals serving as the tutor data stored in the tutor data storage unit 132, and extracts predetermined ones from the low-image-quality pixels making up the low-image-quality image signals serving as the student data stored in the student data storage unit 134, thereby configuring a prediction tap with the same tap configuration as that configured by the prediction tap extracting unit 121 shown in FIG. 29, which is supplied to an adding unit 192.

The features extracting unit 136 uses the low-image-quality image signals serving as the student data stored in the student data storage unit 134 with regard to the tutor pixel of interest to extract the features of the tutor pixel of interest in the same way as with the case at the features extracting unit 122 shown in FIG. 29, and supplies these to the class classification unit 137.

Note that the prediction tap extracting unit 135 and the features extracting unit 136 receive supply of the parameter z which the parameter generating unit 191 generates, and the prediction tap extracting unit 135 and the features extracting unit 136 make up prediction taps or extract the features of a tutor pixel of interest, using the student data generated corresponding to the parameters z supplied from the parameter generating unit 191 (here, low-image-quality image signals serving as the student data generated using a LPF with a cutoff frequency corresponding to the parameter z).

The class classification unit 137 performs the same class classification as with the class classification unit 123 shown in FIG. 29, based on the tutor pixel of interest output from the features extracting unit 136, and outputs the class code corresponding to the class obtained as the result thereof to the adding unit 192.

The adding unit 192 reads out the tutor pixel of interest from the tutor data storage unit 132, and performs adding regarding the tutor pixel of interest, the student data making up the prediction tap configured with regard to the tutor pixel of interest supplied from the prediction tap extracting unit 135, and the parameter z when the student data was generated, for each class code supplied from the class classification unit 137.

That is to say, the adding unit 192 is supplied with the tutor data $y_k$ stored in the tutor data storage unit 132, the prediction tap $x_{i,k}$ ($x_{j,k}$) output from the prediction tap extracting unit 135, and the class code output from the class classification unit 137, along with the parameter z for generating the student data used for configuring the prediction tap being supplied from the parameter generating unit 191.

For each class corresponding to the class code supplied from the class classification unit 137, the adding unit 192 performs computation equivalent to the multiplication ($x_{i,k}t_p$ $x_{j,k}t_q$) of the student data for obtaining the component $x_{i,p,j,q}$ defined in Expression (18) in the matrix to the left side in Expression (20) and the parameter z, and summation (Σ) thereof, using the prediction tap (student data) $x_{i,k}$ ($x_{j,k}$) and the parameter z. Note that $t_p$ in Expression (18) is calculated from the parameter z according to the Expression (10). This is also true for $t_q$ in Expression (18).

Also, for each class corresponding to the class code supplied from the class classification unit 137, the adding unit 192 performs computation equivalent to the multiplication ($x_{i,k}t_p$ $y_k$) of the student data $x_{i,k}$ for obtaining the component $Y_{i,p}$ defined in Expression (19) in the vector to the right side in Expression (20), the tutor data $y_k$, and the parameter z, and summation (Σ) thereof, using the prediction tap (student data) $x_{i,k}$, the tutor data $y_k$, and the parameter z. Note that $t_p$ in Expression (19) is calculated from the parameter z according to the Expression (10).

That is to say, the adding unit 192 stores in the memory thereof (not shown) the left-side matrix component $x_{i,p,j,q}$ and the right-side vector component $y_{i,p}$ of the Expression (20) obtained regarding the tutor data taken as the tutor pixel of interest at the previous time, and adds to the matrix component $x_{i,p,j,q}$ or vector component $y_{i,p}$ the corresponding component $x_{i,k}t_p$ $x_{j,k}t_q$ or $x_{i,k}t_p$ $y_k$ regarding new tutor data taken as the tutor pixel of interest, the corresponding component $x_{i,k}t_p$ $x_{j,k}t_q$ or $x_{i,k}t_p$ $y_k$ being calculated using the tutor data $y_k$, the student data $x_{i,k}$, ($x_{j,k}$), and the parameter z (i.e., performs the addition expressed by the summation of the component $x_{i,p,j,q}$ in Expression (18) or the component $y_{i,p}$ in Expression (19)).

The adding unit 192 performs this addition with all of the tutor data stored in the tutor data storage unit 132 as tutor pixel of interest, for all values 0, 1, and so on through Z, of the parameter z so as to form the normal equation given in Expression (20) for each class, and then supplies the normal equations to the tap coefficient calculating unit 193. The tap coefficient calculating unit 193 solves the normal equation for each class, supplied from the adding unit 192, and thus obtains and outputs the coefficient seed data $\beta_{m,n}$ for each class.

The parameter generating unit 191 generates several values z=0, 1, 2, and so on through Z, as the range which the parameter z to be supplied to the parameter memory 184 in FIG. 30 can assume as described above, and supplies these to the student data generating unit 133. Also, the parameter generating unit 191 supplies the generated parameters z to the prediction tap extracting unit 135, features extracting unit 136, and adding unit 192 as well.

Figure 34:
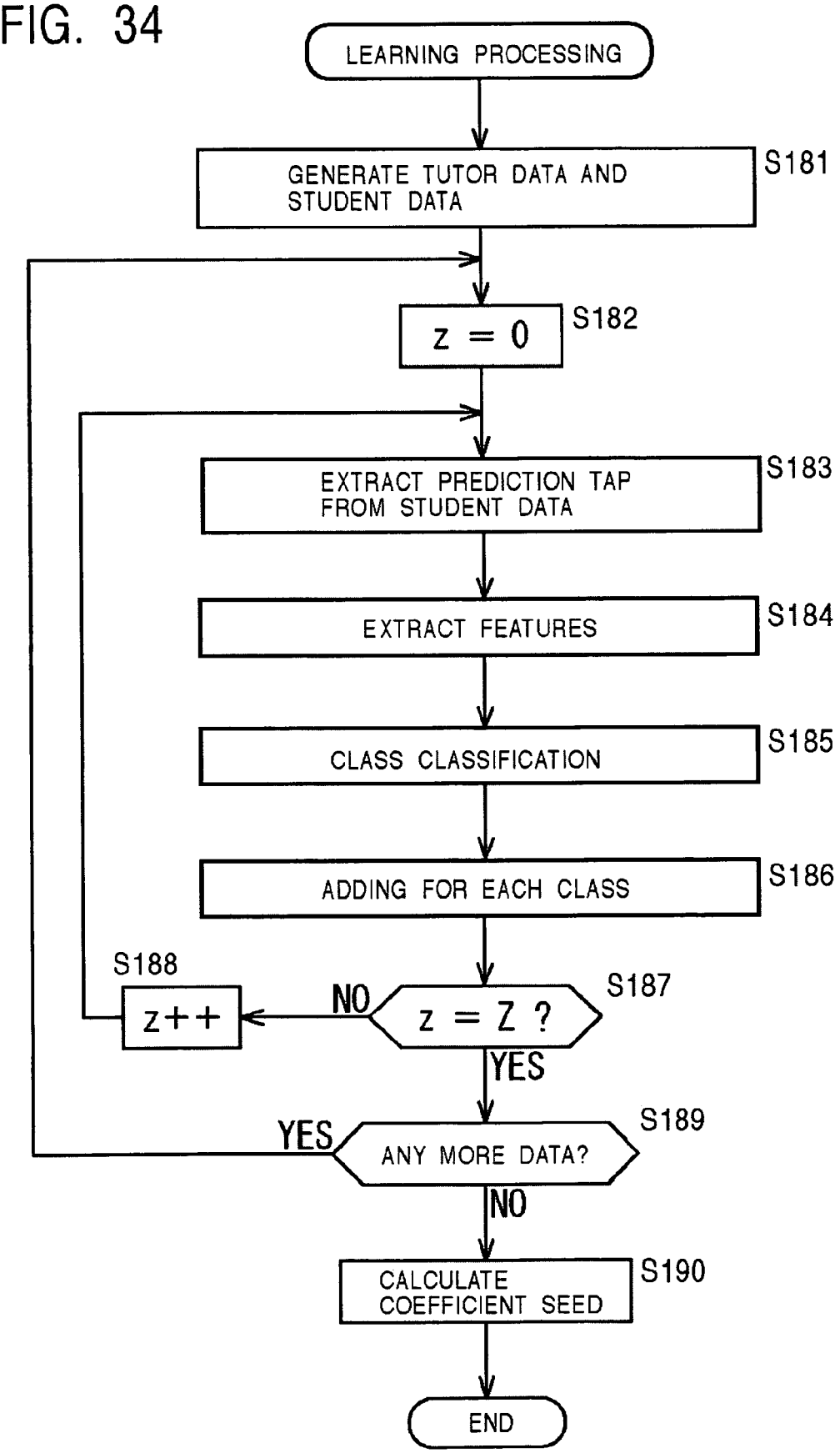
FIG. 34 is a flowchart describing the learning processing for learning coefficient seed data.

Next, the processing performed by the learning device shown in FIG. 32 (learning processing), will be described with reference to the flowchart in FIG. 34.

First, in step S181, the tutor data generating unit 131 and the student data generating unit 133 respectively generate tutor data and student data from learning image signals which is then output. That is to say, the tutor data generating unit 131 outputs the learning image signals without change as tutor data. Also, the student data generating unit 133 is supplied with parameters z having Z+1 values which are generated by the parameter generating unit 191 and the student data generating unit 133 filters the learning image signals with LPF at a cutoff frequency corresponding to the parameters z having the Z+1 values (0, 1, and so on through Z) generated by the parameter generating unit 191, thereby generating and outputting Z+1 frames of student data regarding the tutor data (learning image signals) for each frame.

The tutor data output from the tutor data generating unit 131 is supplied to and stored in the tutor data storage unit 132, and the student data output from the student data generating unit 133 is supplied to and stored in the student data storage unit 134.

Subsequently, the flow proceeds to step S182, where the parameter generating unit 191 sets the parameter z to the initial value, 0 for example, supplies this parameter z to the prediction tap extracting unit 135, features extracting unit 136, and adding unit 192, and the flow proceeds to step S183. In step S183, from the tutor data stored in the tutor data storage unit 132, the prediction tap extracting unit 135 takes as a tutor pixel of interest one which has not yet been taken as a tutor pixel of interest. Further, in step S183, the prediction tap extracting unit 135 configures a prediction tap from the student data stored in the student data storage unit 134 regarding the parameter z output by the parameter generating unit 191 (student data generated by filtering the learning image signal corresponding to the tutor data which is the tutor pixel of interest using an LPF with a cutoff frequency corresponding to the parameter z) with regard to the tutor pixel of interest, which is then supplied to the adding unit 192, and the flow proceeds to step S184.

In step S184, the features extracting unit 136 extracts the features of the tutor pixel of interest using the student data regarding the parameter z output from the parameter generating unit 191 stored in the student data storage unit 134, which is then supplied to the class classification unit 137, and the flow proceeds to step S185.

In step S185, the class classification unit 137 performs class classification of the tutor pixel of interest based on the pixel of interest features regarding the tutor pixel of interest from the features extracting unit 136, and outputs a class code corresponding to the class obtained thereby to the adding unit 192, and the flow proceeds to step S186.

In step S186, the adding unit 192 reads the tutor pixel of interest out from the tutor data storage unit 132, and calculates the left-side matrix component $x_{i,k}t_p$ $x_{j,k}t_q$ and the right-side vector component $x_{i,k}t_p$ $y_k$ of the Expression (20) using the tutor pixel of interest, prediction tap supplied from the prediction tap extracting unit 135, and parameter z output by the parameter generating unit 191. Further, of the matrix components and vector components already obtained, the adding unit 192 adds to a matrix component and vector component which correspond to class code from the class classification unit 137 the matrix component $x_{i,k}t_p$ $x_{j,k}t_q$ and the vector component $x_{i,k}t_p$ $y_k$ obtained from the pixel of interest, prediction tap, and parameter z, and the flow proceeds to step S187.

In step S187, the parameter generating unit 191 determines whether or not the parameter z which it is outputting is equal to the greatest value which Z can assume. In the event that determination is made in step S187 that the parameter z is not equal to (i.e., less than) the greatest value which Z can assume, the flow proceeds to step S188, the parameter generating unit 191 increments the parameter z by 1, and outputs the new parameter z to the prediction tap extracting unit 135, features extracting unit 136, and adding unit 192. The flow then returns to step S183, and subsequently the same processing is repeated.

Also, in the event that determination is made in step S187 that the parameter z is equal to the greatest value which Z can assume, the flow proceeds to step S189, and the prediction tap extracting unit 135 determines whether or not tutor data not yet taken as a tutor pixel of interest is stored in the tutor data storage unit 132. In the event that determination is made that tutor data not yet taken as a tutor pixel of interest is still stored in the tutor data storage unit 132, the prediction tap extracting unit 135 returns to step S182 with the tutor data not yet taken as a tutor pixel of interest, and the same processing is repeated.

On the other hand, in the event that determination is made in step S189 that the tutor data storage unit 132 has no more tutor data not yet taken as a tutor pixel of interest, the adding unit 192 supplies to the tap coefficient calculating unit 193 the left-side matrix and right-side vector of the Expression (20) for each class that has been obtained by the processing so far, and the flow proceeds to step S190.

In step S190, the tap coefficient calculating unit 193 solves the normal equation for each class made up of the left-side matrix and right-side vector of the Expression (20) for each class supplied from the adding unit 192, thereby obtains and outputs coefficient seed data $\beta_{m,n}$ for each class, and the processing ends.

While there may be cases wherein the number of normal equations necessary for obtaining the coefficient see data cannot be obtained due to insufficient number of learning image signals or the like, the coefficient seed calculating unit 193 is arranged to output a default coefficient see data for example, for such classes.

Figure 35:
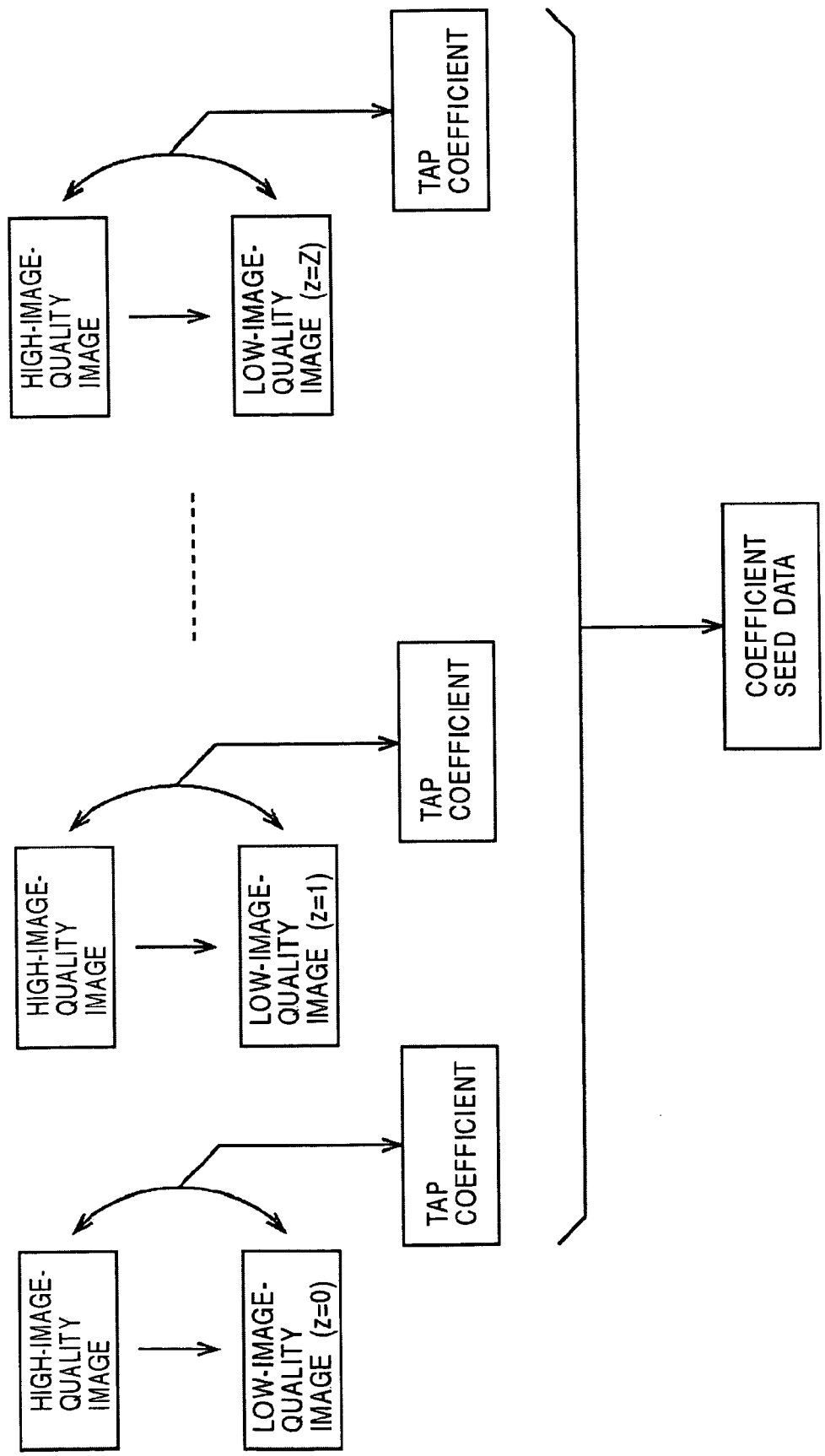
FIG. 35 is a diagram describing a learning method for learning coefficient seed data.

Now, with the learning device shown in FIG. 32, learning has been described as being performed for directly obtaining the coefficient seed data $\beta_{m,n}$ which minimizes the sum of squared error of the prediction value y of the tutor data predicted with the linear primary expression of Expression (1), from the tap coefficient $w_n$ represented by the coefficient seed data $\beta_{m,n}$ and the variable $t_n$ corresponding to the parameter z with Expression (11), with high-image-quality image signals as learning images signals serving as tutor data and low-image-quality image signals obtained by deteriorating the resolution of the high-image-quality image signals corresponding to the parameter z serving as student data, and student data $X_n$, as shown in FIG. 33; however, the learning of the coefficient seed data $\beta_{m,n}$ is not restricted to this, and instead may be performed as shown in FIG. 35, for example.

That is, with the arrangement shown in FIG. 35, as with the case in FIG. 33, with high-image-quality image signals as learning images signals serving as tutor data, and low-image-quality image signals obtained by deteriorating the horizontal and vertical resolution of the high-image-quality image signals with LPF of a cutoff frequency corresponding to the parameter z serving as student data, first, the tap coefficient $w_n$ which minimizes the sum of squared error of the prediction value y of the tutor data predicted with the linear primary expression of Expression (1), from the tap coefficient $w_n$ and student data $x_n$, is obtained for each value of the parameter z (here, z=0, 1, and so on through Z). Further, with the arrangement in FIG. 35, with the obtained tap coefficient $w_n$ as tutor data and the parameter z as student data, learning is performed for obtaining the coefficient seed data $\beta_{m,n}$ which minimizes the sum of squared error of prediction value of the tap coefficient $w_n$ serving as the tutor data, which is predicted by the coefficient seed data $\beta_{m,n}$ and the variable $t_n$ corresponding to the parameter z with Expression (11).

Now, the tap coefficient $w_n$ which gives the smallest (minimal) value for the squared error sum E of the prediction value y of the tutor data predicted with the linear primary prediction expression of Expression (1) can be obtained for each parameter value (z=0, 1, and so on through Z) for each class, by solving the normal equation of Expression (8), as with the case of the learning device shown in FIG. 8.

Now, the tap coefficient is obtained from the coefficient seed data $\beta_{m,n}$ and the variable $t_n$ corresponding to the parameter z, as indicated in Expression (11). This means that, with the tap coefficient obtained from Expression (11) as $w_n'$, a coefficient seed data $\beta_{m,n}$ wherein the error en between the optimal tap coefficient $w_n$ and the tap coefficient $w_n{'}$ obtained by Expression (11) is 0 is optimal coefficient seed data $\beta_{m,n}$ for predicting the optimal tap coefficient $w_n$ as shown in the following Expression (21), but obtaining such coefficient seed data $\beta_{m,n}$ for all tap coefficients $W_n$ is generally difficult.

$$e_n = w_n - w_n{'} \quad (21)$$

The Expression (21) can be modified as the following Expression by Expression (11).

$$e_n = w_n - \left(\sum_{m=1}^{M} \beta_{m,n} t_m\right) \quad (22)$$

Now, taking the least-square method in this case as well for a standard indicating the that the coefficient seed data $\beta_{m,n}$ is optimal, the optimal coefficient seed data $\beta_{m,n}$ can be obtained by minimizing the squared error sum E in the following Expression.

$$E = \sum_{n=1}^{N} e_n^2 \quad (23)$$

The minimum value (minimal value) of the squared error sum E in Expression (23) is obtained with a coefficient seed data $\beta_{m,n}$ wherein partial differentiation of the sum E with the coefficient seed data $\beta_{m,n}$ yields 0, as shown in Expression (24).

$$\frac{\partial E}{\partial \beta_{m,n}} = \sum_{m=1}^{M} 2 \frac{\partial e_n}{\partial \beta_{m,n}} \cdot e_n = 0 \quad (24)$$

Substituting Expression (22) into Expression (24) yields the following Expression.

$$\sum_{m=1}^{M} t_m \left( w_n - \left(\sum_{m=1}^{M} \beta_{m,n} t_m\right) \right) = 0 \quad (25)$$

Let us now define $X_{i,j}$ and $Y_i$ as in Expressions (26) and (27).

$$X_{i,j} = \sum_{z=0}^{Z} t_i t_j \quad (i = 1, 2, \ldots, M; j = 1, 2, \ldots, M) \quad (26)$$

$$Y_i = \sum_{z=0}^{Z} t_i w_n \quad (27)$$

In this case, the Expression (25) can be given as the normal equation shown in Expression (28) using $X_{i,j}$ and $Y_i$.

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \quad (28)$$

The normal equation of Expression (28) also can solve the coefficient seed data $\beta_{m,n}$ by using discharge calculation (Gauss-Jordan elimination), for example.

Figure 36:
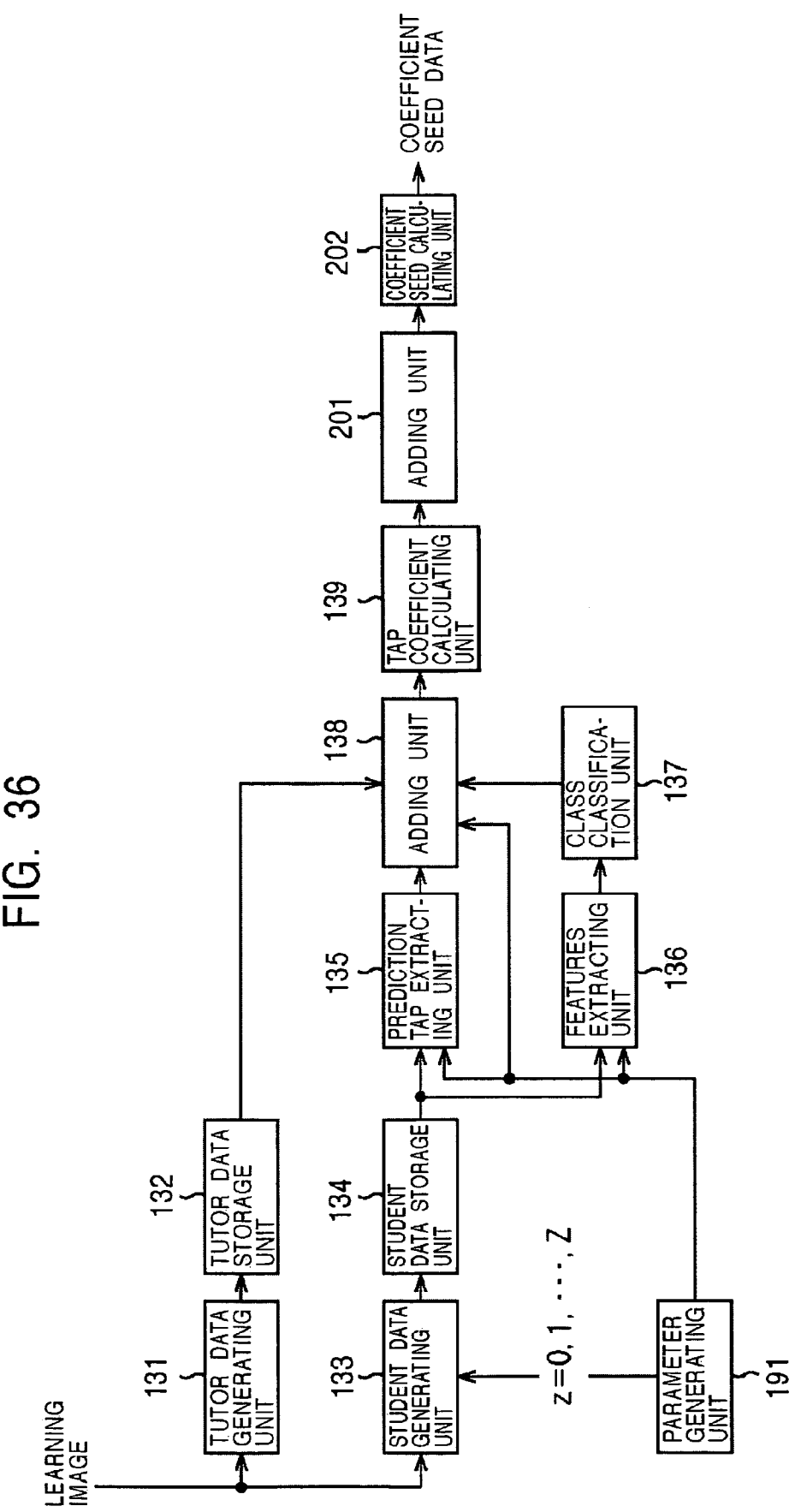
FIG. 36 is a block diagram illustrating a second configuration example of a learning device for learning coefficient seed data.

Next, FIG. 36 illustrates a configuration example of a learning device for performing learning for obtaining the coefficient seed data $\beta_{m,n}$ by giving and solving the normal equation in Expression (28). Note that the components here which correspond to those in FIG. 8 or 32 are denoted with the same reference numerals, and description thereof will be omitted as appropriate.

Class code regarding the tutor pixel of interest output from the class classification unit 137, and the parameter z output from the parameter generating unit 191, are supplied to the adding unit 138. The adding unit 138 reads out the tutor pixel of interest from the tutor data storage unit 132, and performs adding regarding the tutor pixel of interest and the student data making up the prediction tap configured with regard to the tutor pixel of interest supplied from the prediction tap extracting unit 135, for each class code supplied from the class classification unit 137, and for each value of the parameter z which the parameter generating unit 191 outputs.

That is to say, the adding unit 138 is supplied with the tutor data $y_k$ stored in the tutor data storage unit 132, the prediction tap $x_{m,k}$ output from the prediction tap extracting unit 135, the class code output from the class classification unit 137, and the parameter z used for generating the student data used for configuring the prediction tap $x_{n,k}$, that has been output from the parameter generating unit 191.

For each class corresponding to the class code supplied from the class classification unit 137, and also for each parameter z value output from the parameter generating unit 191, the adding unit 138 performs computation equivalent to the multiplication ($x_{n,k} x_{n',k}$) of the student data one with another in the matrix to the left side in Expression (8), and summation ($\Sigma$) thereof, using the prediction tap (student data) $x_{n,k}$.

Also, for each class corresponding to the class code supplied from the class classification unit 137, and also for each parameter z value output from the parameter generating unit 191, the adding unit 138 performs computation equivalent to the multiplication ($x_{n,k} y_k$) of the student data $x_{n,k}$ and the tutor data $y_k$ in the vector to the right side in Expression (8), and summation ($\Sigma$) thereof, using prediction tap (student data) $x_{n,k}$ and the tutor data $y_k$.

That is to say, the adding unit 138 stores in the memory thereof (not shown) the left-side matrix component ($\Sigma x_{n,k} x_{n',k}$) and the right-side vector component ($\Sigma x_{n,k} y_k$) of the Expression (8) obtained regarding the tutor data taken as the tutor pixel of interest at the previous time, and adds to the matrix component ($\Sigma x_{n,k} x_{n',k}$) or vector component ($\Sigma x_{n,k} y_k$) the corresponding component $x_{n,k-1} x_{n',k-1}$ or $x_{n,k-1} y_{k-1}$ regarding new tutor data taken as the tutor pixel of interest, the corresponding component $x_{n,k-1} x_{n',k-1}$ or $x_{n,k-1} y_{k-1}$ being calculated using the tutor data $y_{k-1}$ and the student data $x_{n,k-1}$, (i.e., performs the addition expressed by the summation in Expression (8)).

The adding unit 138 performs this addition with all of the tutor data stored in the tutor data storage unit 132 as tutor pixel of interest so as to form the normal equation given in Expression (8) for each class and for each value of the parameter z, and then supplies the normal equations to a tap coefficient calculating unit 139. The tap coefficient calculating unit 139 solves the normal equation with each value of the parameter z for each class, supplied from the adding unit 138, and thus obtains and outputs an optimal tap coefficient $w_n$ with each value of the parameter z for each class, which is supplied to an adding unit 201.

The adding unit 201 performs adding regarding the parameter z (or the variable $t_m$ corresponding thereto) and an optimal tap coefficient $W_n$, for each class. That is, the adding unit 201 performs computation equivalent to the multiplication ($t_i t_j$) one with another of the variables $t_i$ ($t_j$) corresponding to the parameter z for obtaining the component $X_{i,j}$ defined in Expression (26) in the matrix to the left side in Expression (28), and summation (Σ) thereof, using the variables $t_i$ ($t_j$) obtained by Expression (10) from the parameter z.

It should be understood that the component $X_{i,j}$ is determined by the parameter z alone and is unrelated to the class, so calculation of the component $X_{i,j}$ does not actually need to be performed for each class; once is sufficient.

Further, the adding unit 201 performs computation equivalent to the multiplication ($t_i w_n$) of the variable $t_i$ corresponding to the parameter z for obtaining the component $Y_i$ defined in Expression (27) in the vector to the right side in Expression (28) and the optimal tap coefficient $W_n$, and summation (Σ) thereof, using the variable $t_i$ obtained by Expression (10) from the parameter z, and the optimal tap coefficient $W_n$.

The adding unit 201 obtains the component $X_{i,j}$ represented by Expression (26) and the component $Y_i$ represented by Expression (27) for each class, sets the normal equation of Expression (28) for each class, and supplies the normal equation to a coefficient seed calculating unit 202. The coefficient seed calculating unit 202 solves the Expression (28) supplied from the adding unit 201 for each class, thereby obtaining and outputting the coefficient seed data $\beta_{m,n}$ for each class.

The coefficient seed memory 183 shown in FIG. 30 may be arranged to store the coefficient seed data $\beta_{m,n}$ for each class obtained as described above.

Now, with the coefficient output unit 124 shown in FIG. 30, an arrangement may be made wherein no coefficient seed memory 183 is provided for example, with the optimal tap coefficient $w_n$ for each value of the parameter z output from the tap coefficient calculating unit 139 shown in FIG. 36 being stored in memory, and the optimal tap coefficient stored in the memory being selected according to the parameter z stored in the parameter memory 184, and set in the coefficient memory 181. However, in this case, memory with a capacity proportionate to the values which the parameter z can assume is necessary. Conversely, with the arrangement wherein coefficient seed memory 183 is provided to store the coefficient seed data, the storage capacity of the coefficient seed memory 183 is not dependent on the values which the parameter z can assume, and accordingly, memory with a small capacity can be employed for the coefficient seed memory 183. Further, in the event of storing the coefficient seed data $\beta_{m,n}$, tap coefficients $w_n$ are generated by Expression (9) from the coefficient seed data $\beta_{m,m}$, and the values of the parameter z, so tap coefficients $w_n$ which can be said to be continuous can be obtained according to the values of the parameter z. Consequently, the image quality of the high-image-quality image signals output from the computing unit 125 as second image signals can be adjusted in a step-less manner.

Note that with the arrangement described above, learning image signals are taken as tutor data corresponding to the second image signals with no change, and also, low-image-quality image signals wherein the resolution of the learning image signals has been lowered are taken as student data corresponding to the first image signals, upon which learning of coefficient seed data is performed, so coefficients seed data can be obtained enabling image conversion processing, wherein resolution improvement processing of the first image signals into the second image signals with improved resolution can be realized.

In this case, at the image converting unit 431, the horizontal resolution and vertical resolution of the image signals can be improved in accordance with the parameter z. Accordingly, in this case, it can be said that the parameter z is a parameter corresponding to resolution.

Now, depending on how the image signals for the student data corresponding to the first image signals and the tutor data corresponding to the second image signals are selected, coefficient seed data for various types of image conversion processing can be obtained.

That is to say, for example, with an arrangement wherein high-image-quality image signals are taken as tutor data, and noise corresponding to parameter z is superimposed on the tutor data high-image-quality image signals to yield image signals with noise which are taken as student data, learning processing is carried out, whereby coefficient seed data can be obtained which perform image conversion processing which is noise removal processing for converting the first image signals into the second image signals with the noise contained therein removed (or reduced).

Also, for example, with an arrangement wherein given image signals are taken as tutor data and image signals with the number of pixels of the image signals serving as the tutor data is thinned out yielding image signals taken as student data, or wherein given image signals are taken as student data and image signals with the number of pixels of the image signals serving as the student data is thinned out according to a predetermined thinning ratio so as to yield image signals taken as tutor data, learning processing is carried out, whereby coefficient seed data can be obtained which perform image conversion processing which is resizing processing for converting the first image signals into second image signals which are enlarged or reduced.

In the event of storing coefficient seed data for noise removal processing, or coefficient seed data for resizing processing, in the coefficient seed memory 183, noise removal or resizing (enlarging or reduction) can be performed at the image converting unit 31 corresponding to the parameter z.

In the case described above, the tap coefficient $w_n$ was defined by $\beta_{1,n}z^0+\beta_{2,n}z^1+ \ldots +\beta_{M,n}z^{M-1}$, as indicated in Expression (9), obtaining the tap coefficient $w_n$ for improving both the horizontal and vertical resolution corresponding to the parameter z with this Expression (9), but an arrangement may be made for the tap coefficient $w_n$ wherein the horizontal resolution and vertical resolution are both independently improved corresponding to individual parameters $z_x$ and $z_y$.

That is to say, the tap coefficient $w_n$ is defined by, for example, the cubic expression $\beta_{1,n}z_x^0z_y^0+\beta_{2,n}z_x^1z_y^0+\beta_{3,n}z_x^2z_y^0+\beta_{4,n}z_x^3z_y^0+\beta_{5,n}z_x^0z_y^1+\beta_{6,n}z_x^0z_y^2+\beta_{7,n}z_x^0z_y^3+\beta_{8,n}z_x^1z_y^1+\beta_{9,n}z_x^2z_y^1+\beta_{10,n}z_x^1z_y^2$, instead of Expression (9), and the variable $t_m$ defined in Expression (10) is defined by, instead of Expression (10), $t_1=z_x^0z_y^0$, $t_2=z_x^1z_y^0$, $t_3=z_x^2z_y^0$, $t_4=z_x^3z_y^0$, $t_5=z_x^0z_y^1$, $t_6=z_x^0z_y^2$, $t_7=z_x^0z_y^3$, $t_8=z_x^1z_y^1$, $t_9=z_x^2z_y^1$, $t_{10}=z_x^1z_y^2$. In this case as well, the tap coefficient $w_n$ can ultimately be expressed by Expression (11), and accordingly, learning using image signals as student signals wherein the horizontal resolution and vertical resolution of tutor signals have each been deteriorated corresponding to the parameter $z_x$ and $z_y$ can be performed at the learning device (FIGS. 32 and 36), thereby obtaining the coefficient seed data $\beta_{m,n}$ whereby tap coefficients $w_n$ for independently improving the horizontal resolution and vertical resolution corresponding to the independent parameters $z_x$ and $z_y$ can be obtained.

Other examples include introducing a parameter $z_t$ corresponding to the time-wise resolution in addition to the parameters $z_x$ and $z_y$ corresponding independently to the horizontal resolution and vertical resolution, thereby enabling obtaining tap coefficients $w_n$ for independently improving the horizontal resolution, vertical resolution, and time-wise resolution, corresponding to the independent parameters $x_x$ and $z_y$, and $z_t$.

Also, with regard to resizing processing as well, tap coefficients $w_n$ for resizing both the horizontal and vertical directions at enlargement percentages (reduction percentages) corresponding to a parameter z, or tap coefficients $w_n$ for independently resizing the horizontal and vertical directions at enlargement percentages (reduction percentages) corresponding to respective parameters $z_x$ and $z_y$, can be obtained, in the same way as with resolution improvement processing.

Further, with the learning device (FIGS. 32 and 36), learning can be performed by deteriorating the horizontal resolution and vertical resolution of the tutor data corresponding to the parameter $z_x$ and also adding noise to the tutor data corresponding to the parameter $z_y$, and taking the image signals as student data, from which the coefficient seed data $\beta_{m,n}$ is obtained, whereby tap coefficients $W_n$ can be obtained which improves the horizontal resolution and vertical resolution corresponding to the parameter $z_x$ and also perform nose removal corresponding to the parameter $z_y$.

The coefficient seed memory 183 (FIG. 30) of the image converting unit 431R shown in FIG. 28 stores coefficient seed data obtained by learning using only the R signals of the image signals as the tutor data and all of the R, G, and B signals of the image signals as student data. Also, the coefficient seed memory 183 (FIG. 30) of the image converting unit 431G shown in FIG. 28 stores coefficient seed data obtained by learning using only the G signals of the image signals as the tutor data and all of the R, G, and B signals of the image signals as student data. In the same way, the coefficient seed memory 183 (FIG. 30) of the image converting unit 431B shown in FIG. 28 stores coefficient seed data obtained by learning using only the B signals of the image signals as the tutor data and all of the R, G, and B signals of the image signals as student data.

Figure 37:
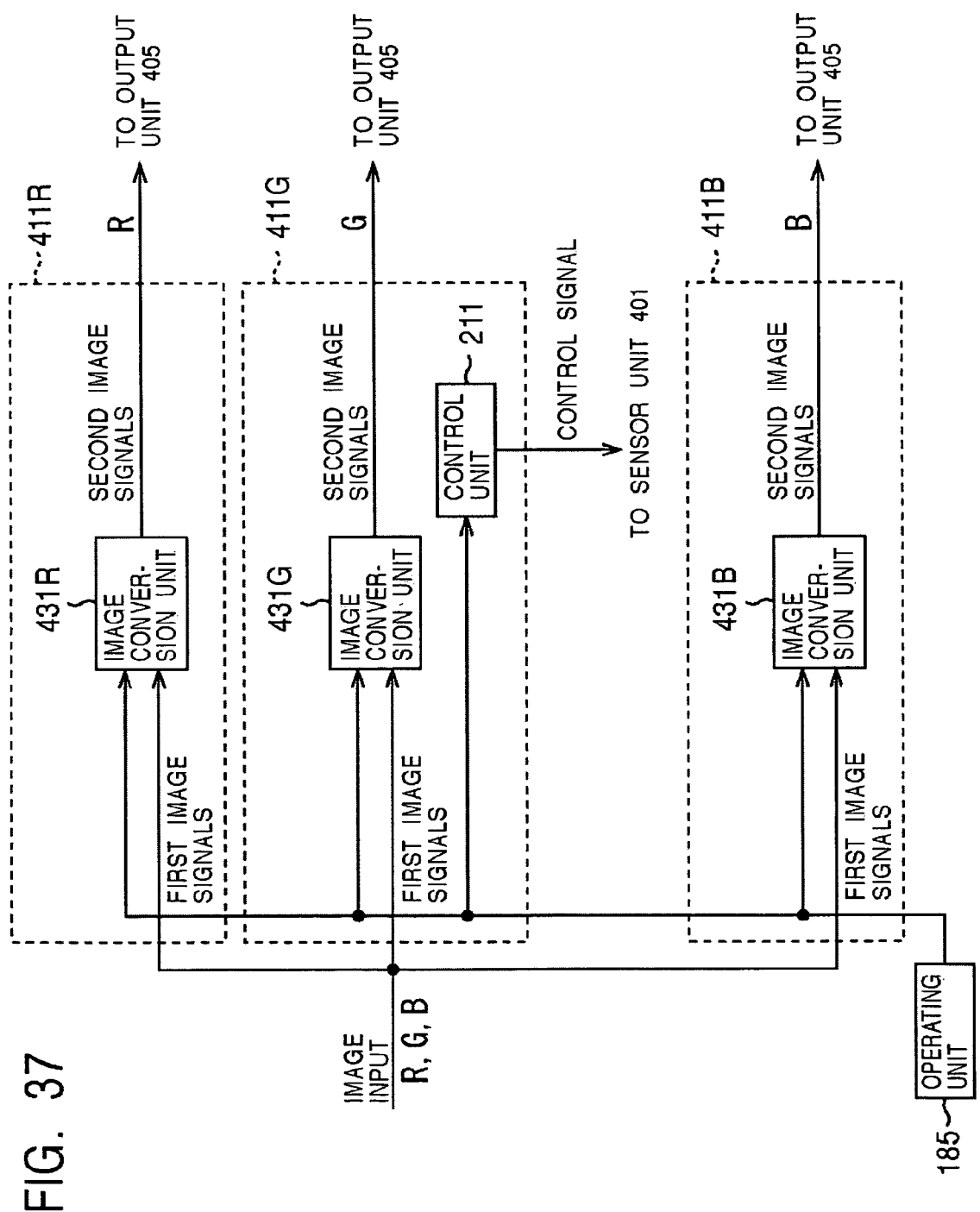
FIG. 37 is a block diagram illustrating a configuration example of the signal processing unit 411.

Next, FIG. 37 illustrates another configuration example of the signal processing units 411R, 411G, and 411B making up the signal processing unit 404 shown in FIG. 27. Note that the components here which correspond to those in FIG. 28 are denoted with the same reference numerals, and description thereof will be omitted as appropriate. That is to say, the signal processing units 411R, 411G, and 411B shown in FIG. 37 are configured in the same way as that shown in FIG. 28 except that image storage units 432R, 432G, and 432B are not provided and that a control unit 211 is provided instead of the evaluation unit 433.

In FIG. 37, the control unit 211 is supplied with the parameters output from the operating unit 185 rather than the second image signals output from the image converting unit 431G. The control unit 211 obtains the parameters which the operating unit 185 outputs, and controls the placement position of the R photoreceptor unit 423R, G photoreceptor unit 423G, and B photoreceptor unit 423B of the sensor unit 401 (FIG. 20).

Figure 38:
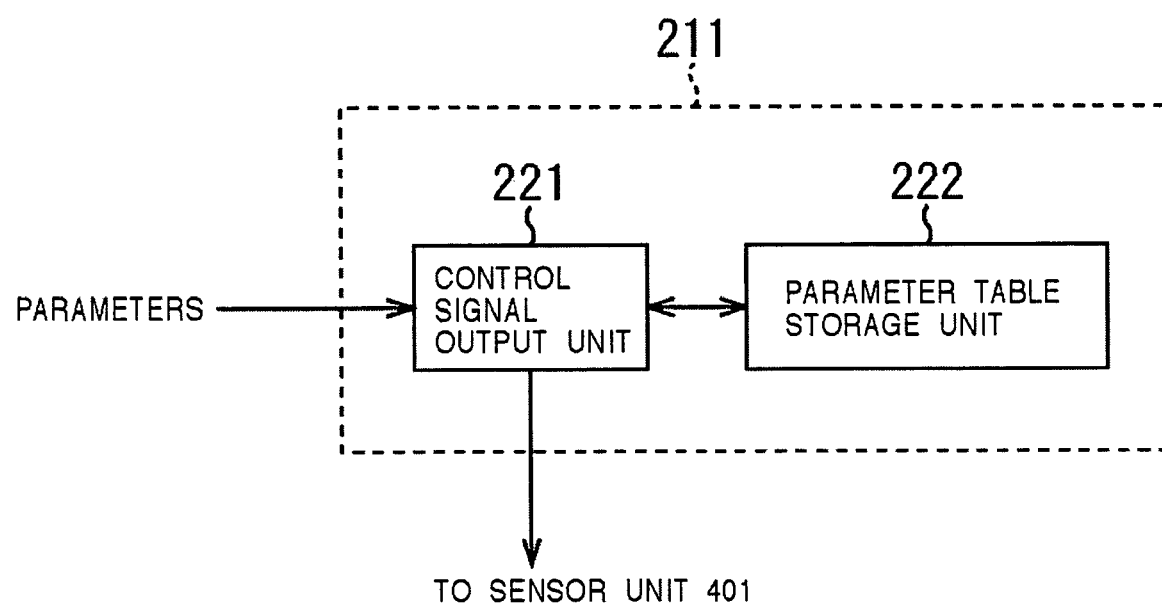
FIG. 38 is a block diagram illustrating a configuration example of the control unit 211.

Now, FIG. 38 illustrates a configuration example of the control unit 211 shown in FIG. 37. The control signal output unit 221 obtains parameters supplied from the operating unit 185, and recognizes offset amounts $Ph_G$, $Pv_G$, $Ph_B$, and $Pv_B$ correlated with the parameters obtained from the operating unit 185 in a parameter table stored in a parameter table storage unit 222. Further, the control signal output unit 221 supplies control signals for specifying the offset amounts $Ph_G$, $Pv_G$, $Ph_B$, and $Pv_B$ recognized with the parameter table to the sensor unit 401 in the same way as with the control signal output unit 444 described above, thereby controlling the placement position of the R photoreceptor unit 423R, G photoreceptor unit 423G, and B photoreceptor unit 423B of the sensor unit 401 (FIG. 20).

The parameter table storage unit 222 stores a parameter table correlating parameters input by operating the operating unit 185, and the offset amounts $Ph_G$, $Pv_G$, $Ph_B$, and $Pv_B$ representing the placement position of the R photoreceptor unit 423R, G photoreceptor unit 423G, and B photoreceptor unit 423B of the sensor unit 401 at the time of obtaining image signals suitable for image conversion processing corresponding to the parameters. The parameter table has been obtained beforehand by later-described parameter table learning.

Accordingly, at the control signal output unit 221, supplying control signals for specifying the offset amounts $Ph_G$, $Pv_G$, $Ph_B$, and $Pv_B$ correlated with parameters obtained from the operating unit 185 to the sensor unit 401 controls the placement position of the R photoreceptor unit 423R, G photoreceptor unit 423G, and B photoreceptor unit 423B of the sensor unit 401 (FIG. 20), so image signals suitable for the image conversion processing corresponding to the parameters obtained from the operating unit 185 are output from the sensor unit 401. Subjecting such image signals to image conversion processing corresponding to the parameters obtained from the operating unit 185 enables image signals with even higher quality to be obtained.

Figure 39:
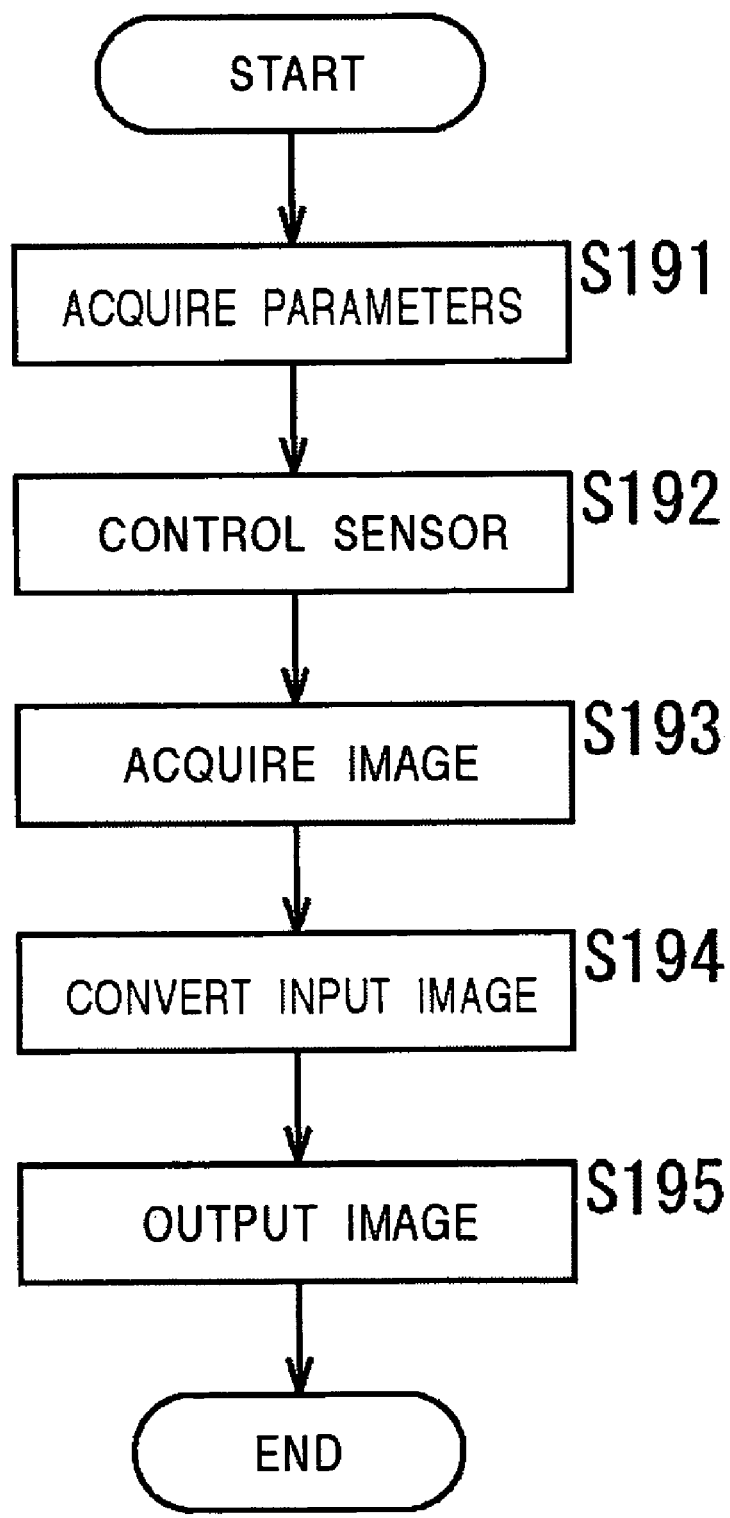
FIG. 39 is a flowchart describing the operations of the image-taking device.

Next, the operation of the image-taking device shown in FIG. 27 will be described with regard to a configuration shown in FIG. 37 for the signals processing unit 411 which makes up the signal processing unit 404 shown in FIG. 27, with reference to the flowchart in FIG. 39.

First, in step S191, the control signals output unit 221 of the control unit 211 (FIG. 38) obtains parameters which the operating unit 185 outputs, and the flow proceeds to step S192. In step S192, the control unit 211 recognizes the offset amounts $Ph_G$, $Pv_G$, $Ph_B$, and $Pv_B$ correlated with the parameters obtained from the operating unit 185, in the parameter table stored in the parameter table storage unit 222, supplies control signals for specifying the offset amounts $Ph_G$, $Pv_G$, $Ph_B$, and $Pv_B$ to the sensor unit 401, and the flow proceeds to step S193. Accordingly, the placement positions of the R photoreceptor unit 423R, G photoreceptor unit 423G, and B photoreceptor unit 423B of the sensor unit 401 (FIG. 20) are controlled.

In step S193, the sensor unit 401 receives the subject light, and performs photoelectric conversion, thereby obtaining image signals as electric signal (i.e., images the subject), and supplies the image signals to the signal adjusting unit 402. The signal adjusting unit 402 subjects the image signals supplied from the sensor unit 401 to CDS processing and then supplies these to the A/D converting unit 403. The A/D converting unit 403 performs A/D conversion of the image signals supplied from the signal adjusting unit 402, which are then supplied to the signal processing unit 411 as first image signals, and the flow proceeds from step S193 to step S194.

That is to say, in this case, the placement positions of the R photoreceptor unit 423R, G photoreceptor unit 423G, and B photoreceptor unit 423B of the sensor unit 401 (FIG. 20) are positions corresponding to the offset amounts $Ph_G$, $Pv_G$, $Ph_B$, and $Pv_B$ correlated with the parameters output from the operating unit 185. Accordingly, in step S193, image signals suitable for the image conversion processing corresponding to the parameters output from the operating unit 185 are output from the sensor unit 401, and the image signals are supplied to the signals processing unit 411 as first image signals.

In step S194, the image converting unit 431 (FIG. 29) of the signal processing unit 411 (FIG. 37) subjects the first image signals supplied from the A/D converting unit 403 to image conversion processing as signal processing corresponding to the parameters output from the operating unit 185, thereby yielding the second image signals with image quality improved over that of the first image signals, and the flow proceeds to step S195.

Now, as mentioned earlier, the first image signals supplied to the image converting unit 431 are image signals suitable for the image conversion processing corresponding to the parameters which the operating unit 185 output, and accordingly, in step S194, subjecting the first image signals to image conversion processing corresponding to the parameters obtained from the operating unit 185 enables image signals with even higher image quality to be obtained.

In step S195, the image converting unit 431 outputs the second image signals obtained the image conversion processing to the output unit 405, thereby completing processing for image of one frame (or one field). With the image-taking device, the processing according to the flowchart in FIG. 39 is repeated until the user gives a command to stop image-taking, for example.

Figure 40:
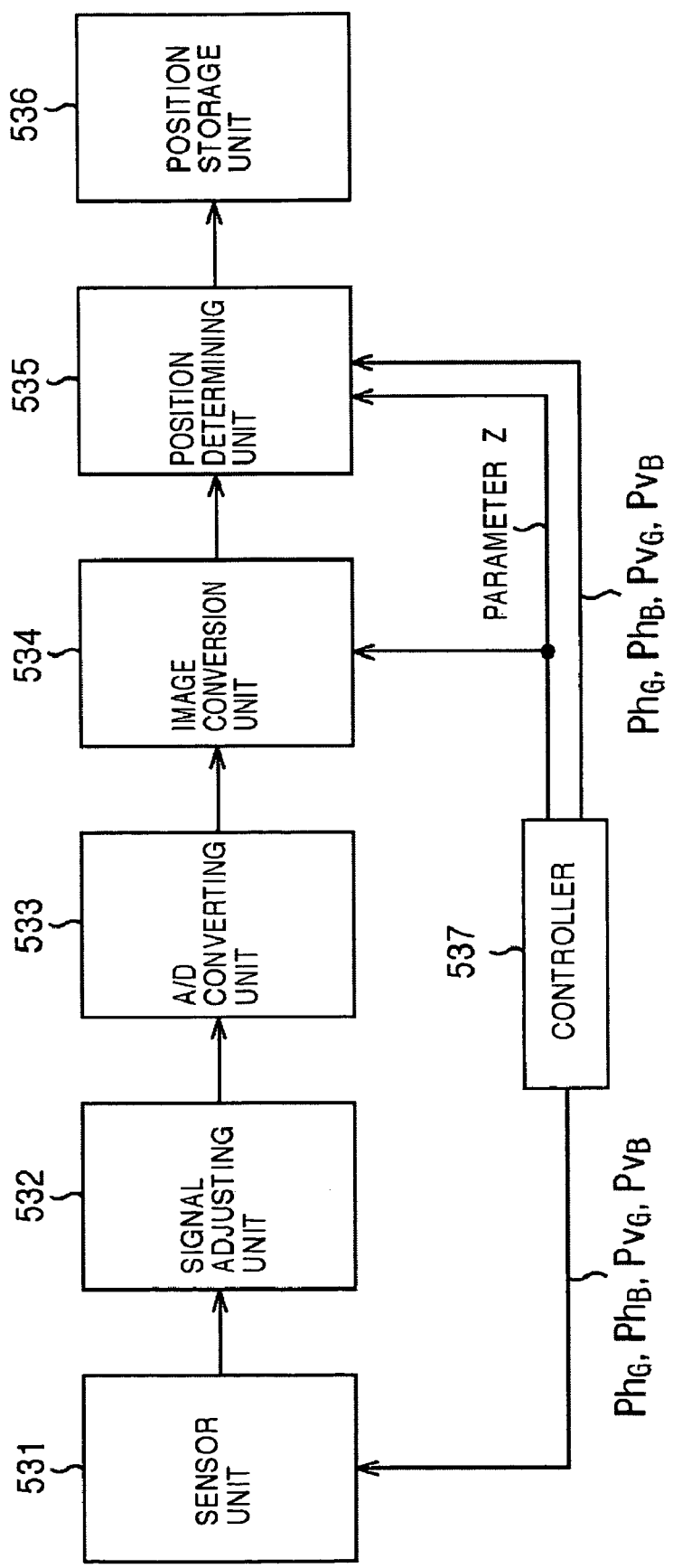
FIG. 40 is a block diagram illustrating a configuration example of a learning device for learning a parameter table.

Next, FIG. 40 illustrates a configuration example of a learning device for performing learning for the parameter table stored in the parameter table storage unit 222 shown in FIG. 38.

A sensor unit 531, signal adjusting unit 532, and A/D converting unit 533 are configured in the same way as the sensor unit 401, signal adjusting unit 402, and A/D converting unit 403 shown in FIG. 27. However, it should be noted that while with the image-taking device shown in FIG. 27, the placement positions of the R photoreceptor unit 423R, G photoreceptor unit 423G, and B photoreceptor unit 423B of the sensor unit 401 (FIG. 20) are controlled by control signals output from the control unit 211 of the signal processing unit 404 (or rather, the signal processing unit 411G making up the processing unit 404), with the learning device shown in FIG. 40, the placement positions of photoreceptor unit corresponding to each of the R photoreceptor unit 423R, G photoreceptor unit 423G, and B photoreceptor unit 423B, of the sensor unit 531 (hereafter referred to as "placement position in sensor unit 531" as appropriate) are controlled by control signals output by a controller 537.

The image converting unit 534 is configured in the same way as the image converting unit 431 (431G) shown in FIG. 29. However, while the image converting unit 431 shown in FIG. 29 performs image conversion processing corresponding to parameters output from the operating unit 185, the image converting unit 534 shown in FIG. 40 performs image conversion processing corresponding to parameters output from the controller 537 on the first images signal output from the A/D converting unit 533.

A position determining unit 535 obtains control signals specifying the parameters output from the controller 537 and the offset amounts $Ph_G$, $Pv_G$, $Ph_B$, and $Pv_B$ (hereafter referred to simply as "offset amounts P" when appropriate). Further, the position determining unit 535 obtains from an image conversion processing unit 534 second image signals obtained by subjecting first image signals, imaged in a placement state at the sensor unit 531 corresponding to control signals output from the controller 537 (i.e., a state represented by the offset amount P specified by the control signals), to image conversion processing corresponding to parameters output by the controller 537 (hereafter also referred to as "second image signals corresponding to control signals and parameters" as appropriate). The position determining unit 535 then evaluates the second image signals supplied from the image converting unit 534, correlates the parameters output from the controller 537 with the offset amount P indicated by the control signals, corresponding to the evaluation results, and supplies these to a position storage unit 536.

The position storage unit 536 stores the parameters and offset amounts P supplied from the position determining unit 535 in the form of sets of parameter and offset amount P. The position storage unit 536 stores sets of parameters and offset amounts correlated with the parameters for each of multiple values of the parameter z output from the controller 537, and the parameter table is a list of these multiple sets of parameters and offset amounts.

The controller 537 generates several values which the parameter z can assume, e.g., z=0, 1, 2, and so on through Z, in the same way as the parameter generating unit 191 shown in FIG. 32. Further, the controller 537 generates several values which the offset amount P is capable of assuming ($P_1$, $P_2$, and so on through $P_N$, wherein N is a value of 2 or greater) for each parameter value generated. The controller 537 then sequentially takes the generated parameter values as parameter values of interest, and supplies the parameter value of interest z, and each of the multiple values for the offset amount P generated corresponding to the parameter value of interest, to the position determining unit 535. Further, the controller 537 supplies control signals specifying the offset amount P supplied to the position determining unit 535, to the sensor unit 531.

Figure 41:
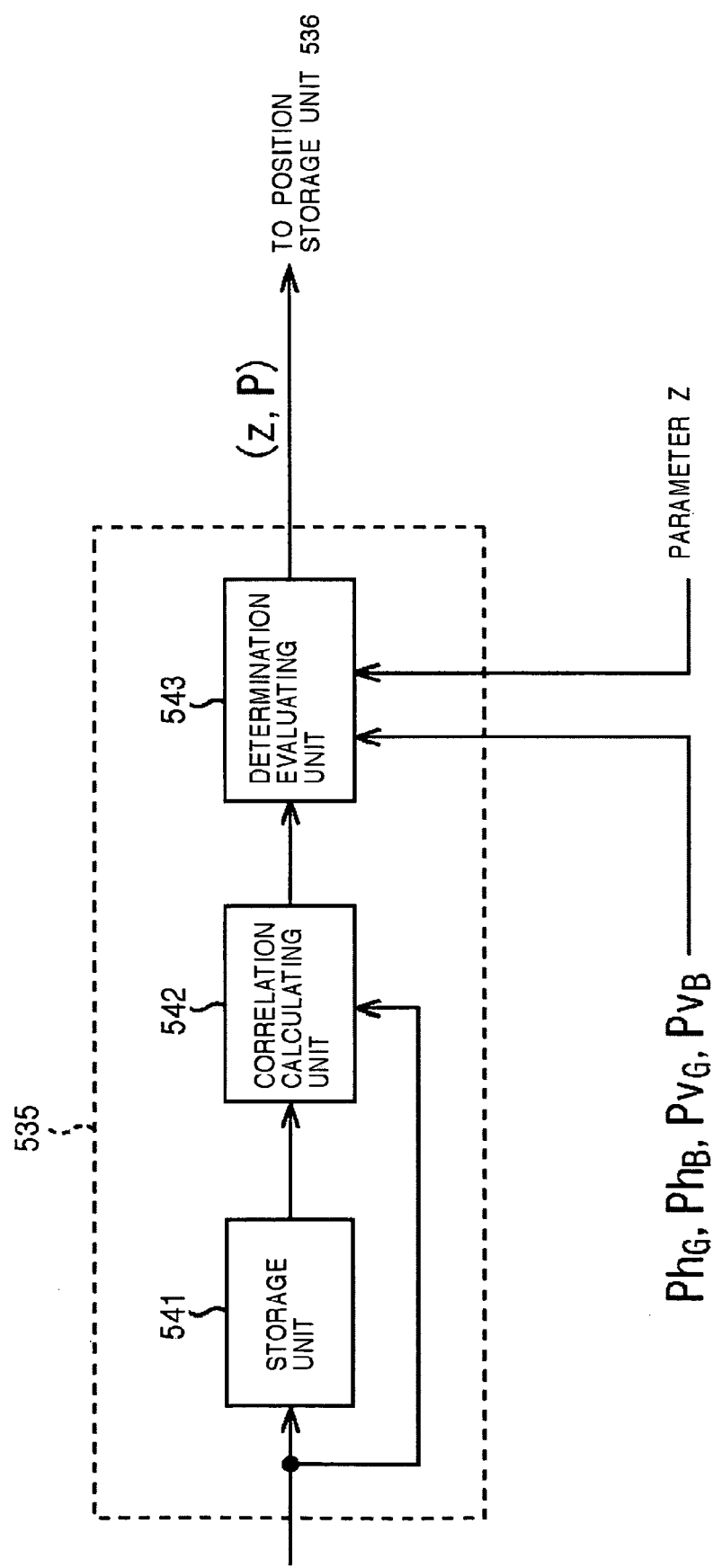
FIG. 41 is a block diagram illustrating a configuration example of a position determining unit 535.

FIG. 41 illustrates a configuration example of the position determining unit 535 shown in FIG. 40. The position determining unit 535 comprises a storage unit 541, a correlation calculation unit 542, and a determination evaluation unit 543. The storage unit 541, correlation calculation unit 542, and determination evaluation unit 543 are each configured in the same way as the storage unit 441, correlation calculation unit 442, and determination evaluation unit 443 shown in FIG. 23.

Note however, that the determination evaluation unit 543 is supplied with input of the parameter (parameter value of interest) and offset amount output from the controller 537 (FIG. 40). In the same way as with the determination evaluation unit 443 shown in FIG. 23, the determination evaluation unit 543 evaluates the second image signals output from the image converting unit 534 (FIG. 40), based on the correlation value supplied from the correlation calculating unit 542 and outputs evaluation results to the effect that the image quality of the second image signals is high or low. Further, the determination evaluation unit 543 correlates the parameters and offset amount supplied from the controller 537 according to the evaluation results, and supplies the set of the correlated parameter and offset amount to the position storage unit 536 (FIG. 40).

Next, the parameter table learning processing with the learning device shown in FIG. 40 will be described with reference to the flowchart in FIG. 42.

First, in step S320, the controller 537 takes one of the several values within the range which the parameter z can assume as a parameter value of interest z, and supplies this to the image converting unit 534 and the determination evaluation unit 543 of the position determining unit 535 (FIG. 41). Also in step S320, the image converting unit 534 and the determination evaluation unit 543 obtains the parameter value of interest z supplied from the controller 537, and the flow proceeds to step S321.

In step S321, the sensor unit 531 receives the subject light, and performs photoelectric conversion, thereby obtaining image signals as electric signal (i.e., images the subject), and supplies the image signals to the signal adjusting unit 532. The signal adjusting unit 532 subjects the image signals supplied from the sensor unit 531 to CDS processing and then supplies these to the A/D converting unit 533. The A/D converting unit 533 performs A/D conversion of the image signals supplied from the signal adjusting unit 532, which are then supplied to the signal processing unit 534 as first image signals, and the flow proceeds from step S321 to step S322.

In step S322, the image converting unit 534 subjects the first image signals supplied from the A/D converting unit 533 to image conversion processing corresponding to the parameter value of interest z obtained from the controller 537, thereby yielding the second image signals with image quality improved over that of the first image signals, which are supplied to the position determining unit 535, and the flow proceeds to step S323.

In step S323, the position determining unit 535 evaluates the second image signals supplied from the image converting unit 534, and the flow proceeds to step S324. The details of the evaluation processing performed in step S323 will be described later with reference to FIG. 43.

In step S324, the determination evaluation unit 543 of the position determining unit 535 (FIG. 41) determines whether or not evaluation results have been obtained to the effect that the image quality of the second image signals is high, as the evaluation results of the second image signals in the immediately preceding step S323.

In the event that determination is made in step S324 that evaluation results to the effect that the image quality of the second image signals is high have not been obtained, the flow proceeds to step S325, and the controller 537 supplies control signals specifying the offset amount P to the sensor unit 531, whereby the placement position of the sensor unit 531 is changed (moved). Note that the controller 537 sets the offset amount P estimated by the control signals in the same way as the control signal output unit 444 shown in FIG. 23, for example. Further, in step S324, the controller 537 also supplies the offset amount P supplied to the sensor unit 531 to the determination evaluation unit 543 of the position determining unit 535 as well, and the flow returns to step S321.

In step S321, image signals are obtained with the sensor unit 531 of which placement position has been changed in the immediately-preceding step S325, and subsequently, the steps S321 through S325 is repeated.

Due to this repetition of the steps S321 through S325, the image converging unit 534 subjects the first image signals obtained for each of multiple placement positions of the sensor unit 531 to image conversion processing corresponding to the parameter value of interest z, thereby yielding second image signals as the result of the image conversions processing corresponding to the parameter value of interest z. Further, each of the second image signals corresponding to the multiple offset amounts obtained with regard to the parameter value of interest z are evaluated in step S323. Note that in the event that the processing of step S231 is performed for the first time after the processing in step S320, the sensor unit 531 obtains the image signals with a default placement position.

Subsequently, in the event that determination is made in step S324 that evaluation results to the effect that the image quality of the second image signals is high have been obtained, the flow proceeds to step S326, and the determination evaluation unit 543 of the position determining unit 535 correlates the parameter value of interest z and the offset amount P supplied from the controller 537 at the time of the evaluation results being obtained, i.e., the offset amount P indicating the placement state at the sensor unit 531 at the time of obtaining first image signals corresponding to the second image signals regarding which evaluation results to the effect that the image quality is high have been obtained, and the correlated parameter value of interest z and offset amount P are supplied to and stored at the position storage unit 536. Accordingly, the position storage unit 536 stores the offset amount P whereby first image signals suitable for image conversion processing corresponding to the parameter value of interest z (hereafter simply referred to as "optimal offset amount"), in a manner correlated with the parameter value of interest z.

The flow then proceeds from step S326 to step S327, where the controller 537 takes all of the several values within the range which the parameter z can assume, as a parameter value of interest z, and determination is made regarding whether the optimal offset amount P has been obtained or not. In the event that determination is made in step S327 that the optimal offset amount P has not been obtained with regard to the all of the several values within the range which the parameter z can assume, the flow returns to step S320, where the controller 537 takes of the several values within the range which the parameter z can assume, one which has not yet been taken as a parameter value of interest, as a new parameter value of interest, and the same processing is repeated.

Also, in the event that determination is made in step S327 that the optimal offset amount P has been obtained with regard to the all of the several values within the range which the parameter z can assume, i.e., in the event that a parameter table which is a set of each of the several values within the range which the parameter z can assume and the optimal offset amount P has been stored in the position storage unit 536, the flow ends.

As described above, image conversion processing corresponding to the parameter z is performed with regard to each of the first image signals obtained with the sensor unit 531 at positions corresponding to each of the multiple offset amounts P, for each of the multiple values of the parameter z, the second image signals obtained by the image conversion processing are evaluated, and the optimal offset amount P is obtained which is the offset amount at the time of second image signals with high image quality being obtained; accordingly, a parameter table, which is a correlated relation between the parameter z and the optimal offset amount P at the time of first image signals suitable for the image conversion processing corresponding to that parameter z being obtained, can be obtained. As described with reference to FIGS. 37 through 39, the first image signals are imaged with the placement position of the sensor unit 401 at a position represented by the offset amount corresponding to the parameter z output from the operating unit 185 based on the parameter table, whereby image signals suitable for the image conversion processing corresponding to the parameter z can be obtained, and accordingly, second image signals with even higher image quality can be obtained.

Figure 42:
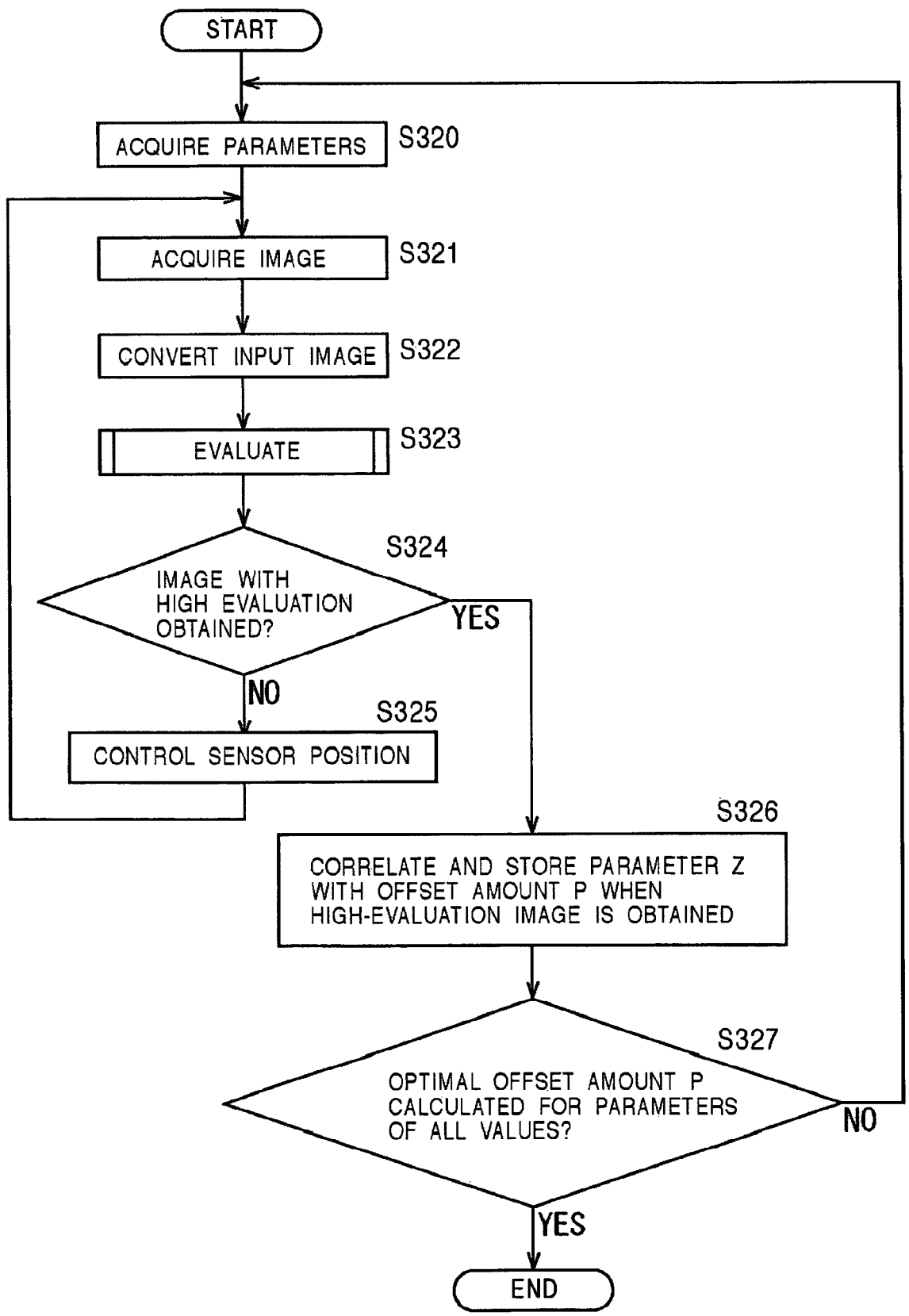
FIG. 42 is a flowchart describing learning processing for learning a parameter table.

Note that with the learning processing in FIG. 42, the parameter table is obtained for the several values within the range which the parameter z can assume, so the parameter table stored in the parameter table storage unit 222 shown in FIG. 38 may not store the same value as the parameter output by the operating unit 185. In this case, the control signal output unit 221 obtains the offset amount corresponding to the parameter output by the operating unit 185, by linear interpolation or the like of the parameters and offset amounts stored in the parameter table stored in the parameter table storage unit 222.

Next, the evaluation processing performed by the position determining unit 535 shown in FIG. 41 in step S323 of FIG. 42 will be described with reference to the flowchart in FIG. 43.

With the evaluation processing, first, in step S330, the storage unit 541 stores the second image signals supplied from the image conversion unit 534 in the immediately-preceding step S322 (FIG. 42), and the correlation calculating unit 542 receives these second image signals. Further, in step S330, the correlation calculating unit 542 computes the correlation value between the second image signals supplied from the image conversion unit 534 and the second image signals stored in the previous step S330 by the storage unit 541, and the flow proceeds to step S331.

In step S331, the determination evaluation unit 543 temporarily stores the correlation value supplied from the correlation calculating unit 542 in a manner correlated with the offset amount P at the time of taking one of the two second image signals used for obtaining the correlation value, and the flow proceeds to step S332. Now, the determination evaluation unit 543 obtains the offset amount P at the time of taking one of the two second image signals used for obtaining the correlation value supplied from the correlation calculating unit 542, from the controller 537 shown in FIG. 40.

In step S332, the determination evaluation unit 543 determines, regarding the relation between the correlation value stored in step S331 so far and the offset amount, whether a maximal value has been obtained for the correlation value. In the event that determination is made in step S332 that a maximal value has not been obtained for the correlation value, the flow proceeds to step S333, the determination evaluation unit 543 makes an evaluation to the effect that the second image signals are of low image quality, and the flow returns to step S324 in FIG. 42.

In this case, in step S324 in FIG. 42, the determination evaluation unit 543 determines that evaluation results have not been obtained to the effect that the image quality is high, and the flow proceeds to step S325. In step S325 the controller 537 supplies the sensor unit 531 with control signals specifying a new offset amount P corresponding to the evaluation results, and also supplies this offset amount P to the determination evaluation unit 543.

Figure 43:
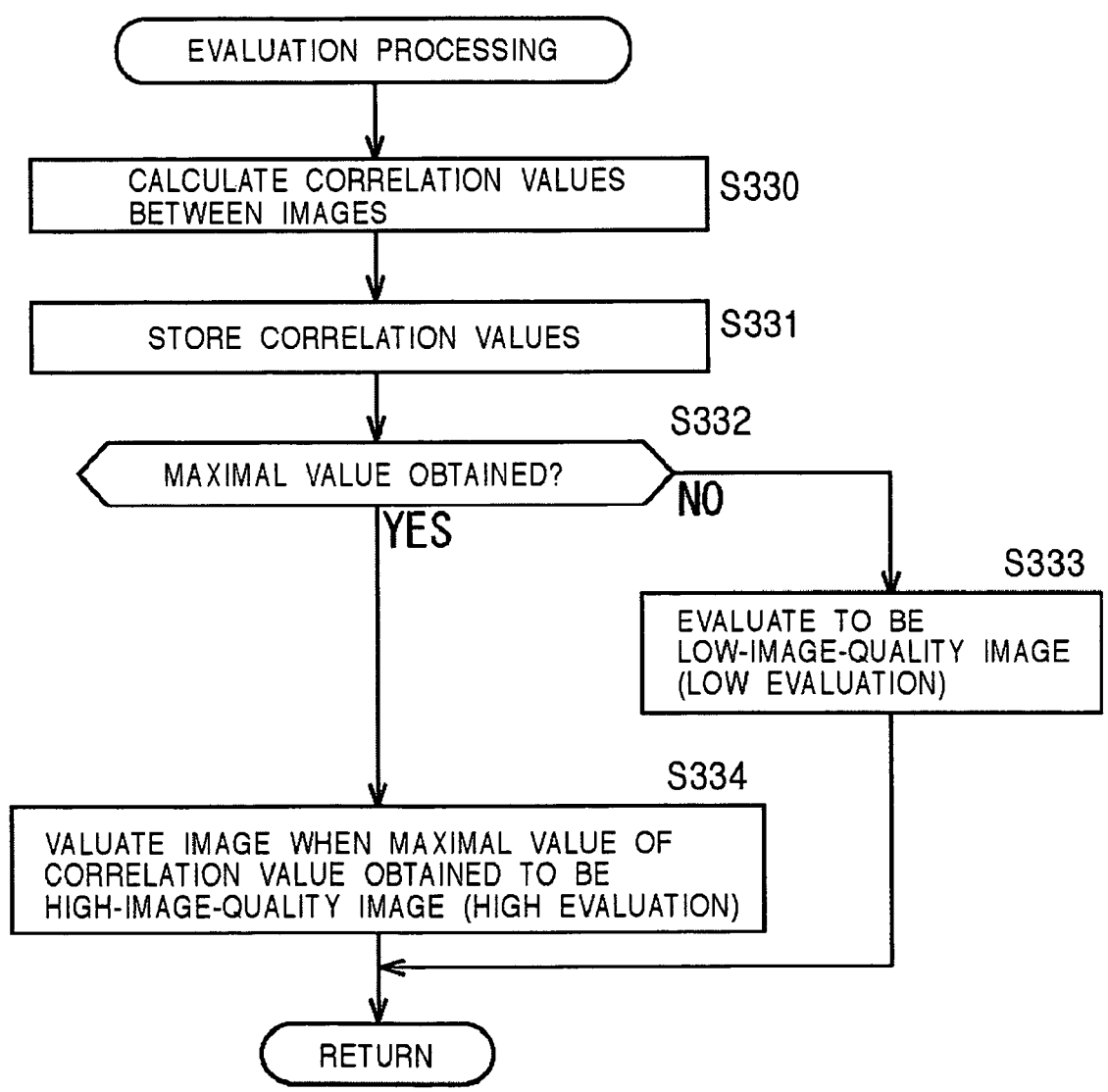
FIG. 43 is a flowchart describing evaluation processing with the position determining unit 535.

Returning to step S332 in FIG. 43, in the event that determination is made in step S332 that a maximal value has been obtained for the correlation value, the flow proceeds to step S334, the determination evaluation unit 543 makes an evaluation to the effect that the second image signals are of high image quality, and the flow returns to step S324 in FIG. 42.

In this case, in step S324 of FIG. 42, determination is made that second image signals, regarding which evaluation results have been obtained to the effect that the image quality is high, have been obtained, and the flow proceeds to step S326. In step S326, the determination evaluation unit 543 correlates the parameter value of interest z with the offset amount P supplied from the controller 537 at the time of the evaluation results being obtained, i.e., the offset amount P representing the placement state at the sensor unit 401 at the time of obtaining first image signals corresponding to second image signals regarding which evaluation results have been obtained to the effect that the image quality is high (optimal offset amount), and supplies to and stores in the position storage unit 536 the correlated parameter value of interest z and optimal offset amount.

In the case described above, description has been made regarding an arrangement wherein, in the event that the maximal value of the correlation value is obtained in step S332, evaluation is made to the effect that the second image signals are high image quality, however, an arrangement may also be made wherein evaluation is made to the effect that the second image signals are high image quality in the event that a maximal value of the correlation value which is equal to or higher than a predetermined threshold value is obtained in step S332.

Also, in the case described above, description has been made regarding an arrangement wherein evaluation of the second image signals is made based on the correlation value, however, an arrangement may also be made wherein evaluation is made based on the S/N or the like of the second image signals obtained with regard to the offset amounts $Ph_G$, $Pv_G$, $Ph_B$, and $Pv_B$ for each value, for example. Further, evaluation of the second image signals may be input externally. That is, for example, an arrangement may be made wherein the second image signals are displayed, and evaluation of the second image signals is input by a user viewing the displayed image, for example.

The above-described series of processing by the signal processing unit 404, image conversion unit 534, position determining unit 535, controller 537, and so forth, can be carried out by dedicated hardware, or with software. In the event of performing the series of processing with software, a program making up the software is installed in a microcomputer, a general-purpose computer, or the like, as described above with reference to FIG. 17.

Also note that the image conversion units 431 and 534 may perform processing for obtaining second image signals besides the above-described image conversion processing, such as subjecting the first image signals to digital clamping processing, white balance adjusting processing, gamma correction processing, linear interpolation processing, and so forth.

Also, while the present embodiment has been described as using so-called three-sensor means for the sensor unit 401 and 531, single-sensor, two-sensor, or four or more sensor systems may be used for the sensor unit 401 and 531.

Moreover, while evaluation of the second image signals has been made in the above arrangement using the G signals thereof, evaluation of the second image signals may be performed using the R signals or B signals thereof, or two or more of the R, G, and B signals.

Fourth Embodiment

Figure 44:
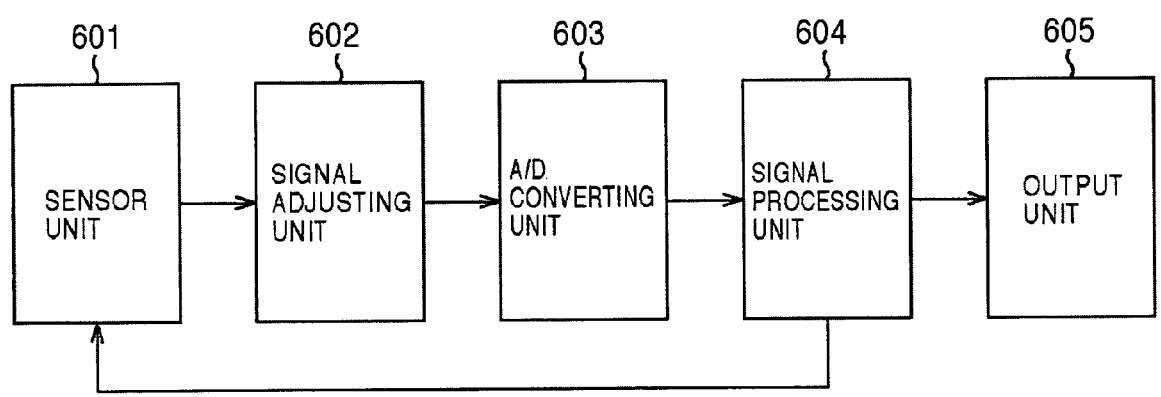
FIG. 44 is a block diagram illustrating a configuration example of a fourth embodiment of the image-taking device to which the present invention has been applied.

Next, a fourth embodiment of the present invention will be described with reference to FIG. 44. FIG. 44 illustrates a configuration example of the fourth embodiment of an image-taking device to which the present invention has been applied. The image-taking device shown in FIG. 44 may be a digital still camera or digital video camera, for example, as with the image-taking device shown in FIG. 18.

The sensor unit 601 comprises multiple photoelectric conversion elements corresponding to pixels for receiving subject light cast therein vi an unshown optical system and supplying image signals corresponding to the subject light as electric signals to a signal adjusting unit 602. Also, the sensor unit 601 changes its capabilities according to control signals supplied from a signal processing unit 604.

The signal adjusting unit 602 performs CDS processing for removing the reset noise contained in the image signals output from the sensor unit 601 as with the signal adjusting unit 402 in FIG. 18, and supplies image signals obtained as the result of the processing to an A/D converting unit 603. The A/D converting unit 603 performs A/D conversion of the image signals supplied from the signal adjusting unit 602 as with the A/D converting unit 403 in FIG. 18, i.e., quantizes the image signals by sampling, and supplies the digital image signals obtained as a result thereof to the signal processing unit 604.

The signal processing unit 604 takes the digital image signals (hereafter simply referred to as "image signals") supplied from the A/D converting unit 403 as first image signals, subjects the first image signals to predetermined image conversion processing and outputs digital image signals obtained as a result thereof as second image signals to an output unit 605. Also, the signal processing unit 604 evaluates the first image signals in a predetermined region of one screen (one frame or one field), and supplies control signals to the sensor unit 601 corresponding to the evaluation.

The output unit 605 receives the second image signals output from the image processing unit 604 as with the output unit 405 in FIG. 18, and outputs these. That is to say, the output unit 605 outputs the second image signals from the signal processing unit 604 from an unshown external terminal, or displays on an unshown monitor. Also, the output unit 605 stores the second image signals in an unshown recording medium such as an optical disk, magnetic disk, magneto-optical disk, magnetic tape, semiconductor memory, or the like, or transmits these via such as a telephone line, the Internet, a LAN, or other like cable or wireless transmission medium.

With the image-taking device configured as described above, subject light is received at the sensor unit 601, and image signals which are electric signals corresponding to the amount of light received are supplied to the signal processing unit 604 via the signal adjusting unit 602 and A/D conversion unit 603. The signal processing unit 604 subjects the image signals supplied from the sensor unit 601 via the signal adjusting unit 602 and A/D conversion unit 603 to signal processing as first image signals, such as image conversion processing for improving image quality by improving resolution for example, and outputs second image signals wherein the image quality has been improved thereby to the output unit 605. At the output unit 605, the second image signals supplied from the signal processing unit 604 are output.

Also, the signal processing unit 604 evaluates the first image signals from the sensor unit 601 by predetermined region of one screen thereof. That is to say, the signal processing unit 604 evaluates first image signals for each screen from the sensor unit 601. Further, the signal processing unit 604 supplies controls signals to the sensor unit 601, corresponding to the evaluation thereof.

The sensor unit 601 changes the capabilities of each pixel of one screen (the entire photoreception face) corresponding to the first image signals of the predetermined region. Subsequently, the sensor unit 601 outputs image signals obtained from the pixels following the change in capabilities.

Next, the change in capabilities of the sensor unit according to control signals output from the signal processing unit 604 will be described. The image signals output from the sensor unit 601 are quantized at the A/C converting unit 603, as described above. Accordingly, in the event that predetermined regions in one screen are flat, and accordingly, change in the signal level of image signals of a predetermined region are small enough to fit within a quantization step width in the quantization performed by the A/D converting unit 603 as shown in FIG. 45A, the image signals within the predetermined region are all quantized to the same value at the A/D converting unit 603, loosing small changes. It is unlikely that performing image conversion processing on such digital image signals quantized to the same value at the signal processing unit 604 will yield high resolution images.

Accordingly, the signal processing unit 604 supplies control signals for changing the capabilities of the sensor unit 601 thereto, thereby changing the capabilities of the sensor unit 601, so that suitable image signals can be output by the image conversion processing, i.e., so that image signals capable of yielding high-resolution images by image conversion processing can be output, for example.

Figure 45B:
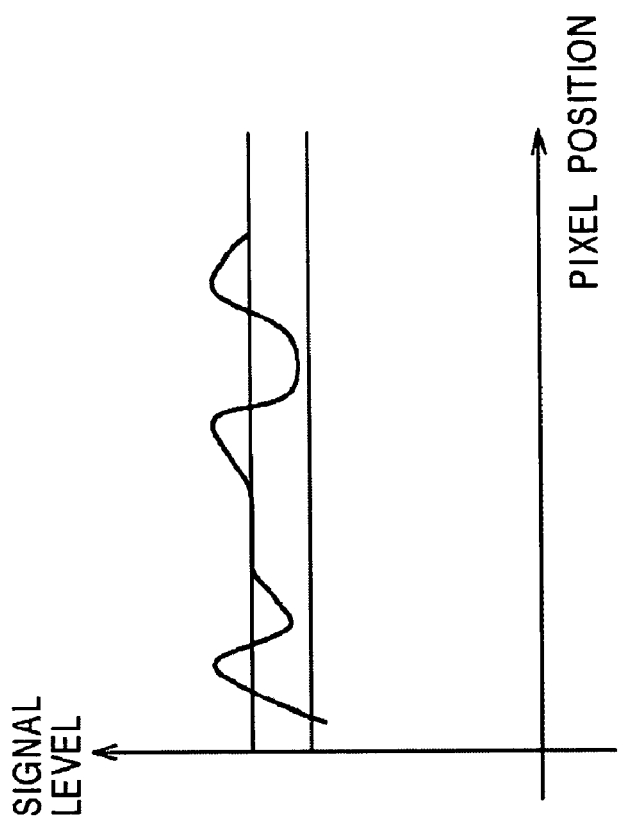
FIGS. 45A and 45B are diagrams describing the change in capabilities of a sensor unit 601 according to control signals output from a signal processing unit 604.
Figure 45A:
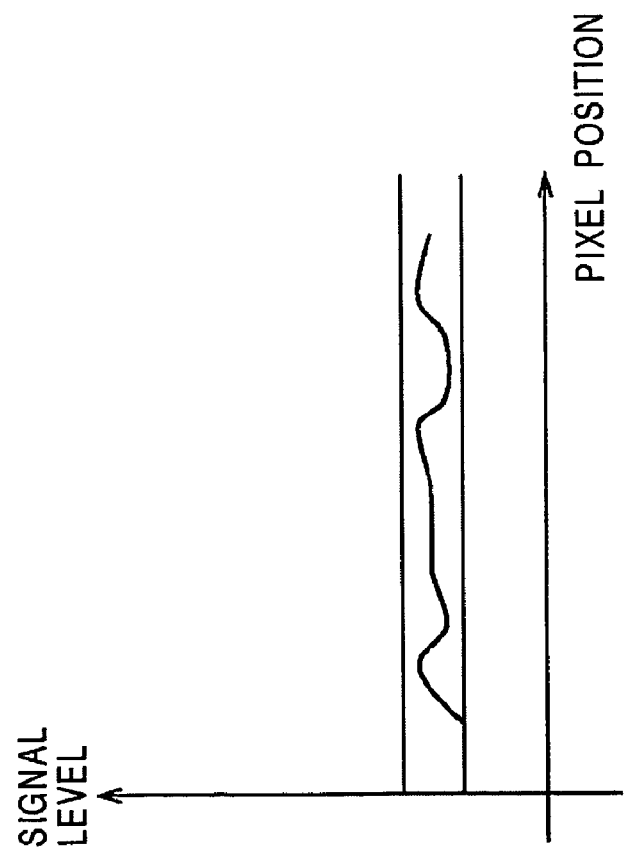

That is to say, the signal processing unit 604 evaluates image signals of a predetermined region output from the sensor unit 601, and in the event that the change of the signal level of the image signals is recognized to be small such as shown in FIG. 45A, the capabilities of the sensor unit 601 are changed so that the change in the signal level of the image signals output from the sensor unit 601 is great, as shown in FIG. 45D. In this case, image signals wherein change in the signal level is manifested are input to the signal processing unit 604, and image conversion processing is performed on such image signals, thereby obtaining a high-resolution image.

Figure 46:
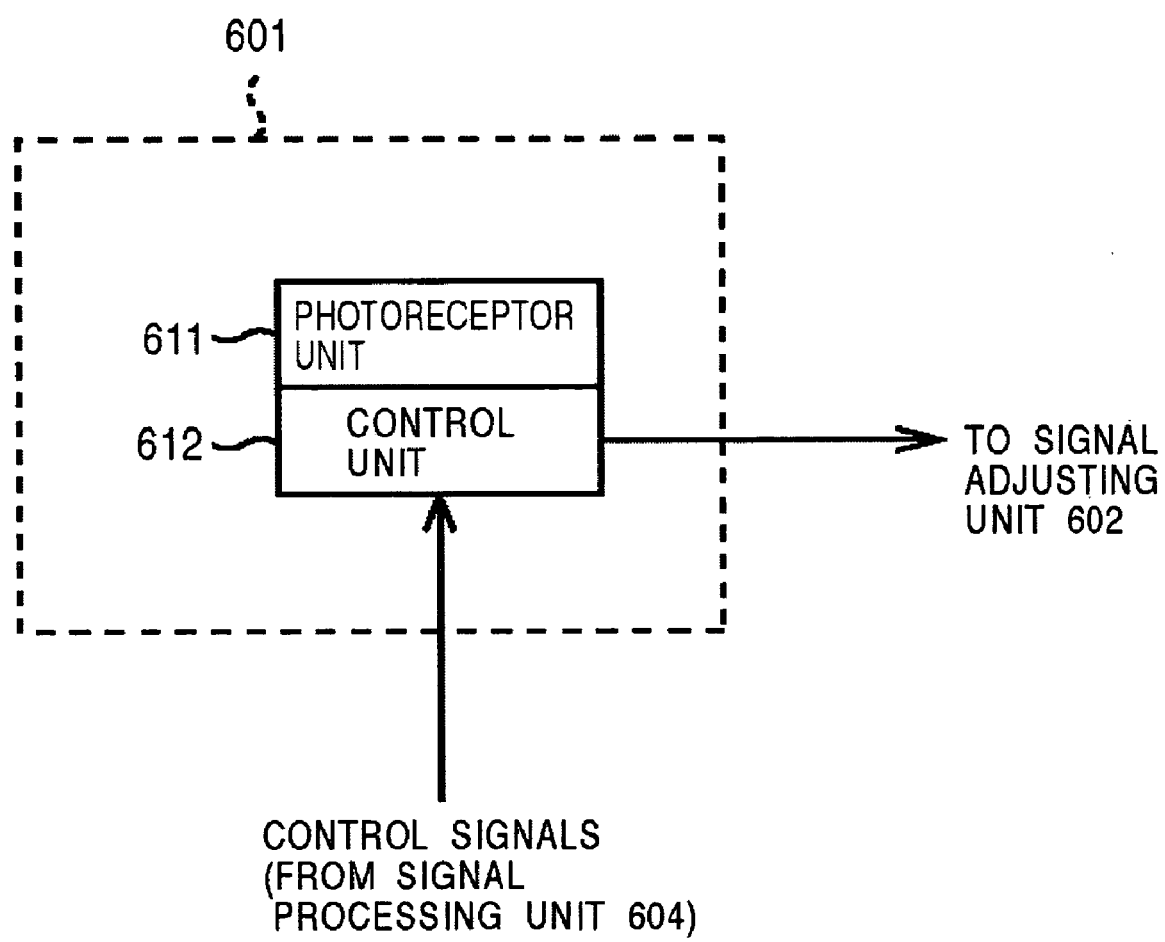
FIG. 46 is a block diagram illustrating a configuration example of the sensor unit 601.

FIG. 46 illustrates a configuration example of the sensor unit 601 with changing capabilities. The sensor unit 601 has a great number of pixels arrayed in the horizontal and vertical direction, thereby making up a photoreception face. Each pixel is made up of a photoreceptor unit 611 and control unit-612 for example, as shown in FIG. 46.

The photoreceptor unit 611 is configured of a photoelectric converting device such as a photodiode or the like, so as to output electric signals, corresponding to a charge according to the amount of light received, to the control unit 612. The control unit 612 is made up of a transistor or the like, for amplifying the electric signals from the photoreceptor unit 611 by a predetermined amplification, and outputting to the signal adjusting unit 602. Also, the control unit 612 is supplied with control signals from the signal processing unit 604, and the control unit 612 controls the amplification whereby the electric signals from the photoreceptor unit 601 are amplified according to the control signal.

The control unit 612 changes the amplification as the capabilities thereof, according to the control signals from the signal processing unit 604, so as to output image signals having change in signal level, suitable for image conversion processing at the signal processing unit 604.

Now, the sensor unit 601 made up of pixels having such a photoreceptor unit 611 and control unit 612 can be configured by applying MEMS technology to a CMOS sensor., for example. However, it should be understood that the sensor unit 601 is by no means restricted to a CMOS sensor, and that a CCD, or a HARP which is an imaging tube employing the electron avalanche phenomena occurring within a photoconductive target of an a-Se semiconductor, may be used instead. Also, the sensor unit 601 may also be formed of devices having amplifying units for amplifying image signals for the entirety or in increments of one pixel or more, such that the amplification at the amplifying unit(s) can be changed according to control signals.

Figure 47:
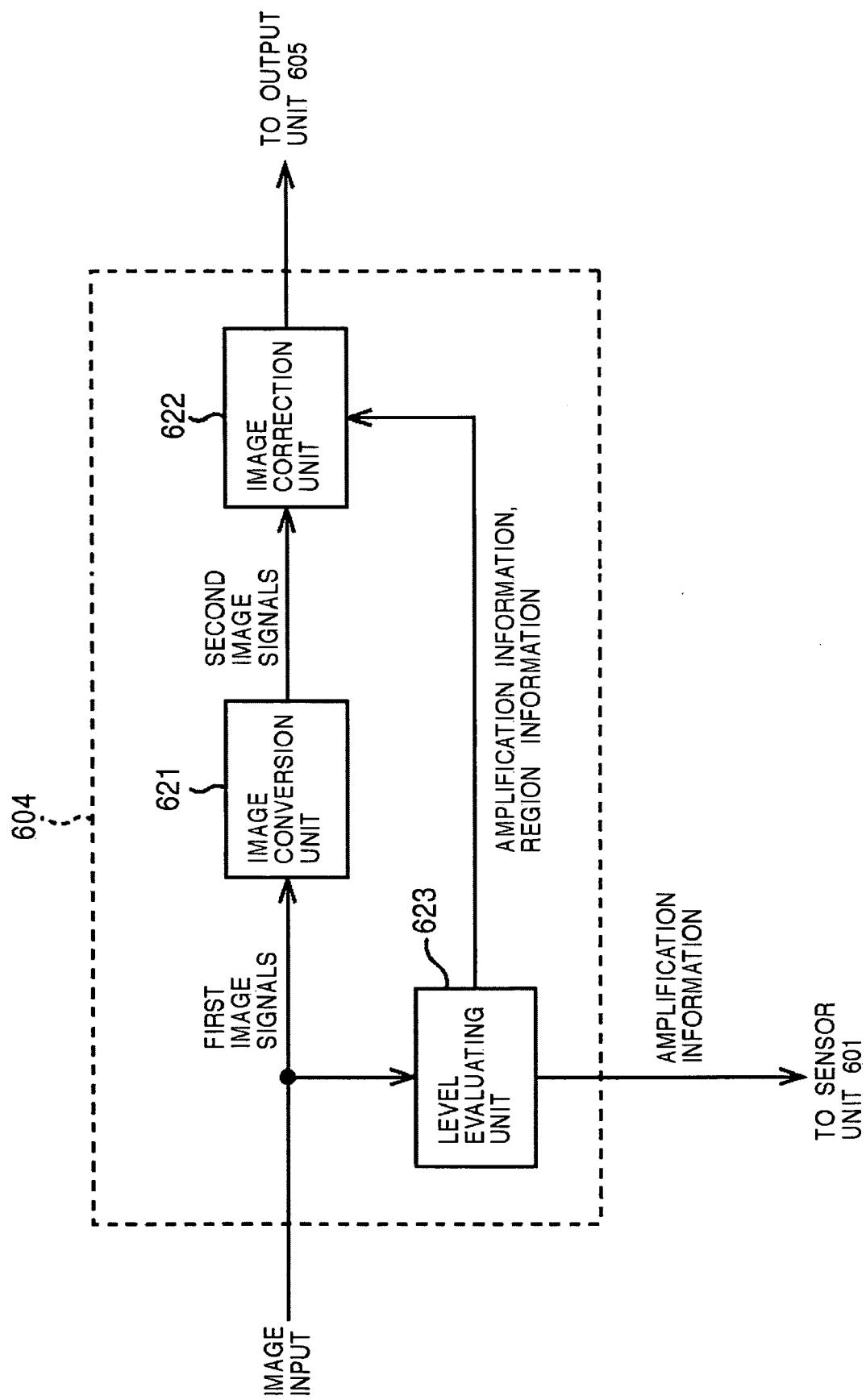
FIG. 47 is a block diagram illustrating a configuration example of the signal processing unit 604.

Next, FIG. 47 illustrates a configuration example of the signal processing unit 604 shown in FIG. 44. In FIG. 47, the signal processing unit 604 is made up of an image converting unit 621, image correcting unit 622, and a level evaluating unit 623.

Image signals output from the sensor unit 601 are supplied as first image signals to the signal processing unit 604 via the signal adjusting unit 602 and the A/D converting unit 603. The first image signals are supplied to the image converting unit 621 and the level evaluating unit 623.

The image converting unit 621 subjects the first image signals to image conversion processing for improving the image quality, such as improving resolution for example, and supplies the digital image signals with improved image quality thereby, to the image correction unit 622, as second image signals.

The image correction unit 622 has supplied thereto second image signals from the image converting unit 621, and also amplification information and region information from the level evaluating unit 623. The image correction unit 622 corrects the second image signals supplied from the image converting unit 621, based on the amplification information and region information supplied from the level evaluating unit 623, and supplies the second image signals following the correction to the output unit 605.

The level evaluation unit 623 evaluates the first image signals by predetermined region part of a screen. Further, the level evaluating unit 623 determines the amplification whereby amplification is to be performed at the control unit 612 shown in FIG. 46, and supplies the amplification information indicating the amplification, and region information indicating the region where the evaluation was performed, to the image correction unit 622. Also, the level evaluation unit 623 supplies amplification information to the control unit 612 of pixels making up the predetermined region, out of the pixels making up the sensor unit 601, as control signals.

That is to say, the level evaluation unit 623 evaluates whether or not the first image signals in each region of a screen are suitable for image correction processing at the image correction unit 621. Specifically, the level evaluation unit 623 recognizes the signal level (brightness or color) of the first image signals for each predetermined region, and evaluates whether change in the signal level is great or small. Further, the level evaluation unit 623 determines an amplification with a great value for pixels making up a region regarding which evaluation has been obtained that change in the signal level is too small, and also determines an amplification with a small value for pixels making up a region regarding which evaluation has been obtained that change in the signal level is too great, and supplies amplification information representing the amplification thereof to the control units 612 (FIG. 46) of the pixels of each region, as control signals.

At the control unit 612 shown in FIG. 46, the output signals of the photoreception unit 611 are amplified at an amplification according to the control signals from the level evaluating unit 623, and accordingly, image signals having change in signal level which is suitable for image conversion processing at the image converting unit 621, are output from the sensor unit 601.

On the other hand, at the level evaluating unit 623, the amplification information supplied as control signals to the control unit 612 of the sensor unit 601, and the region information representing the region made up of the pixels where the amplification is being performed at the amplification represented by the amplification information, are correlated, and supplied to the image correcting unit 622. The image correcting unit 622 corrects the second image signals, obtained by the image converting unit 621 subjecting the first image signals to image conversion processing, according to the amplification information and region information supplied from the level evaluating unit 623.

That is to say, the first image signals of the region which the region information indicates are of a value differing from the signals output from the photoreception unit 611 of the sensor unit 601 by gain corresponding to the amplification which the amplification information correlated to the region information indicates. Accordingly, the image correction unit 622 corrects the second image signals of the region which the region information represents by an amplification indicated by the amplification information correlated to that region information, so as to yield second image signals with the same gain which image signals would have had, had they been obtained by image conversion processing performed on signals output from the photoreceptor unit 611 of the sensor unit 601. Specifically, the image correction unit 622 corrects the second image signals of the region which the region information indicates, by reducing the gain by a value proportionate to the amplification which the amplification information correlated to the region information indicates.

Note that with the level evaluating unit 623, the predetermined region to take as the increment of evaluation may be the entire screen (frame of field), or regions made up of one pixel or multiple pixels.

Now, at the level evaluating unit 623, in the event that the predetermined region to serve as the increment of evaluation is one pixel or multiple pixels, but not one entire screen, image conversion processing is performed at the image converting unit 621 on first image signals which have different amplifications for each predetermined region. While various types of computation are carried out at the image converting unit 621, in the event that the computation is performed using first image signals having different amplifications, there is the need to perform the computation taking into consideration the difference in amplification. Here, in order to simplify description, let us say that the predetermined region to be taken as the increment of evaluation at the level evaluating unit 623 is the entire one screen.

Figure 48:
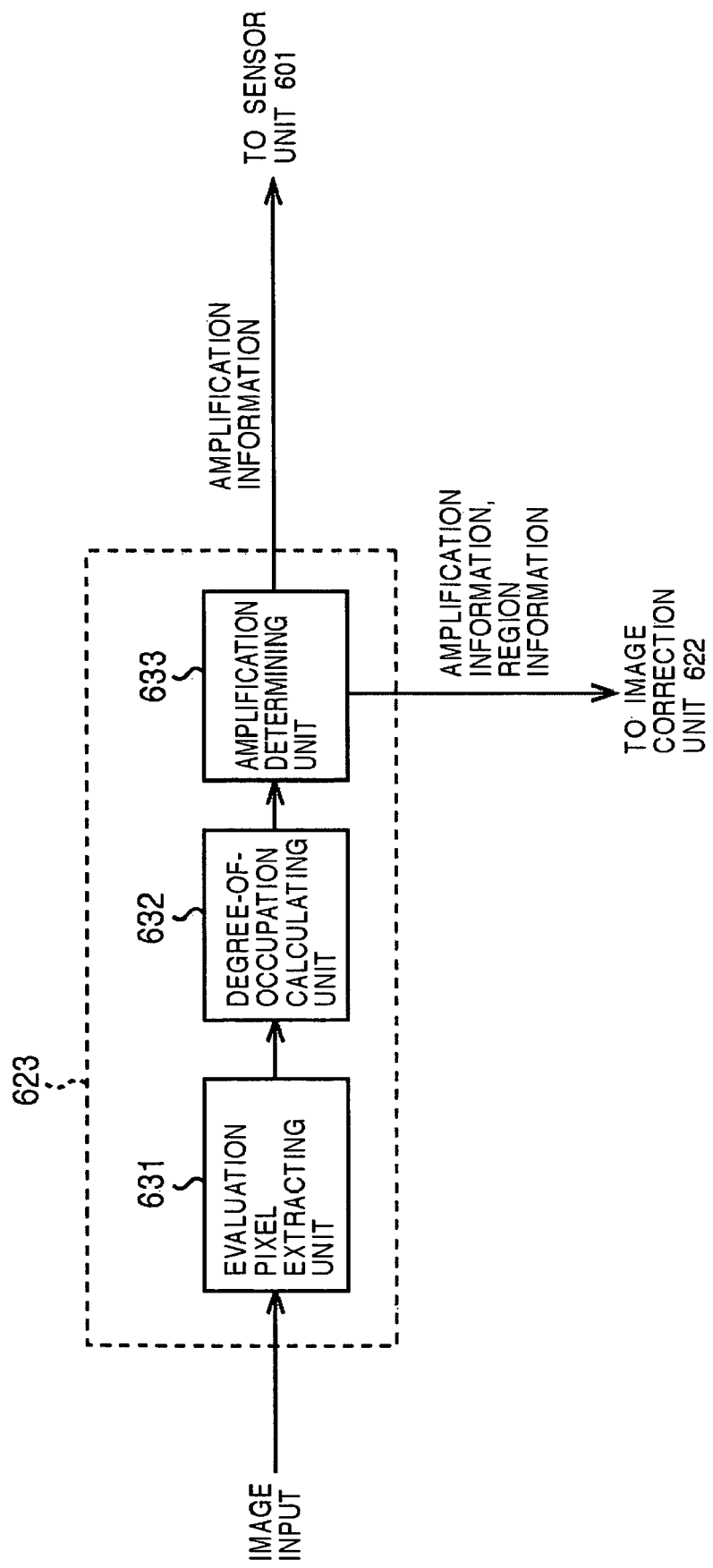
FIG. 48 is a block diagram illustrating a first configuration example of a level evaluating unit 623.

Next, FIG. 48 illustrates a first configuration example of the level evaluating unit 623 shown in FIG. 47. In FIG. 48, the level evaluating unit 623 is made up of an evaluation pixel extracting unit 631, a degree-of-occupation calculating unit 632, and an amplification determining unit 633.

The evaluation pixel extracting unit 631 is supplied with the first image signals from the sensor unit 601, via the signal adjusting unit 602 and A/D converting unit 603 to the signal processing unit 604. The evaluation pixel extracting unit 631 extracts pixels to be used in evaluating the first image signals of the one screen as evaluation pixels, and supplies these to the degree-of-occupation calculating unit 632. The degree-of-occupation calculating unit 632 calculates the degree of occupation of the evaluation pixels on the one screen which is the increment of evaluation, and supplies this to the amplification determining unit 633.

At the amplification determining unit 633, the first image signals of the one screen which is the increment of evaluation are evaluated, according to the degree of occupation supplied from the degree-of-occupation calculating unit 632, and determines an amplification corresponding to that evaluation to be the amplification for the control units 612 of the pixels corresponding to the image signals of the one screen of the sensor unit 601. Further, the amplification determining unit 633 supplies amplification information indicating this amplification to the sensor unit 601 (or the control unit 612 thereof) as control signals. Further, the amplification determining unit 633 correlates the amplification information with the region information representing the one screen which is the region made up of the pixels where amplification is to be performed at the amplification indicated by the amplification information, to the image correction unit 622 (FIG. 47).

Next, the operations of the image-taking device shown in FIG. 44 will be described, with reference to the flowchart shown in FIG. 49.

With the image-taking device, first, in step S401, the photoreception unit 611 of the sensor unit 601 receives subject light and performs photoelectric conversion, thereby obtaining first image signals which are electric signals (images the subject), the control unit 612 amplifies the image signals with a predetermined amplification, the amplified signals are supplied to the signal adjusting unit 602, and the flow proceeds to step S402. Note that in cases wherein imaging is to be performed the first time after turning on the electric power source of the image-taking device, the amplification of the control unit 612 of the sensor unit 601 is a default value.

In step S402, the signal adjusting unit 602 subjects the image signals of the one screen supplied from the sensor unit 601 to signal adjustment such as CDS processing and then supplies these to the A/D converting unit 603, and the flow proceeds to step S403. In step S403, the A/D converting unit 603 performs A/D conversion of the image signals of the one screen supplied from the signal adjusting unit 602, which are then supplied to the signal processing unit 604 as first image signals, and the flow proceeds to step S404.

In step S404, the level evaluating unit 623 of the signal processing unit 604 (FIG. 47) evaluates the first image signals of the one screen supplied from the A/D converting unit 603, and determines the amplification for the control unit 612 shown in FIG. 46. Further, in step S404, the level evaluating unit 623 supplies the amplification information indicating the amplification thereof, and the region information indicating one screen regarding which evaluation is performed to the image correction unit 622, and also supplies the amplification information to the control units 612 of the pixels making up the one screen of the sensor unit 601 as control signals, and the flow proceeds to step S405. Now, the details of the processing performed in step S404 will be described later.

In step S405, the control units 612 of each of the pixels in the sensor unit 601 control the amplification whereby the output of the photoreception units 611 is amplified, according to the control signals supplied from the level evaluating unit 623 in the immediately preceding step S404, and the flow proceeds to step S406.

In step S406, image conversion processing is performed with regard to the first image signals supplied from the A/D converting unit 603, by the image converting unit 621 of the signal processing unit 604 (FIG. 47), the second images signals with image quality improved over the first image signals are supplied to the image correction unit 622, and the flow proceeds to step S407.

In step S407, the image correction unit 622 corrects the second image signals supplied from the image converting unit 621 based on the amplification information and region information supplied from the level evaluation unit 623 in the immediately-preceding step S404, and the corrected second image signals are supplied to the output unit 605, and the flow proceeds to step S408.

In step S408, the output unit 605 outputs the second image signals supplied from the image correction unit 622 of the signal processing unit 604, and thus processing regarding the image of one screen is completed. That is to say, with the image-taking device shown in FIG. 44, the processing of the one image screen according to the flowchart shown in FIG. 49 is repeated until the user commands stopping of the image taking, for example.

Accordingly, in the subsequent step S401, the image signals output from the photoreception unit 611 of the sensor unit 601 are amplified at an amplification controlled in the previously-performed step S404, and accordingly, first image signals suitable for image conversion processing are supplied to the image converting unit 621.

Next, the evaluation processing performed in step S404 in FIG. 49 will be described with reference to the flowchart in FIG. 50. In the evaluation processing, first, in step S421, the evaluation pixel extracting unit 631 of the level evaluating unit (FIG. 48) extracts pixels to be used in evaluating the first image signals of the one screen, from the pixels making up the screen which is the increment of evaluation, as evaluation pixels. That is to say, the evaluation pixel extracting unit 631 extracts from the pixels making up the once screen, for example, pixels having a level of first image signals higher than a first level, and pixels having a level lower than a second level, as evaluation pixels.

Now, for the first level, a value near and equal to or lower than the greatest value which the first image signals can assume can be used. Also, for the second level, a value near and equal to or higher than the smallest value which the first image signals can assume can be used. In the following description, pixels wherein the first image signals have a level higher than the first level will be referred to as "high-level pixels" as appropriate, and pixels wherein the first image signals have a level lower than the second level will be referred to as "low-level pixels" as appropriate.

In step S421, the evaluation pixel extracting unit 631 extracts high-level pixels and low-level pixels from the pixels making up the one screen which is the increment of evaluation as evaluation pixels, and supplies the evaluation pixels to the degree-of-occupation calculating unit 632, and the flow proceeds to step S422.

In step S422, in one screen which is the increment of evaluation, the degree-of-occupation calculating unit 632 calculates the ratio of occupation of each of the high-level pixels and low-level pixels supplied from the evaluation pixel extracting unit 631 in step S421, as high-level degree-of-occupation and low-level degree-of-occupation, supplies this to the amplification determining unit 633, and the flow proceeds to step S423.

In step S423, the amplification determining unit 633 evaluates the first image signals of the one screen which is the increment of evaluation, according to the high-level degree-of-occupation and low-level degree-of-occupation supplied from the degree-of-occupation unit 632, and an amplification according to that evaluation is determined as the amplification for the control unit 612 of the pixels corresponding to the image signals of the one screen.

That is to say, in the event that the high-level degree-of-occupation is sufficiently great as to the low-level degree-of-occupation, this means that a great number of high-level pixels exist in the one screen, so the amplification determining unit 633 makes evaluation that the first image signals of the one screen are not suitable for the image conversion processing at the image converting unit 621, and determines an amplification of a value lower than the current value to be the amplification at the control unit 612. Also, in the event that the low-level degree-of-occupation is sufficiently great as to the high-level degree-of-occupation, this means that a great number of low-level pixels exist in the one screen, so the amplification determining unit 633 makes evaluation that the first image signals of the one screen are not suitable for the image conversion processing at the image converting unit 621, and determines an amplification of a value higher than the current value to be the amplification at the control unit 612. Otherwise, for example, the amplification determining unit 633 makes evaluation that the first image signals of the one screen are suitable for the image conversion processing at the image converting unit 621, and determines the amplification of the previous value to be the amplification at the control unit 612.

In step S423, the amplification determining unit 633 supplies the amplification information indicating the determined amplification to the sensor unit 601 (or the control unit 612 thereof) as control signals, and also correlates the amplification information with region information indicating that the region made up of the pixels where the amplification at the amplification indicated by the amplification information is being performed is one screen, supplies the correlated amplification information and region information to the image correcting unit 622 (FIG. 47), and the flow returns.

In this case, image signals with a suitable level of the image conversion processing at the image converting unit 621 are output from the sensor unit 601, and consequently, second image signals with even higher image quality can be obtained from the image conversion processing. It should be noted that an arrangement may be made wherein a low amplification is determined for only the high-level pixels, and wherein a high amplification is determined for only the low-level pixels.

Figure 49:
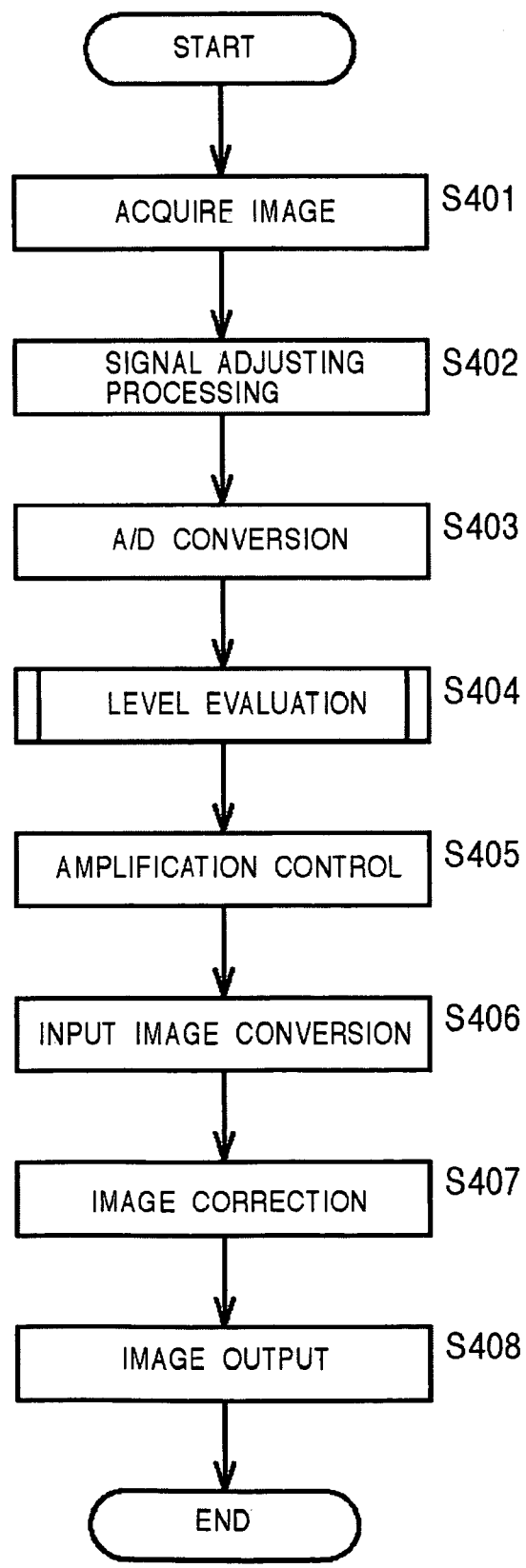
FIG. 49 is a flowchart describing the operations of the image-taking device.
Figure 50:
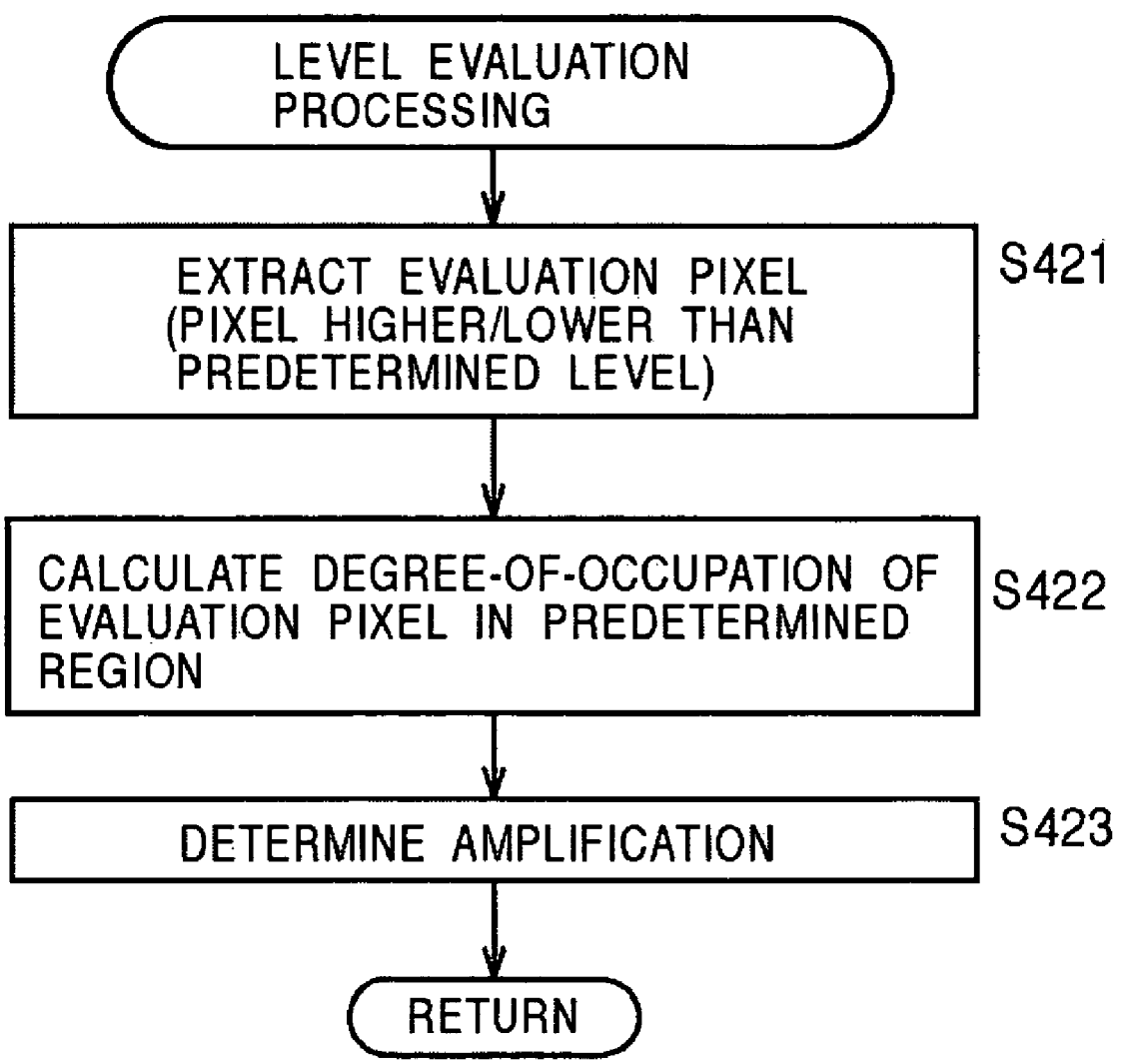
FIG. 50 is a flowchart describing the processing of the level evaluating unit 623.

With the arrangement illustrated in FIG. 49, in step S401, the sensor unit 601 amplifies the image signals output from the photoreceptor unit 611 at an amplification controlled in the previous step S404, so the image signals of the current frame or field at the sensor unit 601 are amplified at an amplification determined by the image taken one frame or one field back being evaluated. On the other hand, an arrangement may be made wherein the sensor unit 601 amplifies the image signals of the current frame or field at an amplification determined by the image taken in the current frame or field being evaluated.

Now, the operations of the image-taking device shown in FIG. 44 will be described regarding a case wherein the sensor unit 601 amplifies the image signals of the current frame or field at an amplification determined by the image taken in that frame or field being evaluated. In this case, the same processing as that in steps S401 through S405 in FIG. 49 is performed in steps S431 through S435 in FIG. 51, and the flow proceeds to step S436.

In step S436, as with step S431 corresponding to step S401 in FIG. 49, the photoreception unit 611 of the sensor unit 601 receives subject light and performs photoelectric conversion, thereby obtaining first image signals which are electric signals. Further, in step S636, the control unit 612 amplifies the image signals obtained by the photoreceptor unit 611 with the amplification controlled in the immediately preceding step S635, and supplies the amplified image signals to the signal processing unit 604 via the signal adjusting unit 602 and A/D converting unit 603, and the flow proceeds to step S437.

The flow then proceeds through the step S437 through S439 in order, whereby processing the same as that of steps S406 through S408 in FIG. 49 is performed, thereby completing the processing for the one frame or one field image. The processing with the image-taking device shown in FIG. 44 according to the flowchart shown in FIG. 51 is repeated until the user commands stopping of the image taking, for example.

Figure 51:
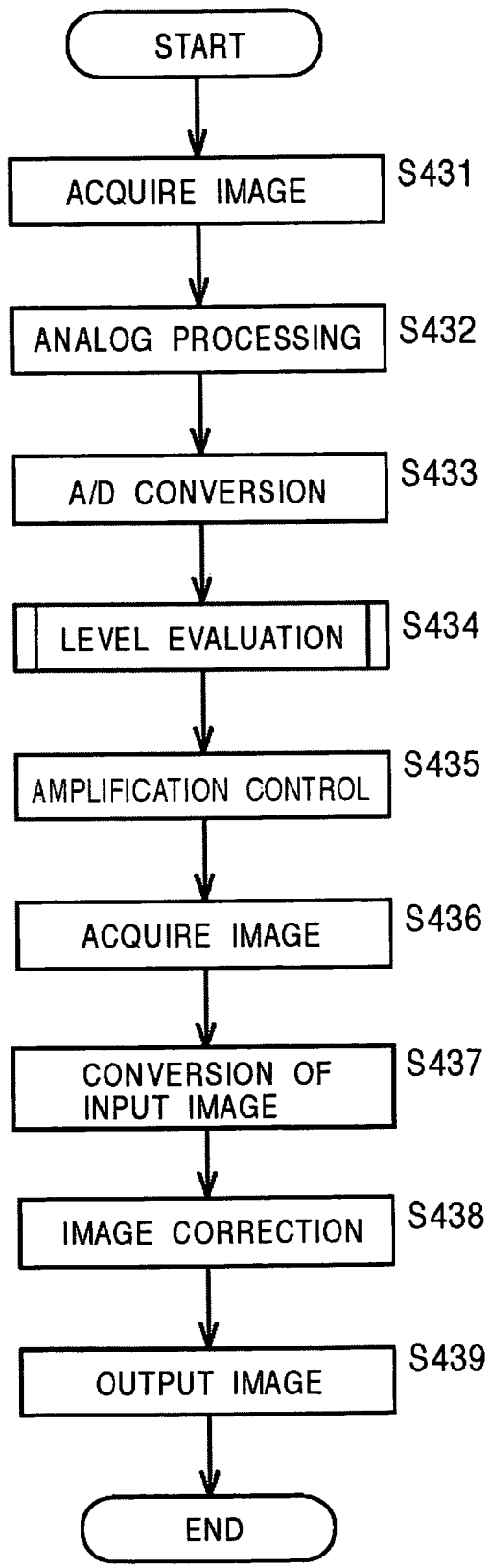
FIG. 51 is a flowchart describing the operations of the image-taking device.

In the processing according to the flowchart in FIG. 51, the sensor unit 601 performs image-taking two times in the cycle of one frame or one field, in steps S431 and S436. In step S434, the image signals taken the first time are evaluated, and the amplification of the image signals to be taken the second time are is determined in step S435 based on the evaluation results. Accordingly, at the sensor unit 601, the image signals obtained by the second imaging of the current frame of field are amplified by an amplification determined by evaluating the image signals obtained by the first imaging.

Note that with the processing according to the flowchart in FIG. 49, the sensor unit 601 only needs to perform imaging once during one frame (field), but with the with the processing according to the flowchart in FIG. 51, the sensor unit 601 needs to perform imaging at least twice during one frame (field).

Figure 52:
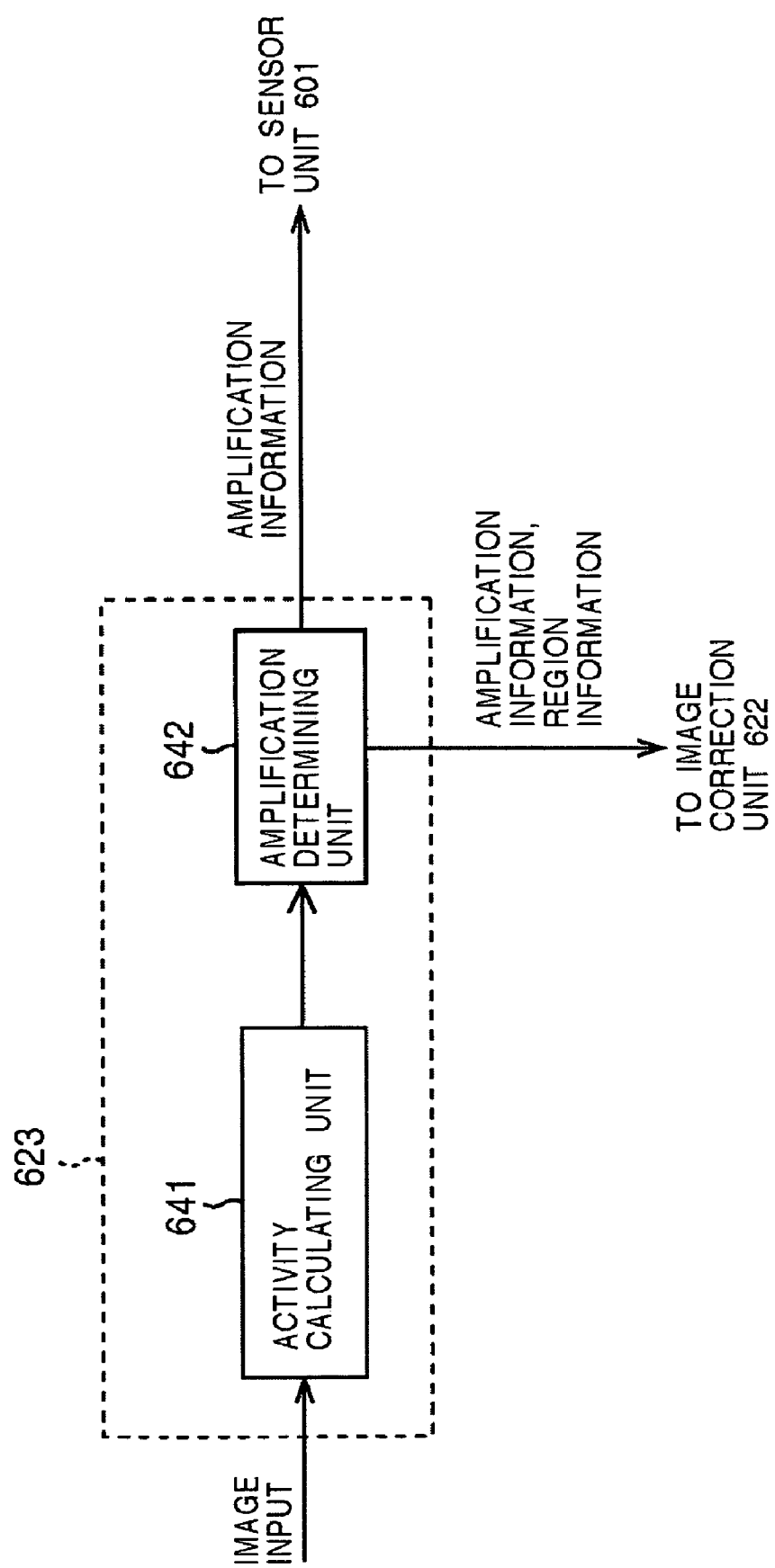
FIG. 52 is a block diagram illustrating a second configuration example of the level evaluating unit 623.

Next, FIG. 52 illustrates a second arrangement of the level evaluation unit 623 in FIG. 47. In FIG. 52, the level evaluation unit 623 is made up of an activity calculating unit 641 and an amplification determining unit 642.

The first image signals supplied from the sensor unit 601 to the image processing unit 604 via the A/D converting unit 603 and the signal adjusting unit 602 are supplied to the activity calculating unit 641. The activity calculating unit 641 calculates the activity of the first image signals in the one screen which is the increment of evaluation, and supplies the calculated activity to the amplification determining unit 642.

Now, an example of activity of the first signals of one screen which can be employed may be the difference between the maximum and minimum value of the first image signals of the one screen (i.e., the dynamic range), the sum of absolute values of difference between adjacent pixels in the first image signals, dispersion of the first image signals in the one screen, and so forth.

The amplification determining unit 642 evaluates the first image signals in the one screen which is the increment of evaluation, and determines the amplification corresponding to the evaluation thereof to be the amplification at the control units 612 of the pixels corresponding to the one screen of image signals of the sensor unit 601.

That is to say, in the event that the activity from the activity calculating unit 641 is great for example, evaluation is made that the one screen of first image signals are not suitable for the image conversion processing at the image converting unit 621, so an amplification lower than the current amplification is determined by the amplification determining unit 642 to be the amplification at the control unit 612. Also, in the event that the activity from the activity calculating unit 641 is small for example, evaluation is made that the one screen of first image signals are not suitable for the image conversion processing at the image converting unit 621, so an amplification higher than the current amplification is determined by the amplification determining unit 642 to be the amplification at the control unit 612. Further, in the event that the activity from the activity calculating unit 641 is neither great nor small for example, evaluation is made that the one screen of first image signals are suitable for the image conversion processing at the image converting unit 621, so the current amplification is determined by the amplification determining unit 642 to be the amplification at the control unit 612.

The amplification determining unit 642 then supplies the amplification information indicating the amplification which has been determined to the sensor unit 601 (the control units 612 thereof) as control signals, and also correlates the amplification information with the region information indicating the one screen which is the region made up of pixels of the sensor unit 601 where amplification at the amplification indicated by the amplification information is to be performed, and the correlated amplification information and region information are supplied to the image correcting unit 622 (FIG. 47).

In this case as well, image signals of a level suitable for the image conversion processing at the image converting unit 621 are output from the sensor unit 601, consequently, second image signals with even higher image quality can be obtained from the image conversion processing.

Figure 53:
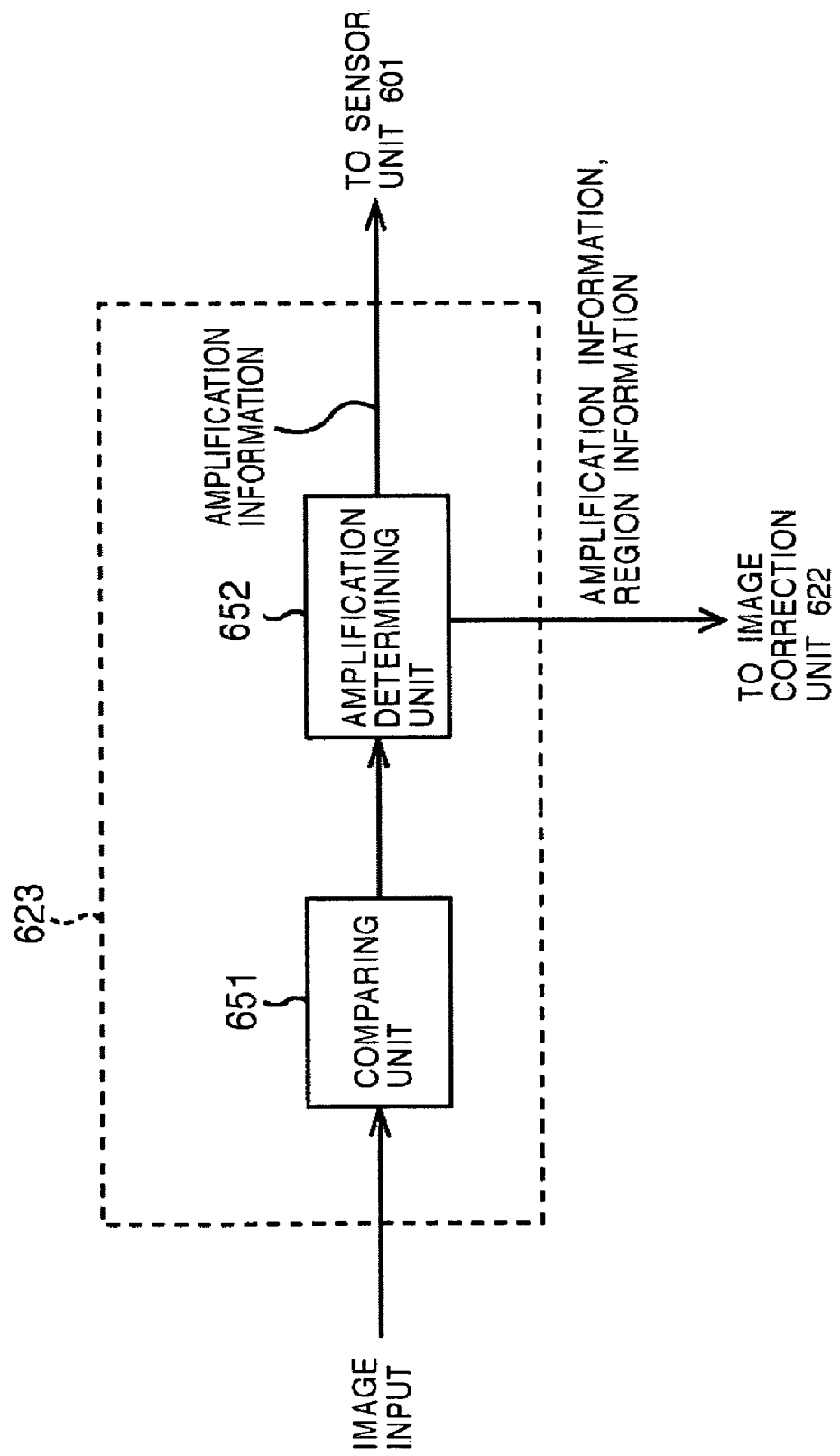
FIG. 53 is a block diagram illustrating a third configuration example of the level evaluating unit 623.

Next, FIG. 53 illustrates a third configuration arrangement of the level evaluation unit 623 shown in FIG. 47. In FIG. 53, the level evaluation unit 623 is configured of a comparing unit 651 and an amplification determining unit 652.

The first image signals supplied from the sensor unit 601 to the image processing unit 604 via the A/D converting unit 603 and the signal adjusting unit 602 are supplied to the comparing unit 651. The comparing unit 651 compares the first image signals in the one screen which is the increment of evaluation with a predetermined threshold value, and supplies the comparison results to the amplification determining unit 652. An example of a threshold value to be compared with the first image signals is a first threshold value which is a small value for serving as the object of image conversion processing at the image converting unit 621, and a second threshold value which is a large value for image conversion processing.

Also, examples of first image signals to compare with the first and second threshold values at the comparing unit 651 include arbitrary first image signals within the one screen which is the increment of evaluation, first image signals of the value of the greatest number of pixels in the one screen, the average value of the first image signals in the one screen, and so forth.

The amplification determining unit 652 evaluates the first image signals of the one screen which is the increment of evaluation according to the results of comparison with the threshold values supplied from the comparing unit 651, and determines an amplification corresponding to the evaluation to be the amplification at the control units 612 of the pixels corresponding to the one screen of image signals.

That is to say, in the event that the comparison results from the comparing unit 651 indicate that the first image signals are equal to or lower than the first threshold value, the amplification determining unit 652 makes evaluation that the first image signals of the one screen are not suitable for the image conversion processing at the image converting unit 621, and determines an amplification of a value higher than the current value to be the amplification at the control unit 612, based on the evaluation. Also, in the event that the comparison results from the comparing unit 651 indicate that the first image signals are equal to or higher than the second threshold value, the amplification determining unit 652 makes evaluation that the first image signals of the one screen are not suitable for the image conversion processing at the image converting unit 621, and determines an amplification of a value lower than the current value to be the amplification at the control unit 612, based on the evaluation. Further, in the event that the comparison results from the comparing unit 651 indicate that the first image signals are in a range between the first threshold value and the second threshold value, the amplification determining unit 652 makes evaluation that the first image signals of the one screen are suitable for the image conversion processing at the image converting unit 621, and determines the current amplification value to be the amplification at the control unit 612, based on the evaluation.

The amplification determining unit 652 then supplies the amplification information indicating the amplification which has been determined to the sensor unit 601 (the control units 612 thereof) as control signals, and also correlates the amplification information with the region information indicating the one screen which is the region made up of pixels of the sensor unit 601 where amplification at the amplification indicated by the amplification information is to be performed, and the correlated amplification information and region information are supplied to the image correcting unit 622 (FIG. 47).

In this case as well, image signals of a level suitable for the image conversion processing at the image converting unit 621 are output from the sensor unit 601, and consequently, second image signals with even higher image quality can be obtained from the image conversion processing.

Note that an arrangement may be made wherein comparison of the first image signals and the thresholds is executed in increments of single pixels, with the amplification being determined for each pixel according to the comparison results.

The configuration of the image converting unit 621 shown in FIG. 47 is the same as the configuration of the image converting unit 21 shown in FIG. 6, and accordingly, description thereof will be omitted (see FIGS. 6 through 10, and corresponding descriptions). Also, an arrangement may be made for the image-taking device wherein an operating unit 185 is provided as with the arrangement shown in FIG. 27, so that the configuration of the image converting unit 621 shown in FIG. 47 is the same as the configuration of the image converting unit 431 shown in FIG. 29 (see FIGS. 29 through 36, and corresponding descriptions). In the case of employing such an arrangement, the amplification indicated by the amplification information which the signal processing unit 604 supplies to the sensor unit 601 as a control signal can be corrected according to parameters, for example. That is, the amplification may be corrected such that the higher the resolution corresponding to the parameter is, the higher the amplification value is.

Figure 54:
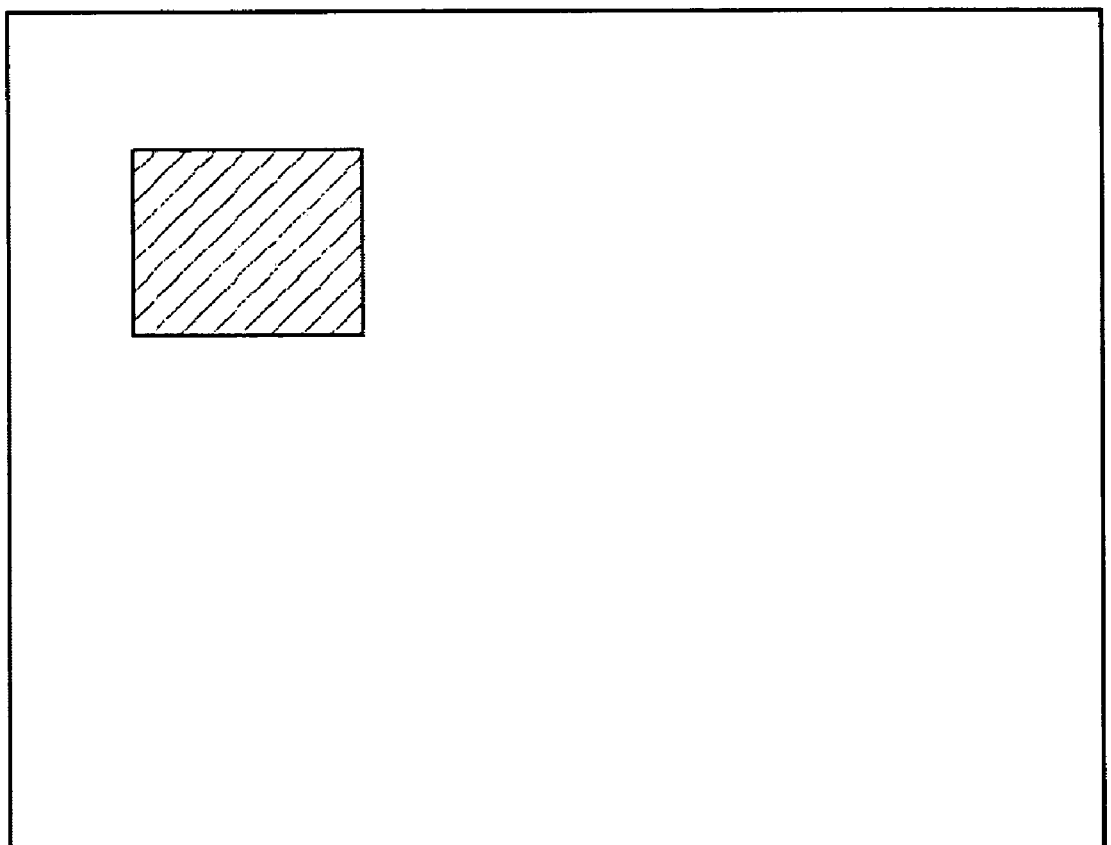
FIG. 54 is a diagram illustrating a region which is the object of image conversion processing.

Also, the above description has been made with reference to an example wherein the entirety of one frame or one field is converted from first image signals to second image signals in the image conversion processing, but an arrangement may be made wherein, for example, a partial region of one frame or one field is converted from first image signals to second image signals, as shown in FIG. 54.

The above-described series of processing by the signal processing unit 604 can be carried out by dedicated hardware, or with software. In the event of performing the series of processing with software, a program making up the software is installed in a micro-computer, a general-purpose computer, or the like, as described above with reference to FIG. 17.

Fifth Embodiment

Figure 55:
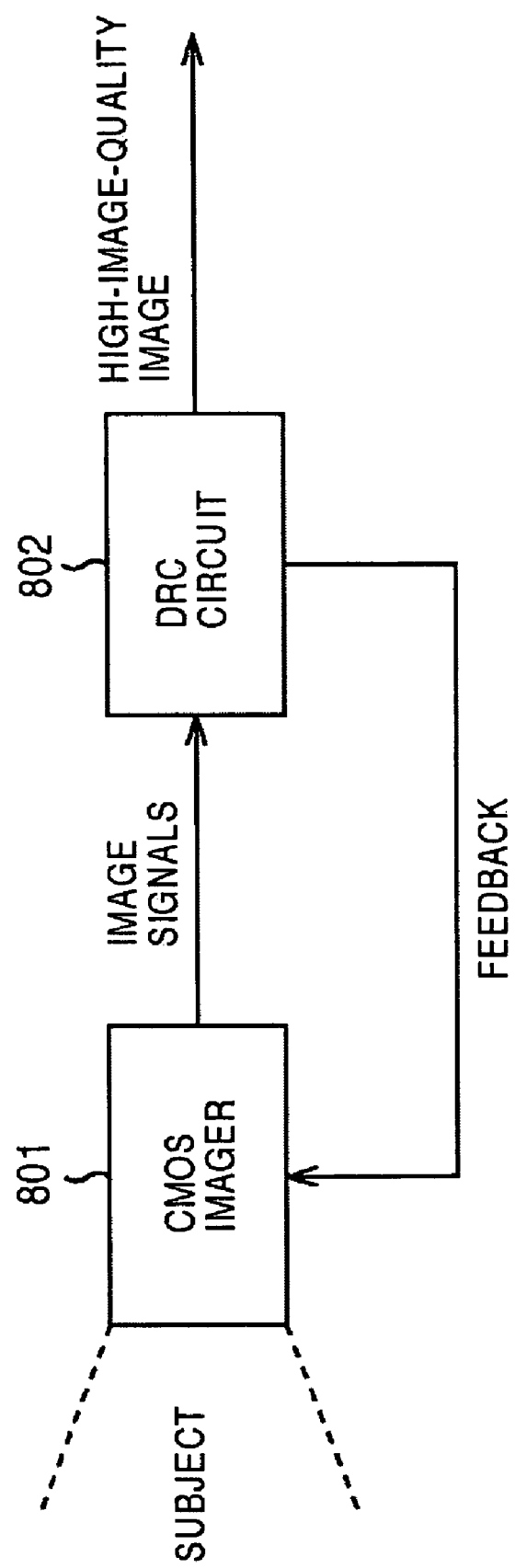
FIG. 55 is a block diagram illustrating a configuration example of a fifth embodiment of a sensor system to which the present invention has been applied.

Next, a fifth embodiment of the present invention will be described. FIG. 55 illustrates an embodiment of a sensor system to which the present invention has been applied. It should be noted that the term "system" as used here refers to a logical configuration of multiple devices, and has nothing to do with whether the component devices are within a single case or not.

This sensor system is configured of a CMOS imager 801 and a DRC (Digital Reality Creation) circuit 802, and senses light from a subject (subject light) and outputs high-image-quality image signals corresponding to the subject. That is to say, the CMOS imager 801 receives the subject light, and supplies image signals as electric signals corresponding to the amount of light received, to the DRC circuit 802.

The DRC circuit 802 performs signal processing on the image signals supplied from the CMOS imager 801, and obtains and outputs image signals with a higher image quality (hereafter referred to as "high-image-quality image signals" as appropriate). Further, the DRC circuit 802 controls the CMOS imager 801 based on the image signals supplied from the CMOS imager 801. Accordingly, the CMOS imager 801 is controlled so as to output image signals suitable for the signal processing performed at the DRC circuit 802.

Accordingly, with the sensor system in FIG. 55, the CMOS imager 801 outputs image signals suitable for signal processing performed at the DRC circuit 802, so the DRC circuit 802 can obtain high-image-quality image signals by performing signal processing on these image signals.

FIG. 56 illustrates a first configuration example of the DRC circuit 802 shown in FIG. 55. In FIG. 56, the DRC circuit 802 comprises a DRC unit 811 for performing signal processing on image signal output from the CMOS imager 801, and a control unit 812 for controlling the CMOS imager 801, according to the image signals supplied from the CMOS imager 801.

The DRC unit 811 performs various types of signal processing, one example thereof being image conversion processing for converting image signals from first image signals into second image signals. This image conversion processing can be realized by configurations the same as the above-described configurations for realizing image conversion processing, however, here, a case of using the CMOS imager 108 will be described including control of the CMOS imager 108, and it will be noted that parts of the description are the same as with the above descriptions.

Now, if we say that for example, the first image signals are low-resolution image signals and the second image signals are high-resolution image signals, the image conversion processing can be said to be resolution improving processing. Also, if we say that for example, the first image signals are low-S/N (Signal/Noise) image signals and the second image signals are high-S/N image signals, the image conversion processing can be said to be noise removal processing. Further, if we say that for example, the first image signals image signals of a predetermined size and the second image are signals are image signals greater or smaller than the size of the first image signals, the image conversion processing can be said to be image resizing (enlarging or reducing) processing. Accordingly, various kinds of processing can be realized by the image conversion processing, depending on how the first and second image signals are defined.

The DRC unit 811 takes the image signals output from the CMOS imager 108 as the first image signals, and converts the first image signals into high-image-quality image signals as the second image signals.

Now, at the DRC unit 811, the image signals supplied from the CMOS imager 108 are supplied to a prediction tap extracting unit 821 and class tap extracting unit 822 as the first image signals. The prediction tap extracting unit 821 sequentially takes the pixels making up the second image signals as a pixel of interest, and further, extracts several of the pixels (or rather, the pixel values thereof) making up the first image signals used for predicting the pixel value of the pixel of interest, as a prediction tap.

Specifically, with regard to a pixel of the first image signals corresponding to the pixel of interest (for example, a pixel in the first image signals at a position closest to the pixel of interest either space-wise or time-wise), the prediction tap extracting unit 821 extracts from the first image signals multiple pixels which are close either space-wise or time-wise, as a prediction tap.

The class tap extracting unit 822 extracts, as a class tap, several of the pixels making up the first image signals used for performing class classification for classifying the pixel of interest into one of several classes.

Now, a prediction tap and class tap may both have the same tap structure, or may have different tap structures. It should also be noted here that the class tap extracting unit 822 corresponds to the features extracting unit 122 shown in FIG. 6.

The prediction tap obtained at the prediction tap extracting unit 821 is supplied to the prediction computing unit 825, and the class tap obtained at the class tap extracting unit 822 is supplied to the class code generating unit 823.

A class code generating unit 823 classifies the pixel of interest into one of multiple classes, based on the level distribution of the pixels making up the class tap from the class tap extracting unit 822, and generates a class code corresponding to the class obtained as a result thereof, which is then supplied to a coefficient generating unit 824. It should be noted that the class code generating unit 823 corresponds to the class classification unit 123 shown in FIG. 6.

Class classification may be performed by employing ADRC or the like, for example, as described above. With the method using ADRC, the pixel values of the pixels making up the class tap are subjected to ADRC processing, and the class of the pixel of interest is determined following the resultant ARC code.

Now, with K-bit ADRC, for example, the maximum value MAX and minimum value MIN of components making up the vector amount representing the features of the class tap are detected, and with DR=MAX−MIN as a local dynamic range of a group, the components making up the features of the class tap are re-quantized into K bits based on this dynamic range DR. That is to say, the minimum value MIN is subtracted from the components making up the features of the class tap, and the subtracted value is divided (quantized) by $DR/2^K$. A bit string wherein the K-bit components making up the features of the class tap are arrayed according to a predetermined order is output as ADRC code. Accordingly, in the event that the vector amount representing the features of the class tap is subjected to 1-bit ADRC processing, each of the components making up the features of the class tap are divided by the average of the maximum value MAX and minimum value MIN (rounded off at the decimal), whereby each component becomes one bit (i.e., binarized). The bit string wherein the 1-bit components are arrayed in a predetermined order is output as the ADRC code. The class code generating unit 823 outputs the ADRC code obtained by ADRC processing of the features of the class tap for example, as the class code.

Now, the level distribution pattern of the pixels making up the class tap, for example, could be output to the class code generating unit 823 as the class code, without any change. However in this case, in the event that the class tap is made up of the pixel values of N pixels, and K bits are assigned to the pixel value of each pixel, the number of class codes output by the class code generating unit 823 would be $(2^N)^K$, a very great number exponentially proportionate to the number of bits K of the pixel value of the pixels.

Accordingly, at the class code generating unit 823, class classification is preferably performed by compressing the amount of class tap information with the above-described ADRC processing, vector quantization, or the like.

Now, a class tap is obtained from the image signals output from the CMOS imager 801 at the class tap extracting unit 822, and class code is obtained therefrom at the class code generating unit 823. Accordingly, it can be said that the class tap extracting unit 822 and class code generating unit 823 make up a class classification unit for performing class classification.

A coefficient generating unit 824 stores tap coefficients for each class obtained by learning, and from the tap coefficients stored, supplies (outputs) tap coefficients stored at an address corresponding to the class code supplied from the class code generating unit 823 (tap coefficients of the class which the class code supplied from the class code generating unit 823 indicates) to a prediction computing unit 825. Now, a tap coefficient is equivalent to a coefficient which is multiplied with input data in a so-called tap in a digital filter.

The prediction computing unit 825 obtains the prediction tap which the prediction tap extracting unit 821 outputs, and the tap coefficient which the coefficient generating unit 824 outputs, and performs predetermined prediction computation for obtaining a prediction value of the true value of the pixel of interest, using the prediction tap and the tap coefficient. Accordingly, the prediction computing unit 825 outputs the prediction value of the pixel value of the pixel of interest, i.e., the pixel value of the pixel making up the second image signals.

The control unit 812 controls the CMOS imager 801 according to the level distribution of image signals output from the CMOS imager 801. More specifically, class code of a class tap extracted from the image signals which the CMOS imager 801 outputs is supplied from the class code generating unit 823 to the control unit 812. At the control unit 812, the DL (Delay Line) 826 temporarily stores the class code supplied from the class code generating unit 823, and supplies the stored class code to a motion amount control unit 827. The motion amount control unit 827 controls the CMOS imager 801 according to the class code supplied from the DL 826.

Now, the class code generating unit 823 generates class code by subjecting class taps to ADRC processing for example, as described above. This class code is a string of re-quantized values wherein the pixel value of multiple pixels making up the class tap extracted from the image signals output from the CMOS imager 801 have been re-quantized, and accordingly can be said to be representing the multiple pixels making up the class tap, i.e., the level distribution of the image signals output from the CMOS imager 801. Accordingly, it can be said that the motion amount control unit 827 which controls the CMOS imager 801 according to the class code controls the CMOS imager 801 according to the level distribution of image signals which the CMOS imager 801 has output.

Figure 57B:
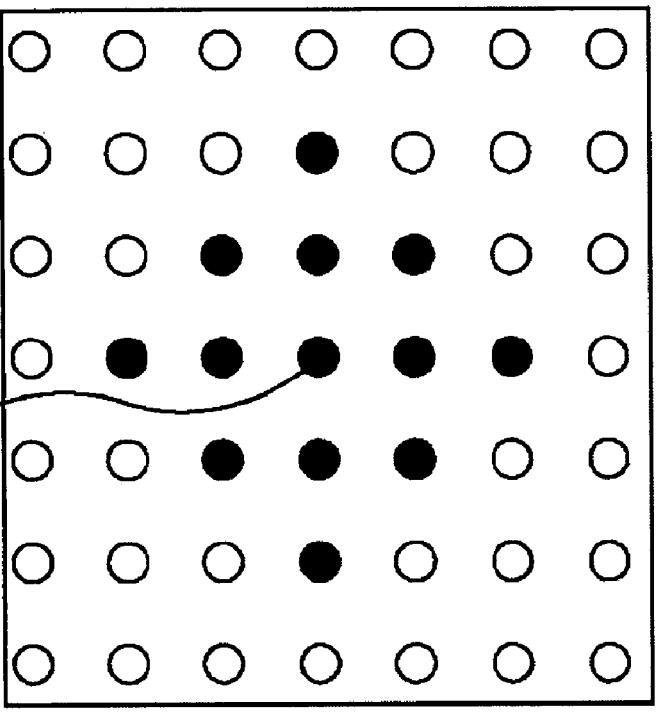
FIGS. 57A and 57B are diagrams illustrating a class tap and a prediction tap, respectively.
Figure 57A:
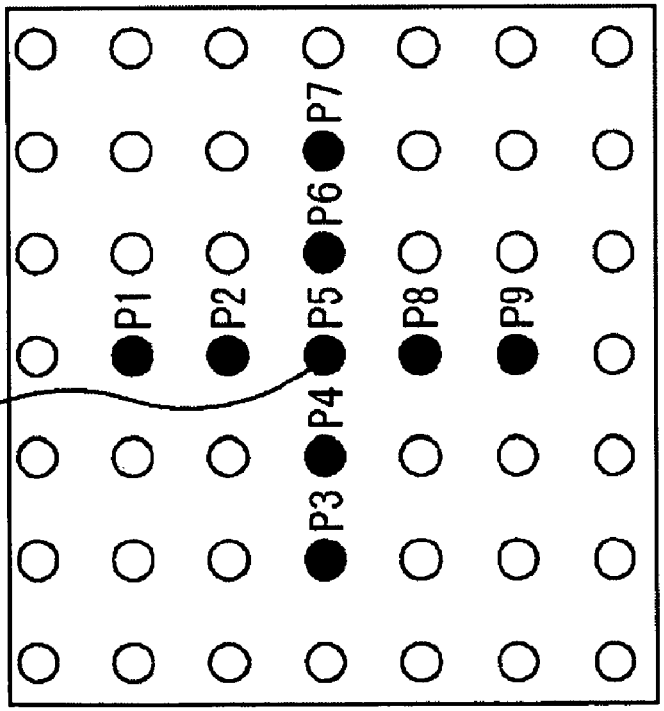

Next, FIGS. 57A and 57B illustrate examples of the tap structures of a prediction tap and a class tap, respectively. FIG. 57A illustrates an example of the tap structure of a class tap. The example shown here in FIG. 57A has a class tap configured of nine pixels. That is to say, with the example in FIG. 57A, a cross-shaped class tap is configured of a pixel corresponding to the pixel of interest in the image signals output from the CMOS imager 801, and two adjacent pixels each in the upward, downward, left, and right directions thereof.

FIG. 57B illustrates an example of the tap structure of a prediction tap. The example shown here in FIG. 57B has a prediction tap configured of 13 pixels. That is to say, with the example in FIG. 57B, a diamond-shaped class tap is configured of a pixel corresponding to the pixel of interest in the image signals output from the CMOS imager 801, two pixels each in the upward, downward, left, and right directions thereof, and one pixel each in the four diagonal directions.

Figure 9:
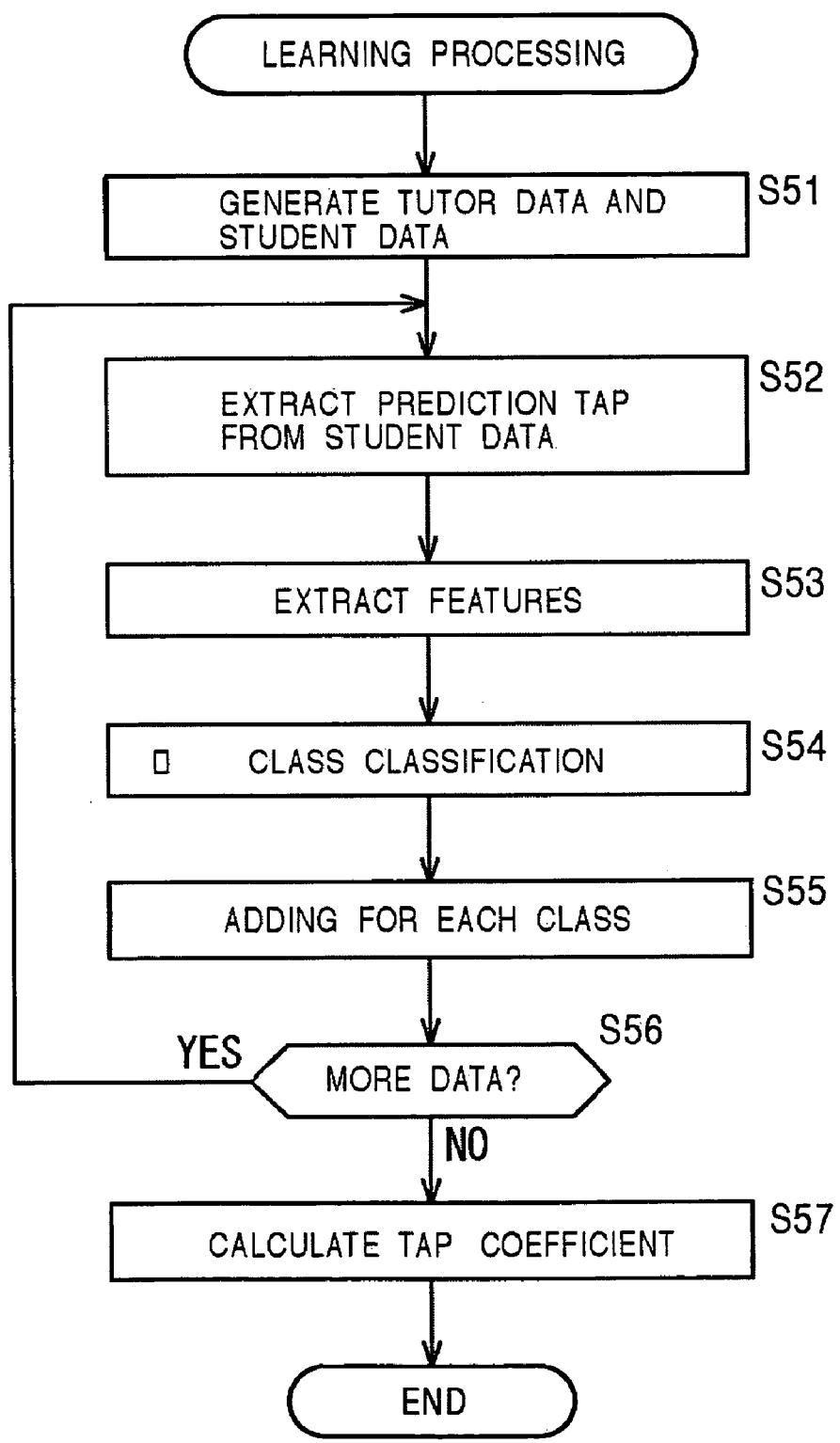
FIG. 9 is a flowchart describing learning processing for learning tap coefficients.

The prediction computation at the prediction computing unit 825 shown in FIG. 56 is the same processing as that of the computing unit 125 shown in FIG. 6, and description thereof will be omitted here, since the learning of tap coefficients used in the prediction computation can be carried out in the same way with the learning of the tap coefficients stored in the coefficient memory 181 in FIG. 7 (see FIGS. 8 through 10).

The configuration of the corresponding learning device is the same as the learning device shown in FIG. 8, however it should be noted that the features extracting unit 136 configures class taps of the same tap configuration as those which the class tap extracting unit 822 configures, which are supplied to the class classification unit 137. The class classification unit 137 then generates the same class code as that with the class code generating unit 823.

Figure 58B:
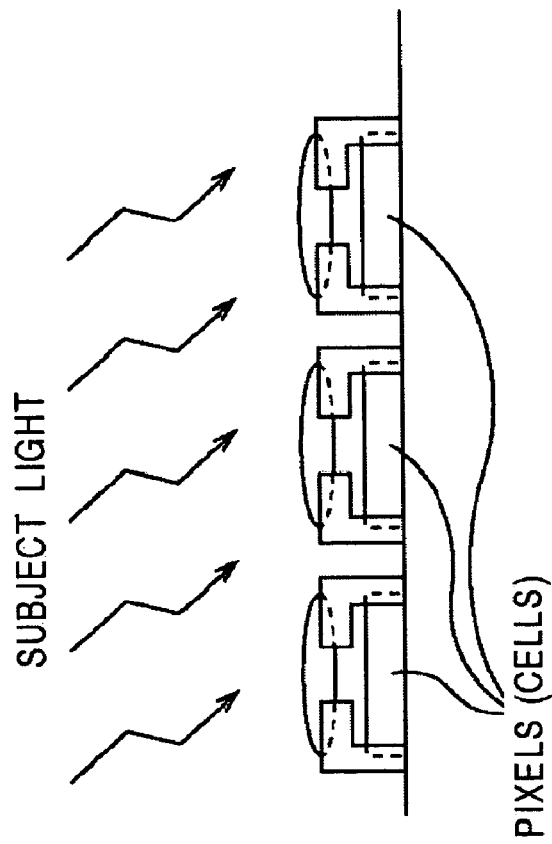
FIGS. 58A through 58C are diagrams illustrating a configuration example of a sensor system to which the present invention has been applied.
Figure 58C:
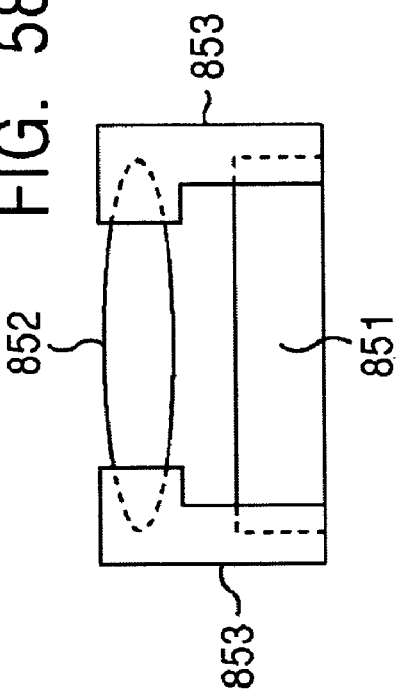
Figure 58A:
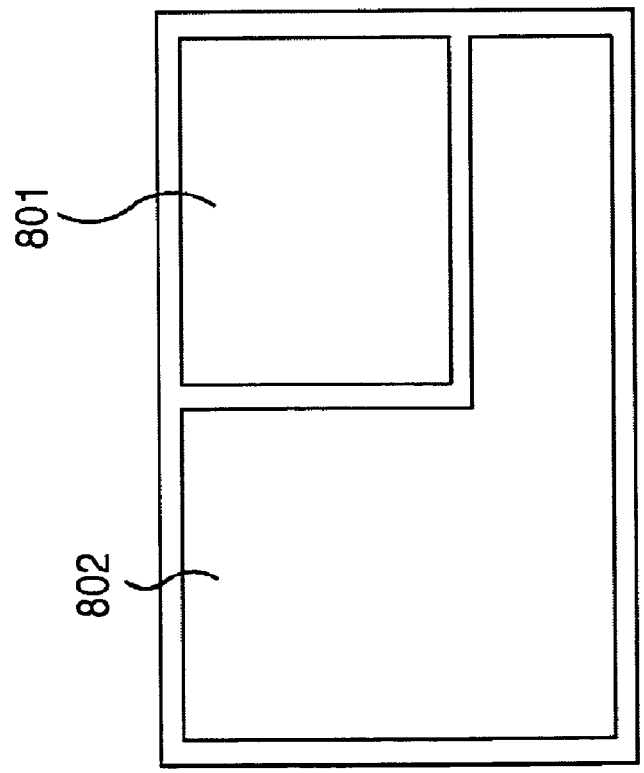

Next, FIGS. 58A through 58C illustrate a configuration example of the sensor system shown in FIG. 55. FIG. 58A is a plan view of the sensor system shown in FIG. 55.

The sensor system is configured on a single chip, by semi-conductor process for example. In FIG. 58A, the CMOS imager 801 is formed on the upper right portion of the one chip, and the DRC circuit 802 and the other electric circuits are configured in the other portions.

As shown in FIG. 58B, the CMOS imager 801 has a great number of so-called cells arrayed in a lattice layout, these cells being equivalent to pixels. Each of the pixels of the CMOS imager 801 has a photodiode 851, condensing lens 852, and MEMS unit 853, as shown in FIG. 58C.

The photodiode 851 receives light cast therein, and generates and outputs electric signals corresponding to the amount of light received. Each of the electric signals output by the photodiodes 851 are pixel values of the individual pixels.

The condensing lens 852 is a so-called on-chip lens, and is disposed at a position facing the photoreception face of the photodiode 851. The condensing lens 852 condenses the light, and emits the condensed light onto the photodiode 851. Condensing the light at the condensing lens 852 and emitting to the photodiode 851 allows the usage efficiency of light at the photodiode 851 to be improved.

The MEMS unit 853 is a movable part configured with MEMS technology, and holds the condensing lens 852. Driving the MEMS unit 853 moves the position of the condensing lens 852 as to the photoreception face of the photodiode 851.

Note that though the pixels of the CMOS imager 801 each have electronic circuits such as an amplifier and so forth, these are omitted from the illustration.

The motion amount control unit 827 of the control unit 812 shown in FIG. 56 controls the position of the condensing lens 852 by driving the MEMS unit 853. With this in mind, control of the position of the condensing lens 852 with the motion amount control unit 827 will be described with reference to FIGS. 59A through 60B.

Figure 59A:
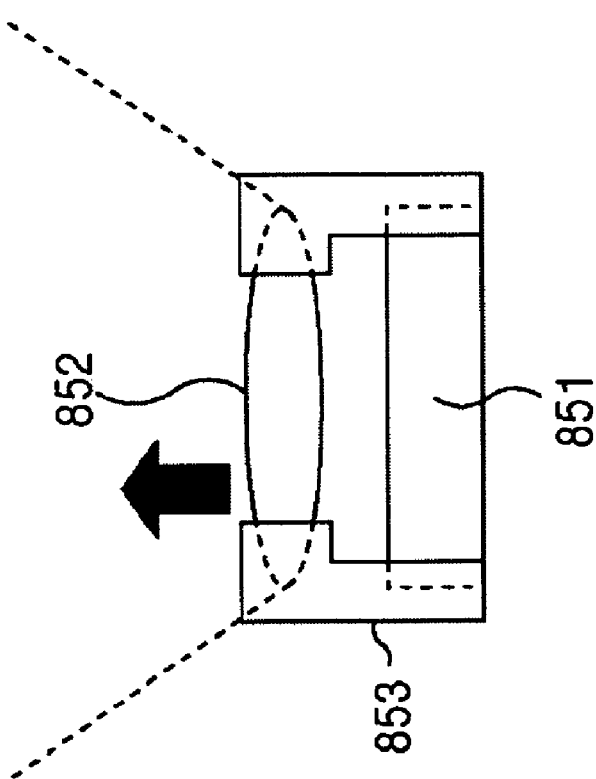
FIGS. 59A and 59B are diagrams describing the control of the position of a condenser lens 852.
Figure 59B:
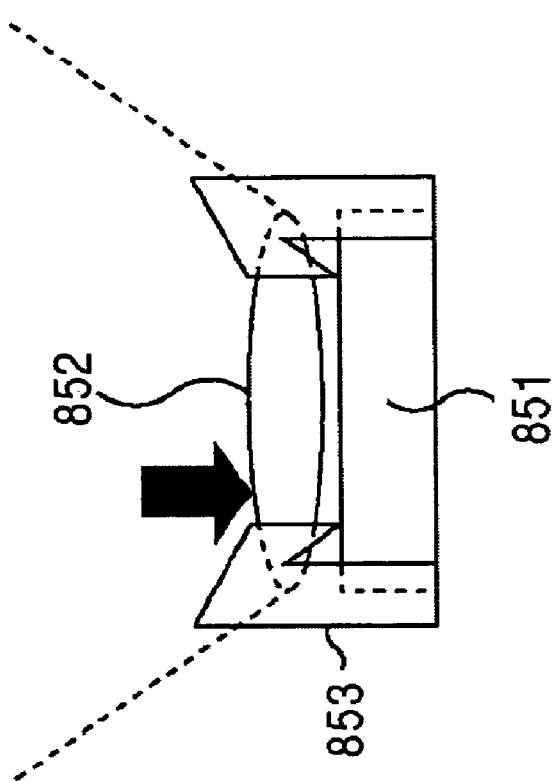

Now, as shown in FIGS. 59A and 59B, The position of the condensing lens 852 can be moved to a position close to the photodiode 851 and a position away from the photodiode 851, by driving the MEMS unit 853, i.e., two positions. Further, in the event that the position of the condensing lens 852 is away from the photodiode 851 as shown in FIG. 59A, subject light of a narrow range is emitted from the condensing lens 852 onto the photodiode 851. Also, in the event that the position of the condensing lens 852 is close to the photodiode 851 as shown in FIG. 59B, subject light of a wide range is emitted from the condensing lens 852 onto the photodiode 851. Also, the relation between the position of the condensing lens 852 and the range of the subject light emitted from the condensing lens 852 onto the photodiode 851 may be the opposite as described above.

The subject light emitted from the condensing lens 852 is received with the photodiode 851, and electric signals approximately proportionate to the integral value of the amount of light received are output as pixel values. Thus, the amount of light received is integrated at the photodiode 851 and taken as the pixel value, so minute changes in the subject light are lost in the pixel value (i.e., quantized). The minute changes in the subject light being lost in the pixel value will also be referred to as "integration effect" as appropriate. The wider the range of the subject light received at the photodiode 851 is, the greater the integration effect is, meaning that more minute changes in the subject light are lost, and an image with low resolution (an image with some motion blurring) is obtained.

In the event that the image corresponding to the subject light is a flat image with little change in level (flat portion), noise becomes conspicuous. Accordingly, in this case, receiving the subject light over a wide area with the photodiode 851 allows the noise contained in the image from the pixel values output from the photodiode 851 to be reduced due to the integration effect.

Also, in the event that the image corresponding to the subject light is an image with fairly great change in level (non-flat portion), receiving the subject light over a wide area with the photodiode 851 dulls the great level change due to the integration effect, and the resolution deteriorates. Accordingly, in this case, receiving the subject light over a narrow are a with the photodiode 851 reflects the great level change in subject light in the image from the pixel values output from the photodiode 851 in a relatively true manner.

On the other hand, in the signal processing performed by the DRC unit 811 (image conversion processing), a prediction tap is configured from pixel values output from the photodiode 851 and a pixel of interest (or the pixel value thereof) is predicted by computation using the prediction tap thereof. Accordingly, in the event that noise is included in the pixel in a prediction tap configured (extracted) from a smooth image, the prediction precision of the pixel of interest deteriorates. Also, in the event that the pixels in the prediction tap had originally have great change in level but have been taken as image pixels with the level change thereof dulled, the prediction precision of the pixel of interest deteriorates.

That is to say, with smooth (flat) images, in order to perform suitable signal processing so that the pixel of interest can be predicted with high precision and high-image-quality image signals obtained at the DRC unit 811, a prediction tap needs to be configured from pixels with little noise. Also, with images with great change in level, the prediction tap needs to be configured from pixels faithfully reflecting the change in level.

As described above, causing the photodiode 851 to receive subject light over a wide range enables noise contained in the image from the pixel values output by the photodiode 851 to be reduced. Also, causing the photodiode 851 to receive subject light over a narrow range enables great changes in level in the subject light to be faithfully reflected in the image from the pixel values output by the photodiode 851.

Accordingly, the photodiode 851 is caused to receive subject light over a wide range for smooth images, and photodiode 851 is caused to receive subject light over a narrow range for with images with great change in level of the subject light, thereby predicting the pixel of interest with high precision at the DRC unit 811, whereby suitable image processing can be carried out such that image signals with even higher image quality can be obtained.

Accordingly, the motion amount control unit 827 controls the position of the condensing lens 852 according to the class code supplied from the class code generating unit 823 via the DL 826, as follows.

FIGS. 60A and 60B illustrate examples of class code output from the class code generating unit 823. FIG. 60A illustrates class code obtained by performing 1-bit ADRC processing on the cross-shaped class tap shown in FIG. 57A. Also, FIG. 60B illustrates the pixel values P1 through P9 of the nine pixels making up the class tap shown in FIG. 57A, arrayed in a single row in the order of pixel P1 through P9.

With 1-bit ADRC processing, the pixel values of the pixels making up the class tap are re-quantized with the average value of the maximum value of the pixels making up the class tap (maximum pixel value) MAX and the minimum value thereof (minimum pixel value) MIN. That is to say, pixel values smaller than the average of the maximum value MAX and minimum value MIN become 0, and pixel values equal to or greater than this average value become 1.

Accordingly, with a class tap extracted from a smooth portion of the image, the change in the pixel values of the pixels P1 through P9 making up the class tap is small, so a class code wherein there is almost no bit inversion at adjacent bits, such as "000000001" as in FIG. 60A, for example.

On the other hand, with class taps extracted from portions of the image where there is great change, the change in the pixel values of the pixels P1 through P9 making up the class tap is great, so a class code is obtained wherein the number of times of bit inversion at adjacent bits, such as "1011010101", as in FIG. 60B, for example.

Accordingly, looking at the class code, a smooth image can be recognized in the event that the number of times of bit inversion at adjacent bits is small, and great change in level can be recognized in the event that the number of times of bit inversion at adjacent bits is great.

Accordingly, in the event that that the number of times of bit inversion at adjacent bits is small in the class code, the image of pixel values to be obtained with the photodiode 851 is smooth, so the motion amount control unit 827 controls the position of the condensing lens 852 to a position close to the photodiode 851 as shown in FIG. 59B, such that the photodiode 851 receives subject light over a wide range. Also, in the event that that the number of times of bit inversion at adjacent bits is great in the class code, the image of pixel values to be obtained with the photodiode 851 has a great level of change, so the motion amount control unit 827 controls the position of the condensing lens 852 to a position away from the photodiode 851 as shown in FIG. 59A, such that the photodiode 851 receives subject light over a narrow range.

Figure 61:
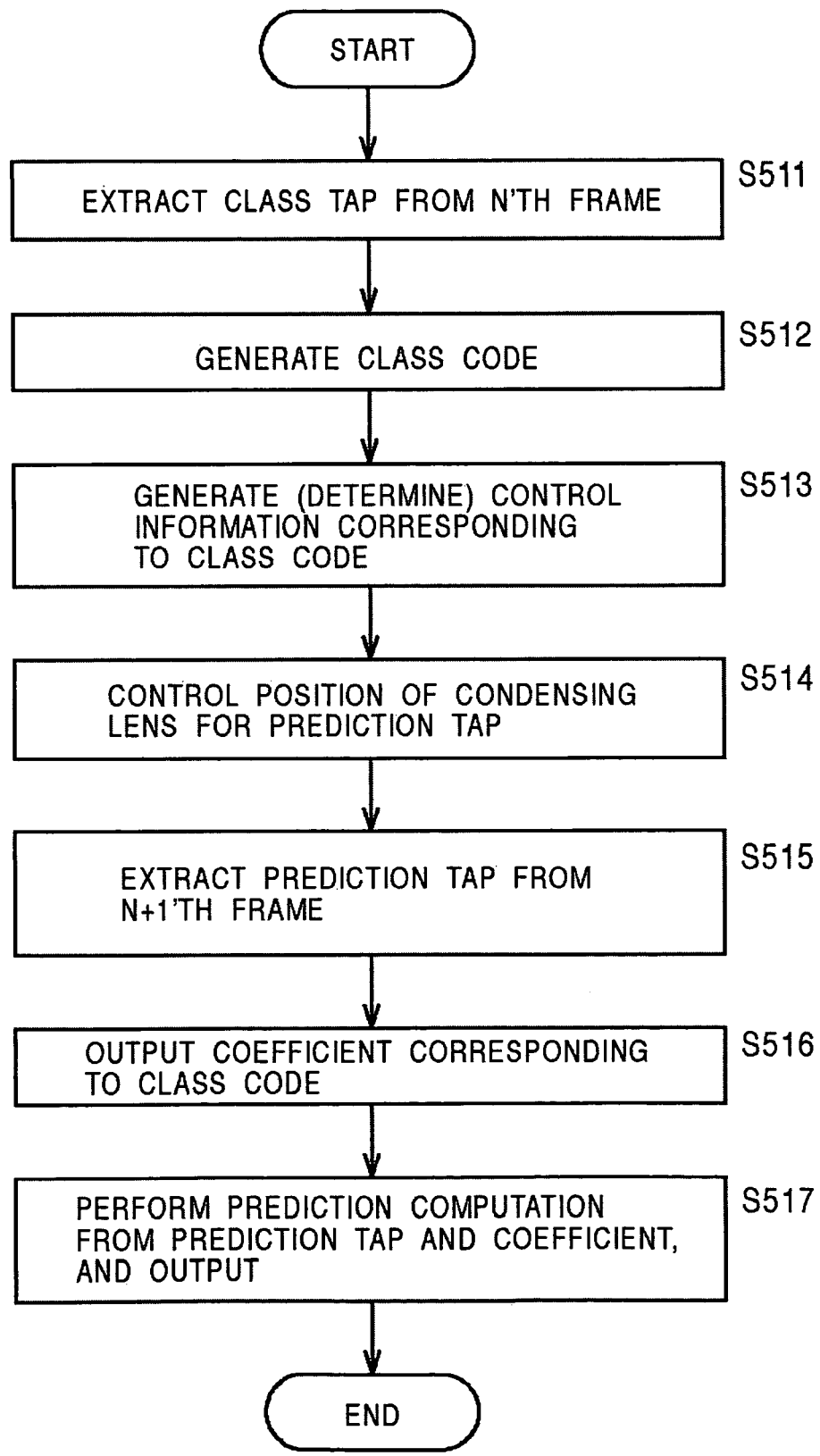
FIG. 61 is a flowchart describing the processing of the DRC circuit 802.

Next, the signal processing at the DRC circuit 802 shown in FIG. 56 will be shown with reference to FIG. 61. Note here that the DRC unit 811 takes a certain pixel in the N+1'th frame (or field) as the pixel of interest, and predicts this pixel of interest.

In this case, upon the image signals of the N'th frame being output from the CMOS imager 801, in step S511 the class tap extracting unit 822 extracts pixels in a cross-shape centered on a pixel at a position closest to the position of the pixel of interest from the N'th frame of image signals output from the CMOS imager 801 as a class tap of the pixel of interest (FIG. 57A) and supplies the extracted pixels to the class code generating unit 823, and the flow proceeds to step S512. That is to say, here, the class tap of the pixel of interest of the image signals of the N+1'th frame is extracted from the image signals of the N'th frame, which is one frame back.

In step S512, the class code generating unit 823 obtains the class code of the pixel of interest by performing 1-bit ADRC processing of the class tap supplied from the class tap extracting unit 822, and supplies this to the coefficient generating unit 824, as well as supplying this to the motion amount control unit 827 via the DL 826, and the flow proceeds to step S513.

In step S513, the motion amount control unit 827 generates control information for controlling the position of the condensing lens 852 corresponding to the class code supplied via the DL 826, and the flow proceeds to step S514. In step S514, the motion amount control unit 827 follows the control information generated in the immediately preceding step S513 to control the MEMS unit 853 at the pixels making up the prediction tap of the pixel of interest thereby moving the condensing lens 852 of that pixel to a position close to the photodiode 851 or a position away from the photodiode 851.

Subsequently, at the imaging timing of the N+1'th frame, upon image signals of the N+1'th frame being imaged and output at the CMOS imager 801, the flow proceeds from step S514 to step S515, and the prediction tap extracting unit 821 extracts pixels in a diamond shape centered on a pixel at a position closest to the position of the pixel of interest from the image signals of the N+1'th frame output from the CMOS imager 801 as a prediction tap of the pixel of interest (FIG. 57B), which is supplied to the prediction computing unit 825, and the flow proceeds to step S516.

That is to say, in step S514, the MEMS unit 853 at a pixel serving as the prediction tap of the pixel of interest is controlled whereby the position of the condensing lens 852 of that pixel is controlled. Accordingly, in step S515, the prediction tap of the pixel of interest is made up of pixel values output from the photodiodes 851 of pixels regarding which the position of the condensing lens 852 has been controlled in this way.

In step S516, the coefficient generating unit 824 outputs a tap coefficient indicated by the class code of the pixel of interest supplied from the class code generating unit 823. That is to say, the coefficient generating unit 824 stores the tap coefficients for each class obtained beforehand by learning in the above-described learning device for example, and accordingly reads out the tap coefficient of the class indicated by the class code of the pixel of interest from the tap coefficients for each class, and outputs the tap coefficient to the prediction computing unit 825.

The flow then proceeds from step S516 to step S517, where the prediction computing unit 825 performs the computation of the above Expression (1) using the prediction tap supplied from the prediction tap extracting unit 821 and the tap coefficient supplied from the coefficient generating unit 824, thereby obtaining the pixel value of interest, and the processing ends.

The above-described processing is sequentially performed with each pixel in the N+1'th frame as a pixel of interest, and further, regarding the N+2'th frame, and so on.

Note that the arrangement described above involves the class tap of the pixel of interest being extracted from the N'th frame which is one frame prior to the N+1'th frame, but the class tap of the pixel of interest may be arranged to be extracted from the image signals of the N+1'th frame which is the frame of the pixel of interest.

Also, there may be cases within an N+1'th frame wherein the condensing lens 852 of the same pixel of the CMOS imager 801 is controlled to different positions in a case that a certain pixel #A is the pixel of interest and in a case wherein a pixel #B close to that pixel is the pixel of interest. This can be resolved by imaging the image signals of the N+1'th frame in time sequence for the position of the condensing lens 852 of the pixel in the case that the pixel #A is the pixel of interest and the position of the condensing lens 852 of the pixel in the case that the pixel #B is the pixel of interest, at the CMOS imager 801.

Further, the arrangement describe here involves the position of the condensing lens 852 being controlled by controlling the MEMS unit 853 at a pixel to be the prediction tap of the pixel of interest, but arrangements may be made wherein, for example, the position of the condensing lens 852 of only the pixel closest to the pixel of interest is controlled, or wherein the position of the condensing lenses 852 of all pixels within a certain range from the pixel of interest are controlled, or the like.

Figure 62:
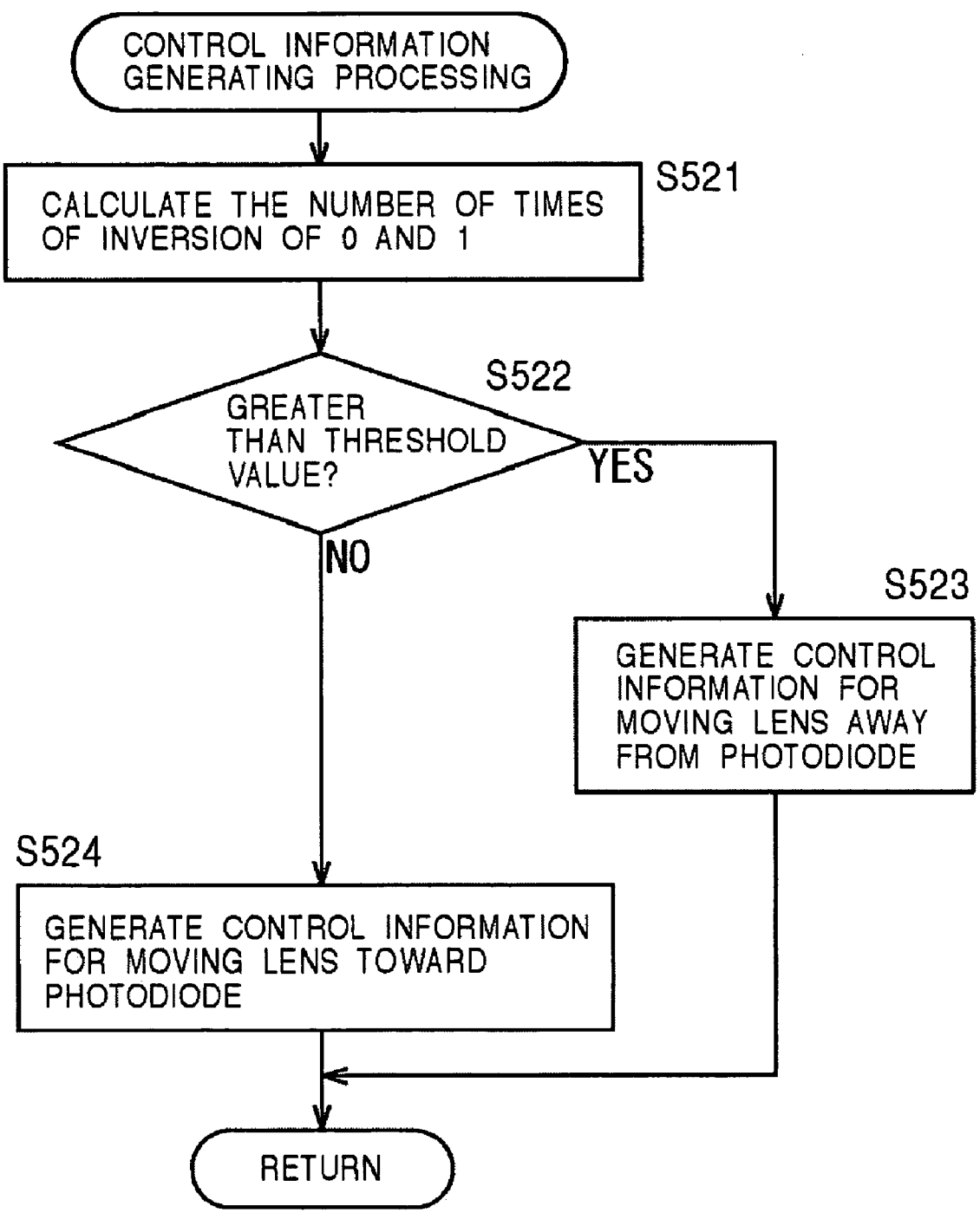
FIG. 62 is a flowchart describing control information generation processing.

Next, the processing in step S513 in FIG. 61 (control information generating processing for generating control information corresponding to the class code) will be described in detail, with reference to the flowchart in FIG. 62.

First, in step S521, the motion amount control unit 827 calculates the number of times of bit inversion at adjacent bits in the class code of the pixel of interest, and the flow proceeds to step S522.

In the event that the class code is, for example, "000000001" as shown in FIG. 60A, there is only on inversion from 0 to 1 at the 8th and 9th bits, so the number of times of bit inversion calculated here is 1. Also, in the event that the class code is, for example, "101101010" as shown in FIG. 60B, there is inversion from 1 to 0 at the 1st and 2nd bits, there is inversion from 0 to 1 at the 2nd and 3rd bits, there is inversion from 1 to 0 at the 4th and 5th bits, there is inversion from 0 to 1 at the 5th and 6th bits, there is inversion from 1 to 0 at the 6th and 7th bits, there is inversion from 0 to 1 at the 7th and 8th bits, and there is inversion from 1 to 0 at the 8th and 9th bits, so the number of times of bit inversion calculated here is 7.

In step S522, the motion amount control unit 827 determines whether or not the number of times of bit inversion in the class code of the pixel of interest is greater than a predetermined threshold. In the event that the class code is 9 bits as in the above case (or in the event that the number of pixels making up the class tap is nine pixels), the predetermined threshold employed may be 3 or the like, for example.

In the event that the number of times of bit inversion in the class code of the pixel of interest is determined to be greater than the predetermined threshold value, i.e., in the event such as shown in FIG. 60B wherein the class code is "101101010" so the number of times of bit inversion is 7 which is greater than the predetermined threshold value of 3, the flow proceeds to step S523, and the motion amount control unit 827 takes this to mean that the change in level near the position of the pixel of interest of the image imaged with the CMOS imager 801 is great, and accordingly generates control information to control the position of the condensing lens 852 to a position away from the photodiode 851, i.e., a position whereby subject light of a narrow range is cast into the photodiode 851, and the flow returns.

In the event that the number of times of bit inversion in the class code of the pixel of interest is determined to be not greater than the predetermined threshold value, i.e., in the event such as shown in FIG. 60B wherein the class code is "000000001" so the number of times of bit inversion is 1 which is not greater than the predetermined threshold value of 3, the flow proceeds to step S524, and the motion amount control unit 827 takes this to mean that the level near the position of the pixel of interest of the image imaged with the CMOS imager 801 is smooth, and accordingly generates control information to control the position of the condensing lens 852 to a position close to the photodiode 851, i.e., a position whereby subject light of a wide range is cast into the photodiode 851, and the flow returns.

While description has been made here regarding an arrangement wherein class code obtained from the class tap is used as information indicating the level distribution near the position of the pixel of interest in the image imaged by the CMOS imager 801, other arrangements may be made besides arrangements using class taps, such as an arrangement using multiple arbitrary pixels near a prediction tap or a like pixel of interest, as information indicating the level distribution near the position of the pixel of interest.

Also, in the case described above, control of the condensing lens 852 was made to one of two positions by controlling the MEMS unit 853, i.e., a position close to the photodiode 851 and a position away therefrom, but the position of the condensing lens 852 may be controlled to three positions, or more.

Figure 63A:
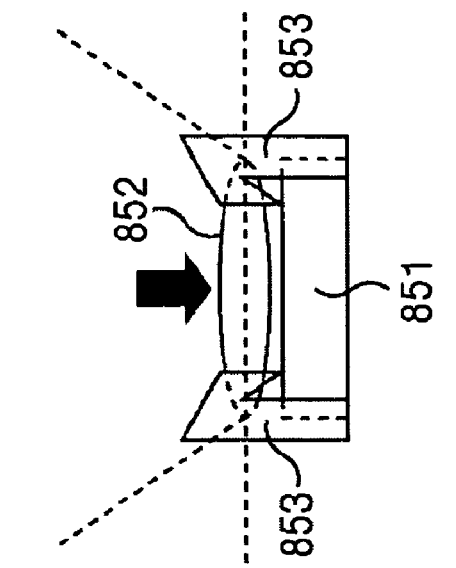
FIGS. 63A through 63C are diagrams describing control of the position of the condenser lens 852.
Figure 63B:
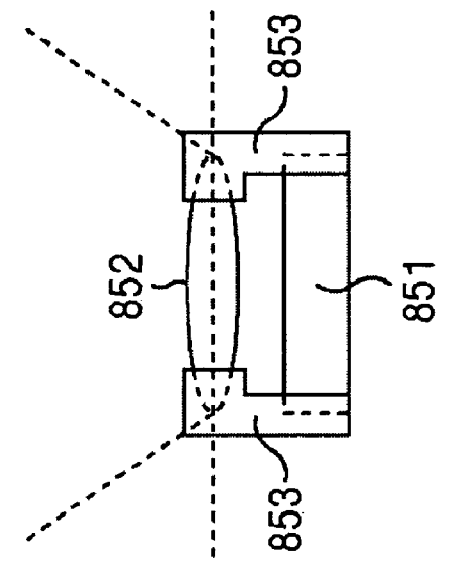
Figure 63C:
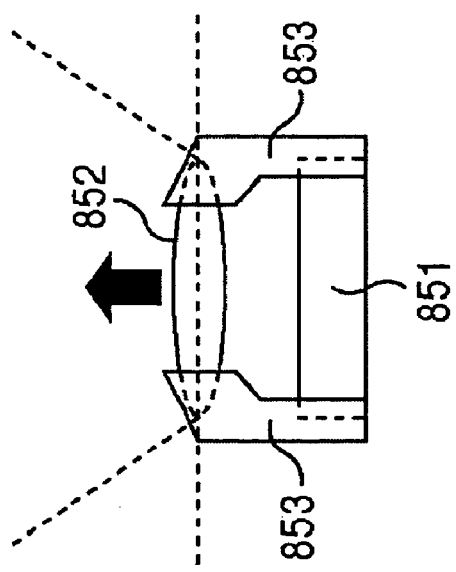

FIGS. 63A through 63C illustrate an arrangement wherein the position of the condensing lens 852 is controlled to one of three positions with a position a certain distance from the photodiode 851 serving as a standard position, the three positions being the standard position, a position close to the photodiode 851, and a position away from the photodiode 851.

It should be understood in this arrangement as well, the farther the position of the condensing lens 852 is from the photodiode 851, the narrower a range of subject light is emitted from the condensing lens 852 to the photodiode 851, and the closer the position of the condensing lens 852 is to the photodiode 851, the wider a range of subject light is emitted from the condensing lens 852 to the photodiode 851.

The motion amount control unit 827 still controls the position of the condensing lens 852 corresponding to class code, in the case of controlling the position of the condensing lens 852 to one of the three positions of the standard position, the position close to the photodiode 851, and the position away from the photodiode 851, as shown in FIGS. 63A through 63C.

That is to say, in the event that the number of times of bit inversion in the class code is small, and accordingly the area around the position of the pixel of interest in the image signals output from the CMOS imager 801 is a smooth portion, the motion amount control unit 827 controls the position of the condensing lens 852 to a position closer to the photodiode 851 as shown in FIG. 63C, so as to cast a wide range of subject light on the photodiode 851. Also, in the event that the number of times of bit inversion in the class code is great, and accordingly the area around the position of the pixel of interest in the image signals output from the CMOS imager 801 has great change in level, the motion amount control unit 827 controls the position of the condensing lens 852 to a position farther from the photodiode 851 as shown in FIG. 63A, so as to cast a narrow range of subject light on the photodiode 851. Moreover, in the event that the number of times of bit inversion in the class code is neither great nor small, and accordingly the change in level at the area around the position of the pixel of interest in the image signals output from the CMOS imager 801 is neither great nor small, i.e. intermediate, the motion amount control unit 827 controls the position of the condensing lens 852 to the standard position as shown in FIG. 63B, so as to cast a range of subject light on the photodiode 851 which is neither wide nor narrow, i.e., intermediate.

Figure 64:
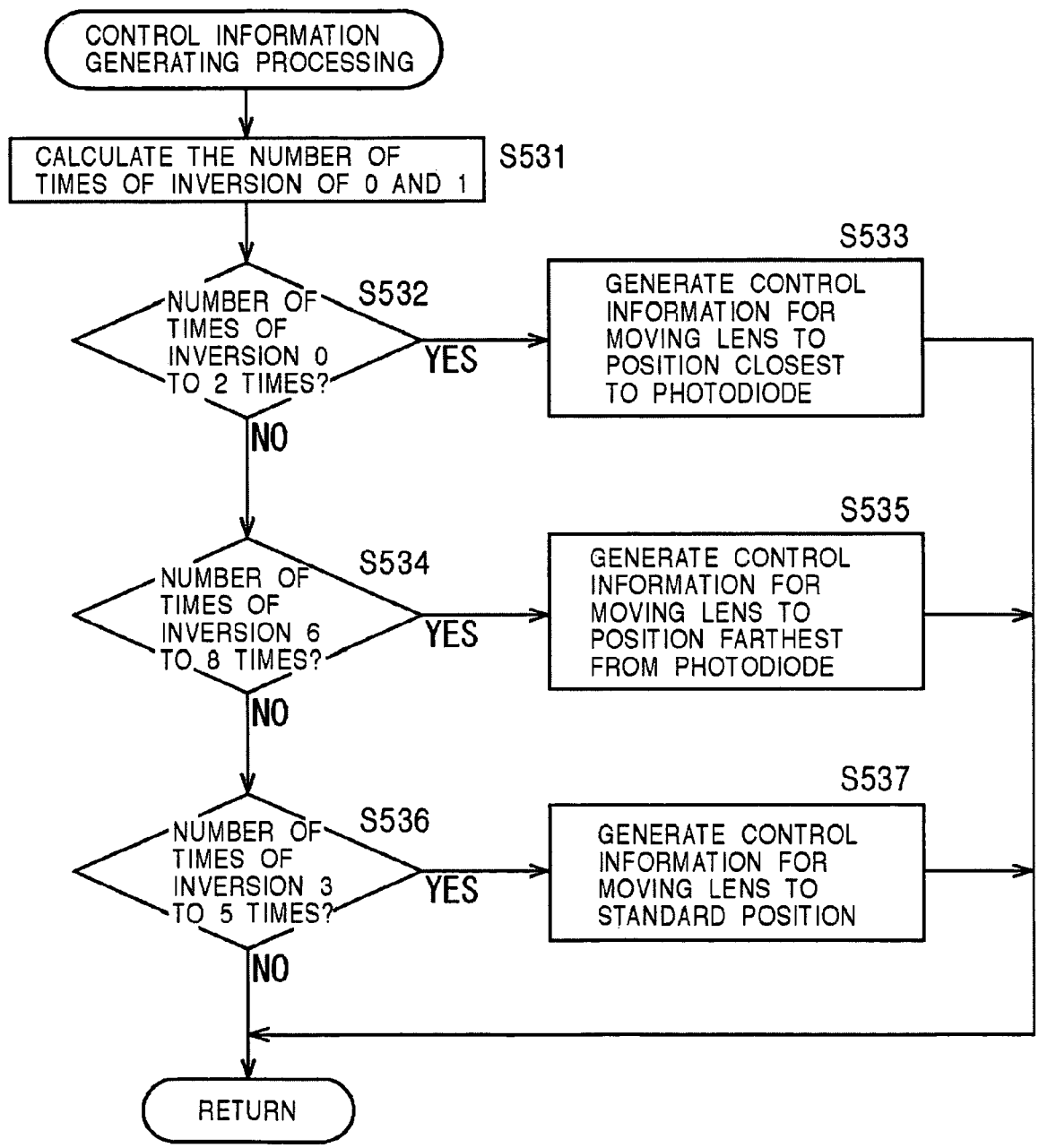
FIG. 64 is a flowchart describing control information generation processing.

Next, the control information generating processing in step S513 in FIG. 61 wherein position of the condensing lens 852 is controlled to one of the three positions of the standard position, the position close to the photodiode 851, and the position away from the photodiode 851, as in FIGS. 63A through 63C, will be described with reference to the flowchart in FIG. 64.

First, in step S531, the motion amount control unit 827 calculates the number of times of bit inversion of the adjacent bits in the class code of the pixel of interest, and the flow proceeds to step S532. Let us say here that the number of bits making up the class code is nine, the same as with the example in FIG. 62. In this case, the minimum number of times of bit inversion in the class code is 0, and the maximum number of times is 8.

In step S532, the motion amount control unit 827 determines whether or not the number of times of bit inversion in the class code of the pixel of interest is relatively small, e.g., in a range of 0 to 2 times.

In the event that the number of times of bit inversion in the class code of the pixel of interest is determined to be in a range of 0 to 2 times in step S532, the flow proceeds to step S533, where the motion amount control unit 827 takes the amount of change in level near the position of the pixel of interest in the image imaged with the CMOS imager 801 to be small, and accordingly generates control information to control the position of the condensing lens 852 to a position close to the photodiode 851, i.e., a position whereby subject light of a wide range is cast into the photodiode 851, and the flow returns.

In step S532, in the event that the number of times of bit inversion in the class code of the pixel of interest is determined not to be in a range of 0 to 2 times, the flow proceeds to step S534, and the motion amount control unit 827 determines whether or not the number of times of bit inversion in the class code of the pixel of interest is relatively great, e.g., in a range of 6 to 8 times.

In the event that the number of times of bit inversion in the class code of the pixel of interest is determined to be in a range of 6 to 8 times in step S534, the flow proceeds to step S535, where the motion amount control unit 827 takes the amount of change in level near the position of the pixel of interest in the image imaged with the CMOS imager 801 to be great, and accordingly generates control information to control the position of the condensing lens 852 to a position away from the photodiode 851, i.e., a position whereby subject light of a narrow range is cast into the photodiode 851, and the flow returns.

In step S534, in the event that the number of times of bit inversion in the class code of the pixel of interest is determined not to be in a range of 6 to 8 times, the flow proceeds to step S536, and the motion amount control unit 827 determines whether or not the number of times of bit inversion in the class code of the pixel of interest is neither great nor small, e.g., in a range of 3 to 5 times.

In the event that the number of times of bit inversion in the class code of the pixel of interest is determined to be in a range of 3 to 5 times in step S536, the flow proceeds to step S537, where the motion amount control unit 827 takes the amount of change in level near the position of the pixel of interest in the image imaged with the CMOS imager 801 to be neither great nor small, and accordingly generates control information to control the position of the condensing lens 852 to the reference position, i.e., an intermediate position as to the photodiode 851 whereby subject light of an intermediate range is cast into the photodiode 851, and the flow returns.

Also, in step S536, in the event that the number of times of bit inversion in the class code of the pixel of interest is determined not to be in a range of 6 to 8 times, the motion amount control unit 827 handles this as an error and returns without generating control information. In this case, the position of the condensing lens 852 is maintained at the same position as before, for example.

In the event of having a 9-bit class code and controlling the position of the condensing lens 852 according to the number of times of bit inversion in the class code, the positions of the condensing lens 852 can be as many as nine.

Figure 65:
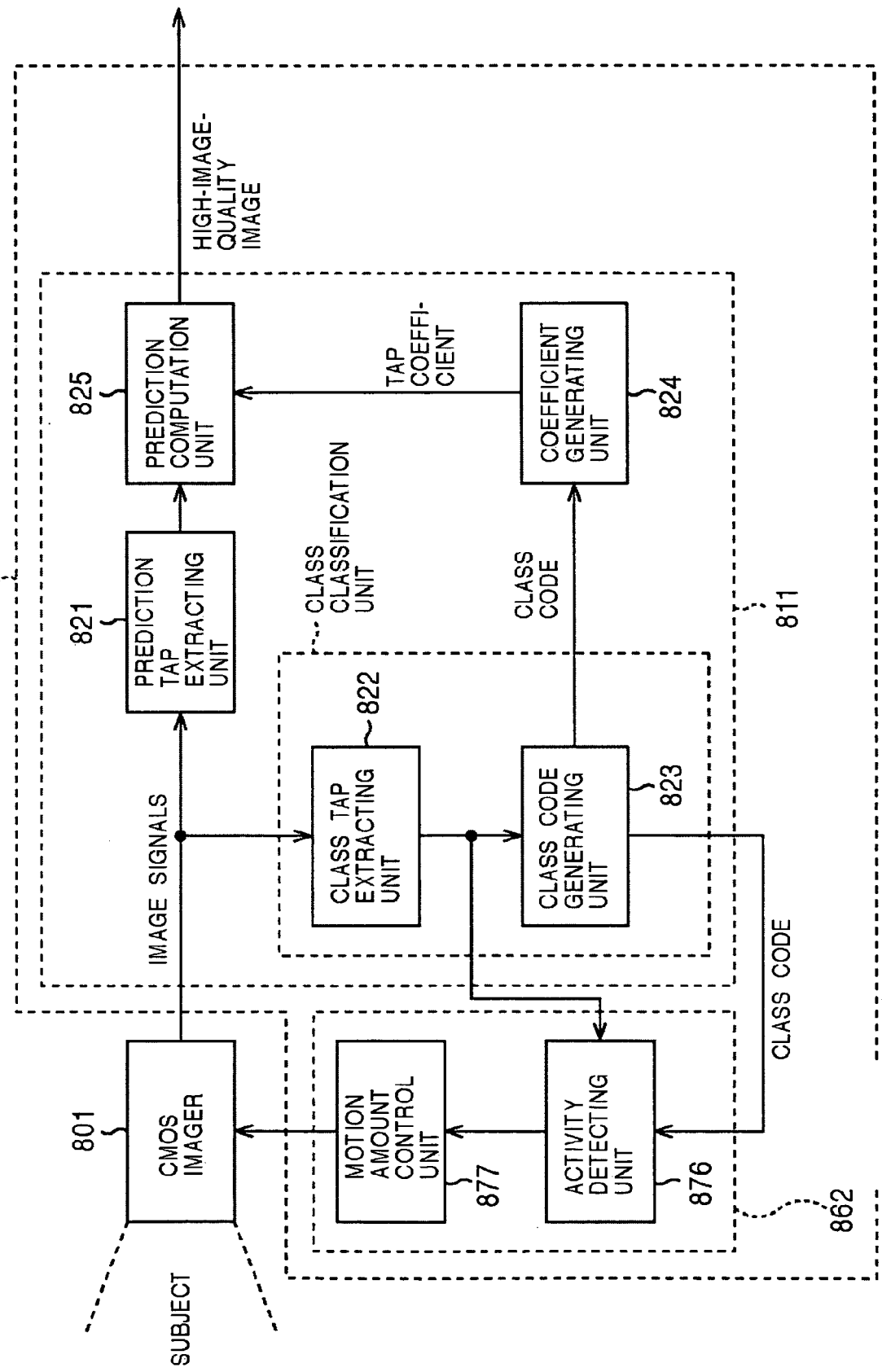
FIG. 65 is a block diagram illustrating a second configuration example of the DRC circuit 802.

Next, FIG. 65 illustrates a second configuration example of the DRC circuit 802 shown in FIG. 55. The components in FIG. 65 which are the same as the components shown in FIG. 56 are denoted with the same reference numerals, and description thereof will be omitted as appropriate. That is to say, the DRC circuit 802 shown in FIG. 65 is configured basically the same as the DRC circuit 802 shown in FIG. 56, other than a control unit 862 being provided instead of the control unit 812. The control unit 862 comprises an activity detecting unit 876 and a motion amount control unit 877.

The activity detecting unit 876 is supplied with the class tap of the pixel of interest which the class tap extracting unit 822 outputs. The activity detecting unit 876 detects the activity near the position of the pixel of interest in the image signals which the CMOS imager 801 outputs, from the class tap of the pixel of interest supplied from the class tap extracting unit 822, and supplies the activity to the motion amount control unit 877. Examples of the activity here include the dynamic range of the pixels making up the class tap of the pixel of interest (the difference between the maximum and minimum value of the pixels making up the class tap), the sum of absolute values of difference between adjacent pixels making up the class tap of the pixel of interest, the sum of absolute values of difference between each of the pixels making up the class tap of the pixel of interest and the average thereof, and so forth. In this arrangement, the dynamic range of the pixels making up the class tap of the pixel of interest, for example, will be used as the activity.

The motion amount control unit 877 controls the CMOS imager in the same way as the motion amount control unit 827 in FIG. 56, according to the activity supplied from the activity detecting unit 876. That is to say, the motion amount control unit 877 controls the position of the condensing lens 852 of the pixels in he prediction tap of the pixel of interest, according to the activity supplied from the activity detecting unit 876.

Figure 66B:
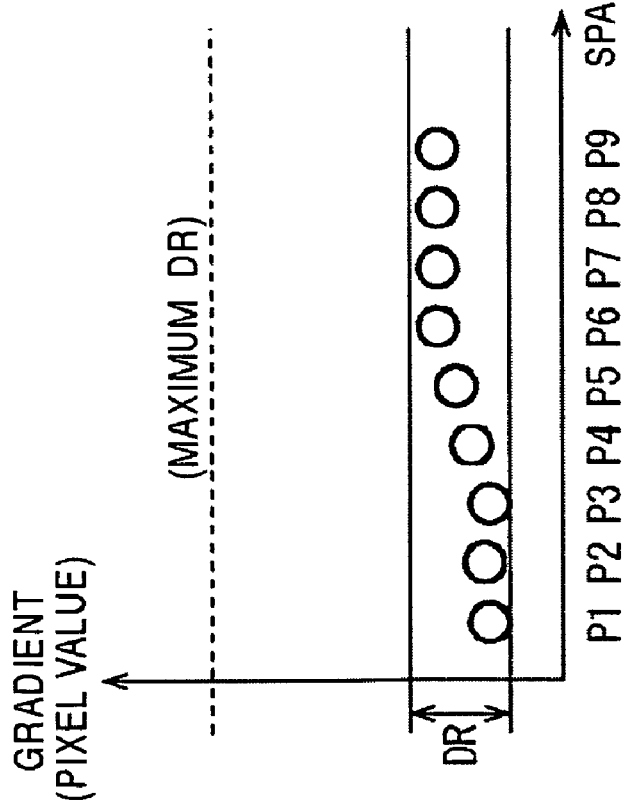
FIGS. 66A and 66B are diagrams describing the dynamic range of class taps.
Figure 66A:
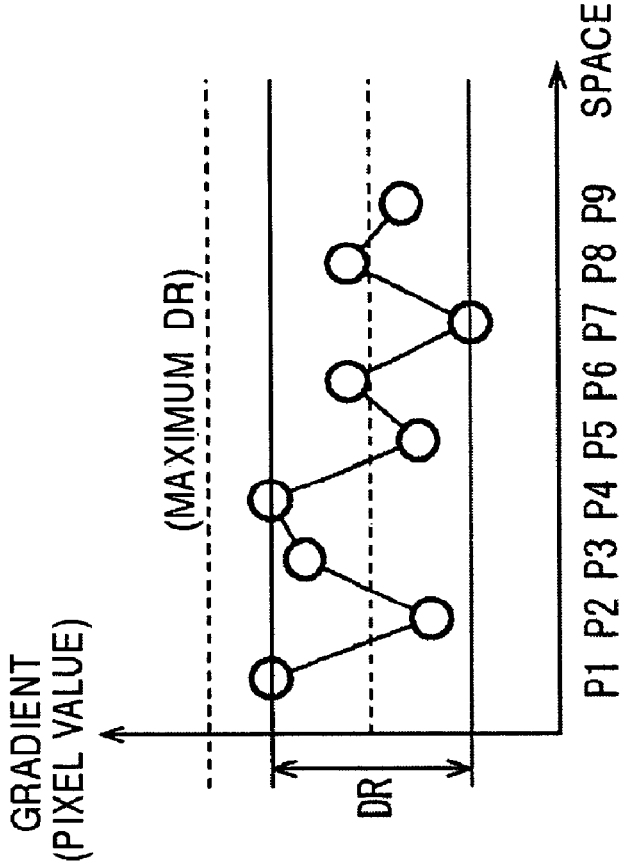

FIGS. 66A and 66B illustrate examples of a class tap output from the class tap extracting unit 822, with the pixel values P1 through P9 of the nine pixels making up the class tap shown in FIG. 57A, arrayed in a single row in the order of pixel P1 through P9.

With a class tap extracted from a smooth portion of the image, the change in the pixel values of the pixels P1 through P9 making up the class tap is small, so the dynamic range DR is a small value as shown in FIG. 66A, for example.

On the other hand, with a class tap extracted from a portion of the image with great change, the change in the pixel values of the pixels P1 through P9 making up the class tap is great, so the dynamic range DR is a great value as shown in FIG. 66B, for example.

Accordingly, in the event that the dynamic range of the class tap is small, a smooth image can be recognized, and in the event that the dynamic range of the class tap is great, an image with a great change in level can be recognized.

Thus, in the event that the dynamic range of the class tap is small, and accordingly the image of image values obtained with the photodiode 851 is smooth, the motion amount control unit 877 controls the position of the condensing lens 852 to a position closer to the photodiode 851 as shown in FIG. 59B, so as to cast a wide range of subject light on the photodiode 851. Also, in the event that the dynamic range of the class tap is great, and accordingly the image of image values obtained with the photodiode 851 has great change in level, the motion amount control unit 877 controls the position of the condensing lens 852 to a position away from the photodiode 851 as shown in FIG. 59A, so as to cast a narrow range of subject light on the photodiode 851.

Figure 67:
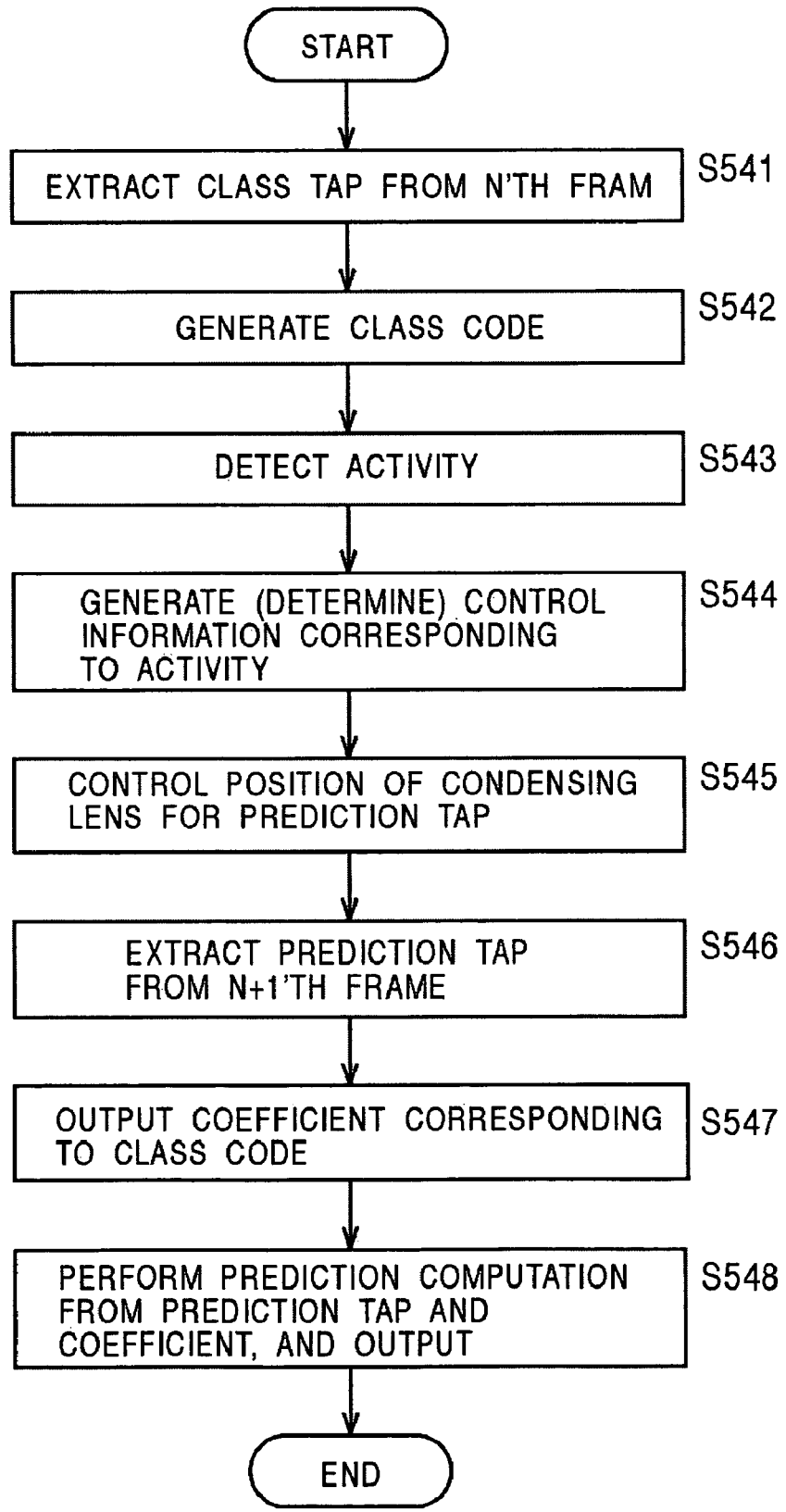
FIG. 67 is a flowchart describing processing of the DRC circuit 802.

Next, the signal processing at the DRC circuit 802 shown in FIG. 65 will be described with reference to the flowchart in FIG. 67. Here, as with the case in FIG. 61, the DRC unit 811 takes a certain pixel in the N+1'th frame (or field) as the pixel of interest, and predicts this pixel of interest.

In this case, upon the image signals of the N'th frame being output from the CMOS imager 801, in step S541 the class tap extracting unit 822 extracts pixels in a cross-shaped centered on a pixel at a position closest to the position of the pixel of interest from the N'th frame of image signals output from the CMOS imager 801 as a class tap of the pixel of interest (FIG. 57A) and supplies this to the class code generating unit 823 and activity detecting unit 876, and the flow proceeds to step S542. That is to say, here as well, the class tap of the pixel of interest of the N+1'th frame is extracted from the image signals of the N'th frame, which is one frame back, as with the case in FIG. 61.

In step S542, the class code generating unit 823 obtains the class code of the pixel of interest by performing 1-bit ADRC processing of the class tap supplied from the class tap extracting unit 822, and supplies this to the coefficient generating unit 824, and the flow proceeds to step S543.

In step S543, the activity detecting unit 876 detects the dynamic range of the class tap of the pixel of interest from the class tap extracting unit 822 as the activity, supplies this to the motion amount control unit 877, and the flow proceeds to step S544.

In step S543, the motion amount control unit 877 generates (determines) control information for controlling the position of the condensing lens 852 in accordance with the dynamic range of the class tap supplied from the activity detecting unit 876, and the flow proceeds to step S545. In step S545, the motion amount control unit 877 controls the MEMS units 853 of the pixels making up the prediction tap of the pixel of interest according to the control information generated in step S543 which is the immediately preceding step, thereby moving the condensing lens 852 of that pixel to the predetermined position.

Subsequently, at the imaging timing of the N+1'th frame, upon image signals of the N+1'th frame being imaged and output at the CMOS imager 801, the flow proceeds from step S545 to step S546, and the prediction tap extracting unit 821 extracts pixels in a diamond shape centered on a pixel at a position closest to the position of the pixel of interest from the image signals of the N+1'th frame output from the CMOS imager 801 as a prediction tap of the pixel of interest (FIG. 57B), which is supplied to the prediction computing unit 825, and the flow proceeds to step S547.

That is to say, in step S545, the MEMS unit 853 at a pixel serving as the prediction tap of the pixel of interest is controlled whereby the position of the condensing lens 852 of that pixel is controlled. Accordingly, in step S546, the prediction tap of the pixel of interest is made up of pixel values output from photodiodes 851 of pixels regarding which the position of the condensing lens 852 has been controlled in this way.

In step S547, the coefficient generating unit 824 outputs a class tap coefficient indicating the class code of the pixel of interest supplied from the class code generating unit 823 to the prediction computing unit 825, and the flow proceeds to step S548, where the prediction computing unit 825 performs the computation of the above Expression (1) using the prediction tap supplied from the prediction tap extracting unit 821 and the tap coefficient supplied from the coefficient generating unit 824, thereby obtaining the pixel value of the pixel of interest, and the processing ends.

The above-described processing is sequentially performed with each pixel in the N+1'th frame as a pixel of interest, and further, regarding the N+2'th frame, and so on.

Note that the arrangement described above involves the class tap of the pixel of interest being extracted from the image signals of the N'th frame which is one frame prior to the N+1'th frame, but the class tap of the pixel of interest may be arranged to be extracted from the image signals of the N+1'th frame which is the frame of the pixel of interest.

Also, there may be cases within an N+1'th frame wherein the condensing lens 852 of the same pixel of the CMOS imager 801 is controlled to different positions in a case that a certain pixel #A is the pixel of interest and in a case wherein a pixel #B close to that pixel is the pixel of interest. This can be resolved by imaging the image signals of the N+1'th frame in time sequence for the position of the condensing lens 852 of the pixel in the case that the pixel #A is the pixel of interest and the position of the condensing lens 852 of the pixel in the case that the pixel #B is the pixel of interest, at the CMOS imager 801. Or, priority may be given to the position of the condensing lens 852 corresponding to a pixel serving as the pixel of interest before or afterwards.

Further, the arrangement describe here involves the position of the condensing lens 852 being controlled by controlling the MEMS unit 853 at a pixel to be the prediction tap of the pixel of interest, but arrangements may be made wherein, for example, the position of the condensing lens 852 of only the pixel closest to the pixel of interest is controlled, or wherein the position of the condensing lenses 852 of all pixels within a certain range from the pixel of interest are controlled, or the like.

Figure 68:
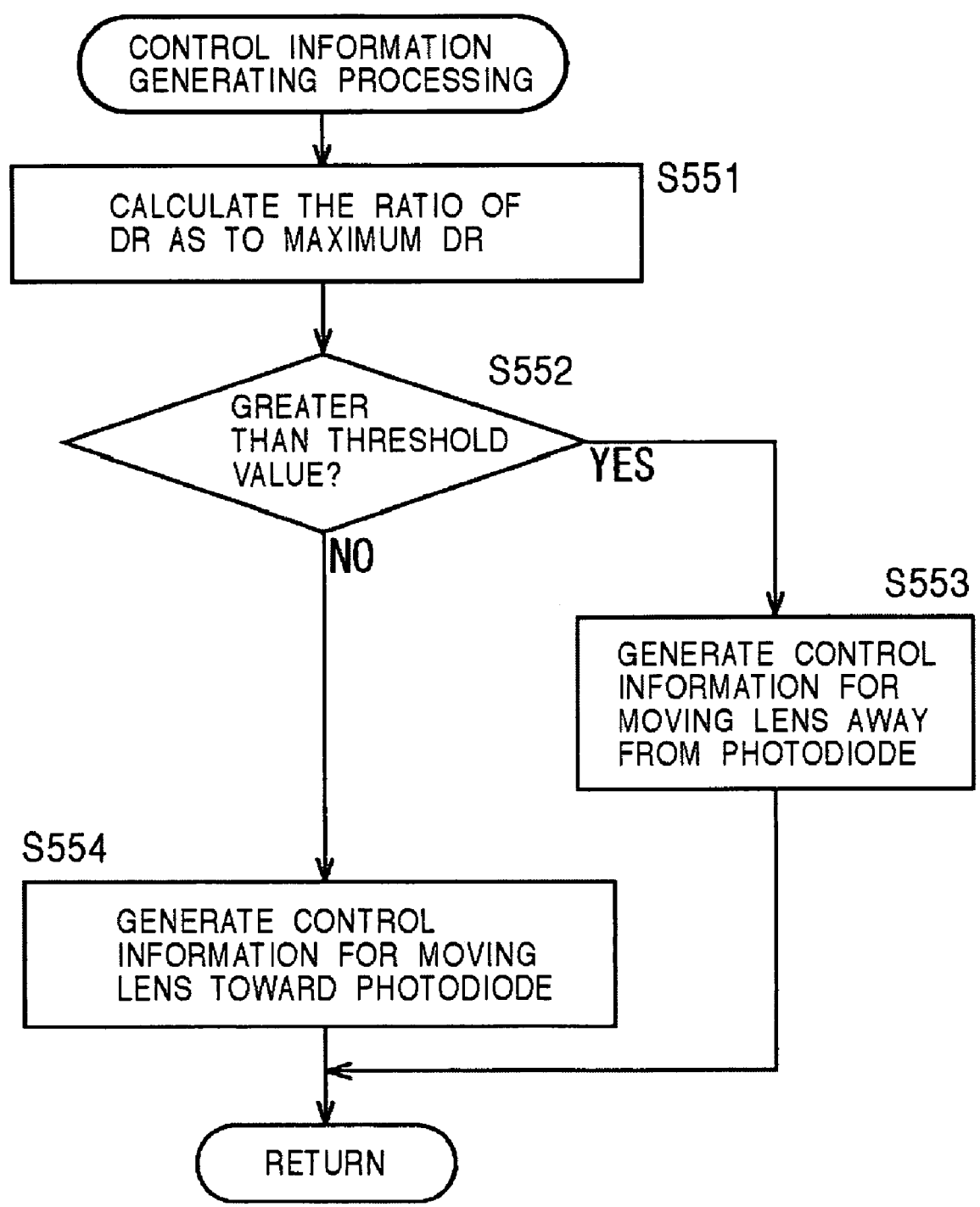
FIG. 68 is a flowchart describing control information generation processing.

Next, the processing in step S544 in FIG. 67 (control information generating processing for generating control information corresponding to the activity of the class tap) will be described with regard to a case of controlling the position of the condensing lens to one or the other of two positions, close to or away from the photodiode 851 as with the case illustrated in FIG. 59, with reference to the flowchart in FIG. 68.

First, in step S551, the motion amount control unit 877 normalizes the dynamic range of the class tap of the pixel of interest with the maximum dynamic range, and the flow proceeds to step S552. That is to say, the motion amount control unit 877 divides the dynamic range of the class tap with the maximum dynamic range which is the difference between the greatest and smallest values which the image signals output from the CMOS imager 801 can assume, thereby normalizing the dynamic range of the class tap. Hereafter, the dynamic range of a class tap that has been normalized will be referred to as "normalized dynamic range" as appropriate. Note that normalizing the dynamic range of a class tap is not necessarily indispensable.

In step S552 the motion amount control unit 877 determines whether or not the normalized dynamic range is greater than a predetermined threshold value. The predetermined threshold employed may be 0.5 or the like, for example.

In the event that the normalized dynamic range is determined to be greater than the predetermined threshold value in step S552, the flow proceeds to step S553, and the motion amount control unit 877 takes this to mean that the change in level in the image imaged with the CMOS imager 801 near the position of the pixel of interest is great, and accordingly generates control information to control the position of the condensing lens 852 to a position away from the photodiode 851, i.e., a position whereby subject light of a narrow range is cast into the photodiode 851, and the flow returns.

In the event that the normalized dynamic range is determined to be not greater than the predetermined threshold value in step S552, the flow proceeds to step S553, and the motion amount control unit 877 takes this to mean that the level image imaged with the CMOS imager 801 near the position of the pixel of interest is smooth, and accordingly generates control information to control the position of the condensing lens 852 to a position close to the photodiode 851, i.e., a position whereby subject light of a wide range is cast into the photodiode 851, and the flow returns.

While description has been made here regarding an arrangement wherein the normalized dynamic range of the class tap is used as information indicating the activity near the position of the pixel of interest in the image imaged by the CMOS imager 801, other arrangements may be made besides arrangements using class taps, such as an arrangement using the difference between the maximum value and the minimum value of multiple arbitrary pixels near a prediction tap or a like pixel of interest, as information indicating the activity near the position of the pixel of interest.

Also, in the case described above, control of the condensing lens 852 was made to one of two positions by controlling the MEMS unit 853, i.e., a position close to the photodiode 851 and a position away therefrom, but the position of the condensing lens 852 may be controlled to three positions, or more.

Figure 69:
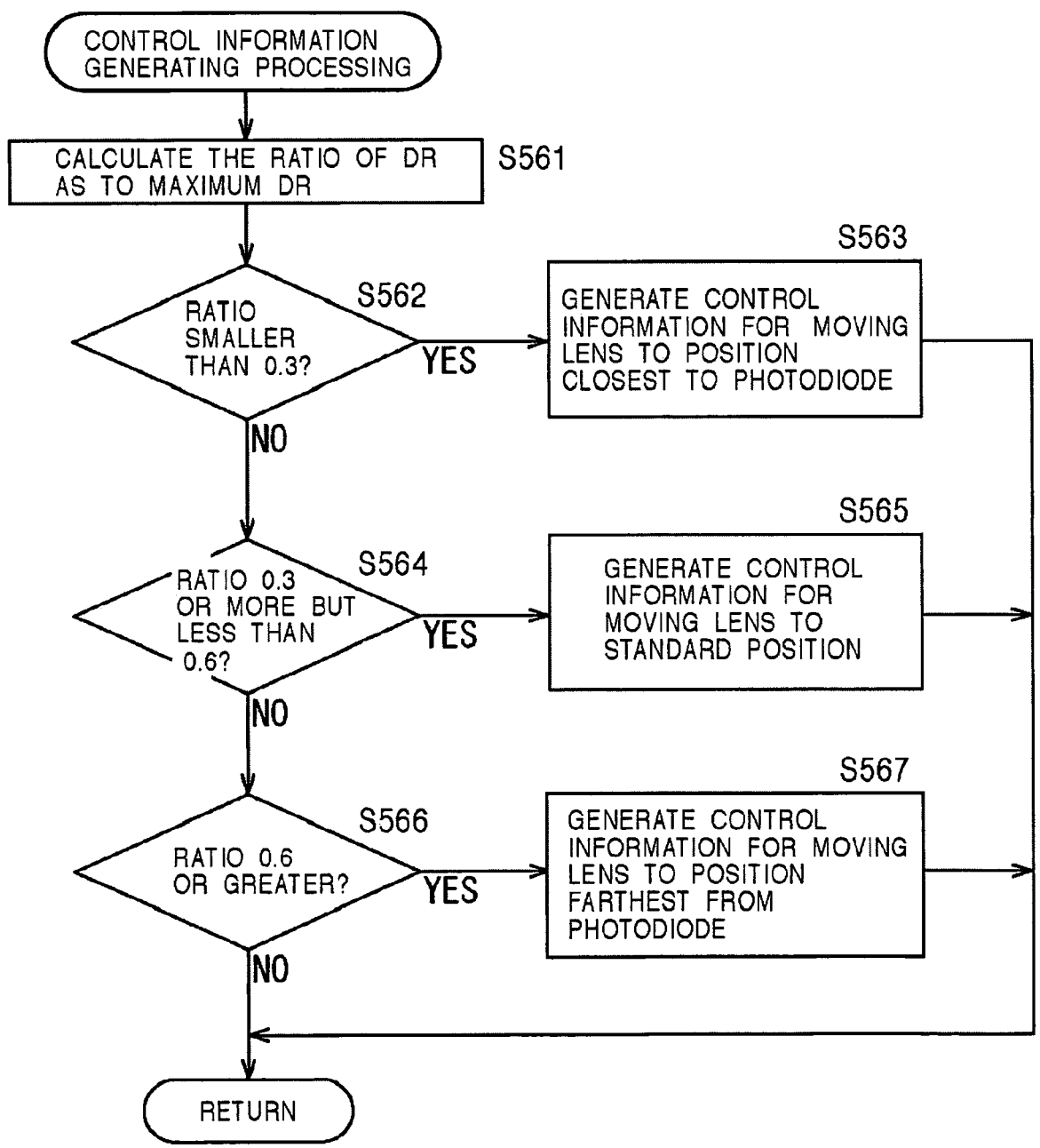
FIG. 69 is a flowchart describing control information generation processing.

Next, the control information generating processing in step S544 in FIG. 67 wherein position of the condensing lens 852 is controlled to one of the three positions of the standard position, the position close to the photodiode 851, and the position away from the photodiode 851, as shown in FIGS. 63A through 63C, will be described with reference to the flowchart in FIG. 69.

First, in step S561, the motion amount control unit 877 obtains the normalized dynamic range which is the ratio of the dynamic range of the class tap of the pixel of interest as to the maximum dynamic range, by normalizing the dynamic range of the class tap of the pixel of interest, and the flow proceeds to step S562.

In step S562, the motion amount control unit 877 determines whether or not the normalized dynamic range is relatively small, e.g., a value smaller than 0.3.

In the event that the normalized dynamic range is determined to be a value smaller than 0.3 in step S562, the flow proceeds to step S563, where the motion amount control unit 877 takes the amount of change in level near the position of the pixel of interest in the image imaged with the CMOS imager 801 to be small, and accordingly generates control information to control the position of the condensing lens 852 to the standard position, i.e., a position whereby subject light of an intermediate range is cast into the photodiode 851, and the flow returns.

In step S562, in the event that the normalized dynamic range is determined not to be a value smaller than 0.3, the flow proceeds to step S564, and the motion amount control unit 877 determines whether or not the normalized dynamic range is neither small nor great, e.g., a value 0.3 or greater but less than 0.6.

In the event that the normalized dynamic range is determined to be a value 0.3 or greater but less than 0.6 in step S564, the flow proceeds to step S565, where the motion amount control unit 877 takes the amount of change in level near the position of the pixel of interest in the image imaged with the CMOS imager 801 to be neither great nor small, and accordingly generates control information to control the position of the condensing lens 852 to a position away from the photodiode 851, i.e., a position whereby subject light of a narrow range is cast into the photodiode 851, and the flow returns.

In step S564, in the event that the normalized dynamic range is determined not to be in a value 0.3 or greater but less than 0.6, the flow proceeds to step S566, and the motion amount control unit 877 determines whether or not the normalized dynamic range is relatively great, e.g., a value greater than 0.6.

In the event that the normalized dynamic range is determined to be a value greater than 0.6 in step S566, the flow proceeds to step S567, where the motion amount control unit 877 takes the amount of change in level near the position of the pixel of interest in the image imaged with the CMOS imager 801 to be great, and accordingly generates control information to control the position of the condensing lens 852 to a position away from the photodiode 851, i.e., a position whereby subject light of a narrow range is cast into the photodiode 851, and the flow returns.

Also, in step S566, in the event that the normalized dynamic range is determined not to be a value greater than 0.6, the motion amount control unit 877 handles this as an error and returns without generating control information. In this case, the position of the condensing lens 852 is maintained at the same position as before, for example.

The arrangement described above involves the coefficient generating unit 824 shown in FIGS. 56 and 65 storing tap coefficients for each class obtained by learning beforehand, but with the coefficient generating unit 824, tap coefficients may be generated for each class capable of yielding the desired quality images, from coefficient seed data serving as seeds, as if it were, and predetermined parameters.

The configuration of the coefficient generating unit for generating tap coefficients for each class from the coefficient seed data and predetermined parameters is the same as the configuration of the coefficient generating unit 124 shown in FIG. 30, so detailed description thereof will be omitted (see FIGS. 30 through 36 and the description thereof).

Also, the configuration of the corresponding learning device is the same as that of the learning device shown in FIG. 20, but the features extracting unit 136 configures class taps having the same tap configuration as those configured by the class tap extracting unit 822, and supplies these to the class classification unit 137. The class classification unit 137 generates the same class code as that which the class code generating unit 823 configures.

In the event that tap coefficients are generated for each class according to parameters corresponding to resolution or the like as shown in FIG. 30 at the coefficient output unit 124, the CMOS imager 801 may be controlled according to parameters, rather than according to class code or class tap activity.

Figure 70:
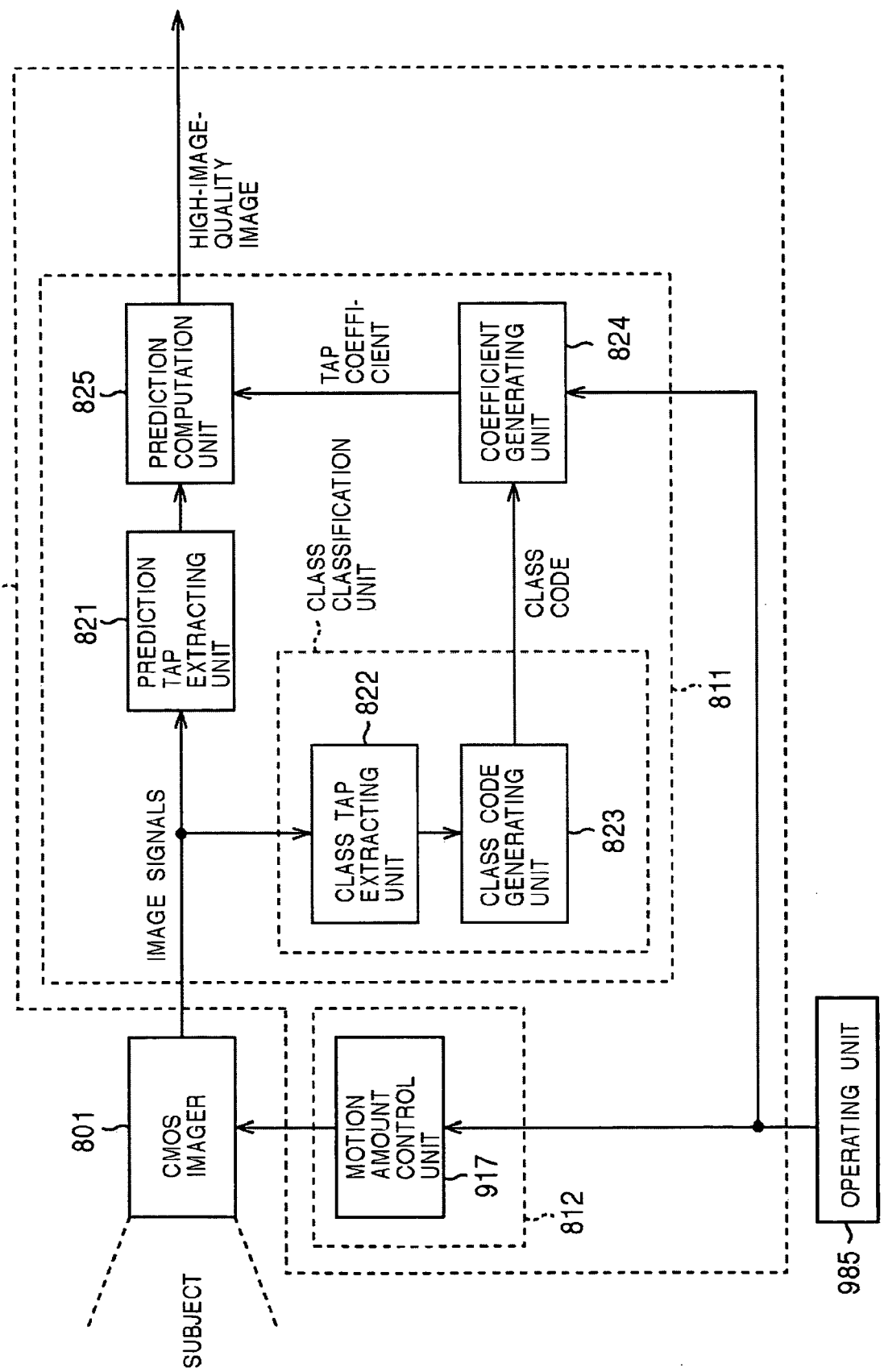
FIG. 70 is a block diagram illustrating a third configuration example of the DRC circuit 802.

FIG. 70 illustrates another configuration example of the DRC circuit 802 which controls the CMOS imager 801 according to the parameters. Note that the components which correspond to those in FIGS. 56 or 65 are denoted with the same reference numerals, and description thereof will be omitted as appropriate. Put simply, the DRC circuit 802 which is illustrated in FIG. 70 is basically the same as that illustrated in FIG. 56, other than an a motion amount control unit 917 being provided instead of the DL 826 of the control unit 812 and the motion amount control unit 827 thereat.

In FIG. 70, a user operates the operating unit 985, which outputs parameters z corresponding to the operations thereof to the coefficient generating unit 824 and the motion amount control unit 917. The coefficient generating unit 824 is configured as shown in FIG. 30, and configures tap coefficients for each class based on the parameter z supplied from the operating unit 985, and outputs tap coefficients thereof which indicate the class code supplied from the class code generating unit 823 to the prediction computing unit 825.

The motion amount control unit 917 controls the CMOS imager 801 corresponding to the parameters z supplied from the operating unit 985. That is to say, in the event that the parameter z is great, the coefficient generating unit 824 generates tap coefficients for greatly improving the resolution, and in the event that the parameter z is small, the coefficient generating unit 824 generates tap coefficients for slightly improving the resolution. With the DRC unit 811, in the event that tap coefficients for greatly improving the resolution are used, the pixels forming the prediction tap should also have high resolution to be suitable for the signal processing performed at the DRC unit 811. Also, with the DRC unit 811, in the event that tap coefficients for slightly improving the resolution are used, the pixels forming the prediction tap should also have resolution which is not that high, to be suitable for the signal processing performed at the DRC unit 811.

Accordingly, in the event that the parameter z is great and a tap coefficient for greatly improving the resolution has been generated, the motion amount control unit 917 controls the position of the condensing lens 852 to a position away from the photodiode 851 for example, so that subject light of a narrow range is cast into the photodiode 851. Also, in the event that the parameter z is small and a tap coefficient for slightly improving the resolution has been generated, the motion amount control unit 917 controls the position of the condensing lens 852 to a position close to the photodiode 851 for example, so that subject light of a wide range is cast into the photodiode 851.

The DRC circuit 802 may be realized by dedicated hardware, or can be realized by causing a computer such as a microcomputer comprising a CPU (Central Processing Unit), (including a DSP (Digital Signal Processor)) and semiconductor memory and the like, to execute a program for carrying out the above-described processing.

The program may be installed in the computer to begin with, or may be stored on removable storage media such as a flexible disk, a CD-ROM (Compact Disc Read Only Memory), a MO (Magneto-Optical) disk, a DVD (Digital Versatile Disc), a magnetic disk, semiconductor memory, or the like, and provided as so-called packaged software.

Besides installing the program to the microcomputer from such a removable recording medium, the program may be transferred to the computer from a download site wirelessly via a satellite such as a digital broadcast satellite, or transferred over cable via a network such as a LAN (Local Area Network) or the Internet, and downloaded and installed.

Now, in the present specification, the processing steps described in the code of the program for causing a computer to carry out the various processes do not need to be processed in time-sequence in the order give in the flowchart, and may be executed in parallel or individually (e.g., parallel processing or object-based processing). Further, the program may be processed by a single computer, or among multiple computers.

As described above, the CMOS imager 801 is controlled such that image signals suitable for signal processing at the DRC unit 811 downstream therefrom are output, so image signals with improved image quality can be obtained by the signal processing of the DRC unit 811.

Note that while images are taken with a CMOS imager (CMOS sensor) with the present embodiment, other imaging means, such as CCDs for example, may be used instead.

Also, while the CMOS imager 801 and DRC circuit 802 are formed on one chip with the present embodiment, the CMOS imager 801 and DRC circuit 802 may be formed on separate chips as well.

Further, with the present embodiment, while the range of subject light cast into the photodiode 851 is controlled by controlling the position of the condensing lens 852, the method for controlling the range of subject light cast into the photodiode 851 is by no means restricted to this. For example, an arrangement may be made wherein a diaphragm using MEMS technology is provided to each pixel of the CMOS imager 801, so that the range of subject light cast into the photodiode 851 can be adjusted by adjusting the diaphragm. Also, besides controlling the range of subject light cast into the photodiode 851, the amount of time of receiving light (exposure time) at the photodiode 851, or the like, may be controlled as well.

What is claimed is:

1. A signal processing device which performs signal processing for converting first image signals into second image signals, said device comprising:
   class classification means for classifying said second image signals into one of a plurality of classes, according to a level distribution of said first image signals output from imaging means for converting subject light, which is light from a subject, into image signals;
   control means for controlling said imaging means according to the level distribution of said first image signals;

tap coefficient output means for outputting tap coefficients for each of said classes, said tap coefficients gained by a learning process; and computing means for obtaining said second image signals by performing computation using said first image signals output by said imaging means controlled by said control means, and tap coefficients of said class obtained by said class classification means.

2. A signal processing device according to claim 1, said imaging means further comprising a condenser lens for condensing subject light on each pixel of said imaging means, wherein said control means control the position of said condenser lens.

3. A signal processing device according to claim 1, wherein said imaging means is a Complementary Metal Oxide Semiconductor sensor.

4. A signal processing device according to claim 3, wherein the signal processing device is integrally formed with said Complementary Metal Oxide Semiconductor sensor.

5. A signal processing device according to claim 1, wherein said imaging means is a Charge Coupled Device.

6. A signal processing device according to claim 1, said class classification means comprising:

class tap extracting means for extracting, from said first image signals, pixels to serve as class taps to be used for said class classification; and class code generating means for obtaining level distribution of 1 bit of a pixel of said class tap, according to a dynamic range of said pixel of said class tap, and generating class code representing a class corresponding to the level distribution thereof.

7. A signal processing device according to claim 6, wherein said control means controls said imaging means corresponding to the number of times of bit inversion in the level distribution of said 1 bit.

8. A signal processing device according to claim 6, wherein said control means controls said imaging means corresponding to the dynamic range of said pixel of said class tap.

9. A signal processing device according to claim 6, wherein said computing means perform computation using a first image signal output from said imaging means controlled by said control means, and the tap coefficient of said class obtained corresponding to the level distribution of the first image signal one frame or one field back in the first image signals.

10. A signal processing device which performs signal processing for converting first image signals into second image signals, said device comprising:

class classification means for classifying said second image signals into one of a plurality of classes, according to a level distribution of said first image signals output from imaging means for converting subject light, which is light from a subject, into image signals;

activity detecting means for detecting an activity of said first image signals;

control means for controlling said imaging means according to the activity of said first image signals;

tap coefficient output means for outputting tap coefficients for each of said classes, said tap coefficients gained by a learning process; and computing means for obtaining said second image signals by performing computation using said first image signals output by said imaging means controlled by said control means, and tap coefficients of said class obtained by said class classification means.

11. A signal processing device according to claim 10, said imaging means further comprising a condenser lens for condensing subject light on each pixel of said imaging means, wherein said control means control the position of said condenser lens.

12. A signal processing device according to claim 10, wherein said imaging means is a Complementary Metal Oxide Semiconductor sensor.

13. A signal processing device according to claim 10, wherein said imaging means is a Charge Coupled Device.

14. A signal processing device according to claim 10, wherein said activity detecting means obtains a dynamic range of a predetermined plurality of pixels of said first image signals as said activity.

15. A signal processing device which performs signal processing for converting first image signals into second image signals, said device comprising:

class classification means for classifying said second image signals into one of a plurality of classes, according to level distribution of said first image signals output from imaging means for converting subject light, which is light from a subject, into image signals;

parameter output means for outputting parameters representing the resolution of said second image signals;

control means for controlling said imaging means according to said parameters;

tap coefficient generating means for generating tap coefficients for each of said classes, from coefficient seed data gained by learning and from said parameters; and computing means for obtaining said second image signals by performing computation using said first image signals output by said imaging means controlled by said control means, and tap coefficients of said class obtained by said class classification means.

16. A signal processing device according to claim 15, said imaging means further comprising a condenser lens for condensing subject light on each pixel of said imaging means, wherein said control means control the position of said condenser lens.

17. A signal processing device according to claim 15, wherein said imaging means is a Complementary Metal Oxide Semiconductor sensor.

18. A signal processing device according to claim 15, wherein said imaging means is a Charge Coupled Device.

19. A signal processing method for performing signal processing for converting first image signals into second image signals, said method comprising:

a class classification step for classifying said second image signals into one of a plurality of classes, according to a level distribution of said first image signals output from imaging means for converting subject light, which is light from a subject, into image signals;

a control step for controlling said imaging means according to the level distribution of said first image signals;

a tap coefficient output step for outputting tap coefficients for each of said classes, said tap coefficients gained by a learning process; and a computing step for obtaining said second image signals by performing computation using said first image signals output by said imaging means controlled in said control step, and tap coefficients of said class obtained in said class classification step.

20. A computer readable storage medium encoded with computer executable instructions, which when executed by a computer, cause the computer to perform a method of signal processing for converting first image signals into second image signals, said method comprising:

a class classification step for classifying said second image signals into one of a plurality of classes, according to a level distribution of said first image signals output from imaging means for converting subject light, which is light from a subject, into image signals;

a control step for controlling said imaging means according to the level distribution of said first image signals;

a tap coefficient output step for outputting tap coefficients for each of said classes, said tap coefficients gained by a learning process; and a computing step for obtaining said second image signals by performing computation using said first image signals output by said imaging means controlled in said control step, and tap coefficients of said class obtained in said class classification step.

21. A signal processing method for performing signal processing for converting first image signals into second image signals, said method comprising:

a class classification step for classifying said second image signals into one of a plurality of classes, according to a level distribution of said first image signals output from imaging means for converting subject light, which is light from a subject, into image signals;

an activity detecting step for detecting an activity of said first image signals;

a control step for controlling said imaging means according to the activity of said first image signals;

a tap coefficient output step for outputting tap coefficients for each of said classes, said tap coefficients gained by a learning process; and a computing step for obtaining said second image signals by performing computation using said first image signals output by said imaging means controlled in said control step, and tap coefficients of said class obtained in said class classification step.

22. A computer readable storage medium encoded with computer executable instructions, which when executed by a computer, cause the computer to perform a method of signal processing for converting first image signals into second image signals, said method comprising:

a class classification step for classifying said second image signals into one of a plurality of classes, according to a level distribution of said first image signals output from imaging means for converting subject light, which is light from a subject, into image signals;

an activity detecting step for detecting an activity of said first image signals;

a control step for controlling said imaging means according to the activity of said first image signals;

a tap coefficient output step for outputting tap coefficients for each of said classes, said tap coefficients gained by a learning process; and a computing step for obtaining said second image signals by performing computation using said first image signals output by said imaging means controlled in said control step, and tap coefficients of said class obtained in said class classification step.

23. A signal processing method for performing signal processing for converting first image signals into second image signals, said method comprising:

a class classification step for classifying said second image signals into one of a plurality of classes, according to a level distribution of said first image signals output from imaging means for converting subject light, which is light from a subject, into image signals;

a parameter output step for outputting parameters representing the resolution of said second image signals;

a control step for controlling said imaging means according to said parameters;

a tap coefficient generating step for generating tap coefficients for each of said classes, from coefficient seed data gained by learning and from said parameters; and a computing step for obtaining said second image signals by performing computation using said first image signals output by said imaging means controlled in said control step, and tap coefficients of said class obtained in said class classification step.

24. A computer readable storage medium encoded with computer executable instructions, which when executed by a computer, cause the computer to perform a method of signal processing for converting first image signals into second image signals, said method comprising:

a class classification step for classifying said second image signals into one of a plurality of classes, according to a level distribution of said first image signals output from imaging means for converting subject light, which is light from a subject, into image signals;

a parameter output step for outputting parameters representing the resolution of said second image signals;

a control step for controlling said imaging means according to said parameters;

a tap coefficient generating step for generating tap coefficients for each of said classes, from coefficient seed data gained by learning and from said parameters; and a computing step for obtaining said second image signals by performing computation using said first image signals output by said imaging means controlled in said controlling control step, and tap coefficients of said class obtained in said class classification step.

25. A signal processing device which performs signal processing for converting first image signals into second image signals, said device comprising:

a class classification unit configured to classify said second image signals into one of a plurality of classes, according to a level distribution of said first image signals output from an imaging unit configured to convert subject light, which is light from a subject, into image signals;

a control unit configured to control said imaging unit according to the level distribution of said first image signals;

a tap coefficient output unit configured to output tap coefficients for each of said classes, said tap coefficients gained by a learning process; and a computing unit configured to obtain said second image signals by performing computation using said first image signals output by said imaging unit controlled by said control unit, and tap coefficients of said class obtained by said class classification unit.

26. A signal processing device which performs signal processing for converting first image signals into second image signals, said device comprising:

a class classification unit configured to classify said second image signals into one of a plurality of classes, according to a level distribution of said first image signals output from an imaging unit configured to convert subject light, which is light from a subject, into image signals;

an activity detecting unit configured to detect an activity of said first image signals;

a control unit configured to control said imaging unit according to the activity of said first image signals;

a tap coefficient output unit configured to output tap coefficients for each of said classes, said tap coefficients gained by a learning process; and a computing unit configured to obtain said second image signals by performing computation using said first image signals output by said imaging unit controlled by said control unit, and tap coefficients of said class obtained by said class classification unit.

27. A signal processing device which performs signal processing for converting first image signals into second image signals, said device comprising:

a class classification unit configured to classify said second image signals into one of a plurality of classes, according to a level distribution of said first image signals output from an imaging unit configured to convert subject light, which is light from a subject, into image signals;

a parameter output unit configured to output parameters representing the resolution of said second image signals;

a control unit configured to control said imaging unit according to said parameters;

a tap coefficient generating unit configured to generate tap coefficients for each of said classes, from coefficient seed data gained by learning and from said parameters; and a computing unit configured to obtain said second image signals by performing computation using said first image signals output by said imaging means controlled by said control unit, and tap coefficients of said class obtained by said class classification unit.

* * * * *